United States Patent [19]

Von Kohorn

[11] Patent Number: 5,759,101
[45] Date of Patent: *Jun. 2, 1998

[54] CENTRAL AND REMOTE EVALUATION OF RESPONSES OF PARTICIPATORY BROADCAST AUDIENCE WITH AUTOMATIC CREDITING AND COUPONING

[75] Inventor: Henry Von Kohorn, Vero Beach, Fla.

[73] Assignee: Response Reward Systems L.C., Vero Beach, Fla.

[*] Notice: The term of this patent shall not extend beyond the expiration date of Pat. No. 4,745,468.

[21] Appl. No.: 226,073

[22] Filed: Apr. 11, 1994

Related U.S. Application Data

[63] Continuation-in-part of Ser. No. 25,397, Feb. 25, 1993, Pat. No. 5,508,731, which is a continuation-in-part of Ser. No. 763,672, Sep. 19, 1991, Pat. No. 5,283,734, which is a continuation-in-part of Ser. No. 603,882, Oct. 25, 1990, Pat. No. 5,057,915, which is a continuation-in-part of Ser. No. 424,089, Oct. 19, 1989, Pat. No. 5,034,807, which is a continuation-in-part of Ser. No. 192,355, May 10, 1988, Pat. No. 4,926,255, which is a continuation-in-part of Ser. No. 837,827, Mar. 10, 1986, Pat. No. 4,745,468.

[51] Int. Cl.$^6$ ........................................................ A63F 9/22
[52] U.S. Cl. .................................................................. 463/40
[58] Field of Search ........................ 463/40, 41, 42, 463/16, 9; 364/410, 412; 434/307 R, 308, 309, 322, 323; 273/138 A Primary Examiner—Jessica Harrison
Assistant Examiner—Michael O'Neill
Attorney, Agent, or Firm—Perman & Green, LLP

[57] ABSTRACT

A system and method for evaluating responses to broadcast programs, such as television programs, includes an instructional signal modulated onto a signal transmitted concurrently with the television program, simulcast, or time-multiplexed with a television. At each of a plurality of remote receiving stations, one or more members of a remote audience has the opportunity to respond to a situation presented in the television program by entering a response on a keyboard. The system includes response evaluation circuitry which may be located at a central facility or partially at the central facility and partially at each remote receiving station, or completely within a response unit at each remote receiving station, in the latter case the response unit having a memory responsive to the instructional signal for storing acceptable responses, a comparison circuit for comparing responses entered at the keyboard with those stored in the memory, circuitry for scoring responses in accordance with commands from the instructional signal, and a recording device for providing a permanent record of the audience score at the remote station. For conducting a sweepstakes, numbers or other responses are entered at the remote stations and are stored at a central facility for verification. The program may be presented live conducted by a host at a central station, or by a prerecorded message accessible by telephone from a remote station with regulation from a central station.

35 Claims, 28 Drawing Sheets

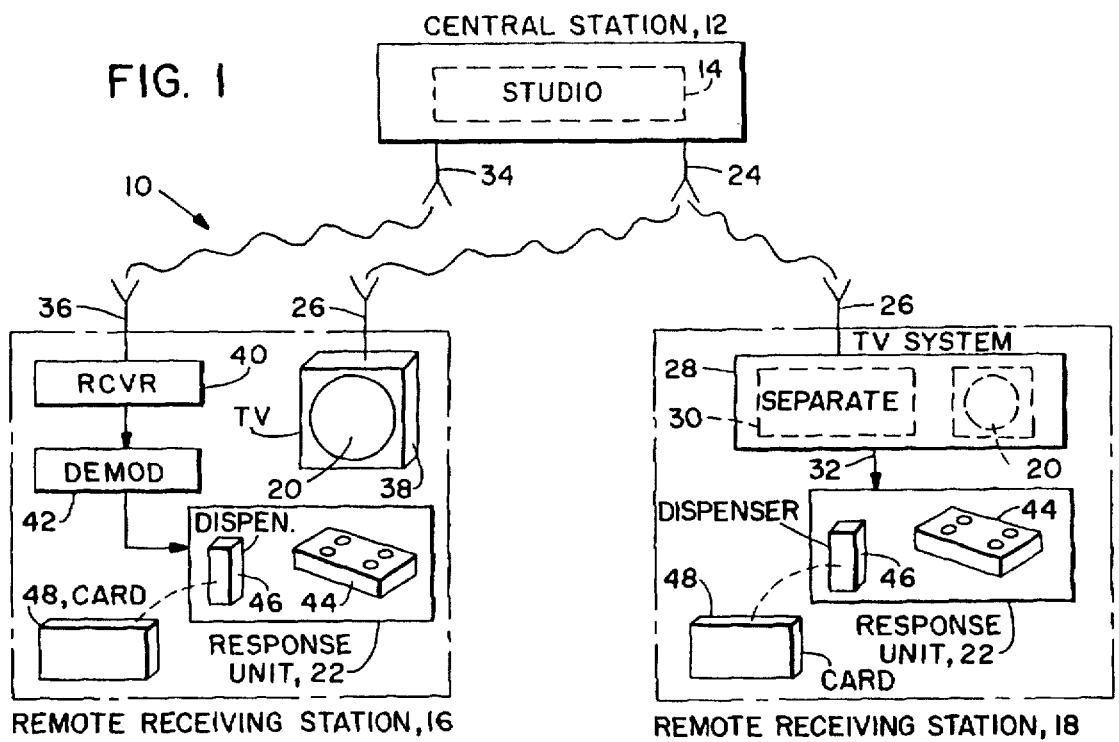
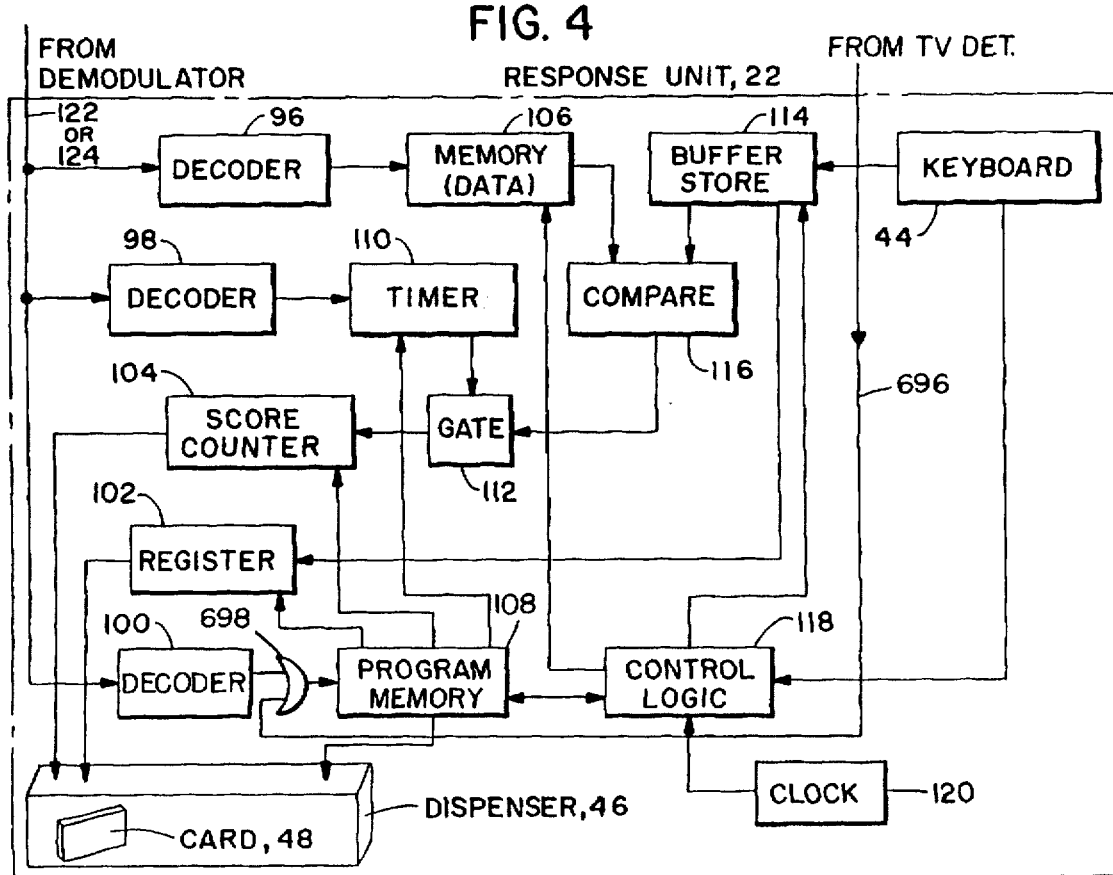

FIG. 7
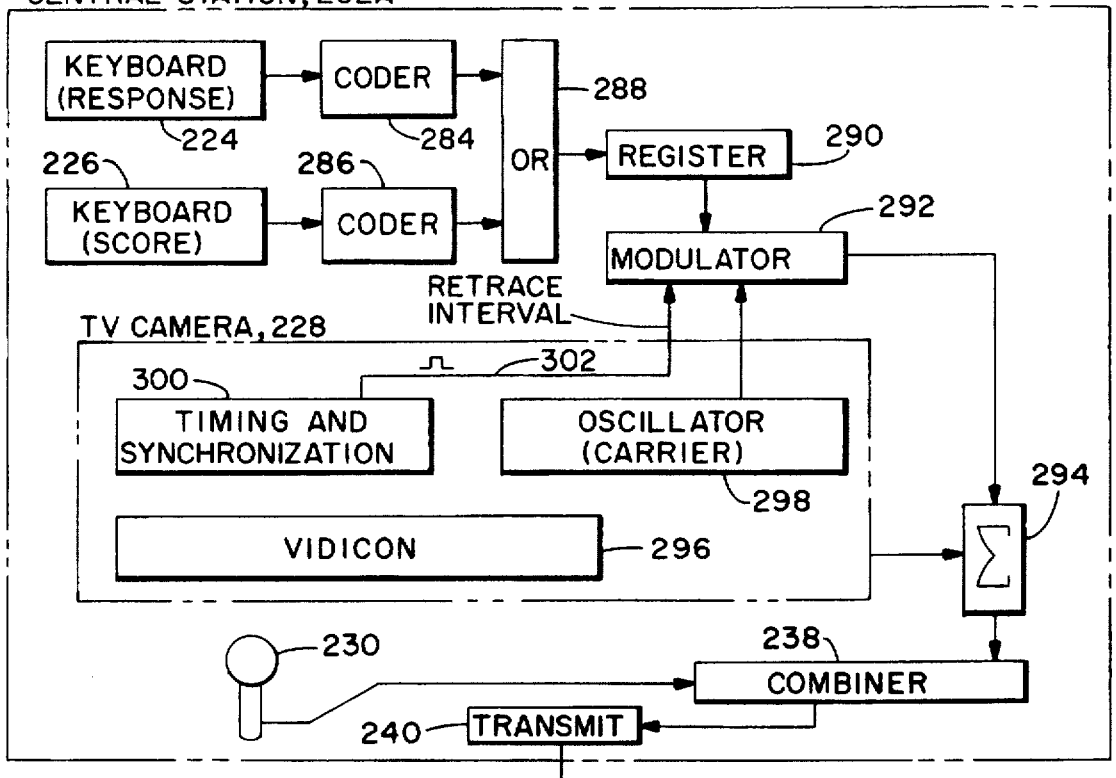
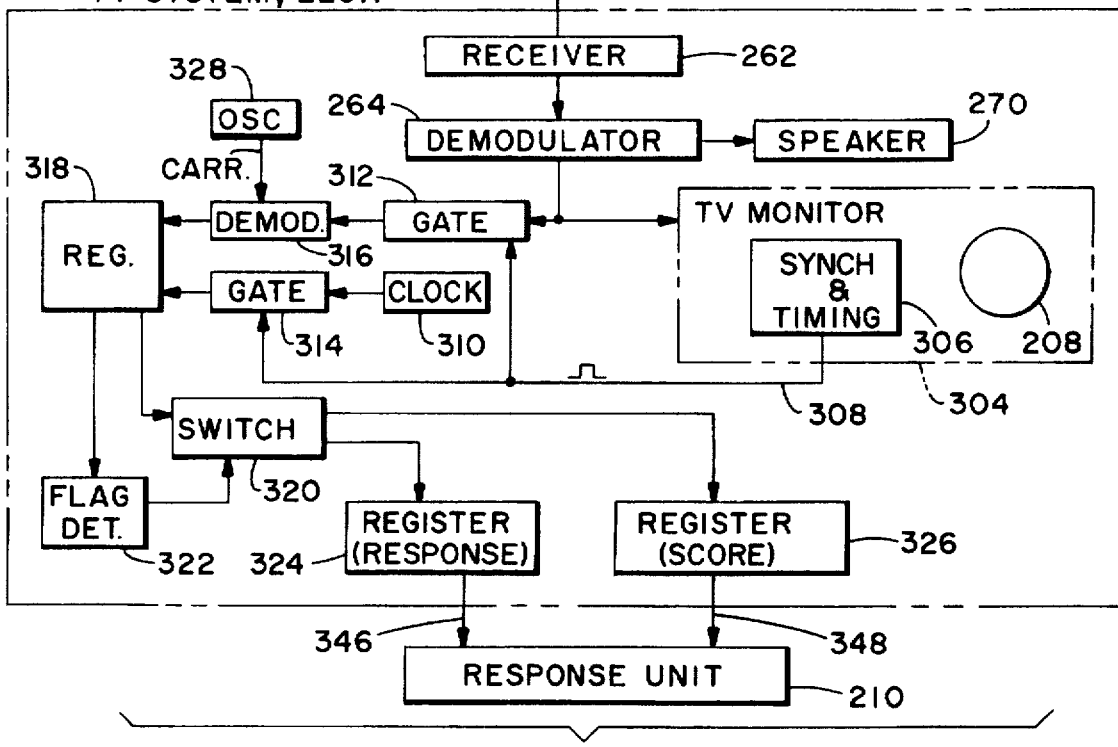

CENTRAL AND REMOTE EVALUATION OF RESPONSES OF PARTICIPATORY BROADCAST AUDIENCE WITH AUTOMATIC CREDITING AND COUPONING

BACKGROUND OF THE INVENTION

This application is a continuation-in-part of application Ser. No. 08/025,397 filed Feb. 25, 1993, now U.S. Pat. No. 5,508,731, which is a continuation in part of application Ser. No. 07/763,672 filed Sep. 19, 1991, now U.S. Pat. No. 5,283,734, which is a continuation in part of application Ser. No. 07/603,882 filed Oct. 25, 1990, now U.S. Pat. No. 5,057,915, which is a continuation-in-part of application Ser. No. 07/424,089 filed Oct. 19, 1989, now U.S. Pat. No. 5,034,807, which is a continuation-in-part of application Ser. No. 192,355, filed May 10, 1988, now U.S. Pat. No. 4,926,255, which is continuation-in-part of application Ser. No. 837,827 filed Mar. 10, 1986, now U.S. Pat. No. 4,745,468. Related material is found in U.S. Pat. No. 4,876,592 which is also a continuation-in-part of said application Ser. No. 837,827.

This invention relates to transmission by electronic media including radio and television broadcasting programs, as well as recordings of such programs, to listeners and viewers of the programs and, more particularly, to the provision of signals designating questions or tasks including a wagering situation, to the provision of response criteria for evaluating responses of the listeners and viewers of the broadcast or prerecorded programs, and to the dispensing of awards to individual listeners and viewers having provided answers meeting the response criteria and/or placed a wager.

The invention also particularly relates to the transmission of signals conveying scenarios of events about to take place or taking place and to outcome criteria for evaluating predictions of listeners and viewers of the broadcasts of such events and to the dispensing of awards to individual listeners and viewers having provided predictions meeting the outcome criteria. An example of a situation involving a prediction is a wagering situation in which a player designates a wager applied to a possible outcome of a given scenario.

A common form of program transmitted by the broadcast media is the quiz program. Typically, in such a program, a panel of people provide answers to questions arising from the subject matter of the quiz. Often, the answers are indicated by use of a keyboard with electronic circuitry. The answers may be provided in response to questions which are asked directly, or in response to a situation such as a chess game, or task presented by the program such as in the solving of a puzzle. Other situations such as in sports, call for predictions of outcomes of events.

A characteristic of such quiz programs is the fact that the responses to the questions are limited to participants in the studio audience. The much larger external audience, namely the listeners of radio and viewers of television, are generally excluded from participation except for those few people who, on occasion, may have the opportunity to call in a response via telephone to a situation arising in the program. Letter writing has also been employed as a means of response to questions and other matters raised by the program.

Thus, it is apparent that a problem exists in that a large percentage of the external audience is essentially excluded from active participation in the broadcast programs. In view of the fact that the studio audiences can provide their responses electronically, it is clear that personal involvement, such as conversation among participants, is not necessarily required. It is, therefore, apparent that such programs should be open to participation by the larger external audience in addition to the studio audience; yet, no system providing for such participation has been available.

It is noted that this problem is not limited to quiz programs only, but that other forms of programs in the areas of education and research might also be conducted in a fashion allowing active public participation if a suitable system were available to make such public participation possible. A desirable feature of such a system would be the capability for evaluating and recording the responses, a feature that would be very useful in the case of educational programs because such a feature would permit a teacher to grade or otherwise evaluate papers and examinations dispensed to students by the broadcast media. Such a system would also be useful in commercial ventures wherein a prize is to be given to a participant providing an acceptable answer. In such a case, the participant would bring the recorded answer, which might be in the form of a coded credit card, to a store or other establishment for receipt of the prize. This would be a great convenience in the implementation of a sales and advertising program. Responses by the listening or viewing audience can also be used in conducting a survey of public opinion. However, in spite of the advantages which would be provided by such a system, for including the listening and viewing audience, no practical system has yet been available.

It would be advantageous also if the equipment of the system could be employed in the conduct of wagering, whether a simple lottery or a more complex situation involving wagering based on responses to a quiz game, educational game or a situation relating to the advertising of a product. It would be advantageous furthermore if such wagering could be conducted electronically so as to inhibit forgery and to reduce the number of inconvenient trips which a better must make to a lottery agent. Such a system and method of wagering is not available at the present time.

SUMMARY OF THE INVENTION

The foregoing problem is overcome, and other advantages are provided by a system for the evaluation of responses to a broadcast or a prerecorded program wherein a response may include the entry of a wager on a possible outcome of a situation presented in the program. In accordance with the invention, the system provides for the transmission of signals designating conditions of the wagering and, in the case of scenarios, games or other events upon which a person may wish to bet, the system provides questions and response criteria along with a transmission of the broadcast program. In the event of questions or similar tasks, signals may be recorded prior to transmission, and may be transmitted at a fixed predetermined time, or upon request of a person who will respond to the program and/or questions. The invention includes both method and system aspects which create added interest and excitement among listeners and viewers, and thus tend to increase the audience of stations carrying programs of the type to be described hereinafter.

In accordance with the theory of the invention, two groups of signals are broadcast, wherein each of the two signal groups may be divided in two portions designated as first and second signals. In the first signal group, the first of the two signals includes the program signal itself which may be broadcast from a radio station or television station to the listening or viewing audience. The second signal of the first group is a signal transmission setting forth a task, such as the answering of one or more questions which may be viewed on a television screen and/or listened to over radio or the audio portion of the television transmission. For simplicity in describing the invention, an audience viewing a televised program is presumed. It is understood that the description of the invention in terms of the viewing audience applies also to the listening audience of a radio broadcast.

The second of the two signal groups is in the nature of an instructional signal group identifying the amount of time available for an answer, the proper content and form of an acceptable answer, and a mode of scoring the answers. In one embodiment of the invention, the first signal of the second signal group sets forth the desired acceptable answer or answers, and the second signal provides the mode of scoring responses, such as the parameters, formulas and other response criteria to be employed in the scoring of the answers. Therefore, in this one embodiment of the invention, the two signal groups include at least four sets of signals which are transmitted, each of which can be varied independently of the other, and which may be transmitted concurrently or at different times.

Included at the site of each viewer in the external or remote audience is a television set, plus electronic response equipment having circuitry for reception of the instructional signal group transmitted from a central station, the response equipment also including a keyboard for designating answers or responses to the questions, timing circuitry, circuitry for comparing a response to one or more designated answers to determine acceptability of a response, scoring circuitry, and a recording device for recording answers to the question. The recording device includes preferably a dispenser for dispensing a record such as a printout, or a magnetizable card containing a person's responses to the questions and/or a person's score in answering the questions.

A particular advantage of the invention is the capacity for interaction between a person conducting a broadcast program and the external audience. This may be illustrated by way of example wherein a sportscaster is describing a sporting event such as a football game. The questions asked by the sportscaster may pertain to the winning team, to plays that have been accomplished, as well as to questions which may be called in by telephone from the listening/viewing audience. During the program, commercials may be aired, and various products and/or services may be described and offered to the viewing audience.

In the practice of the invention, it is noted that signals of the instructional signal group, Group Two, may be transmitted before, concurrently, or subsequent to the transmission of the program signals in accordance with the nature of the questions and responses required. For example, in the event that the program situation deals with a college professor giving an examination, the correct or acceptable answers to the various questions and the procedure for scoring answers to individual ones of the questions can be transmitted before the lecture in which the professor asks the questions. In the event that a limited period of time is available for response to each of the questions, then, at least a portion of the instructional signals, Group Two, must be sent concurrently with the program data, this portion being a timing signal which the professor would initiate when he asks the question. The timing signal would initiate operation of a timer in the electronic equipment at each of the receiving stations which are tuned to the broadcast program, the timer then clocking a requisite amount of time in accordance with an instructional signal which has been previously transmitted or is concurrently transmitted with the program data. In yet a further example, in the case of an interactive situation wherein the professor is responding to a comment made by a student in the classroom or, possibly in response to a telephoned inquiry, the professor may then ask a question for which the instructional signal designating the nature of the response would be transmitted after the question has been asked.

At a receiving station the electronic equipment includes a response unit having a keyboard by which a viewer of the broadcast program enters a response. The response should be a desirable or correct response, or at least an acceptable response in order to receive credit. The response is stored in a buffer store for comparison with a correct or acceptable response which is stored in a data memory. One or more acceptable responses are provided as a data input to the data memory by the instructional signal group. The comparison is provided by comparison circuitry which outputs a signal via timing circuitry to a score counter to provide a score at the conclusion of responses to a question. The timing circuit, under control of a program memory, is activated upon request from the host of the transmitted program. Instructional signals transmitted by the host are modulated onto the audio portion of the transmitted signals and, subsequently at a receiving station, are demodulated and decoded to provide the data signals for the data memory, synchronization signals for operation of the timing circuitry, and instructional signals for operation of the program memory. Alternatively, the instructional signals may be transmitted at television frequencies by known methods, such as the use of vertical blanking intervals or other unused parts of a television transmission. The resulting score from the score counter may be recorded in a readout device which, in a preferred embodiment of the invention, provides a printout or a card with an encrypted value of the score in a magnetic strip that is readily read by automatic card readers. According to one embodiment, a register may be included for the storage of responses which are printed or typed out in the form of a message. The message may be passed on to the readout device under instruction of the program memory.

At each of the remote receiving stations, circuitry responsive to the third signals is provided for implementing the response criteria. In particular, provisions are made to evaluate responses to the same question at different difficulty levels. For example, different amounts of credit can be given based on the speed at which a viewer responds to the question. Also, answers showing a more detailed, accurate or comprehensive understanding can be weighted to provide greater credit for responding to the question. If desired, a set of response criteria may include only one difficulty level.

The readout or dispensing device provides a printout having at least two sets of information. The information may be provided on a tape or card in printed lettering and/or in a bar code format to show the value of any award which might be given, and a verification of the fact that the award has been made. The printout may also verify the identity of the person answering the question. The verification may be provided either by a signal transmitted from a central station as part of the instructional group of signals to be stored at the remote location or, alternatively, by use of a validation code taking the form of alphanumeric data and/or other symbols, such as a machine readable code, which the dispenser is capable of printing. The value of the award is printed preferably in alphanumeric form so as to be readily understandable by the participant.

In the event that a two-way cable system is available, such system may be used to advantage in the practice of the invention by providing for transmission of the television program to a remote audience while also enabling members of the remote audience to communicate responses or other commentary back to the broadcasting station.

It is recognized that there may be situations wherein it is impractical to have communication of receiving stations with a studio at the central station at the time when the program is being generated. The invention would then be practiced by use of a further embodiment in which the program and instructional signals, including response criteria and scoring criteria, would be recorded for playback to the receiving stations at a later time. Such a situation might arise in the case of an educational program to be employed in a school, or to a program of general public interest which might be employed in a vehicle for public transportation, such as an aircraft. In the event that television is available at the receiving stations, the transmission and receiving equipment would be the same as that employed for the embodiment of the invention as disclosed above. However, in the event that only audio reception is possible, as by the use of earphones in an aircraft, then a verbal description of the task-setting situation would be provided, both the task setting and instructional verbal signals being recorded in an audio tape recording. Each of the receiving stations may be provided with a dispenser of hard-copy of results to responses to the task-setting message or, alternatively, a central dispenser may be used as in a classroom or aircraft, the central dispenser communicating via a digital communication system to response units at each of the receiving stations.

The transmission of a program, such as the playback of an audio-visual tape, may be initiated by a member of the remote audience though cable communication, including telephone. In such instances, a member of the home audience calls a dedicated number, such as a 900-number, and requests the playing of a tape. Such request may be made through a central operator or by dialing further digits of a dedicated number, associated with a specific tape or program selected by the caller.

In accordance with an important aspect of the invention, participants in the remote audience can designate an area of interest. This is particularly important with respect to an award received by individual ones of the participants, such that the award is related directly to a participants area of interest. Thus, in the case of a game show wherein advertiser's products are displayed in various areas of interest, a participant of the remote audience can select a product area of interest and, subsequently, receive an award in the form of a coupon allowing him to purchase a product in the area of interest. This greatly increases a participant's interest in the game show. This feature of the invention also greatly increases the chance that a participant will employ his coupon, as by visiting the store of an advertiser to redeem his coupon.

A further advantage of this feature of the invention is that it can be implemented using the electronic communication systems employed in various embodiments of the invention, including the use of a central station to broadcast program material with its set of instructional signals and directives on the imprinting of a coupon. Furthermore, this can be employed using the electronic systems of the embodiments of the invention wherein the program and the instructional signals are prerecorded. This includes the prerecorded format in which recording apparatus may be located, for example, in an aircraft, or may be employed with participants in the home interconnected with a central station by means of a telephone network.

In terms of utilization of the foregoing electronic equipment, questions, instructions, and coupon imprinting directives are transmitted from the central station to the remote stations in a plurality of categories of interest. These categories of interest are presented by the host in the communication transmitted from the central station. For example, in the case of a televised program, the categories of interest may be presented directly on the television screen. In cases wherein the program is transmitted by an audio channel only, then the categories of interest would be listed audibly by the host. The participants at the remote station by use of his response unit, presses a key on the keyboard indicating his selection of a desired category or area of interest. Thereupon, the response unit is responsive only to those questions, instructions, and coupon printing directives pertaining to the selected category of interest, and ignores the remaining questions, instructions, and coupon-printing directives as being irrelevant to the operation of the response unit. This is implemented readily by transmitting to the remote response unit, to be stored in a memory therein, the set of acceptable responses and the accompanying scoring criteria and advertising information for each area of interest. Then a respondent need only signal the response unit as to his desired area of interest, the signal serving to address the corresponding region of the memory. The response unit then operates with the data for the desired area of interest.

Normally, broadcast contests presently conducted are sponsored by manufacturers or retailers of products. Successful respondents may receive prize coupons entitling them to a discount on merchandise promoted by a sponsor. However, winners often receive coupons carrying a discount on merchandise they do not intend to purchase at the time they receive such a coupon. Discount coupons tied in this manner to an unwanted product will not be redeemed and are useless to both the public and the sponsor. It is a weakness of the coupon system presently in use that the overall coupon redemption rate is less than 4%.

The disclosed system and methodology provide for a dispensing of coupons to members of a broadcast audience for redemption, and enable members of the audience who have acceptably responded to a task presented in a broadcast to win a prize coupon carrying a discount deductible from the price of a product selected by such a member for purchase. Local sponsors thereby may promote the sale of products.

The foregoing coupons may be issued in conjunction with a broadcast television and/or radio program requiring an audience response wherein a part or all of the program is conducted in the form of a lottery, or other wagering situation, in which case the coupon identifies the winning entity which may be a lottery number, or the identity of horse in a horse race, or the identity of a player in a sports event. This is accomplished in accordance with a further aspect of the invention in which the aforementioned equipment can be employed for conducting a lottery game in a fashion which is resistant to forgery.

In accordance with the invention, there is provided a central data storage facility in which all player responses and, when desired, the winning response(s) are stored. Player entries can be authenticated electronically prior to storage at the central facility, and are transmitted either electronically (as by two-way cable, or by modem over a telephone line) from remote sites of players to the central facility. Authentication is accomplished by comparing numbers or names assigned to players, including serial numbers of player entry devices, with reference data previously stored in the central facility. Further authentication is provided by storing at the central facility data, such as the player's response and the winning number(s), which appears also on the coupon presented for redemption. At a redemption center, an electronic communication link with the central facility permits instant comparison of the two sets of data to verify the authenticity of the coupon and prevent fraud. The central facility may be connected to the remote stations and to a credit agency by means of a telephone network which permits verification of a player's line of credit, and a charging of lottery fees against a preestablished credit limit.

In accordance with a further aspect of the invention, numerous central stations, such as television and/or radio stations, may be linked together with a common base station and numerous telephone hubs by a communications system to form a network of broadcast stations serving a much enlarged audience wherein members of the audience are located at their respective remote receiving stations. The network is ideally suited for presentation of network programs of general interest, such as a sweepstakes and other prize events, to the enlarged audience by interspersing relatively short programs in time slots between segments of regularly scheduled disparate broadcast programs from the central stations. The base station provides program material for retransmissions via the central stations of the network. The network program, for any one time slot, may be in any one of a number of forms, particularly a contest having a duration in a range of time extending from less than one minute up to possibly several minutes for presentation on television or radio. The network broadcast may take the form of a well-known network communication commonly employed today for news programs communicated across the country from the base station simultaneously to local broadcasting stations for retransmission to home radios and televisions.

The individual programs are transmitted one after the other from the base station in a sequence extending for the duration of a program, or throughout the day. Each of the network programs occupy a predetermined time slot within a program sequence wherein the times of occurrence of the various programs as well as, possibly, the contents of programs, have been made known previously to the manager of the central station. Each central station is free to select specific ones of the network programs for rebroadcast in accordance with the program scheduling of the individual central station. This provides freedom for the host of the central station to employ network program material which may be live or previously prepared.

A great advantage of the invention is that the use of the network program material interspersed among local programming material allows people across the country to participate simultaneously in a common contest, or a common learning experience, or in a common national survey, by way of example. The use of alternative network programs inserted in opportune time slots allows the central stations to insert the network programs within the regular broadcasting schedules of the respective central station in a manner similar to that of the usual interruption of a broadcast program for a message from an advertiser or sponsor. Thereby, the invention allows for the simultaneous participation of people from across the country to be accomplished without need for any significant rescheduling of local programming.

Many people in the broadcast audience can participate by responding to tasks or questions set forth in the network program by use of electronic or telephone hubs which facilitate entry of the large number of responses, as well as to evaluate and authenticate the responses. Furthermore, valid responses meeting response criteria may also be communicated by telephone link from each electronic hub to a central station for conduction of a sweepstakes. Means for conducting a sweepstakes or other prize event can also be located at and connected to an evaluation hub. Respondents, having provided an acceptable response, can immediately and automatically be entered in a further prize event, which can be a sweepstakes in which winners are randomly determined. Responses can be evaluated at one or more central sites by use of evaluation equipment which may be located in the electronic hubs or, alternatively, evaluation can be accomplished at the individual receiving stations by a response unit. The use of the central evaluation is particularly advantageous because a common evaluation facility allows the sweepstakes or other form of network program to be conducted without need for specialized equipment, other than a radio or television and a telephone, at a participant's receiving station.

In accordance with a feature in the practice of the invention, it is noted that equipment provided for enabling a respondent to respond to a task, and for evaluating a response, may be provided at the remote location of a respondent or, alternatively, may be provided partly at the remote location and partly at a central station. In the case wherein a fully equipped response unit is provided at the remote location, the equipment of the response unit includes a keyboard, a comparator, scoring circuitry, a memory, as well as other circuitry which may include a computer, and circuitry for applying point credits and displaying information, the equipment including also a printer as well as a modem for communicating via a telephone line. However, it is acknowledged that such equipment may represent an excessive expense to participants at remote locations, in which case the complexity and expense of the equipment at the remote locations can be reduced by placing some of the equipment, such as circuitry involved in comparing and scoring participants' answers at a central facility remote from the respondents' locations. Thus, response criteria and scoring criteria which are transmitted via a communications link to the remote receiving locations, in the case of a fully equipped response unit, would be diverted, in the case of a partially equipped remote station, to the central evaluation facility to enable circuitry within the facility to identify acceptable answers, to score the answers, and to credit or weight the answers with additional points appropriate to a difficulty level. In that case, instructional signals directing a printer at a respondent's location are generated at the evaluation hub and transmitted to the respondent's location. According to a preferred embodiment, these instructional signals are transmitted via cable to an addressable converter at respondent's location, which converter is coupled to a printer.

There are other reasons for which equipment, employed in responding to a task, may be located partially at the central evaluation facility. For example, it may be desired to score responses in the order in which responses are received, or it may be desired to alter programming of comparison and scoring circuitry in accordance with the amount of traffic in responses coming in to the evaluation facility. Also, it may be desirable to insure that there can be no tampering with equipment used in evaluating responses, in which case the equipment, for security reasons, is best located at the central facility. Also, it is noted that it may be desirable to rank the scores of the participants, as by time of response, or by magnitude of score, or by geographical region of the respondent, or upon some other basis, in which case ranking can be accomplished best by use of comparison and scoring circuitry at the central evaluation facility. Also, it is noted that a printing facility, for printing coupons, tokens, or other indicia of a proper response may be located at the central evaluation facility. An example is the playing of a game in a public location, such as in an airplane, in which passengers may compete or participate at their seats. Prize coupons are printed at a central location in the airplane and distributed to winning passengers as they exit the airplane. Thus, in the general sense of the invention, the various circuits and equipment can be located as required at either the remote locations or the central evaluation facility. Communication between a central studio, the remote response equipment and the central evaluation facility may be accomplished by dedicated communication lines, by a telephone system, via wireless or cable television and radio transmission, via satellite communication, or a plurality of different forms of communication systems as may be convenient.

BRIEF DESCRIPTION OF THE DRAWING

The aforementioned aspects and other features of the invention are described in the following description, taken in connection with the accompanying drawing wherein:

FIG. 1 is a simplified diagrammatic view of a system incorporating the invention and configured to show two embodiments of receiving stations, one receiving station employing simulcast radio and television signals of a program produced in a studio, and the second receiving station employing a television receiver system modified to receive an instructional signal from the studio;

FIG. 4 is a block diagram of an electronic response unit in each remote receiving station of FIGS. 1 and 3;

FIG. 7 is an alternative embodiment of the system of FIG. 6 wherein the signals of the second group are interleaved with the video signal of the first group by use of the vertical retrace time slot of a television transmission;

DETAILED DESCRIPTION

Figure 2:
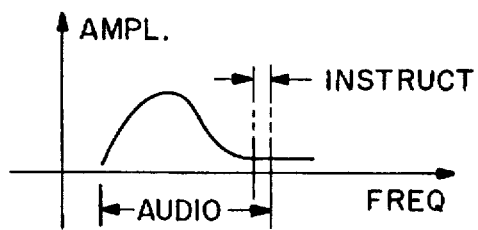
FIG. 2 shows the audio spectrum and a portion thereof designated for an instructional signal.

In the following description, FIGS. 1–5 disclose embodiments of the invention useful for programs to be conducted with participation from remote audiences. In the disclosure of FIGS. 6–10, the system is adapted for a greater selection of, and modification of, parameters in criteria for evaluating answers to questions. The criteria are controllable from a central station. A level of difficulty in the questions may be selected by a contestant. The embodiment of the system of FIGS. 1–5 is described in terms of two signal groups, namely, a radio/television signal group, Group One, and an instructional signal group, Group Two The embodiment of the system of FIGS. 6–10 is described with reference to at least four types of signals, namely, a television signal presenting a studio scene (TV program), a television signal presenting a task such as a set of questions (task signal), a signal setting forth acceptable answers to questions (response criteria), and a signal setting forth criteria to be employed in the evaluation of the answers (scoring mode). In FIGS. 11–22, there is shown a set of embodiments of the invention wherein an event, scenario, presentation, situation or other scene having a task to be performed is recorded for subsequent playback to respondents. The system of FIGS. 1–5 will be described first, this being followed by a description of the system of FIGS. 6–10 and the system of FIGS. 11–23. The systems of the various embodiments will now be described primarily in the context of responses to tasks and questions; it being understood that the practice of the invention is applicable to the making, evaluation and rewarding of predictions. Methods and systems employed in the context of predictions of the outcome of events are more particularly described in connection with FIGS. 22 and 24. The remaining figures show still further embodiments of the invention.

FIG. 1 presents a simplified description of a system 10 wherein a central station 12 includes a studio 14, such as a television studio which broadcasts programs to many external or remote receiving stations, two such receiving stations 16 and 18 being shown by way of example. In accordance with the invention, each of the receiving stations 16 and 18 includes means for observing the broadcast program, such as a television screen 20, and means by which persons in the external viewing audience can respond to situations presented in the studio, the response means being a response unit 22 which evaluates and records responses entered by persons in the viewing audience.

Two signals are broadcast by the central station 12 to each of the receiving stations 16 and 18. One of these two signals is a program signal for presenting on the television screen 20 a program generated in the studio 14. The second of the two signals is an instructional or command signal for operation of the response unit 22, the instructional signal providing appropriate commands to the response unit 22 for evaluating, rejecting or accepting, and scoring audience responses to questions raised in the televised program.

Two modes of transmission are provided for the two signals. In the case of the receiving station 18, both of the signals are carried by a single television channel carrier radiated from an antenna 24 of the central station 22, and received by an antenna 26 at the receiving station 18. The antenna 26 connects with a television system 28 which includes the foregoing television screen 20 and, furthermore, includes circuitry 30 for the separation of the instructional signal from the program signal. The instructional signal is then applied via line 32 to the response unit 22. In the case of the receiving station 16, the two signals are processed separately. The instructional signal is broadcast by a radio channel employing a radio antenna 34 at the central station 12, and received by an antenna 36 at the receiving station 16. Thus, at the receiving station 16, a standard television set 38 including the screen 20 receives the televised program via antenna 26 and presents the program on the screen 20. A separate radio receiver 40 and demodulator 42 are employed for receiving the instructional signal and for applying the instructional signal to the response unit 22.

In the practice of the invention, the instructional signal may be transmitted to a remote receiving station in any convenient manner such as via a cable transmission or by a specially broadcast transmission (not shown) or by combining the instructional signal with the audio signal in a radio broadcast or television broadcast. The combination of the instructional signal with the audio spectrum is demonstrated in the graph of FIG. 2 which shows a typical relationship of amplitude versus frequency in a transmitted audio spectrum. In that spectrum, a relatively narrow frequency band is set aside for transmission of the instructional signal, the narrow frequency band being at the upper frequency edge of the audio spectrum.

For example, the bandwidth of the instructional signal may be approximately 1% of the audio bandwidth, this being sufficient to enable a relatively slow transmission of instructional data to the response units 22 in the respective receiving stations. By maintaining the amplitude of the instructional signal well below that of the audio signal, the instructional signal does not introduce more than a negligible amount of interference with the audio signal. Also, it is noted that the instructional signal is not continuously present but, rather, appears only for a momentary burst of time, typically less; than a few seconds duration, when necessary to instruct each response unit 22. In the case of the receiving station 16, a simulcast of radio and television is employed while, in the case of the receiving station 18, only the television program is broadcast, as has been described above. However, in both cases, the audio spectrum is the same, and the mode of combining the instructional signal with the audio transmission is the same. Typically, the system 10 would be implemented with only one of the transmissions, either the television transmission with the instructional signal combined therewith, as demonstrated by the receiving station 18, or by the simulcast of both the television and the radio transmissions as demonstrated by the receiving station 16. In the case of the simulcast:, the instructional signal need not be combined with the television signal, the instructional signal appearing only in the radio broadcast from the antenna 34 as described above.

The receiver 40 and the demodulator 42 operate in a manner similar to that of the separation circuitry 30, and will be described in detail hereinafter, with reference to FIG. 3.

In both of the receiving stations 16 and 18, the response unit 22 includes a keyboard 44 whereby a person in the remote viewing audience enters a response. The response unit 22 includes a dispenser 46 which dispenses a record of the score and/or responses in a permanent recording medium such as a card 48 of plastic, or similar material, and including a well-known strip of magnetizable material (not shown) upon which the score and/or responses have been recorded. Alternatively, by way of example, the dispenser 46 may be constructed in a form (not shown) for outputting a tape which has been imprinted or punched with the desired information. Easily recognizable indicia may also be imprinted on the tape or card.

The system described lends itself well to multi-part questions and/or to multiple choice answers, for any of which special forms can be provided, to be filled in or otherwise marked. The response recording and/or data entering means can have provisions for the insertion of special forms or blanks, which can be made available or mailed to participants. For example, a school may mail to students forms specially prepared for a particular examination or assignment. The response unit 22 may therefore be configured to hold a recording medium such as a paper blank to which markings are applied. Alternatively, the medium, such as paper tape, discontinuous or continuous forms, may be inserted by the respondents.

Examination papers, whether taking the shape of forms to be filled in, or the result of a free hand composition or narrative, may also be graded by the comparator means, which is capable of identifying key phrases and words that are expected to appear on the completed examination paper. In similar fashion, comparator means to be described hereinafter is designed so as to be able to recognize and accept any one or more of a plurality of predetermined key words, symbols or phrases.

Dispenser 46 can be adapted to reward children who have provided answers meeting the predetermined response criteria by dispensing gold stars or other tokens. In another embodiment, the dispenser combines the coupons issued to winners with advertising material or shopping hints.

The records created pursuant to the present invention may be used as tokens, coupons, certificates and general proof of participation in the broadcast transmission program. Coupons may be redeemed by mail or in retail establishments for cash, prizes or discounts.

The following terms are useful in describing the system of the invention.

The term "task-setting" is intended to include the meaning of interrogative, opinion-eliciting and statement-eliciting, as well as the soliciting of creative endeavors and all kinds of functions capable of being performed by an entry in a data entering device.

The term "comparing" relates to one or more possible established responses which may be established prior to or subsequent to a contestant's response (the previously known color of a golf ball, or during a game, a prediction of how close the ball will come to the hole), and a comparing of an actual response to an established response to determine if an actual response is acceptable. An acceptable response may be based on one or more words or phrase or alphanumeric symbol or selection of designated objects, by way of example.

The terms "evaluating" and "scoring" are intended to refer to and include the meanings of sorting, counting, screening, evaluating, analyzing and processing information, data and responses in accordance with predetermined criteria, ranging from simple comparing tasks to computerized processing and analyses.

The term "interactive system" refers to a system for communicating from a sender to a respondent and having the capacity for allowing the sender to respond to a communication, when desired, from the respondent whether by manual or electronic means.

The term "response" is intended to include answers, elicited opinions and statements, text and narrative provided by contestants, respondents, students and other participants in broadcasts calling for interaction, reaction and responses.

The term "response criteria" is intended to refer to descriptive words, key words, key phrases, parameters, equations, formulas, symbols and definiens describing or defining responses that have been determined by the producer of a program to be acceptable in the context of a task so as to qualify for a reward. The term "response criteria" is intended to include one or more acceptable answers. As an example, in response to a question having four multiple-choice answers, the answers 1 and 2 can be stipulated as acceptable, so that no comparison or evaluation per se is required. Similarly, the terms "compare" and "evaluate" are intended to include determinations of the acceptability of responses in which an acceptable response is specifically prescribed without requiring a comparing or evaluation step.

The terms "outcome criteria" and "success criteria" are intended to include alphanumeric symbols and data by which the outcome of an event can be described, measured or identified, such as key and descriptive words, coordinates, grid, pinpointed and other locations, pictorial, diagrammatic and graphic presentations, results, scores, counts, records, distances, rates and other measurements.

The term "processed response" is intended to refer to and include the results produced by screening, sorting, scoring, evaluating, massaging, statistically analyzing, or otherwise machine-processing responses, data and information provided by participants at the receiving stations.

The term "hard copy" is intended to refer to and include any kind of permanent record capable of being visually read, scanned or machine read. The term "matrix" may be used to refer to the source or origin from which something originates, takes form or develops, such as a cellulosic or plastic strip capable of being provided with printed markings or magnetic recordings so as to create a hard copy record. The term "simulcast" is intended to refer to the simultaneous, but separate transmission from different propagating sources of the video and audio portions of a program.

In the context of formulating response criteria, the terms "formulate", "generate", "format" and "reformat" are intended to refer to and include the selection and determination of all factors affecting the evaluation and scoring of responses.

In the case of a task requiring a prediction of the outcome of an event which has not yet occurred or been completed, such as the completion of a forward pass in a football game, or winning a hand at a card game such as bridge, the response criteria may be referred to as outcome criteria. The outcome criteria is to be transmitted to contestants at remote stations at a time after the prediction has been made.

In the context of transmitting response criteria, for example, on an audio frequency, the use of the term "encoding" is intended to include various forms of signal coding as well as a transmission of signals at an increased speed which would render the signals unintelligible to the human ear. The term "encoding", as used by way of example for transmitting response criteria, is intended to include other modes of communication such as various forms of color signal coding and transmission of signals to television stations capable of being read by sensors of devices for receiving signals outside the audible frequency range. The transmission of encoded information, whether within the audio spectrum or within the visual spectrum, is to be accomplished preferably in a fashion which is essentially unnoticed by a contestant and cannot be perceived as conveying information. In this sense, the encoding is perceptually unintelligible.

The term "keypad" is understood to include other forms of data entry devices, the keyboard being presented by way of example.

The term "print-out" is intended to include printed, embossed, punched, stamped, and other types of hard copy, paper, cardboard and plastic in the form of coupons, certificates, tokens, cards, forms and matrices. The printing of the print-out includes the foregoing forms of marking including the creation of three-dimensional configurations.

The term "central" as used, for example, in "central station", is intended to refer to a broadcast station or network serving a country, a time zone or a region, and also is intended to include discrete local broadcast stations operating independently and serving a town or other smaller geographic area, always provided that such "central" station serves a multiplicity of remote receiving stations. It need not be at the geographic center of the region served.

The terms "remote" or "external" as used for example in "external audience", are intended to include all television viewers and radio listeners tuned into an electronic transmission station, irrespective of the distance from such central station; as such, a "remote" audience includes, for example, students or other respondents positioned in close proximity to the source of a program, as in the case of a closed circuit transmission.

The term "interval" is intended to mean time interval or period of time.

The terms "code", "encoding", and "encryption" are intended to include alphanumeric codes, color codes, bar codes and symbols, including those readable, recognizable or conveyable by humans and machines.

The terms "acceptable response" or "acceptable answer" are intended to include all answers to a question, which answers meet or exceed a minimum standard or degree of accuracy, comprehensiveness or responsiveness; such "acceptable answers" specifically including partially correct answers. Answers may be defined as "acceptable" irrespective of a level of difficulty or a scoring mode.

The term "commercial message" as used herein includes sponsored, paid-for and other messages intended for commercial purposes.

The term "user" of a recording medium as used herein includes viewers, listeners, and buyers of a recording medium such as video tapes, and the target audience intended to be reached by the commercial message.

The term "intelligible" is intended to mean intelligible to a human without machine intervention, for example, without decoding, demodulation, change of transmission or receiving speed, or other manipulations to make a signal intelligible to humans. The term "intelligible" includes material which can be seen or heard such as written material or speech. The term "unintelligible", as applied to various signals which may be transmitted by equipment employed in the practice of the invention, is intended to include signals which can be made intelligible only be machine intervention.

The terms "multipart task" or "multipart question" are intended to include any situations, such as questions, tasks and puzzles, in which a contestant is required to provide chronologically spaced responses related to a common question, task, puzzle, or subject matter requiring an action by the contestant. Such a task may include so-called umbrella or omnibus questions comprising sub-groups, contingent questions (e.g. "if the answer is "true", then proceed to . . . ) and sub-questions derived from a parent question.

The term "reward" is intended to include in its scope discounts, prizes, free merchandise, monetary awards and other rewards having monetary or symbolic value. A "sweepstakes award" may be a special award of extra value beyond the value of a typical award.

The term "host" is intended to include an on-stage and an off-stage announcer, master of ceremonies, program director, guest host and celebrities, announcers of commercials and any other individual associated with the program or appointed to carry out one or more of the activities enumerated herein. It also is intended to include the individuals engaged in the operation of formulating a message or program for broadcasting on behalf of an advertiser, manufacturer, store or sponsor.

The term "difficulty level" is intended to include difficulty levels set by the host and inherent in the task or question, as reflected by possible answers, as well as difficulty levels inherent in a response or answer set by a respondent based on the speed, accuracy, comprehensiveness or responsiveness of the response and reflecting respondent's confidence in his or her knowledge of the subject matter. Similarly, a "difficulty level" may apply to the outcome of an event, as reflected by possible predictions.

In the formulation of a response to a question by a member of the external television audience, in the ensuing description reference will be made to a response in terms of recognition of key words as well as responses which require several words as in a phrase, sentence, formula and the like.

It is to be understood that, in the generation of such responses, the term "word" includes also alphanumeric characters and other symbols such as pictorial representations which may be required as a proper response to a question.

With respect to various embodiments of the invention, the response unit 22 may be configured to provide the foregoing functions of evaluating and scoring, as well as the processed response.

Figure 3:
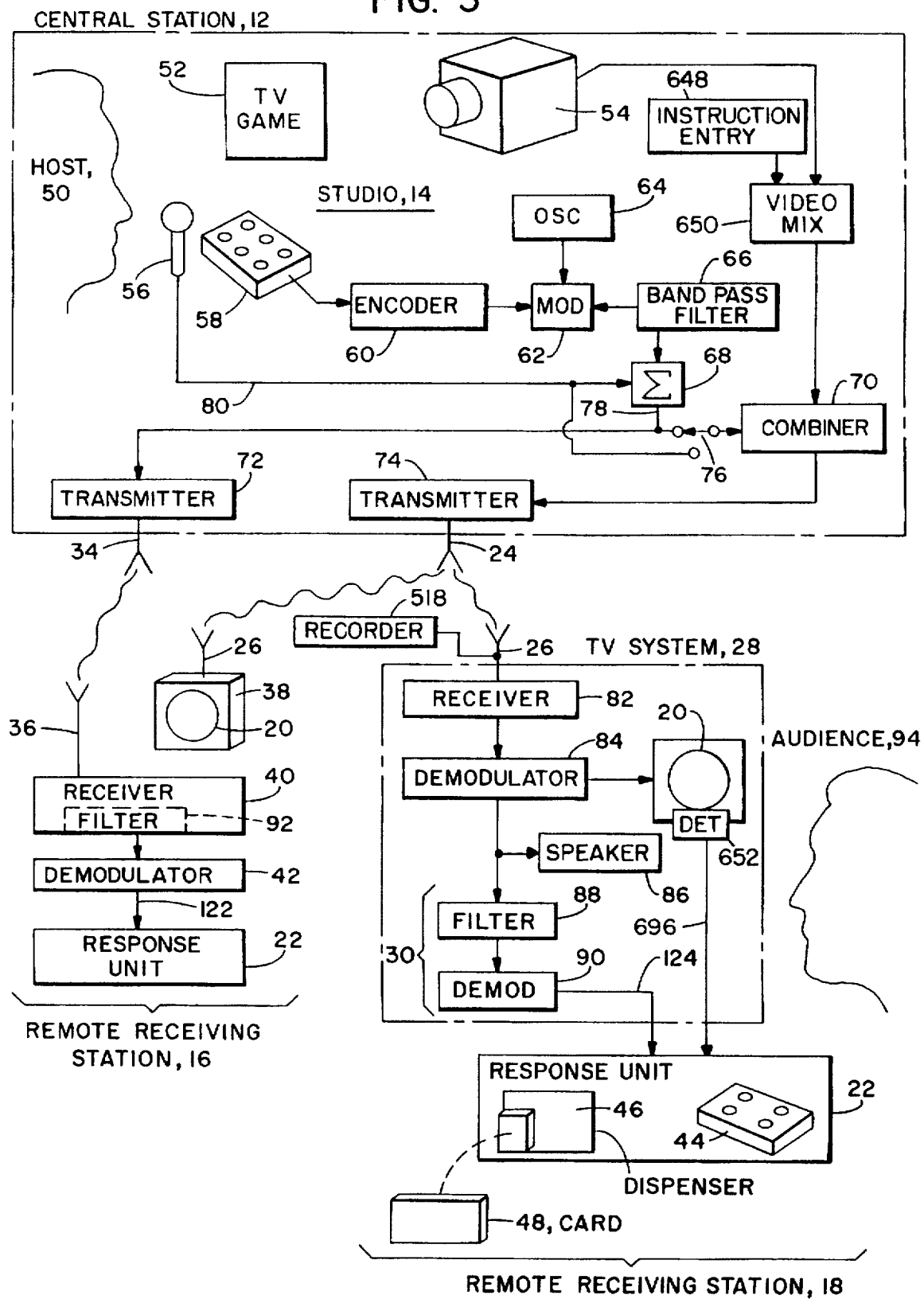
FIG. 3 is a detailed diagram of the system of FIG. 1.

In FIG. 3 the studio 14 is shown, by way of example, to include a television host 50, conducting a quiz program or game 52 in front of a television camera 54 which views both the game 52 and the host 50, and, also including when required, display means on stage (not shown) to provide an image thereof, which image is televised or only visible to the studio audience. Words spoken by the host 50, as well as other sounds in the studio 14, are converted by a microphone 56 to electric signals.

Also included within the studio 14 is a keyboard 58 by which the host 50 or another person, may enter commands and instructions to be communicated via the instructional signal. The central station 12 further comprises an encoder 60 a modulator 62, an oscillator 64, a band-pass filter 66, a summer 68, a combiner 70, a radio transmitter 72, a television transmitter 74, and a switch 76. The switch 76 connects an input terminal of the combiner 70 to either an output terminal of the summer 68 on line 78 or an output terminal of the microphone 56 on line 80.

The instructional signals may be prerecorded and then propagated from a central transmission station to remote locations. In such a case, the host uses the keyboard (or other such device) to initiate the transmission of the instructional signal message.

In operation, the pressing of keys on the keyboard 58 activates the encoder 60 to output digital signals representing the keys which have been pressed. The oscillator 64 outputs a carrier signal which is modulated by the modulator 62 with the digital signals outputted by the encoder 60. The modulator 62 applies the modulated carrier signal to the filter 66 which narrows the bandwidth of the modulated signal to equal the instructional bandwidth shown in FIG. 2. The filtered signal is coupled from the filter 66 to one input terminal of the summer 68, a second input terminal of the summer 68 receiving the output electrical signal from the microphone 56 via line 80. An output signal of the camera 54 is connected to one input terminal of the combiner 70, either directly or via a video mixing unit (to be described with reference to FIG. 23). To facilitate the explanation of this embodiment of the invention, it is presumed now that the camera 54 is connected directly to the combiner 70. A second input terminal of the combiner 70 is connectable via the switch 76 in line 78 to an output terminal of the summer 68. In the alternative position of the switch 76, the second input terminal of the combiner 70 is connected via line 80 to receive the output electric signal of the microphone 56 rather than the output signal of the summer 68. An output terminal of the combiner 70 is connected to the television transmitter 74. Signals outputted by the summer 68 are connected via line 78 also to the radio transmitter 72.

The signal outputted by the band-pass filter 66 is the instructional signal which is to be transmitted via either the transmitter 72 or 74 to a remote receiving station. The signal outputted by the microphone 56 is the audio signal component of the signals transmitted in the television channel via the transmitter 74, and is also transmitted via the radio transmitter 72 to the remote receiving stations when a radio transmission of the audio portion of the activity in the studio 14 is desired. The summer 68 performs the function of combining the instructional signal with the audio signal whereby the instructional signal shares a small fraction of the audio spectrum as shown in FIG. 2. This is accomplished by adding the output signals of the microphone 56 and the filter 66 to output the sum signal on line 78. The combiner 70 functions, in a well-known fashion, to combine the video portion of the television channel signal from the camera 54 with either the microphone signal on line 80 or the composite signal of the summer 68 depending on the position of the switch 76.

In the event that the simulcast of both the radio and the television transmissions is to be provided by the transmitter 72 and 74, the switch 76 connects the combiner 70 to line 80 in which case the television signal transmitted by the transmitter 74 has the standard format of video and audio portions without the instructional signal, the latter being transmitted via the radio transmitter 72. In the event that the switch 76 is connected to line 78, then the television signal transmitted by the transmitter 74 includes the instructional signal within the audio portion of the television signal.

The circuitry of FIG. 3 demonstrates two possible embodiments of the invention wherein the receiving stations may have either of the two forms shown for the remote receiving stations 16 and 18. If all of the receiving stations have the form of the station 16, then the switch 76 may be placed in the position for connection of the line 80 to the combiner 70, in which case the transmitter 74 transmits a normal television signal while the instructional signal is transmitted by the transmitter 72. In the event that all of the receiving stations are in the form of the station 18 then the switch 76 connects a line 78 to the combiner 70 for providing a modified form of the transmitted television signal wherein the instructional signal is included within the television signal. In such case, the radio transmitter 72 is not used by the invention, but may, nevertheless, transmit a radio program to remote radios which do not form a part of the system of the invention.

The television system 28 comprises a receiver 82, a demodulator 84, and a speaker 86. The separation circuitry 30 comprises a narrow-band filter 88 and a demodulator 90. The passband of the filter 88 is equal to the bandwidth of the instructional signal shown in FIG. 2.

In the operation of the receiving station 16, the receiver 40 functions in the manner of a well-known radio receiver for receiving the radio transmission incident upon the antenna 36. In addition, the receiver 40 includes a narrow-band filter 92 having a passband equal to that of the filter 88. Thereby, the filter 92 extracts from the audio spectrum the portion of the spectrum, shown in FIG. 2 designated for the instructional signal. The signal outputted by the filter 92 is demodulated by the demodulator 42 to recover the digitally formatted signal produced by the encoder 60, which digitally formatted signal is applied to the response unit 22 for providing instruction thereto. The television set 38 in the receiving station 16, as noted hereinabove, functions in accordance with the well-known form of television set outputting both audio and video signals, the latter appearing on the screen 20.

In the operation of the receiving station 18, the receiver 82 includes a well-known television tuner (not shown) and outputs the television signal of the channel to which the receiver 82 is tuned. The television signal outputted by the receiver 82 is demodulated in a well-known fashion by the demodulator 84 to provide a video signal which is presented on the television screen 20, and an audio signal which is presented by the speaker 86.

In accordance with a feature of the invention the demodulator 84 also applies an audio signal to the filter 88 of the separation circuitry 30. The filter 88 extracts the portion of the audio spectrum designated for the instructional signal, as does the filter 92, and outputs the instructional signal to the demodulator 90. The demodulator 90 operates, as does the demodulator 42 to recover the digitally formatted signal produced by the encoder 60, which digitally formatted signal is applied to the response unit 22 to provide instruction thereto. Thereby, the response units 22 of the receiving stations 16 and 18 are able to function concurrently with the presentation of the broadcast television program upon the television screens 20. As indicated in the drawing for the receiving station 18, a member of the normally remote audience 94 operates the keyboard 44 of the response unit 22 while listening to the speaker 86 and watching the television screen 20.

With reference to FIG. 4, there is shown one embodiment of the response unit 22 of FIG. 3. The circuitry shown therein accomplishes the major functions of the response unit 22, namely, providing a member of the audience 94 with a means for entering a response to a situation viewed on the television screen 20 and/or heard via the speaker 86, not accepting (rejecting) or accepting, evaluating and scoring such response, recording such response, and outputting a temporary or permanent record of the response. In particular, it can be advantageous if the permanent record is in the form of the card 48, which form is machine readable to facilitate a reading of the score and/or response by either a third party or the host 50. It is to be understood that the circuitry of FIG. 4 constitutes only one possible embodiment of the invention for performing these functions and that other embodiments employing a digital computer suitably programmed (not shown) may also be employed.

The response unit 22 comprises three decoders 96, 98, and 100, a register 102, a score counter 104, a memory 106 for storing data, and a memory 108 for storing an operating program, a timer 110, a gate 112, a buffer store 114, a comparator 116 for comparing output signals of the store 114 with the memory 106, a logic unit 118, and a clock 120, these components being in addition to the keyboard 44 and the dispenser 46 disclosed previously with reference to FIGS. 1 and 3.

In operation, the memory 106 stores data with respect to the answers which are to be provided by the viewing audience. For example, in the event that the viewing audience is composed of children in a children's show wherein children are learning to identify colors, the host may point successively to a red hat, a blue table, and a green car and request to know the colors of the respective objects. In such case, the memory 106 would store response criteria, in this instance, the words red, blue, and green in the sequence corresponding to the order in which the objects are to be addressed by the host. The keys on the keyboard 44 may be similarly colored to enable entry of the correct response. Alternatively, for older children, the keyboard may be an alphanumeric keyboard, as is found on a typewriter, in which case the viewing audience is to type the words corresponding to the colors addressed by the host. In this case, the comparator 116 would compare the spelling of the words entered via the keyboard 44 with the spelling of the colors stored in the memory 106. The buffer store 114 stores the responses entered via the keyboard 44 to enable the comparator 116 to compare the response with the data stored in the memory 106.

The method and system of the invention lend themselves particularly well to educational shows for children. Questions pertaining to educational toys, to books, to stories and to subjects being taught or addressed, are interspersed in the show. Children are rewarded with tokens or other forms of award, such as coupons redeemable at candy stores, ice cream parlors, and the like.

The score counter 104 operates under command from the program memory 108 to score each correct response signal outputted by the comparator 116. When the response entered at the keyboard 44 agrees with the data stored in the memory 106, the comparator 116 outputs a logic-1 signal via gate 112 to the counter 104. The output signal of the comparator 116 serves as an enable signal to initiate a count by the counter 104. The counter increments its count by 1, 2, 3, or other amount depending on the magnitude of the score to be awarded for the correct response. In the event that the response is to be timed in the sense that a limited time is available for the response, then the timer 110 is activated by the program memory 108 to render the gate 112 in a state of conduction of signals of the comparator 116 only during the interval of time when the response is permitted. Both before and after this interval of time, the timer 110 places the gate 112 in a state of nonconduction so that a response entered at the keyboard 44 outside of the desired response interval, or "window", cannot enable the counter 104 to increment or modify the score.

The output count, score, or evaluation of the counter 104 is applied to the dispenser 46 which includes a recording medium, such as the card 48, for providing a permanent record of the score. The dispenser 46 includes suitable magnetic recording heads (not shown) for recording information on the card 48 in a well-known fashion. In addition, if desired, the dispenser 46 may include well-known encryption circuitry for recording the score on the card 48 in a fashion which cannot be read except by an automatic card reader having circuitry for decrypting the recorded message. The dispenser 46 is activated by the program memory 108 to accomplish the foregoing recording of the score.

The score counter/evaluator 104 can take different forms. While the score counting function is described herein for illustrative purposes, it should be understood that unit 104 may be designed to perform the processing of data entered by respondents on keyboard 44 or other data entering device. Included in such processing are, for instance, the computerized processing of data provided by respondents in accordance with one of several programs stored in memory 108 and brought into play by the instructional or command signals transmitted by transmitters 72 or 74. Questionnaires or forms used in market research may be stored in dispenser 46 or may be placed into it by respondents. Following a set of questions, or upon the completion of the broadcast, processed or unprocessed data are issued by dispenser 46 in the form of hard copy taking the form of one of the embodiments described.

If desired, the actual response entered at the keyboard 44, such as the words red, blue, and green of the foregoing example, may be recorded by the dispenser 46. For this purpose, the responses are coupled from the buffer store 114 to a register 102 wherein the responses are stored prior to recording at the dispenser 46. After all of the responses have been stored in the register 102, the program memory 108 strobes the register 102 to pass the data of the responses into the dispenser 46 for recordation upon the card 48 or such other form of storage media as may be employed.

The printout mechanism or marking device may take different forms to meet the requirements of the broadcast, whether quiz programs, educational programs, tests surveys or other task setting assignments. These devices may be relatively small, utilizing a continuous tape as the substrate to which the markings are applied, or they may utilize full page printouts. The recording medium may be a special form or blank dispensed individually by the device as a cut section, or may take other configurations, including discontinuous shapes.

Although completely blank forms may be used in recording respondents' entries in the data entering device, in many instances the forms or blanks preferably are provided with lines, grids, schematics and the like for easier subsequent scoring of responses recorded on such forms or blanks.

To prevent tampering, forging and counterfeiting, the recording medium may comprise material, such as paper or cardboard stock, plastic and the like, of special composition or containing admixtures of identifiable substances facilitating recognition by electronic or other sensing and scanning devices. Verification may also be facilitated by using recording media that are colored, coated, embossed, textured, magnetized or otherwise given recognizable properties.

By replacing the recording media, such as rolls of paper tape, periodically, and by stipulating redemption of the record thus created within a specified time period, the unauthorized reproduction, tampering with and counterfeiting of the marked recording media can, for all practical purposes, be prevented.

The marking may be applied by any known methods, including printing with or without impact, using ink sprays, heat, magnetic pulses, laser beams and other light sources. The markings may also take the form of depressions and embossed configurations legible by appropriate devices.

In addition, to prevent tampering, the recording mechanism, such as a printer, can be provided with means for alternatively and selectively applying one of a plurality of different types of markings. As an example, the color, intensity, width, spacing, positioning, font and resolution of the markings may be built into the recording means and may be controlled by radio or other electronic command signals from a central station.

The shape and configuration of the markings to be utilized at any particular time and subject to change at any time, includes numbers, letters, dots, dashes, regular and irregular shapes, codes, symbols and other configurations, which may be discrete, connected or continuous. The markings may also comprise shapes and configurations having no discernible pattern and readable only by appropriate scanning, reading or decoding means.

The number of combinations and permutations of the above mentioned properties of the recording media and markings is so large as practically to preclude tampering, forging, altering, counterfeiting or reproduction of authentic records; the unauthorized manufacture of special composition paper alone, would be far too costly and particularly time consuming to be practical.

According to a feature of the invention, with respect to preventing the forging of prize winning coupons, a would-be forger is denied use of the printer to accomplish forgery.

As an illustration, a TV-viewer having a response unit (as described above) in his home, is provided with two materials or matrices to form hard copy outputted by the dispenser. For example, the matrices may be a paper tape comprised of 100 coupon sections, which tape is fed into the printer of the response unit, and a verification card having 100 spaces or boxes. The coupons and the card have the name or other identification of the TV-viewer imprinted thereon. Codes can be provided on both the tapes and cards. The paper tape and the verification card are tamper-resisting in various ways. Both can carry time limits for redemption. Tapes and cards provided to TV-viewers, say monthly, can for example have a 30-day limit for redemption. In view of the special composition of the tape and the card, their duplication by a forger would be impractical, because special paper or cardboard would have to be manufactured. The individual coupons and the spaces or boxes on the card carry identical consecutive numbers.

Each time a winning coupon is presented at a redemption center, the winner of such a prize is required to present the verification card. The numbers on the winning coupon and on the card are compared to verify their matching. When the coupon is redeemed, the corresponding space or box in the verification card are canceled or invalidated by any one of many known methods, such as marking, punching, tearing off, stamping and the like. When 100 coupons have been presented, both the paper tape and the verification card have been used up.

By the method described, forging of coupons alone is rendered useless. Frequent changing of the properties of tapes and cards by the operator of the system and the multiplication of obstacles faced by a would-be forger are so great as to make forging practically impossible.

A similar system can be employed when using magnetized cards in lieu of paper coupons. The magnetized card of a winning contestant is provided with identifying indicia and codes, the verification card carrying matching markings and codes. The redemption procedures are similar.

If magnetized cards are used and validated by dispenser, the validation may be erased at the time a card is presented for redemption, so that it may be reused.

It is noted that the data to be stored in the memory 106 is provided by the instruction signal on line 122 or 124 from the demodulators of the receiving stations 16 or 18 shown in FIG. 3. The digital format of the instructional signal is decoded by the decoder 96 to extract the portion of the signal relating to the data which is to be stored in memory 106. The decoder 98 decodes that portion of the signal which is to be employed for presetting the timer 110 for the designated interval of response time. The decoder 100 may be coupled directly to the memory 108, or via an OR gate which will be described with reference to FIG. 23. To facilitate the present explanation of this embodiment of the invention, it is presumed that the decoder 100 is connected directly to the memory 108. The decoder 100 decodes that portion of the instruction signal which presets the memory 108 to any one of a number of previously stored formats for responding to situations presented in the studio 14. In this regard, it is noted that the form of the instructional signal follows common communication practice wherein the instructional signal is set up as a sequence of digital words or fields which identify respective portions of the message dealing with data, timing interval, and program commands. Thereby, the decoders 96, 98 and 100 are able to recognize the specific parts of the instructional signal and to extract the requisite data and commands. The response criteria may consist of a simple requirement to be met by a respondent or may comprise a plurality of independently variable factors.

The control logic 118 operates in response to a succession of clock pulses provided by the clock 120 for outputting control function signals to the memories 106 and 108 and to the buffer store 114. A connection between the keyboard 44 and the logic unit 118 provides for a control function, such as an entry command whereby a person responding directs the store 114 to enter the data inputted by the keyboard 44. The control logic of the unit 118 may also be activated by a command from the program memory 108. Thereby, the response unit 22 is capable of receiving, scoring, and recording a response entered by a member of the audience at a remote receiving station.

The construction of the foregoing system of the invention permits its use in numerous situations involving participation wherein members in the external audience are to participate with members of the studio audience in situations requiring participation. An example of the utility of the system may be demonstrated by considering a television game/quiz show involving both people at home as well as in the studio. The invention makes it possible to broadcast quiz show permitting home viewers to become participants and contestants. The invention is applicable to a variety of present and future game shows.

As an illustration, a game show or quiz program may include the task of listing, in reverse chronological order, the names of all teams having won the baseball World Series, or the World Soccer Championship. A time limit is set which makes it impossible for contestants to enter all correct answers; this is common practice in aptitude tests.

There are five contestants on the studio stage. Each studio contestant is equipped with well known means to write, print, type or otherwise enter his or her response on a board, keyboard or other data entering device adapted so that the responses, in the process of being entered, may be projected on a screen or screens visible to the studio audience, but not to the contestants and not to the home viewers until the predetermined time limit has been reached, or until the time allowed has substantially been consumed. The responses of studio contestants can be displayed to the studio audience and to home viewers with some delay, thereby preventing any of the home contestants from benefiting from the answers of the stage contestants.

It therefore is an object of the system described to elicit responses from contestants at remote sites and to capture their responses in their data entering devices essentially before the responses given by stage or studio contestants become known to home contestants. This is accomplished by projecting the questions on a screen hidden from studio contestants but in view of the camera 54 of FIG. 3. Concurrently with, or prior to the projection of the questions, the host 50 employs the keyboard 58 to transmit instructions to the response units 22 of the remote audience. The response entered by a participant in the remote audience is timed and is subject to a time limit, the time period to conclude before the questions are presented to the studio contestants. Thereby, the responses of the remote audience are not influenced by the responses of the studio contestants. Keyboard 58 may be operated by a person other than the quiz show host and may be situated on-stage or off-stage.

In a simple version, the system can be employed to attract viewers and listeners not normally disposed to participate in game or quiz shows per se, but willing to answer a few unobtrusive questions, especially if pertaining to a subject of interest to the viewer. By responding to questions, a home viewer can, in effect, act as a contestant. The questions to be answered by home viewers and radio listeners can be interspersed in shows other than quiz shows and can be so simple as to require essentially only a confirmation by participants of being tuned in to a particular program.

Thus, for instance, home participants may be asked to identify the soap opera character who earlier appeared in the program. Or home viewers of a sports program may be asked to name a player who just scored. These implementations of the system and accompanying awards to a correct answer are intended to increase the television and radio audience. Viewers of a soap opera or persons listening to a radio sports broadcast, constitute a highly targeted audience and as a result of the lower per-household cost, advertisers will be able to award more valuable coupons and prizes to successful respondents. Participants who have given an acceptable answer can be rewarded with a coupon of defined value to be redeemed in cash, or to be applied to the price of a specified product or to the price of any product in a specified retail outlet. Other forms of rewards, whether of commercial or symbolic value, may be devised.

Advertising material, such as shopping hints and promotional material may be provided on hard copy records as coupons, prior to the delivery of the matrix, for example a paper tape, to participants at remote locations; or the advertising material may be provided and printed on the coupons at the time at which other data, such as prize information, is provided thereon.

The latter method has the advantage that a sponsor or advertiser can have up-to-date promotional information printed on coupons by directing the station which transmits instructional signals to remote locations to include in such signals the desired advertising material. A last-minute-telephone call by an advertiser to the sub-carrier station with directives to incorporate certain instructional signals in the sub-carrier transmission will result in a large number of shoppers being alerted to "special sales" through up-to-the-minute coupon promotions.

The quantitative results obtained by this method can also be used in the statistical analysis and the reactions of audiences tuned in to certain programs. It is noted that the equipment of the invention may well be installed in numerous selected or random households in which case, responses by household members can readily serve as a bases for statistically sampling peoples' responses to a product, service, political candidates, corporate images and other subjects of surveys. The increased audience provided by the invention is significant in survey and market research fields because, by way of example, an increase of sample size from 2000 to 2 million will reduce a sampling error from 3% to 0.1%.

In the field of qualitative market analysis and consumer research, the system and methods described can be employed very effectively, substituting home viewers and listeners for the so-called focus groups or other population samples used to determine buyer responses to products and services. The versatility and flexibility of the home keyboard or other data entering device are particularly well suited to the elicitation of unbiased responses to questions or statements by advertising agencies and market analysts. The market research and other surveys and polls made possible by the system and methods described, can be part of a regular quiz show or can be conducted separately. Respondents are rewarded for their cooperation by issuing certificates, coupons and the like to them. The permanent records produced by the dispensing means in remote locations can be mailed to the research organization. For this purpose the forms dispensed by the dispensers in participants' homes can take the form of self-addressed return envelopes. Special printed forms may be used in conducting research into respondents' reactions to tasks or questions. Coupon awards may be dispensed separately or may be a tear-off section of a survey form.

The relative simplicity and compactness of the electronic devices comprising the response unit, and the fact that the response unit is not connected by wire and requires no installation, makes it possible to design the response unit as a portable unit. A plurality of such units may be placed in systematically or randomly selected homes, used for the desired research purposes and thereupon moved to new locations. The units may be battery powered to provide mobility for use at private or public locations.

For the implementation of game/quiz shows, the following advantages of the invention are noted. The system of the invention does not require any wiring or rewiring of a home nor the use of telephone lines, and may be offered to viewers free of charge. In the context of the disclosed embodiment, a telephone is suggested merely as a convenient and rapid means for interaction between respondent and host, but is not required to practice the invention. For example, the external audience might be located in a separate room within walking distance from the studio in which case interaction can be accomplished personally by allowing a member of the external audience to walk over to the studio. The system permits home viewers to participate in quiz shows on the spur of the moment without advance notice and without any requirement for special forms or entry blanks. The system can be superposed upon a variety of game and quiz shows to permit viewer participation without interference with existing show formats, and has the advantage of expanding the television audience, thereby attracting sponsors of the shows. The machine readable card 48, or a one-time coupon which may be outputted by the dispenser 46, may be presented or redeemed for prizes by successful participants at a local store or other business establishment cooperating with the broadcaster.

When applying the methods and systems described to a multi-part task, contestants normally are confronted with a situation, such as questions or puzzles, in which a plurality of entries on the response entering device are required, the total of the responses determining the correctness or acceptability of a contestant's response.

While such an event or operation of such a task is in progress, the responses, entered piecemeal, as well as the applicable response criteria, are stored at contestants' locations. In a game shoe situation, one unacceptable answer may eliminate or disqualify a contestant from winning a prize. The task may be presented all at once, or in parts presented successively and calling for a partial response to each partial task.

The comparison and scoring means can be programmed to perform their functions at each stage of the task, upon completion of the entire task, or following a group of partial tasks. The printer/dispenser normally is programmed to operate at the end of all responses by a contestant to a multi-part task.

The system provides simplicity in the administration of the game by identification of the successful respondents; this is readily accomplished at the dispenser 46 in each remote location by imprinting each card 48 or token with the name of the respondent. If desired, the name of the respondent can also be inputted at the keyboard 44 as are other answers to questions. The questions may include multiple-part questions and may require multiple choice answers, if desired. The questions may require simple answers such as yes or no, a single word such as a number or a color, or a plurality of words as in a phrase or narrative. Operation of the score counter 104 for various choices of answer permit a scoring of partially correct responses and those meeting a predetermined response criteria. In its simplest form, the keyboard may be provided with only two keys to answer yes or no, while in a more complex form, the keyboard may include the alphanumeric character keys for entering words or phrases, as well as other symbols.

If, as an example, a respondent must select a number from the numbers 1 through 9, and if the completely accurate answer is 5, the comparator unit may be programmed so as to accept any number between 4 and 6, or 3 and 6, etc.

The response entering device 44 may be provided with keys, buttons, levers, or other means for indicating a response, which response can have an assigned meaning. It may be a shorthand entry, standing for a word, a phrase or a sentence. A response unit may be constructed as a dedicated unit for a specific purpose as for playing a game, in which case a key may generate a specific type of response or responses.

By way of alternative embodiments of the invention, it is noted that the comparator 116 may output a multiple-bit digital word wherein the additional bits are provided by the memory 106 dependent on the specific answer stored in the memory 106, which answer is compared to the response within the buffer store 114. For example, if two possible responses would be regarded as correct, but one of the two responses is preferred, then the comparator 116 would output an additional bit for the preferred response. The additional bit would be passed by the gate 112 to advance the count of the counter 104, thereby to increase the score by a larger amount when the preferred response is entered at the keyboard 44.

The formatting and reformatting can provide for various ways of weighing the responses of home contestants, such as straight line additions, geometric and exponential progressions, or computations of scores based on formulas incorporating discrete groups of responses. Thus, score counter 104 may be replaced with a microcomputer (not shown) which is responsive to commands from the memory 108 for combining inputs from keyboard 44, memories 106 and 108, and capable of reflecting the time element, to serve, in effect, as an evaluator of complex answers.

According to the present invention, questions may be transmitted from the central station, to which more than one acceptable answer may be given, the answers varying in the degree of difficulty from the respondent's standpoint. As an example, a question may call for naming a minimum of two European cities, the names beginning with the letter M, this being difficulty level 1. Difficulty level 2 might call for four such cities and difficulty level 3 might call for six such cities, all answers to be entered within 30 seconds. The particular difficulty level may be specified by the person controlling the transmission, or it may be selected by the individual respondent prior to seeing or hearing the question. In order to enable a contestant to choose a difficulty level, the host may announce or hint at the general nature, or the context of the question about to be asked. The degree of difficulty will normally determine the value of the prize, etc. The device evaluating the responses may dispense records, e.g. coupons, certificates and the like of different value or in different denominations. For instance, it may issue a 10 cent coupon at level 1, and 25 cent coupon at level 2, and a 50 cent coupon at level 3. The coupons may be redeemed in retail establishments, the coupons being similar to those contained in newspapers. It should be understood, therefore, that in addition to the difficulty level set by the host, a higher difficulty level may be superimposed by an individual contestant, as will be disclosed subsequently with reference to FIGS. 6–10.

By use of encryption, the card 48 provides an essentially tamper-proof record. The invention is applicable, not only to home viewers but also to viewers in a public establishment such as a restaurant or school wherein people may participate as teams. The questions may be gradated to be suitable for a variety of audiences varying from those having limited formal education to those having special interests. By use of the timer 110, the studio host can designate the beginning and end of a response interval, and vary the time limit allowed from question to question. In addition, the invention lends itself to the development of further forms of game and quiz shows. The difficulty level can be increased by decreasing an allocated time for response.

It should be understood that individual questions may vary with respect to the nature of the task, the type and particulars of acceptable responses, the difficulty level, the period of time allowed for responding, the kind and range of prizes, the weighing of responses, the composition of the target audience and other considerations.

It should be further understood that normally the announcements to remote participants of levels of difficulty and of time intervals allowed for responding to a task are transmitted and received in a form directly intelligible to participants, such as in open language. If an acceptable response criteria is transmitted, prior to entry of a response by a participant, it is conveyed in coded or otherwise unintelligible form; if it is transmitted subsequent to such entry, it may be conveyed in open language.

As an example in the use of the invention in the educational field, the memories of the response units at the remote locations receive and retain instructional signals from a central transmitting station conveying the correct, preferred, or acceptable response or responses to the task posed by the task-setting message. Upon completion of a task by a respondent, or upon lapsing of the allotted time, the printout mechanism is activated by the instructional signals so as to communicate or so as to dispense in hard copy form the correct or preferred response to each respondent at remote locations. In this manner, a student who receives a printout containing his or her scored response, also receives the "textbook" solution or most desirable response to the task presented. For comparison purposes, the dispenser may provide printed hard copy containing a student's original response.

The foregoing features in the operation of the system of the invention are readily applied to the educational field to encourage both early educational experiences among children as well as for home-study courses for high school and university students. In the educational field, the situation portrayed in the studio and presented on the television screen may be in the nature of a task-setting situation rather than that of a pure question. The appropriate response be a brief statement, an equation, or may contain a number of cross-referenced key words or key phrases or symbols. The system of the invention may be implemented also by closed circuit television and cable television as well as by the broadcast situation of FIG. 1. The keyboard 44 at each of the response units 22 may be a standard typewriter keyboard, as noted above, or may include a display of the typed response such as is presently available on some electronic typewriters. Such a display would be useful in the answering of examination questions for home-study programs. It is also noted that the keyboard 44 is representative of a response entry device, and may, if desired, be replaced by other entry devices such as a joystick, switches, or a device responsive to a spoken voice.

Response evaluation means referred to herein may include, when appropriate, as for example in the educational field, scanning devices capable of recognizing symbols, diagrams, charts, formulas, equations and drawings responsive to the response criteria.

In the practice of the invention, the answers given by studio contestants may, for instance, be displayed to the studio audience and/or broadcast to TV-viewers following a predetermined delay of, say 5–20 seconds. During this 5–20 second period, the data or response entering devices of the stage contestants, or the studio display devices, may be made inoperative, so that no answers may be entered and/or displayed, even if the stage contestants are aware of the questions. Other ways of staggering the "response windows" by 5–20 seconds or more can be devised.

This time lag is intended to make the answers projected on studio screens following the time lag useless to home contestants from the point of view of total time allowed for response. By the time the correct answers are televised, all or a critical amount of the allotted time will have elapsed. This forces home contestants to enter their responses before knowing the responses of studio contestants.

By way of example only, a typical sequence of events as pertaining to a quiz show with studio and home contestants is as follows: TV home viewers and contestants see and hear the questions without delay. However, the questions are presented to stage contestants and the studio audience after a delay of 5–20 seconds. The respective contestants may begin answering questions upon their presentation, subject to time limits. Acceptable responses are presented to everyone, only after the stage contestants have completed their time for response.

To provide attention-attracting action on stage for the studio audience and TV-viewers who are not contestants, the announcer or master of ceremonies can set the stage for the questions, or a performer may walk across the stage to a podium and read the questions to the stage contestants and the audience, thereby consuming 5–20 seconds. The questions are displayed on a screen, visible to all TV-viewers, including home contestants. Other ways of giving home contestants a head start of 5–20 seconds, or more, can be devised. In another embodiment, the responses by stage contestants are entered, but not displayed for a predetermined period of time. Home contestants may be allotted more or less time than studio participants. If there is only one participant or contestant on stage, the quiz show still follows the concept outlined. The studio contestants and/or home contestants may be allowed a choice of different difficulty levels.

As an example, the use of key words and key phrases is illustrated in the context of a game show described hereinafter, which might be entitled "Definitions". The host presents a situation, hints at, or announces a dictionary word and defines the task as one of providing the correct definition or definitions of such word. The dictionary definition, frequently a phrase, is of course an acceptable answer. Using the task word "many" as an example, an indispensable key work that would have to appear in any acceptable response would be the word "number". However, two or more definitions may exist for a task word.

It will be obvious that this type of show lends itself well to evaluating partially correct and less-than-exhaustive responses. Partial credit may be given to definitions that are reasonably close to the dictionary definition. A more complex task in the context of said show might be the definition of the word "set", for which a large number of definitions exist. Cumulative credits may be awarded to contestants listing a plurality of key definition words or phrases.

According to another show format, separate quiz programs for studio contestants and home contestants may be conducted concurrently by the same game show host. He or she may, for instance, conduct one quiz program for studio contestants in the manner described and while the studio contestants ponder their answers may present supplemental, or a separate set of, questions to home contestants, to which the latter respond in accordance with the method of the present invention. Such separate questions for home contestants may be posed by a second or off-stage announcer.

In the United States, Europe and other regions, television programs are frequently broadcast repetitively in different time zones. In the case of game shows, this enables television viewers who are tuned in to such program and who are in a time zone which first receives one such game or quiz show to inform members of an audience in another time zone of the correct responses to tasks or questions, thus ensuring such members in other time zones of winning an award without having independently correctly responded to such tasks. This potential problem resulting from a sequential broadcasting of television game shows in the context of the present invention will now be addressed.

When the awards offered successful contestants are of a monetary value representing, say 10–15 percent of the price of the merchandise, and are designed only to attract buyers to a store, then a sponsor, such as a manufacturer, may choose to ignore the risk of, or may even welcome, having members of an audience in a first time zone provide members in a later time zone, who themselves did not think of the correct answer, with an appropriate response. Awarding such viewer a 10 percent discount is similar to making 10 percent discount coupons available through newspapers and magazines.

A more serious problem may arise when a sponsor or manufacturer offers awards of a larger magnitude. In such instances, it is desirable to employ a method, and such methods are hereinafter described, which permit airing a quiz or educational program presenting tasks or questions calling for different responses in different time zones. This is achieved by a modified version of the methods described above, which modified methods may be practiced with the systems described in this specification and accompanying drawings.

For example, a host or professor may stand in front of a map of the world. He or she verbally poses the question "In which country is the river to which I am pointing located?" For purposes of this illustration, the audio portion of the question, posed by an on-stage or off-stage announcer, is referred to herein as a "module question", and normally a quiz show or educational program comprises many such module questions. The object of formulating module questions is to be able easily and economically to substitute such module questions for each other in the same show, which normally is taped prior to airing. Such a module question, consisting of the audio portion of the question can easily and economically be replaced by another audio portion, while the more costly video portion (the host pointing to a map) remains the same.

In such a modified method, a part of all of a question or task presented in a program in one time zone, are differentiated and are different from the corresponding question or task asked in a similar program aired in another time zone. This is achieved by formulating at least a part of a question or task in interchangeable module form.

Either an entire question may be substituted in a program, or a part of a question may be substituted. If only a part of a question is to be substituted, such part can for instance be a part or all of only the video portion of a question. Normally, such interchangeable module questions will be of approximately the same length, so as not to affect the overall length of a program.

If a program comprises an entertainment portion and a game or quiz show portion, the part of the show consisting of questions or tasks may be produced and taped separately and independently of the entertainment of other portions of the show. Many forms of implementation of this method may be devised. The example given below is illustrative of only one of the alternative methods which achieve the above mentioned object.

According to a preferred method, a plurality of sets of different tasks is formulated, using one set of tasks in one time zone and another set of tasks in another time zone. Although the tasks may differ in their entirety, a preferred method is described wherein the tasks differ only with respect to their audio portion.

In the taping of the show, the video portion is the same in all tapes, irrespective of the time zone in which such program is to be aired or transmitted by cable. The audio and video portions together form a question or task. The audio portions of module questions change from one such program to the next. Thus the host or professor is seen in all versions of the show to be pointing to the same map. He or she will, however, tape a plurality of oral module questions, only one of these module questions being used in any one time zone. With reference to the above example, in which a host points to a map of the world, another module question may be "What is the name of the river?" Yet another such module question by the host, or off-stage person, may be "Is the river to which I am pointing among the five longest rivers in the world?"

The above described example involves the same host or professor asking a set of questions, each of which questions must be taped in its entirety. This necessitates the involvement of the host in asking a set of successive oral questions, while the video portion remains the same. In another version of this preferred method, the module questions, that is the audio portions of each question, are asked by an off-camera announcer. This method has the advantage that in the taping of the show, the host spends only sufficient time in front of the camera to ask one question, the host providing such action in front of the camera as is required to make the oral module question asked by the off-camera announcer intelligible. Thus, the host may silently point to an object, such as a map, for a length of time permitting an off-camera announcer to pose one module question. Other module questions asked by the off-camera announcer and accompanying the same video portion showing the host, are dubbed or inserted into the appropriate part of the tape. In the taping of a quiz show intended to be aired in four time zones, an off-camera announcer therefore asks four sets of module questions, one set of these oral questions being inserted into the appropriate place in each of the four program tapes used in transmitting the show in the four time zones.

According to a preferred embodiment of the above-described methods for use in the presentation of quiz programs in different languages, a host announces the oral module questions in one language. Different oral module questions are dubbed in, both in the language originally used by the host and in any other languages for use in different countries. In such an event the words and sentences chosen in formulating questions, are such as to lend themselves to dubbing. Also, the host when announcing some questions, can face towards a picture or a map, away from the viewing audience, in order to facilitate dubbing.

Thus the dubbing technique is an economical method of achieving the above-mentioned objective of utilizing the same video portions with a variety of different audio questions in different time zones.

Yet another example of a simplified version of the above methods may entail a projection of a scene or the filming of an object without a host being present. The object could be a well-known personality, or a picture of such personality; or an action shot of such personality may be used. An off-camera announcer may ask a number of oral or module questions to meet the requirements of the number of shows to be shown in different time zones.

The examples set forth are simple ones and many different and more complex versions and implementations of the home quiz show are possible and will occur to game show producers.

In some instances, such as in market research, the system described can be employed to identify consumers meeting certain criteria. In that event, the memory and control elements of response unit 22 are programmed in accordance with the requirements of the particular consumer research. Response unit 22 normally is placed in remote locations, which need not be homes and can be other private and public places. In an alternative application of the system, the response unit 22 is equipped with appropriate means capable of limiting the functions of the scoring and evaluation means. For this purpose, controls and switches (not shown) are provided, which cause memories 106 and 108, logic control 118, comparator 116 and gate 112 to selectively perform only those evaluating functions required for the specific application. In such an event, dispenser 46 receives only partially processed data and generates a record of responses entered on keyboard 44 reflecting responses evaluated only to the desired extent and at least partially resembling the original information entered by respondents. Respondents are rewarded in one of the manners previously described, including a monetary prize simply for participating in a test.

It is a particular advantage of the present system that the kind of data-entering device may vary between different remote locations. Furthermore, the kind of data entering, scoring or evaluating device installed at different locations may vary in accordance with the intended use. Thus, for instance, in selected remote locations, electronic devices of known design may be installed, which are capable of subjecting the raw data entered by respondents to computer analysis.

The invention may be practiced by providing two or more response units at each remote location together with one set of program presenting means. Providing more than one response unit, including means to modify a difficulty level and timing, and including comparison, storing, scoring and dispensing means in, for example, one household, enables two or more family members to become contestants by responding individually to a situation presented by a single television or radio receiver based on a program transmission from a central station. In a public place, a plurality of response units will generate increased and competitive participation by persons present.

Figure 5:
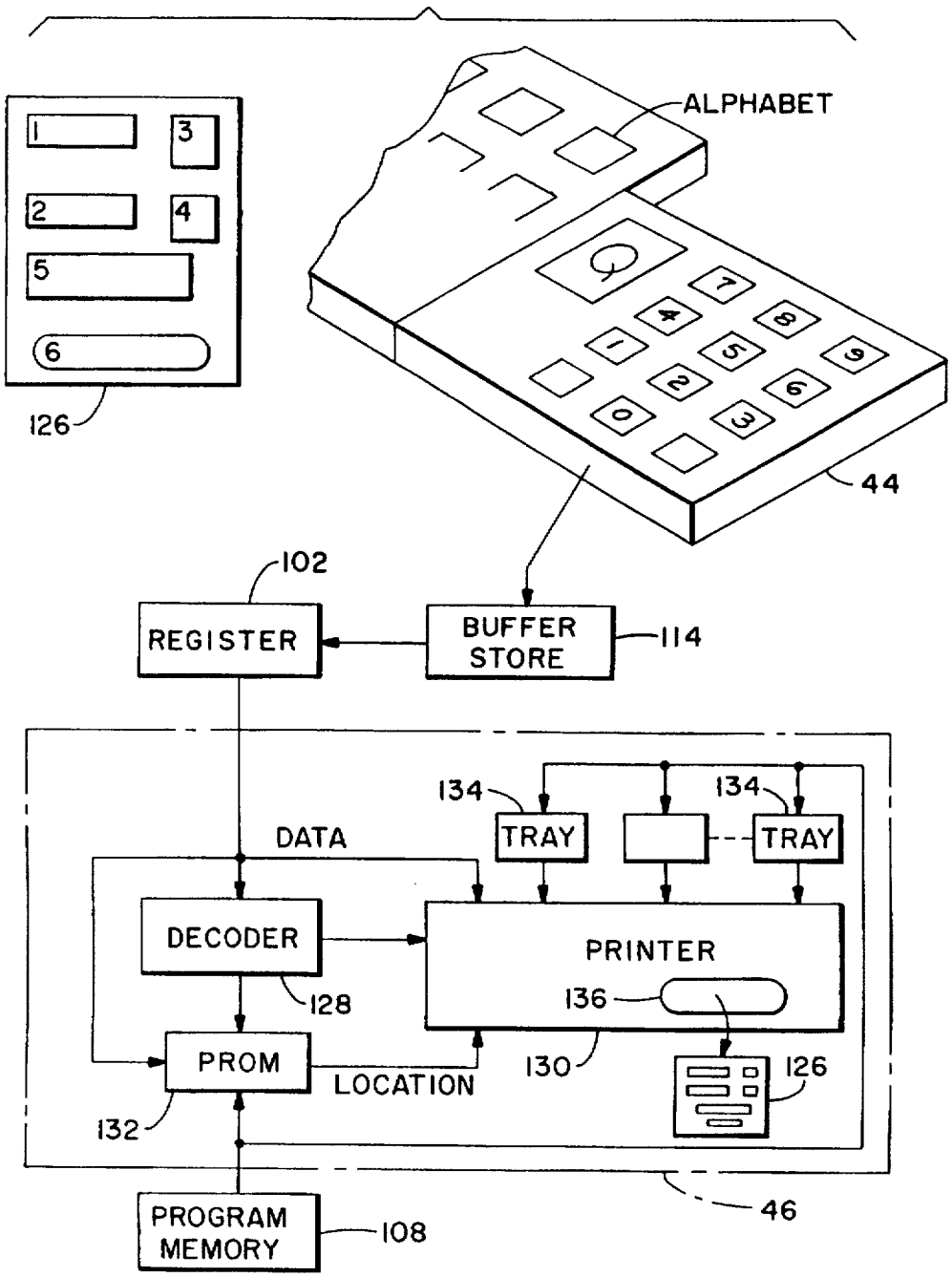
FIG. 5 is a block diagram showing details of a dispenser of FIG. 4.

FIG. 5 shows the buffer store 114, the register 102 and the program memory 108, as well as further details of the dispenser 46 of FIG. 4 to accomplish the imprinting of a response on a recording medium, such as a paper or card, having a prescribed format for the entry of answers. As has been noted hereinabove, such a data entry form or questionnaire, is useful for providing responses by respondents in situations such as contests, educational and advertising promotional or research activities. An example of such a questionnaire 126 is shown in FIG. 5. Therein, blocks numbered 1–6 are provided for entry of responses by members of the audience at the remote receiving stations 16 and 18.

Also shown in FIG. 5 is an enlarged fragmentary view of the keyboard 44, the view showing a keypad with keys for the entry of identifying numerals for identifying the blocks of the questionnaire 126 in which the respective answers are to be entered. The respondent identifies a questionnaire block by holding down a control key Q while typing the identifying numeral on the keyboard 44. The response to be entered in that block is then typed by use of the alphabet keys of the keyboard 44.

The dispenser 46 comprises a decoder 128, a printer 130 and a programmable read-only memory (PROM) 132. In operation, the typed answer and the questionnaire block identification is applied by the keyboard 44 and via the store 114 to the register 102. The contents of the register 102, as described hereinabove, are subsequently transferred to the dispenser 46. The decoder 128 detects the presence of a digital word produced by the control key Q, and thereby decodes the incoming digital signals from the register 102 so as to separate the block identification from the response. The decoder 128 activates the printer 130, upon the appearance of the response, to print the response on the questionnaire 126, the latter having been previously placed into the dispenser 46 by the respondent. The decoder also addresses the PROM 132 with the block identification, whereupon the PROM 132 outputs the block location to the printer 130 to direct the printer 130 to print the response at the correct location on the questionnaire 126. Information with respect to the layout of the questionnaire 126 is loaded into the PROM 132 by the program memory 108 as directed by the instructional signal on line 122 or 124 of FIG. 4.

Alternatively, the block location data and the responses may be stored on the card 48 for printing out at another location, such as the facilities of an advertiser or a company providing the promotional activities. The response may include a narrative text, in which case the comparator 116 may be employed to signal the presence of key words in the response, which have been previously entered into the data memory 106.

By way of further embodiments of the invention, it is noted that the dispenser 46 may include a group of trays 134 each of which stores a separate set of forms such as the questionnaire 126 upon which a response is to be printed. The trays 134 are activated by a control signal from the program memory 108 to present a blank form to the printer 130 to be imprinted with the response. Information with respect to the desired form to be employed in response to a task-setting situation is loaded into the program memory 108 by the instructional signal on line 122 or 124, whereby an instructor or the host 50 in a classroom or in the studio 14 designates the requisite form for use in preparing the response. The completed form, or questionnaire 126, exits a slot 136 of the printer 130. The completed questionnaire 126 may be provided on any suitable recording medium which serves as a hard copy such as paper, plastic strip, or plastic card.

As was shown with respect to FIG. 4, the score counter 104 is under control of the program memory 108. This permits the score counter 104 to be activated and deactivated by commands transmitted via the instructional signal. In the outputting of the foregoing questionnaire 126 from the printer 130 with words printed in the appropriate blocks, a score can also be imprinted upon the questionnaire 126 upon activation of the counter 104, which score is omitted upon deactivation of the counter 104.

The embodiments of the system of FIGS. 6–10 provide further capability to the system of FIGS. 1–5 for conducting a quiz or game-type television show with both local and remote audience participation. The embodiments of FIGS. 6–10 provide for selection of difficulty level, evaluation of response based on key words and phrases, interaction between members of the remote audience and the program host as by use of telephone communication, and adaptation of the program by the host to the interaction by modification and reformatting of response criteria as by altering a basis or mode of scoring and a period of time allowed for response. As with the system of FIGS. 1–5, the present system of FIGS. 6–10 can also be employed with radio programs. Descriptive material relating to the program can be transmitted over the video and/or the voice channels of the television transmission. In particular, it is noted that much of the system description provided in FIGS. 1–5 applies also to the system of FIGS. 6–10 but, that additionally, the system description presented in FIGS. 6–10 shows the use of at least two separate signals, in the instructional signal group, for providing answers and evaluating the answers under control of both the program host and the remote viewer.

At the discretion of the television program conductor, or other person assigned for this purpose, and that of individual viewers, different difficulty levels may be applied to individual questions, it being understood that answers to more difficult questions or answers to the same questions at higher difficulty level may carry with them larger awards. However, even if only one set of response criteria is established for a task, it is understood that such response criteria carry a specified or implied difficulty level. Each successful respondent may be issued a printout or similar hard copy displaying the value of the award and containing a code which is verifiable over the telephone by a central station, or without the use of a telephone, by a cooperating store or merchandising center, for issuing an award.

Figure 6:
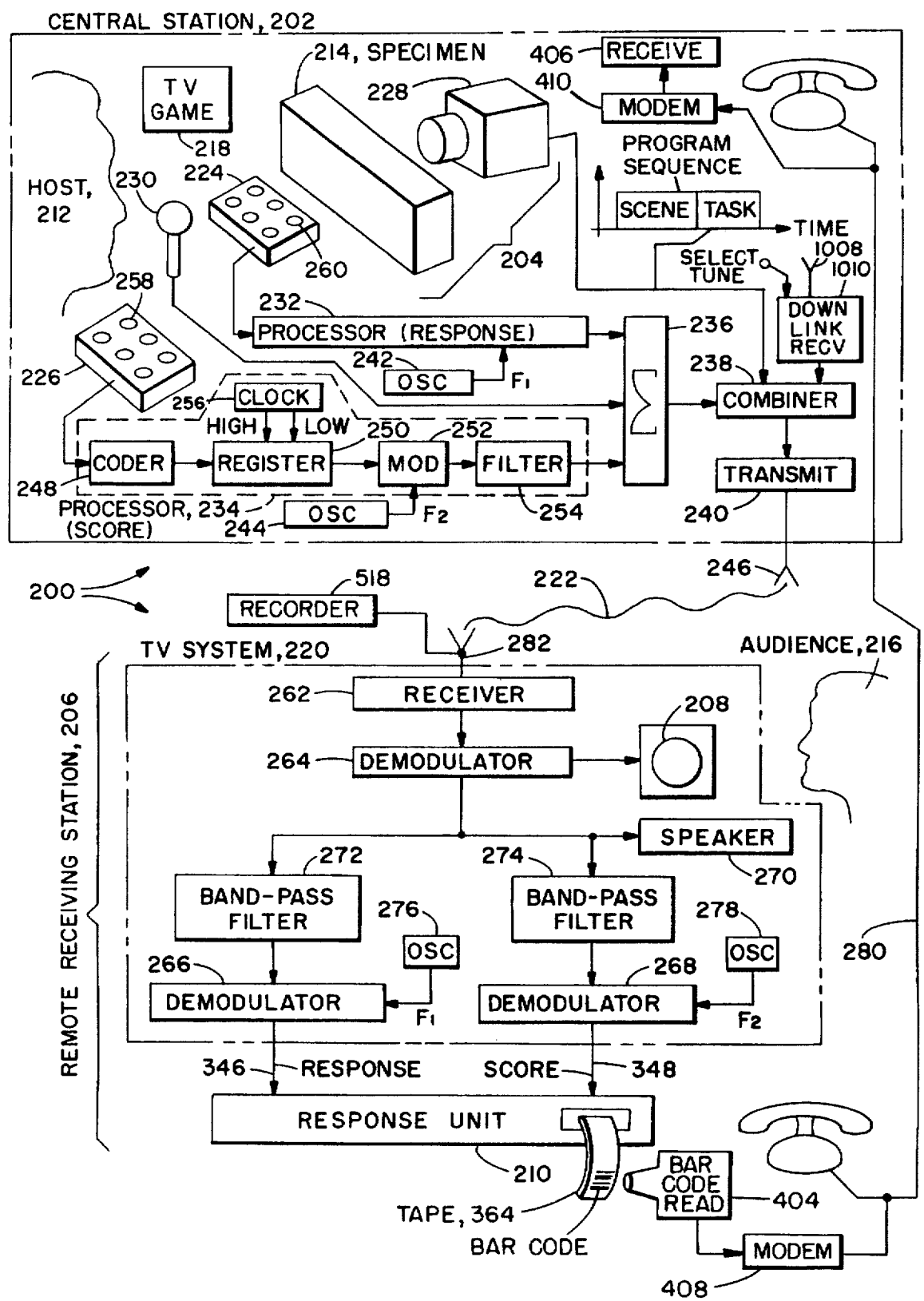
FIG. 6 shows an embodiment of the invention, similar to that of FIG. 3, the system of FIG. 6 employing the transmission of two signal groups each having plural sets of signals, wherein first and second signals of the first signal group are transmitted by video and audio portions of a television program, the first and the second signals presenting respectively a studio scene and a task for respondents, and wherein two sets of signals of the second group, an instructional group, are combined with an audio signal of the first group.

FIG. 6 shows a further embodiment of the invention having greater versatility in the evaluation of learning situations and the scoring of games and contests by means of a system 200. In the system 200, a central station 202 includes a studio 204, such as a television studio, and broadcasts programs to many remote receiving stations, one such station 206 being shown by way of example. Each of the receiving stations 206 includes means, such as a television screen 208, for observing a broadcast program, and means by which persons in a remote viewing audience can respond to situations presented in the studio 204. The response means is shown as a response unit 210 which, as will be described hereinafter, includes circuitry for evaluating and recording responses entered by persons in the viewing audience.

A television program is conducted in the studio 204 by a host 212. While various types of programs may be employed in conjunction with the study of specific subject matter, for example, a course in advertising or packaging, in which there is a display of a specimen 214 of merchandise, or other subject of interest, to members of a remote television audience 216 located at the remote receiving stations 206, a game program employing a television game 218 is presented by way of illustration of the invention. The use of a game is a recognized technique in the teaching of children, as well as older persons, in a classroom. The object of the study or program, designated herein as specimen 214, might be an article, such as furniture or clothing, normally offered for sale, or other type of object such as a painting or animal in the case of study of such subject matter. For example, in a study of architecture, the "specimen" would be a model of a building, and in a home-study course of geography, the "specimen" would be a map or other teaching aid. In the case of services being offered, the specimen may take the form of an advertisement of such services. Each receiving station 206 is provided with a television system 220 which receives broadcast transmissions 222 of the televised game show for presentation on the television screen 208.

In the studio 204, the host 212, or an associate who may be off-camera, is provided with two keyboards 224 and 226, respectively, for entering appropriate responses to situations posed by the game 218 (response criteria) and for entering appropriate guidelines for scoring the responses (scoring mode). The response criteria may consist of specific delineating or parametric information. The game 218 and the specimen 214 are viewed by a television camera 228 which provides video signals for the broadcast transmission 222. It is to be understood that, in addition to the remote audience 216, a local or studio audience (not shown) may be present within the studio 204 for participating in the game 218. The host 212 addresses the local audience and the remote audience by means of a microphone 230, the microphone 230 providing an audio signal for the broadcast transmission 222. In this example of the television game, a first video signal is transmitted to the remote audience to present a picture of the game situation, this signal being followed, preceded or accompanied by an audio signal in which the host describes the task to be performed by the remote audience, which task may be the answering of specific questions in a designated fashion. As described above, when confronted with a time zone problem, one or more off-camera announcers ask a number of questions in the form of the oral or module questions, which module questions are then selectively inserted into the tapes of television programs to be broadcast successively in different time zones. Alternatively, the second signal describing the task may be transmitted over the video channel by use of a display in front of the studio audience, the display having the questions set forth in large lettering which is read readily.

Figure 10:
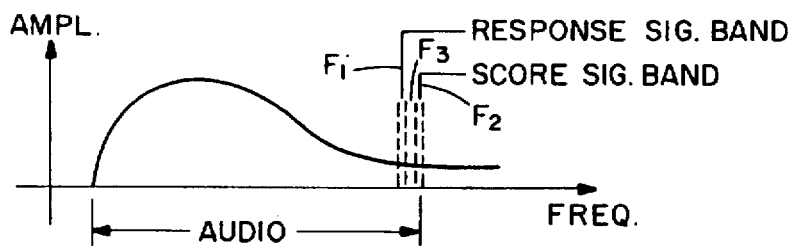
FIG. 10 shows the audio spectrum and a portion thereof designated for instructional signal bands of the second signal group utilized, respectively, for answers and criteria for evaluating answers.

With reference to both FIGS. 6 and 10, the central station 202 provides for a modulation of signals of the instructional signal group outputted by the keyboards 224 and 226 for the predetermined responses and scoring criteria within the audio channel to occupy narrow spectral bands in the upper portion of the audio spectral band. The system 200 is readily described in terms of four or more signals, the first signal being the television signal portraying activity in the studio 204. The second signal provides the description of the task to be performed by the studio and/or the remote audience. The studio scene and the task carried by the first two signals are presented diagrammatically in a typical time sequence by a graph shown alongside the camera 228, it being understood that the time sequence may be varied since the task announcement may precede or accompany the studio situation. The third signal carries the designated criteria for a response or range of responses entered by the host 212 upon the keyboard 224, such criteria being, by way of example, key words to be entered by the respondents. The fourth signal provides the scoring mode or guidelines entered by the host 212 upon the keyboard 226, such scoring being, by way of example, that an answer of the word "fish" is worth three points while an answer of the word "salmon"

is worth five points. Additional examples of response criteria and scoring mode are discussed herein.

As example of a further signal, a fifth signal providing a verification code for use in verifying a printout of awards at a remote station may be sent subsequently along the same channel employed for transmission of the scoring criteria. The passbands of the third and the fourth signals, namely the response criteria and the scoring mode signals respectively, are indicated in FIG. 10, both of these passbands being much narrower than the passband of the audio spectrum, and carrying signal amplitude of relatively low levels, as compared to the audio signal, so as to avoid any interference with the transmission of the voice of the host 212. Since four separate signal channels are provided for the first four of the foregoing signals, these signals may be transmitted in any desired time sequence including a concurrent transmission of a plurality of these signals.

One or more of the signals of the four channels may be retransmitted with an updated message, such as a reformatted scoring mode, to adapt the game program to new scoring instructions by the program conductor, or to audience responses, thereby to provide interaction between the host and the remote audience.

The central station 202 further comprises two signal processors 232 and 234, the summer 236, a combiner 238, a transmitter 240 and two oscillators 242 and 244 coupled respectively to the processors 232 and 234. The microphone 230 is connected to a first input terminal of the summer 236. The processor 232 is connected between the keyboard 224 and a second input terminal of the summer 236 for encoding designated response signals outputted by the keyboard 224, and for modulating the signals onto a carrier frequency $F_1$, which carrier frequency lies in the response signal band of FIG. 10.

Similarly, the processor 234 is connected between the keyboard 226 and a third input terminal of the summer 236 for coding scoring mode signals outputted by the keyboard 226, and for modulating these signals onto a carrier frequency $F_2$, the carrier frequency $F_2$ being within the score signal band of FIG. 10. The summer 236 combines the response and the score signals with the audio signal of the microphone 230 to output a sum signal to the combiner 238. The combiner 238 operates in a well-known fashion to combine the audio signal of the microphone 230 with the video signal of the camera 228 to output a composite television signal to the transmitter 240 for transmission via antenna 246 as the broadcast transmission 222.

Each of the processors 232 and 234 are constructed of the same components, these components being an encoder 248, a register 250, a modulator 252, a band-pass filter 254, and a clock 256. The operations of both of the processors 232 and 234 are the same and, accordingly, only the operation of the processor 234 need be described, it being understood that this description applies also to the processor 232.

In operation, the encoder 248 digitally encodes signals provided by respective keys 258 of the keyboard 226. The clock 256 outputs both a high speed clock signal and a low speed clock signal to the register 250. The high speed clock signal has a relatively high pulse repetition frequency for strobing bits of a digital signal outputted by the encoder 248 at a relatively high speed into the register 250. The bits of the digital signal are than outputted from the register 250 at a relatively low rate to the modulator 252 in response to strobing of the register 250 by the low speed clock signal. This arrangement of the high and low speed clocking allows a command to be entered at the keyboard 226 rapidly by the host 212, and then to be transmitted relatively slowly as a component of the audio signal. The slow transmission minimizes the requisite width of the score signal passband (FIG. 10). The modulator 252 may employ a suitable form of modulation as is commonly employed, such as amplitude modulation or phase modulation, for modulating the digital signal on the $F_2$ carrier. The modulated signal outputted by the modulator 252 is then coupled via the filter 254 to the summer 236, the filter 254 limiting the spectral components of the modulated signal to the desired passband of FIG. 10. In the same manner, the processor 232 digitally encodes signals entered by keys 260 of the keyboard 224, and modulates the digitally encoded signals of the designated response upon the $F_1$ carrier.

The television system 220 comprises a receiver 262, three demodulators 264, 266, and 268, a speaker 270, two bandpass filters 272 and 274, and two oscillators 276 and 278. Also shown in FIG. 6 is a telephone circuit 280 including a telephone at the remote station 206 and a telephone at the central station 202 which enable interaction in the form of direct communication between a member of the remote audience 216 and a person at the central station 202. The telephone at the central station 202 enables members of the remote audience 216 to communicate, when desired, with the host 212, for instance, to furnish their names for announcing on the air. The telephone circuit 280 is presented as a conveniently implemented form of communication system, it being understood that such communication is an optional feature and not essential to the practice of the invention, and that other forms of communication systems may be employed.

In operation, the receiver 262 receives the broadcast transmission 222 via an antenna 282, and outputs the received signal to the demodulator 264. The demodulator 264 operates in a well-known fashion to separate the audio and video portions of the television signal, the audio portion being applied to the speaker 270 and the video portion being presented on the television screen 208. Members of the remote audience 216 hear the voice of the host 212 on the speaker 270, and view the progress of the game 218 and other activities of the studio 204 on the screen 208. The filters 272 and 274 separate, respectively, the response and score signals from the audio spectrum and apply the signals, respectively, to the demodulator 266 and the demodulator 268. The oscillator 276 provides the $F_1$ carrier to the demodulator 266 for demodulation of the response signal to recover the designated responses. Similarly, the oscillator 278 provides the $F_2$ carrier to the demodulator 268 to enable the demodulation of the score signal to recover the scoring mode criteria. The response signal is applied by the demodulator 266 to the response unit 210 via line 346. The score signal is outputted by the demodulator 268 to the response unit 210 via line 348.

FIG. 7 shows a modification of the system 200 of FIG. 6 wherein the third and fourth signals, respectively, for the designated response and scoring mode criteria are transmitted in the video portion of the television signal rather than in the audio portion of the television signal. In FIG. 7, the modified system 200A comprises a central station 202A and a television system 220A which contains some of the components presented in the system 200 of FIG. 6, and has further components which provide for an interlacing of the third and the fourth signals with the television video portion by insertion of the third and the fourth signals within the time intervals allocated for the television vertical retrace. The system 200A is understood to include, when desired, the telephone circuit 280, the game 218, and the specimen 214 which have been deleted in FIG. 7 to simplify the presentation of the system 200A.

In the central station 202A, the signals outputted by the keyboards 224 and 226 are digitally coded by encoders 284 and 286, respectively, and applied via an OR circuit 288 to a register 290. The station 202A further comprises a modulator 292 and a summer 294 which operate with the combiner 238 and the transmitter 240. The television camera 228 includes a well-known vidicon 296, oscillator 298 for production of a carrier frequency, and timing and synchronization circuitry 300.

In operation, the encoded response criteria and scoring mode signals of the keyboards 224 and 226 are stored in the register 290 from which they are applied to an input terminal of the modulator 292. The modulator 292 is activated by a pulse signal on line 302 provided by the timing circuitry 300 during each vertical retrace interval in the generation of the television picture frame at the camera 228. The modulator 292 receives the encoded keyboard signals and modulates these signals onto the carrier provided by the oscillator 298, this carrier being the same carrier employed for carrying the television video signal. Thereby, the modulated keyboard signals outputted by the modulator 292, and the television video signal outputted by the camera 228 are on the same carrier, and are summed together by the summer 294. The output signal of the summer 294 contains both the video and the keyboard signals interleaved with each other. The output signal of the summer 294 is then combined with the signal of the microphone 230 by the combiner 238 and transmitted via the transmitter 240 to a remote receiving station 206A in the same fashion as was described for the system 200 of FIG. 6.

The broadcast transmission from the central station 202A is received by the receiver 262 and applied to the demodulator 264 which separates the audio and video portions of the broadcast transmission, the audio portion being applied to the speaker 270, and the video portion being applied to a television monitor 304 which includes the television screen 208. The monitor 304 includes well-known synchronization and timing circuitry 306 which is employed in converting the broadcast video to a picture presented on the screen 208, the timing circuitry 306 also providing a gate pulse signal on line 308 which is to be used for identifying the retrace interval so as to enable extraction of the designated response signal of the keyboard 224 and the scoring mode signal of the keyboard 226.

The television system 220A further comprises a clock 310, two gates 312 and 314, a demodulator 316, a register 318, a switch 320, a flag detector 322, and two registers 324 and 326.

In operation, the video signal outputted by the demodulator 264 is applied also via the gate 312 to the demodulator 316 which operates in conjunction with a carrier reference signal provided by an oscillator 328 to demodulate the signals of the keyboards 224 and 226. The operation of the demodulator 316 is opposite to the operation of the modulator 292 in the sense that, by way of example, if the modulator 292 employs phase modulation, then the demodulator 316 demodulates phase modulation.

The signal on line 308 activates the gate 312 to pass the modulated keyboard signals occurring during the retrace intervals, and to block the video signal appearing at all times other than during the retrace intervals. If desired, a similar gate (not shown) may be included within the monitor 304 for excluding the modulated keyboard signals from the monitor 304. Such signals appearing during the retrace intervals should not interfere with the operation of the monitor 304 because of the synchronization signals normally present in televised transmissions, which signals gate off the screen 208 during retrace intervals, as is well known.

The signal on line 308 also activates the gate 314 to conduct clock pulses from the clock 310 to the register 318 during each retrace interval. The clock pulses are employed to clock the digitally encoded keyboard signals from the demodulator 316 into the register 318. Included within each of the digitized keyboard signals is a digital flag which identifies whether a signal is the designated response signal of the keyboard 224 or the scoring mode signal of the keyboard 226. The keyboard signals are communicated from the register 318 via a switch 320 to the registers 324 and 326. The detector 322 detects the presence of the flag on digital signals outputted by the register 318, and operates the switch 320 to steer the designated response signals of the keyboard 224 to the register 324, and the scoring mode signals of the keyboard 226 to the register 326. The registers 324 and 326 provide the keyboard signals to the response unit 210 for operation of the response unit 210 in a manner to be described.

Figure 8:
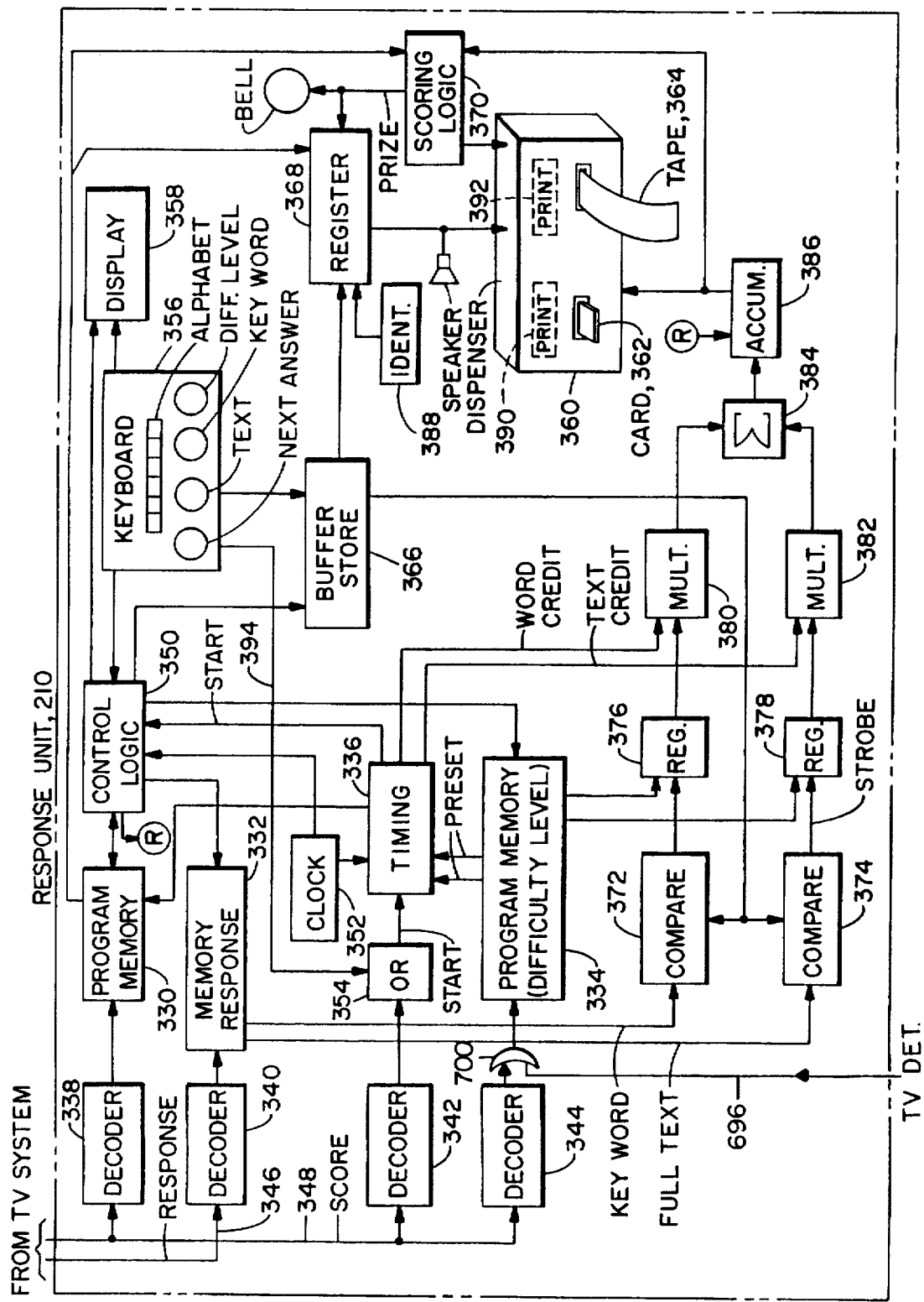
FIG. 8 is a block diagram of a response unit for use with either of the systems of FIGS. 6 and 7.

With reference to FIG. 8, the response unit 210 receives the designated response criteria signals and the scoring mode signals, the signals being stored in memory for evaluating answers of the members of the remote audience 216 (FIG. 6) in responding to tasks set forth in the studio 204. In order to facilitate explanation of the response unit 210, the memory which stores data of the designated response criteria and the scoring mode, is shown as three separate memories, namely, a program memory 330 which stores instructions for operation of the response unit 210, a response-criteria memory 332 which stores a set of data-defining acceptable or designated responses to be used as a reference against which audience response is to be judged, and a further scoring program memory 334 which stores coefficients or values of difficulty levels employed in the scoring of audience responses. A timing unit 336 is employed for interjecting a scoring factor based on the amount of time required or allowed to generate the response, and to apply zero credit in the situation wherein a member of the remote audience fails to respond within a predesignated time interval. The response unit 210 includes four decoders 338, 340, 342, and 344 which extract various portions of the digitized designated response criteria signal and scoring mode signal for application to individual ones of the memories 330 and 332, the timing unit 336 and the memory 334. The decoders 338 and 340 connect lines 348 and 346, carrying the scoring-mode and response-criteria signals, respectively, to the memories 330 and 332. The decoders 342 and 344 connect from line 348, carrying the scoring mode signal, respectively to the timing unit 336 and the memory 334. The decoder 344 may be coupled directly to the memory 334, or via an OR gate which will be described with reference to FIG. 23. To facilitate the present explanation of this embodiment of the invention, it is presumed that the decoder 344 is connected directly to the memory 334.

Also included within the response unit 210 is a control logic unit 350, a clock 352 which provides clock pulse signals to the control logic unit 350 and the timing unit 336 and an OR circuit 354 which couples the decoder 342 to the timing unit 336. A keyboard 356 and, if desired, a display 358 coupled thereto interact with the control logic unit 350 for the entry of responses, the display 358 showing a member of the remote audience what symbols have been typed on the keyboard 356 during the generation of a response.

The response unit 210 further comprises a dispenser 360 of cards 362 and/or tape 364, or similar recording medium, which are imprinted with markings reflecting awards, if any, for responses entered by a member of the remote audience upon the keyboard 356. For example, the dispenser 360 can accept a preprinted form which may be inserted by a respondent and removed from the dispenser 360 after imprinting. Also, the response unit 210 comprises a buffer store 366, a register 368, a scoring logic unit 370, two comparators 372 and 374, two registers 376 and 378, two multipliers 380 and 382, a summer 384, an accumulator 386 for accumulating scores, and an accumulator 387 for accumulating values of a succession of awards.

In operation, the program memory 330 and the control logic unit 350 operate together in a manner similar to that of the program memory 108 and the control logic unit 118 of FIG. 4. The program memory 330 stores information as to the number of possible responses, the number of questions, and also stores instructions for commanding the dispenser to print out messages in accordance with scores based on responses to questions and other tasks set forth in the studio 204. The memory 332 stores possible answers to questions and tasks, such as colors of objects displayed in the studio 204, sizes of such objects, sentences or phrases describing events in history, science, music, art or literature, listings, names and similar information which may be transmitted via the response criteria signal to the remote stations. The timing unit 336 includes counters and memories as will be described with reference to FIG. 9 for outputting appropriate factors or coefficients for use in scoring responses based on time of response. The memory 334 stores designated time intervals which are to be inputted as preset signals to the counters of the timing unit 336, and also stores factors to be applied in the scoring or grading of responses based on level of difficulty. Such level of difficulty information is transmitted from the central station via the scoring mode signal to the remote stations. After presentation of a task in the studio 204, the host 212 indicates the beginning of a time interval for audience response by pressing a key on the keyboard 226, this resulting in the transmission of a start signal to the response unit 210. The decoder 342 decodes the start signal and applies the start signal via the OR circuit 354 to initiate timing in the timing unit 336, the start signal proceeding through the timing unit 336 to the control logic unit 350 to initiate operation of the logic unit 350. Operation of the three memories 330, 332, and 334 is under control of the logic unit 350.

In one type of question-response situation, the host 212 gives a contestant a choice of questions to which the contestant is to respond. For example, two or three groups of questions may be presented on the television screen 208. The answers to all of the questions are loaded into the memory 332. The contestant indicates a selection of a group of questions by means of the keyboard 356, a selection signal then being outputted by the keyboard 356 to the logic unit 350 to address the memory 332 to provide the desired set of answers for evaluating the contestant's response.

While various forms of responses may be desired for specific situations which may be depicted in the studio 204, two situations of particular interest are those wherein a response is to be evaluated based on a significant element of the response such as a series of words, as in a phrase, or by examination of key words present in a phrase or sequence of sentences to be provided as a response. The response unit 210 is provided with dual channel comparison to score responses based on observation of key words or on observation of full text. One of these channels is composed of the comparator 372, the register 376, and the multiplier 380. The other of these two channels is composed of the comparator 374, the register 378, and the multiplier 382. Both of these comparator channels operate in the same fashion.

The first comparator channel is employed for evaluating responses based on the presence of a key word. This is accomplished as follows. A member of the remote audience presses a key-word button on the keyboard 356 to alert the control logic unit 350 that a key word is to be entered. The key word is typed on the keyboard 356 which then places the key word in the buffer store 366 and, preferably, also presents the key word on the display 358 to ensure that the key word is spelled correctly. The buffer store 366, under control of the logic unit 350, presents the key word to one input terminal of the comparator 372. The memory 332 presents the designated key word to the other input terminal of the comparator 372. The comparator 372 compares the designated key word with the response, and outputs a logic-1 signal to the register 376 to indicate a favorable comparison. If the key word of the response differs from the key word of the memory 332, then the comparator 372 outputs a logic-0 signal to the register 376. The memory 334 outputs a predetermined number of points of credit to the register 376 for an at-least partially correct or acceptable response. The outputting of the logic-1 signal from the comparator 372 strobes the register 376 to receive the credit from the memory 334. The number of points of credit are outputted by the register 376 to the multiplier 380 to serve as a factor or coefficient in computing the score for a correct answer. The timing unit 336 outputs a further factor to the multiplier 380 based on the amount of time consumed to produce the response. The multiplier 380 multiplies together both the acceptable-answer coefficient and the time-consumption coefficient to output a product to the summer 384, which product is the score for the response. The amount of credit in the credit factor outputted by the timing unit 336 is dependent on the amount of time; in the event that a maximum time interval is exceeded, the timing credit is zero which results in a score of zero being outputted by the multiplier 380.

By way of alternative embodiments, it is noted that the multipliers 380 and 382 may be replaced with summers, in which case the score would be based upon the sum of the acceptable-answer coefficient and the time-consumption coefficient. The actual range of numerical values of the score will differ, depending on whether multiplication or addition of the acceptable-answer coefficient and the time-consumption coefficient is to be employed in the construction of the response unit 210. Either embodiment of the response unit 210 produces a readily understandable score; the embodiment to be employed is simply a matter of preference in the desired range of score values.

In the same fashion, the comparator 374 compares a full text, as in a series of words composing a phrase, which text is compared by the comparator 374 against the text entered at the keyboard 356 by way of response. The corresponding scoring factors are applied by the memory 334 and the timing unit 336, respectively, to the register 378 and the multiplier 382. The comparator 374 strobes the register 378 to apply a scoring factor to the multiplier 382 to output the score from the multiplier 382 to the summer 384. A sequence of scores outputted by the summer 384 in response to a sequence of responses to a task or game situation presented in the studio 204 are accumulated by the accumulator 386. The output of the accumulator 386 is the total score, which total score is inputted both to the dispenser 360 and to the scoring logic unit 370. The accumulator 386 is reset by the control logic unit 350 (at terminal R) in accordance with commands of the scoring mode signal. Thus, the total score outputted by the accumulator 386 may be the result of response to questions of a single task or of a sequence of tasks as may be commanded by the program host.

In the scoring logic unit 370, the total score is compared with a range of scores presented by the program memory 330. The scoring logic unit 370 outputs a command signal to the dispenser unit 360 when the respondent's score meets the response criteria or is in a designated range, and the dispenser 360 prints the total score. Also, when the total score is within an acceptable range of score, the logic unit 370 directs the dispenser 360 to print a monetary award, or other designation of award on either the card 362 or the tape 364, and may activate a bell to signal success. Sounding of the bell may also be used to direct a respondent to begin the next task. Dispenser 360 may be designed for either one or both types of printouts. If desired, the tape or card may be perforated to allow a portion thereof to be retained by a contestant while the balance would be presented at a redemption center for an award. The award and other information, such as time limits for redemption, instructions to the merchant and a coded validation signal, are applied by the memory 330 to the register 368 for inclusion in the printout of the dispenser 360. By way of example, the validation signal may be encoded with the time of day and date of the television program and be combined with a number identifying the remote station or user. The identity of the remote station is supplied by an encoder 388 (which may be a thumbwheel digital encoder) to the register 368 for inclusion within the printout of the dispenser 360. The buffer store 366 also connects to the register 368 to permit imprinting at least a portion of the actual response in a printout of the dispenser 360. Printers 390 and 392 within the dispenser 360 can provide for imprinting in the form of alphanumeric and symbolic indicia, or by means of bar code or color code. By way of example, the printers 390 and 392 may be constructed as dot-matrix printers. If desired, the printer 390 may be constructed to output the printed message on a magnetic strip (not shown) of the card 362.

The keyboard 356 is provided with a "text" key as well as a "word" key to enable a respondent to answer in the text mode or in the key-word mode. By the inclusion of alphanumeric keys, as in a standard typewriter keyboard, a person may respond by entering key words or phrases. A respondent may answer a question in significantly less time than is allocated for the question, in which case the respondent may wish to indicate task completion before the full allotted time has elapsed, or before the host 212 (FIG. 6) tells the audience to proceed to the next question. In this case, the respondent pushes the "next answer" key or button on the keyboard 356 resulting in the transmission of a strobe signal along line 394 to an input terminal of the OR circuit 354 to restart the timing unit 336 for the next question and answer. Also, in the event that there is a choice of questions and responses, each at a different level of difficulty, the respondent employs the "difficulty level" button on the keyboard 356 to signify, via the control logic unit 350, to the program memory 334 that an answer of a designated difficulty is being attempted. Thereby, the memory 334 in conjunction with the timing unit 336 can provide proper scoring factors for various conditions of response such as accuracy and a shortening of the time interval set by the host. Generally, in determining the value of award to a successful contestant, some or all of the following factors are taken into consideration, namely, the quality of response as evidenced by accuracy, responsiveness, comprehension and comprehensiveness, as well as speed of response and difficulty level.

Normally, the difficulty level announced by the host will be "difficulty level one", with which a certain award is associated. Correspondingly greater awards may be announced for correct answers at higher difficulty levels. The choice of selecting such higher difficulty level rests with the contestants and may, where a choice of subject matters is offered, be made after the host has announced the general subject matter or the nature of the next question.

After participating in a number of games or other projects, each of which has resulted in the awarding to the respondent of a prize or award of significant monetary value, it may be desirable to total the value of all of the awards for a grand total award. The accumulator 387 provides this function. The accumulator 387 is connected to the scoring logic unit 370 to receive successive ones of the dollar amount of the respective awards, or other measure of value of the awards such as a credit toward free trips by an airplane or days on a cruise. The accumulator 387 sums the values of the successive awards and, upon demand from the scoring logic unit 370, outputs the grand total award via the logic unit 370 to the dispenser 360 to be imprinted on a hard copy record dispensed by the dispenser 360.

Figure 9:
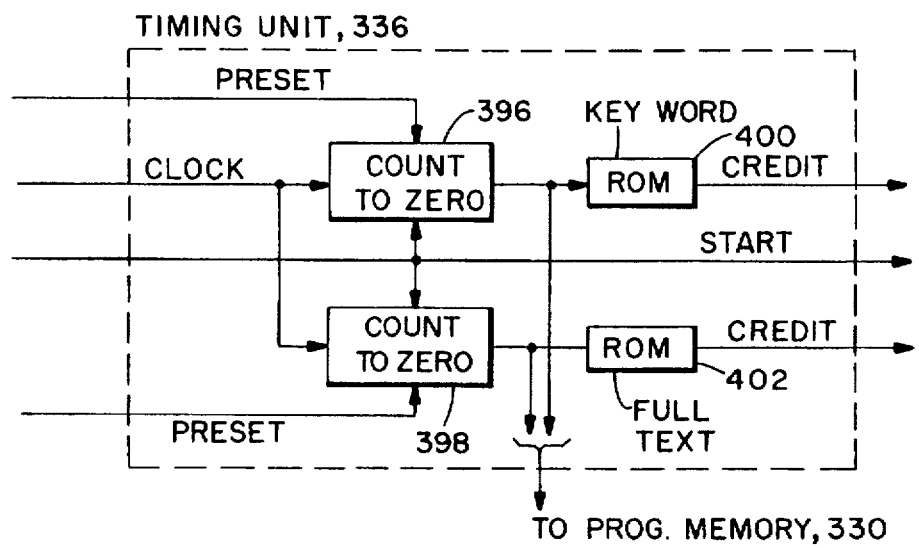
FIG. 9 is a block diagram of a timing unit of FIG. 8.

FIG. 9 shows details of the timing unit 336 of FIG. 8, the timing unit 336 comprising two counters 396 and 398, and two memories 400 and 402 wherein each of the memories 400 and 402 is preferably a read-only memory (ROM). The counters 396 and 398 are preset, as noted above, by signals from the program memory 334 of FIG. 8. The counters 396 and 398 count clock pulses supplied by the clock 352. Each of the counters 396 and 398 counts down from its preset value to zero. The counters 396 and 398 address, respectively, the memories 400 and 402. Output counts of each of the counters 396 and 398 also serve as address signals for operating the program memory 330. Counting by the counters 396 and 398 is initiated upon application of the start signal from the OR circuit 354, the start signal being outputted to the control logic unit 350. Each of the memories 400 and 402 is loaded with appropriate values of credit to be applied to responses, respectively, for key words or numbers and full text. For example, a question answered by a key word in ten seconds might receive a time credit factor of ten points, while a 20-second response time might receive only three points, and any response beyond a half minute might receive a zero points resulting in a zero score. It is noted that a count by either of the counters 396 or 398 from its preset value down to zero automatically terminates an allocated predetermined time interval and results in an outputting of zero score.

The foregoing circuitry allows the response unit to operate, if desired, by presenting a predetermined credit, based on time to respond and on accuracy of response by way of example, to a contestant at the time when a question is asked. Deductions in score are made for excessive time, incomplete answers or inaccurate answers, by way of example. This is accomplished by the counters 396 and 398 (FIG. 9) which count down with increasing time to address the memories 400 and 402 to output a time dependent credit. Inaccuracies effect the final score by virtue of the operation of the comparators 372 and 374 (FIG. 8). An incomplete answer, due to a failure to answer certain parts of a question, results in a reduced output from the accumulator 386.

With respect to the system and methodology of the invention, communication with the home audience by the normal television channels of electronic transmission includes signals broadcast on television frequencies via cable including fiber optics or satellite. A typical example in the propagation of such electronic signals would be that transmission to a communication satellite which, in turn, transmits the signals to ground receiving sites adapted to send the signals either from broadcast stations over the air or via cable to cable subscribers. These signals include the first two signals of Group One mentioned hereinabove, namely the program and the task signals, received by the television receivers at each of the remote locations at which a television viewer is located. Encouragement of as many viewers as possible to participate is accomplished by allowing the television viewers to become contestants who participate in a quiz program or other audience-participation program on the spur of the moment and in the middle of a program wherein the participants win prizes.

A number of versions of the invention in the operation of a sweepstakes system will now be described. According to one embodiment, instructional signals transmitted to all remote locations include signals which, if matching, or bearing a correlation to, symbols on said hard copy record, qualify a participant for a special or sweepstake prize. If, for example, a coupon having previously provided alphanumeric or other symbols is issued to a participant who has entered an acceptable response, such participant qualifies for a sweepstake prize if the said symbols on such coupon are the same or have a correlation, namely, a defined relationship to certain sweepstakes symbols. The symbols on the coupon may be in the form of preprinted sequential numbers, and the sweepstakes symbols may be transmitted from a central location as part of the instructional signals directing the printer to print the sweepstake symbols. In that event, a successful contestant discerns immediately whether he or she has qualified for a sweepstakes prize. Alternatively, the sweepstakes symbols are provided to a place where winning records are redeemed, such as banks or supermarkets, and a person presenting a coupon for redemption learns only at this place and point in time that he or she has won a special prize or sweepstake.

The term "correlation" refers to a predetermined relationship of alphanumeric or other symbols provided on hard copy records and identifying sweepstake awards, whether or not such relationship is expressed in mathematical terms. Thus, the indicia identifying a winning coupon and a sweepstake award may be deemed to be correlated if they are identical or if they meet a predetermined mathematical formula or other definition. The specific correlation entitling a coupon holder to a sweepstakes prize may be known or discernible only at a redemption center. In such an instance, a contestant having been issued a winning coupon will ascertain whether or not a sweepstake prize has been won only after presenting a winning coupon at a supermarket or other redemption center.

Even if the sweepstakes symbols are transmitted to the home of a contestant and are immediately printed on a winning coupon, the following method may be employed to compel such contestant to visit a redemption center, such as a supermarket in order to ascertain whether he or she has won a sweepstakes prize. This is achieved by selecting and providing sweepstakes symbols which are not identical to the symbols of a winning coupon, but bear a previously identified relationship. As an example, if a stipulated percentage of a plurality of alphanumeric elements on a winning coupon matches the elements of sweepstakes symbols, a sweepstakes prize may be awarded. Such prize can be larger, if a larger number of elements comprising the award symbols is matched by the sweepstakes symbols.

In another modification of the method, the winning coupon symbols and the sweepstakes symbols may have no discernible relationship. Any desired correlation between the sets of symbols may be devised, such as a zero relationship, wherein the two sets of symbols have no common elements, or a previously defined formula may be employed wherein for example the symbols are numbers and the sweepstake number is half the winning coupon number.

Sweepstakes symbols determined at a central location may be provided electronically or otherwise to redemption centers, together, when required, with a formula for identifying an acceptable correlation with symbols on a winning coupon, thus identifying such a coupon as one qualifying for sweepstakes prize.

According to the method of the invention, the number of prizes awarded and their values are set by the sponsor of the program, and normally are set so as to optimize the financial return to the sponsor or broadcaster. Normally, in a quiz program, a plurality of tasks will be presented. Each task is formulated in such form that the task setting message may be electronically transmitted from the central location as the second signals or second set of signals of the aforementioned Group One to be received by the viewers at the remote locations. It is noted that all of the signals comprising Group One may be transmitted at the same time, such as by being part of the same pictorial presentation. A simple illustration of such presentation would involve a celebrity appearing before a television camera, holding a sign reading "Who am I?".

Typically, these tasks comprise questions to be answered by viewers who wish to become contestants. The tasks may differ with respect to fields of knowledge, memory skills and reaction speed, literacy, comprehension, expression and experience required, and other aspects. The time allowed viewers to respond to a task may vary. The task may take any form of questions including single-answer questions and multiple-part questions. The questions may also call for one or more multiple choice answers. There may be a requirement that, with respect to a specific task, a minimum number of responses must be provided by participants. The questions may also be open-ended in the sense that viewers can not completely answer a question within an allotted time, a practice common in aptitude tests. A task could, for instance, involve a listing of a large number of names or other data in response to a question to which the answers are more numerous than can be answered within the prescribed time. Normally, the host announces the period of time allowed for entering answers at the time a question is posed. At substantially the same time, the host or other person aiding in the program, may also announce or hint at the general subject area of the next question, the purpose of such announcement being to enable a contestant to elect a higher difficulty level to apply to a favored subject area. Thus, the response criteria may consist of a simple requirement to be met by a respondent, or may comprise a plurality of independently variable elements.

Questions may also be asked by a host in conjunction with television advertisements or "commercials". In such an event, a host or off-camera announcer may first direct the attention of the audience to the fact that the next question will deal with an aspect or feature of the product or service about to be displayed or offered. Awards may also be announced. This type of incentive will significantly increase viewers' attention and recall.

Questions may also be visually posed to the television viewers by displaying the questions on electronic boards or on other display means. Alternatively, the host may silently point to an advertised item of merchandise to insure that participants are paying attention to the television commercial, in which event a question may relate to such merchandise. The awarding of prizes to viewers who correctly answer questions relating to goods or services shown in a preceding commercial is believed to greatly enhance consumer recall.

It is noted that a question asked with reference to an offered item may call for no more than a simple mention of the specimen displayed, or of specific features thereof. There is little or no difficulty in responding to such question posed to the viewers, so that in effect, the viewers are simply verifying that they are tuned in to the desired program. This method can be employed when discontinued items, or "loss leaders", are intended to lead customers to a store, in which case more valuable prizes are awarded for relatively easy answers.

The range of difficulty levels needs no specific limitation. As an illustration, one may consider the task of listing within a period of 20 seconds as many countries as possible that are members of the United Nations.

The award or prize won by a successful contestant is computed in accordance with the response criteria and the scoring basis or mode which may be formulated by the host or program conductor. As noted above, the response criteria and the scoring mode or basis are transmitted from a central station to remote locations through the response-criteria and scoring-mode signals of the aforementioned Group Two. Specific and different response criteria may be set for each question, and may include a different time period allowed for such response. The instructional group of signals, Group Two, conveys the data constituting an acceptable answer or range of answers, as well as the value of the award to be given a successful contestant based on the applicable difficulty level, the accuracy and completeness of the answer to be provided. The elements of the response criteria may be varied from question to question.

The instructional group of signals, Group Two, may also contain, as a subset, additional command signals such as the above-noted validation signal to permit certification and verification of an award claimed by a contestant or member of the remote audience. Such data typically consists of alphanumeric information appearing on the contestant's printout to facilitate verification, but may also consist of coded data or symbols which are machine-readable in the place of redemption.

The instructional group of signals may also contain, as another subset, further additional command signals addressed to the scoring circuitry, which additional signals convey data governing the issue of the printout and its terms, including place of redemption and time limitations. A printout from the dispenser 360 may also serve as a voucher to be exchanged for a ticket at a theater or sporting event.

The invention may be employed for conducting a sweepstake with results dependent on skill and knowledge of contestants. The printout provides a record of responses to insure that those who have successfully responded to an earlier question are properly responding to a later question. Awards for the sweepstake can be based on a selected difficulty level, so that those who are more knowledgeable get higher winnings.

As an example of various forms of programming which may be employed, questions are displayed on an electronic board seen by the television viewers. Alternatively, a question appears on a display board in the television studio and a plurality of numbered answers appear on a separate display so that a television contestant only needs to enter the number of the selected answer believed to correspond to an acceptable answer and to the response criteria. The latter type of visual presentation is particularly suitable for game shows involving multiple choice answers. Particularly successful, or otherwise selected participants, may engage in a personal dialogue with the host.

It is noted that members of the studio audience may also participate in the quiz program. In such event, one display may contain questions for the home viewing audiences, while the studio contestants may be asked a different set of questions. In such a situation, effectively, two separate quiz programs are being conducted substantially concurrently.

In conducting such television program, provisions may also be made to announce and/or display to the television audience information regarding awards that are to be won at different difficulty levels. This information may be provided before, during, or after the corresponding question has been asked, although it normally is made known to viewers at approximately the time that the question is asked. As an illustration, a split television screen technique may be employed wherein part of the screen displays information and/or pictures relating to the question being asked, and another part of the screen displays a table having tabulated information showing a relationship between difficulty levels, and available prizes or discounts from the base price towards the purchase of certain merchandise. If desired, a portion of the split-screen presentation may be hidden from the studio audience. The host announces the number of difficulty levels and the general subject area relative to each question. The host may also announce the base or minimum difficulty level applicable to a specific question so that each contestant has sufficient time to elect to respond under the conditions of the difficulty level set by the host or under conditions of a higher difficulty level. In accordance with the foregoing elected situations, requisite command signals of the instructional signal group, Group Two, are transmitted for directing the dispenser to print out such tabulated award data. Successful participants may be informed of the fact that they have won an award via the audio or video portion of the television signal, or by directing the dispenser to print out a message describing the award. The record or other signal by which a contestant is informed of the outcome of his or her response may be simply "award" or "no award" announcement, or a similar simple notification.

As a further feature in the construction of the invention, the scoring-mode signal generated at the keyboard 226 (FIG. 6) for use in the program memory 330 and scoring logic unit 370 (FIG. 8) may include a delay signal interposed by the host which delays operation of the bell as well as a printing out of notification of award by the dispenser 360 until after a determined time interval. This encourages contestants and viewers to continue watching the television program until the program, or a portion thereof, has been completed.

It is also noted that the card 362 with data encrypted by use of bar code or color code or magnetic recording can be machine readable. This permits use of the card in an automatic dispenser of merchandise at a store wherein such merchandise is dispensed. The dispensing machinery would include a well known card reader and verification circuitry which may operate with a personal identification number known only to the contestant to insure that the merchandise is dispensed to the correct person. It is also noted that the pertinent information can be given over the telephone to allow for purchases by mail.

Another interaction between members of the remote audience and the host is accomplished by means of the optional two-way communication afforded by use of the telephone circuit 280 (FIG. 6) in combination with the signal channels of the television transmission. For example, the host 212 may be a professor conducting a home-study course. The host presents a set of examination questions to home students via the television screen, and transmits various possible responses and scoring criteria via lines 346 and 348 (FIG. 8) to the response unit 280. Students may call in via the telephone circuit 280 to inform the host that the questions relate to material not yet fully covered in the course. The host then operates the keyboard 224 (FIG. 6) to reformat or modify the possible responses, transmitted via line 346, so that the students can give an acceptable response based on the material already covered in the course. In addition, the host operates the keyboard 226 to reformat the mode of scoring to provide a different distribution of score points for various key words and phrases. Further alteration in the mode of scoring can be accomplished, by the host, by operation of the keyboard 226 to alter the amount of time allocated to each question. The difficulty levels stored in the memory 334 may also be altered or reformatted by the host so as to provide a curving of the score distribution to give extra credit to those students who studied course materials in advance of the present curriculum.

The foregoing example in the teaching of a home-study course shows an aspect in the methodology of the invention in which a succession of instructional signals relating to designating acceptable responses and scoring criteria to be applied to responses may be transmitted from the central station 202 to remote receiving stations 206. In a general case, such a succession of instructional signals would be interleaved with communications from persons at the remote stations 206 to the central station 202 to enable the response criteria to be modified to fit the needs of the remote audience. This provides further interaction between the host and the remote audience. Similar interaction is possible between a person conducting research and members of a focus group or other sample populations. This type of interaction is helpful in eliciting consumer reactions in qualitative research and other reaction eliciting programs.

As a further example in the modification of scoring criteria, the studio audience and the remote audience may be engaged in a program for the development of foreign language skills. The host, in this case a language instructor, may submit a set of questions requiring responses in the form of phrases for describing situations depicted in a studio game. If members of the studio audience experience difficulty in answering the questions, then the host would use the keyboards 224 and 226 to modify the scoring criteria, before complaints from the remote audience arrive via the telephone circuit 280. In this example, a succession of instructional signals may be transmitted without direct interaction with the remote audience, and with modification of response criteria and/or scoring mode being based on response of the studio or external audience. In this way, the format of acceptable responses can be updated at the response units 210 in the remote stations 206 in anticipation of remote audience needs. The response unit 210 stores the modified scoring criteria in the memories 330, 332 and 334, the contents of these memories being updated with each transmission of an instructional signal. The operation of the response unit 210 in scoring answers entered by a contestant to a language development game, or other form of game, is based on the most recently transmitted instructional signal.

By way of further embodiment to the invention, it is noted that the tape 364 (FIGS. 6 and 8) outputted by the dispenser 360 of the response unit 310 may be imprinted with a bar code, as portrayed in FIG. 6. The bar code may be read by a scanner 404. The reading of the scanner 404 may be transmitted to a receiver 406 at the central station 202 via modems 408 and 410 connected to the telephone circuit 280. Further example in the communication from a receiving station at a remote location to a central station will be described with reference to FIG. 22 wherein information as to a person's response can be outputted from the response unit 210 as digital signals and transformed by a modem to a signal format suitable for transmission via a telephone circuit, such as the circuit 280. The use of modems and a telephone circuit serves as an example in the practice of the invention for communication electronically from a remote receiving station to a central station, it being understood that other forms (not shown) of electronic or electro-optical communication may be employed.

The foregoing examples in the use of the invention show that the system and methodology of the invention are adaptable to the needs of members of the remote audience. Adaptation can take place by interaction with members of the remote audience, as well as by anticipation of the needs of the remote audience based on observation of responses of the studio audience. This enhances the quality of audience participation, ensures better success in accomplishing the purposes of the television games, and elicits greater satisfaction on the part of both studio and remote audiences.

With reference to FIGS. 1 and 6, it is noted by way of alternative embodiments of the invention that the use of both audio and visual channels, and the use of both television and radio transmissions permits various transmission arrangements to be employed. For example, instead of employing one central television transmitter and one central radio transmitter, as shown in FIG. 1, a network of such transmitters can be employed for transmitting the program from the studio 14 throughout an entire country. In the case of the transmission of the instructional signal by radio, in a network transmission, individual radio stations might alter the instructional signals for different scoring criteria and rewards in different geographic areas while all geographic areas would receive the same television program and task-setting messages. By way of further variation of transmission arrangements, the voice signal of the announcer at the studio can be stopped, and replaced by voice signals at the radio transmitters of the various geographic areas to allow different task-setting messages to be generated audibly at the different geographic areas along with the different instructional signals at the various geographic areas. These variations of transmission arrangements provide a flexibility to the implementation of the invention so as to adapt the task-setting and scoring to needs of local areas.

It is also noted that the invention can be employed even in the situation wherein television may not be available to some members of the remote audience. With reference to the receiving station 16 of FIG. 1, in the absence of any television transmission (possibly due to mountains) or in the absence of television sets, the host 50 (FIG. 3) would describe audibly and fully the program situation by use of the microphone 56, and would also present the tasks audibly by the microphone 56. Thereby, both the audio description and the instructional signals would be transmitted by radio channel.

Also, the microphone 56 may be shut off in which case all task-setting messages would be indicated visually, as by signs and posters, on the television screens of the receiving stations. In this case, the audio channel would be used only for the instructional signals while the program would be conducted silently on the television screens.

Furthermore, the program can be conducted silently, as above, with occasional audio commentary and/or background music, a television format commonly employed by cable television news services. In this case the program and task-setting messages would be transmitted by television with visual presentation of the tasks by signs or posters with the microphone 56 being used only for the occasional comment and playing of background music.

The foregoing situation can be modified further by the substitution of the normal television program format by presentation of a television screen showing only lines of alphanumeric characters, similar to that of a printed portion of a magazine or newspaper. Such a format is used frequently in cable television news by broadcasts employing a channel known as an automated channel. With reference to FIG. 6, the automated channel can be implemented, by way of example, by use of a display system including a character generator (not shown) for generating the text, and a screen (not shown) for presenting the text in front of the camera 228 to be televised. Or the television signals may be generated by a suitably programmed computer (not shown). With respect to the implementation of the invention for broadcast of a quiz program by use of an automated channel, the following observations are noted.

Normally, automated channels are used in cable television to provide information in visual alphanumeric or graphic form, utilizing a character generator, and transmitting news updates, financial news, program guides, catalog-shopping and price information, weather information and the like. If computer type storage is provided at receiving stations, text displayed in this manner on screens at receiving stations may be scrolled in a desired direction. A voice or music audio portion accompanies the visual information.

The automated channel type of television broadcast lends itself well to the presentation of questions and falls within the scope of the present invention. A Home Quiz program of the type described may consist entirely of questions, or the questions may be interspersed with the types of information listed above. As an example, a question is displayed on the screens at remote locations for the period of time allowed for answering the question, after which the data entering devices do no accept contestants' responses. The correct of a series of acceptable answers then appear on the screens for an interval of time enabling contestants to ascertain whether they have won an award as evidenced by a printout emitted by the dispenser. Alternatively, correct answers may be provided orally by a program conductor. Such broadcast requires only very limited studio facilities and is economical to produce. In this and other types of programs, the electronic equipment at remote locations can be very simple, providing only for yes-or-no answers, or can be as complex as is desired.

The type of question and answer broadcast on automated channels lends itself particularly well to education and research. In the field of education, after a time interval allowed for answering a question has expired, a correct answer may be provided orally or visually by the program host, and may be accompanied by extensive explanations and narratives. This method still enables students to mail or deliver examination papers dispensed to them by the electronic printer in the above-described dispenser to an educational institution conducting the test. Such examination forms have printed thereon each student's scored answers.

The use of automated channels permits the implementation of the methods described in a highly economical manner, particularly in the area of education of children. Incentives can be provided to children to take an interest in subjects to be taught by rewarding successful answers to questions which dispenses tokens, such as coupons, carrying an award of interest to children of the age group addressed. The increasing familiarity of children with computer keyboards makes the use of data entering devices a simple task. In the field of use of research, free-standing questions on automated channels may be interspersed with questions pertaining to research conducted. Some questions on automated channels are phrased so that the answers will provide statistically or otherwise meaningful responses, while other questions contain a challenge inherent in answering such a question. For example, a question may require personal judgment, special knowledge, or characterization.

As a further example, a demographic researcher may intersperse between questions regarding respondent's income and expenditures the question "What is the average annual per capita income in your county?". A successful respondent wins an award in order to encourage wider participation in such a survey. In market research, the ability to leave a printed text on a cable television screen for a period of time, and to accompany a question with an oral explanation will not only make respondent's answers to such questions easier and therefore more reliable, but will make the conducting of surveys or automated channels a very economical method of reaching unprecedented numbers of respondents.

The methods and systems described above may advantageously be employed to attract television viewers to interactive programs in which prerecorded listings and information pertaining to merchandise and services are displayed on the TV-screens of viewers.

Typically, in the operation of such programs, prerecorded listings of available products would be televised and displayed on the TV-screens of remote viewers. The homes of such viewers would be wired, permitting individual ones of said viewers, utilizing well-known means for electronically transmitting signals to a central receiving station, to indicate a category or item of merchandise or services of particular interest, regarding which a viewer wishes to receive additional information. Such interactive means may transmit viewers request signals over wires or over the air. The additional information may include pictures of merchandise selected, prices, costs, performance characteristics, capacities, capabilities, sizes, colors, accessories, warranties and descriptions. Viewers might also select listings of product groups, similar products within a specified price range, products offered by one company or in one retail outlet, or firms offering a specified product within a geographic area. A request for more detailed information may, for example, produce a full page of specifications, along with a picture or pictures of one specific item of merchandise.

In a typical embodiment of implementing such a method, a manufacturer of goods or a supplier of services is given the opportunity to contract with the producer of an interactive broadcast program for the insertion of questions among the product data and offerings comprising the television program. Such questions can for example be interspersed between announcements pertaining to products offered by suppliers. The knowledge on the part of TV-viewers that meaningful prizes will be awarded for satisfactorily answering questions will result in attracting additional TV-viewers. Commercials by suppliers of products may be inserted into the listings and questions may relate directly to the commercial shown, which commercial may be a still photograph. A question may follow such a commercial. TV-viewers may be informed prior to the commercial that a question will follow the next commercial and will deal with the commercial. This technique will ensure that the television audience will pay close attention to such a commercial, especially if a valuable prize may be won at one of the aforementioned difficulty levels. Thus, the method described can be a potent advertising and promotional tool in the context of such an interactive program. Prizes awarded TV-viewers may be discounts on the products offered during the show.

Frequently, in television programs Listing items of merchandise and services available to viewers, sometimes referred to as Videotext, interested viewers who are potential buyers have the opportunity to request additional or supplemental information over cable connections such as cable or telephone connections used for home computers. The purpose of such additional information is to help potential buyers to make up their minds whether the item is of interest. Additional listings requested can be progressively more detailed and can provide information of interest pertaining to an item of merchandise or services, such as information where such merchandise or services may be obtainable, alternatives and competitive items and specifics such as prices, size, colors, capacities, performance, and other related information. It is in the interest of the producers of such shows which are frequently sponsored by advertisers, to induce viewers to call up additional information in the form of lists, specification sheets, pictures and other pertinent data. It therefore is an object of the method described to hold viewers interest and to induce them to request more detailed and specific information which may lead to a purchase decision. To achieve this, one or more questions are interspersed in successive presentations of said items of merchandise or services. The method follows and employs the steps enumerated in connection with the methods hereinbefore described. The question and the response criteria, as well as the ultimate answer to such a question are transmitted over the cable connection used in the television transmission.

In order to further induce participation in such television shows, the methodology of awarding prizes can be based on the required accumulation of credits for acceptable answers, i.e. on the requirement that, in order to win a prize, a participant must enter an acceptable answer to two or more questions. In such an instance, if a viewer answers a question correctly, the credit for such an acceptable answer is computed and stored at a viewer's remote location. If the producer of the show has determined that more than one acceptable answer is required to win a prize, viewers are informed, as part of the television program, that either a certain number of acceptable answers must be entered or that a certain cumulative total of credits must be earned to qualify for a prize. The scoring mode in this instance provide for coefficients in computing a total score which becomes progressively larger with each subsequent question. For instance, a viewer who continues to watch the program and ultimately answers three questions in an acceptable fashion, which can only be accomplished having called up at least two additional presentations of the offer, may win ten times the amount of the prize that would have been won for answering only the first of the three questions correctly.

The system provides for storing and accumulating credits for acceptable answers until either the end of the program or until either the end of the program or until the total number of questions has been reached. The producer of the show may announce to the viewers at any stage of the program how many questions will be asked and what scoring mode will be employed in the event more than one question is answered, including additional credits earned by answering questions at higher difficulty levels.

By way of further example, a television game show is conducted by another method providing at a central location the previous described transmitting facilities and providing at TV-viewers' remote locations response units, including comparison and scoring circuits with provisions for allocating credits at different difficulty levels. A plurality of questions is asked in the course of the show, acceptable answers being defined by response criteria at a basic difficulty level and at least one higher difficulty level, at which an acceptable answer earns a larger number of credits. Negative credits are allocated to answers not meeting the response criteria at a higher difficulty level elected, even if doing so at a lower level.

The method is further characterized by not instantly awarding prizes for each accepted answer, but to accumulate credits for all of the accepted answers entered by a TV-viewer in the response unit, based on the scoring mode which allocates a predetermined number of credits to each acceptable answer at the applicable difficulty level. A TV-viewer, by not specifically electing a higher difficulty level, in effect elects to respond at the basic difficulty level. Individual ones of the TV viewers are informed of credits earned or lost and also are informed of the monetary value of credits. At the end of the question and answer period, a recording device in the response unit provides winners with a record of total credits, which record may be a printed token, such as a coupon, or may be a magnetized card.

The method provides for penalizing a contestant for not answering or for unacceptably answering a question, irrespective of the difficulty level by deducting credits determined in accordance with the scoring mode from the accumulated credits of such viewer. The response criteria may be transmitted as an unobtrusive portion of the TV-signals, by optical means, over voice channels, or other means. The total number of credits earned by a viewer and a verification number or code provided on said record in accordance with instructional signals transmitted as fourth signals, may be phoned in by a contestant and the host announces a winner or winners near the end of the show.

FIGS. 11–18 disclose an alternative system of the invention wherein material generated at the studio of the central station is recorded for later playback to one or more receiving stations. By way of example, the receiving stations may be located in hotel rooms or at desks in a classroom wherein the program deals with educational material. As a further example, the receiving stations may be located at seats in a vehicle of public conveyance such as an aircraft. The receiving stations may be equipped with television receivers in which case the recording may be a video recording in the form of the widely-used video cassette recording. The sound portion of the program would be heard by earphones. Alternatively, the receiving stations may be equipped for audio playback only, as by use of earphones in an aircraft, in which case the program at the studio must be formatted by audio description of the task so as to adapt the program for audio recording. In the case of the video recording, the circuitry employed at the central station and at the receiving station, as disclosed in the foregoing embodiments of the invention, may also be employed in this embodiment of the invention. In the event that an audio-only recording is to be utilized, then the equipment of the central station and of the receiving stations must be modified slightly so as to accommodate this embodiment of the invention modified for audio-only. In the case of a video recording, the video signals include synchronization signals which ensure that a playback of the recording is an accurate representation of the original program. However, in the case of an audio-only recording, the system of the invention is modified, preferably, to include a synchronization signal to insure accuracy of a playback even if the playback recorder speed differs somewhat from the recorder speed during the recording of the program.

Figure 19:
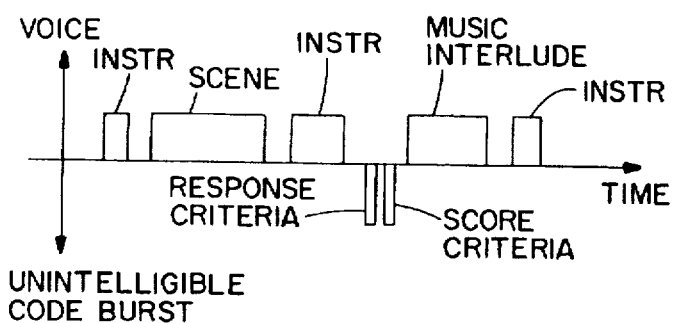
FIG. 19 is a timing diagram showing burst transmissions of response and scoring criteria between voice signals for an audio-only recording employing a single recording track.
Figure 20:
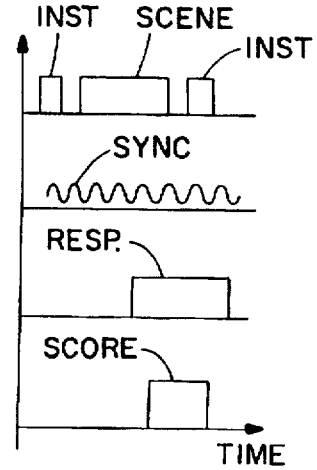
FIG. 20 is a timing diagram showing simultaneous transmission of voice, synchronization, response and scoring criteria signal in an audio-only system employing a multiple track recording medium.
Figure 11:
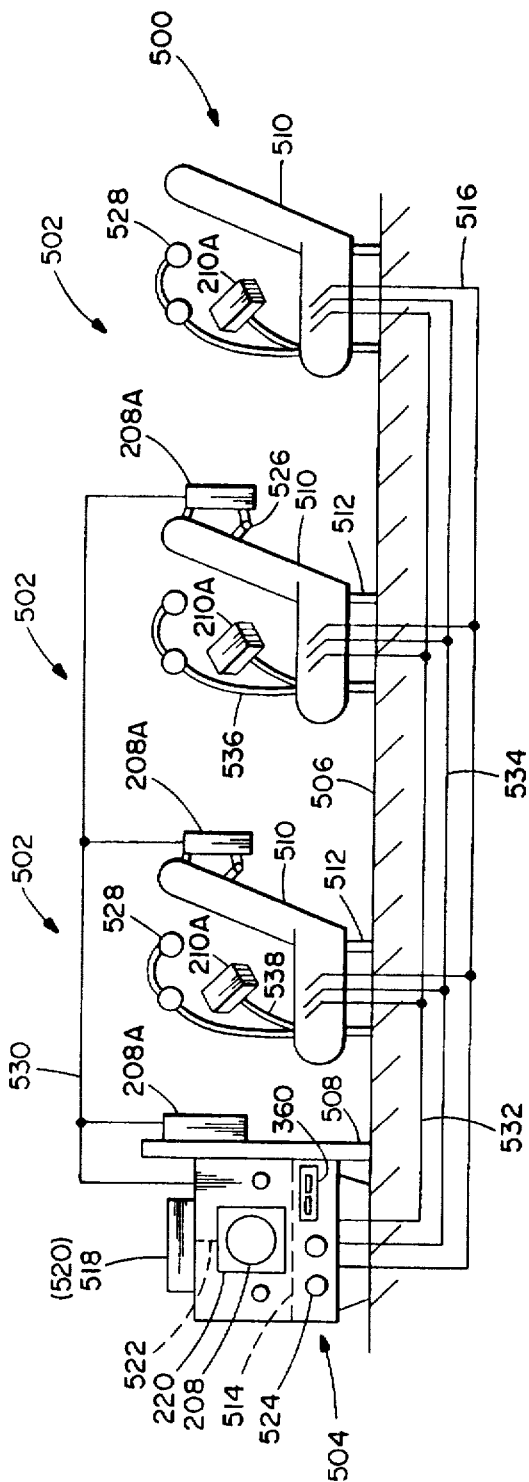
FIG. 11 is a diagrammatic view of receiving stations of the invention installed, as a further embodiment of the invention, in an aircraft with separate receiving stations located at each passenger seat, this embodiment employing a recording of a game situation with instructions for response, each receiving station being equipped for both audio and video.
Figure 12:
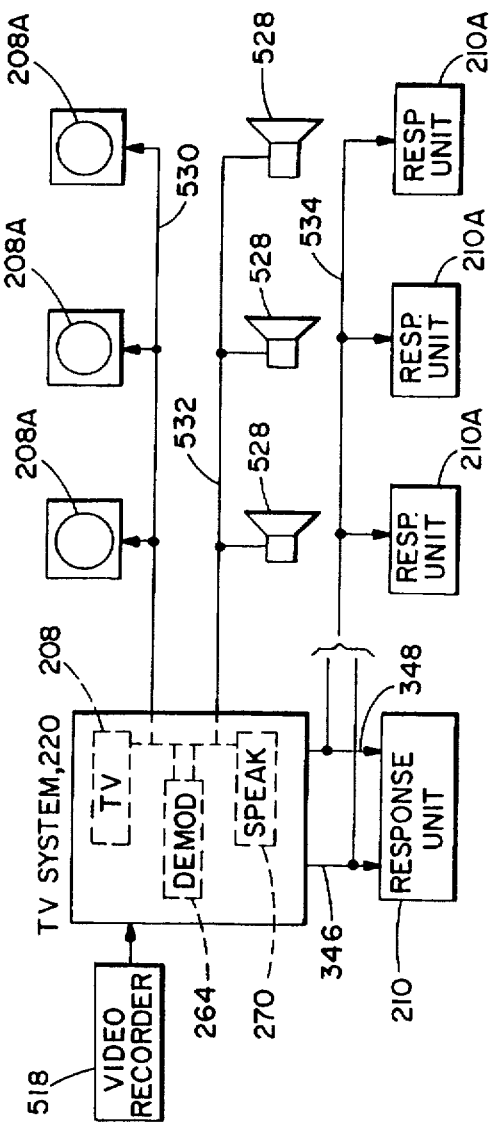
FIG. 12 is a block diagram showing interconnection of electric components of the system of the invention for the installation of FIG. 11, the system of FIG. 12 employing response units having components disclosed in FIG. 8.
Figure 13:
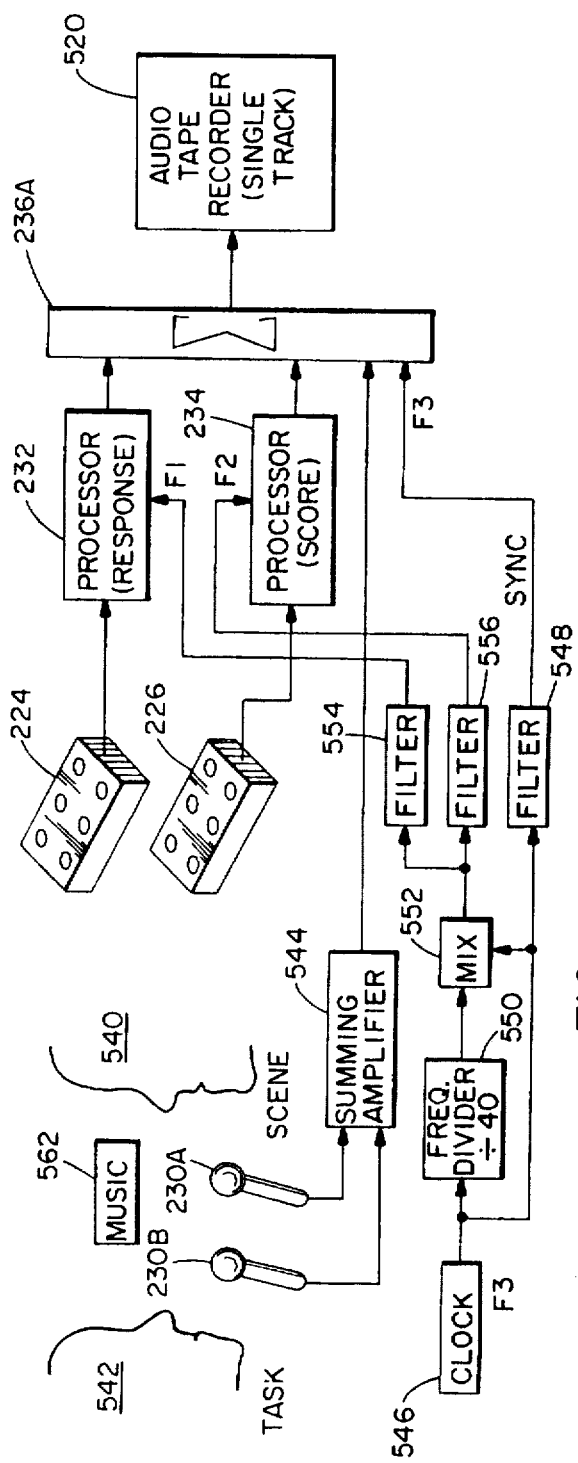
FIG. 13 is a block diagram showing a modification of the central station of FIG. 6 to provide for an audio-only recording of the game program for use by the receiving stations of FIG. 11.
Figure 14:
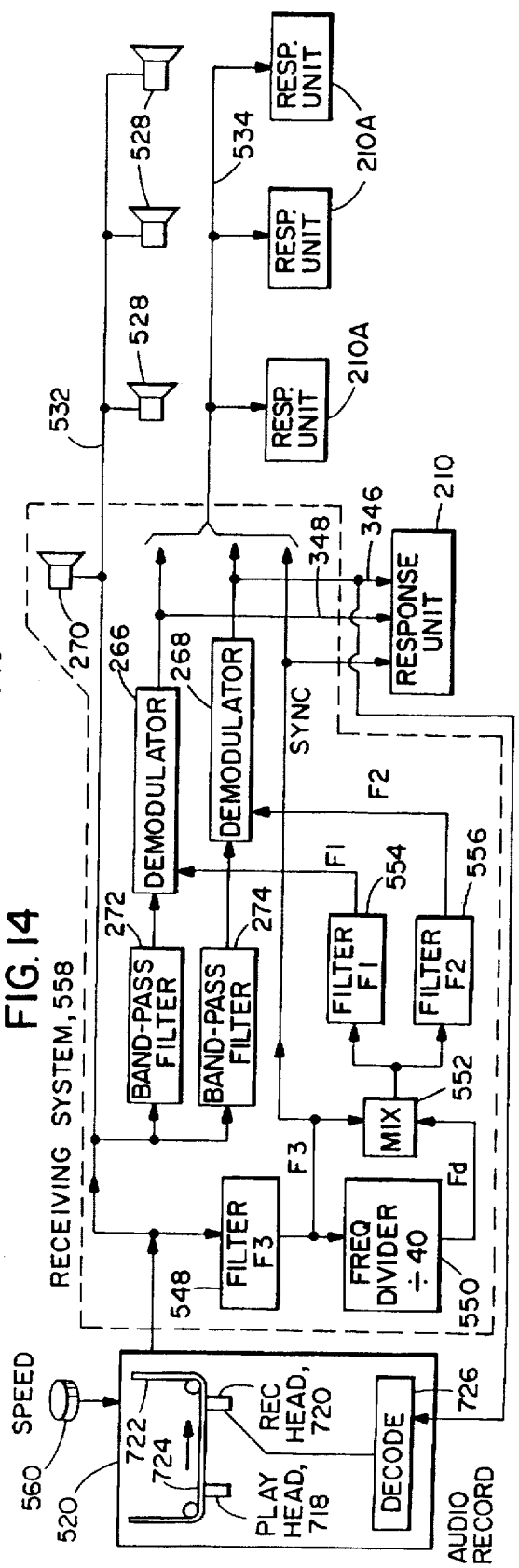
FIG. 14 is an alternative embodiment of FIG. 12 for use of an audio recorder, the system of FIG. 14 employing a recording provided by the system of FIG. 13, the system of FIG. 14 employing response units having components disclosed in FIG. 8.
Figure 15:
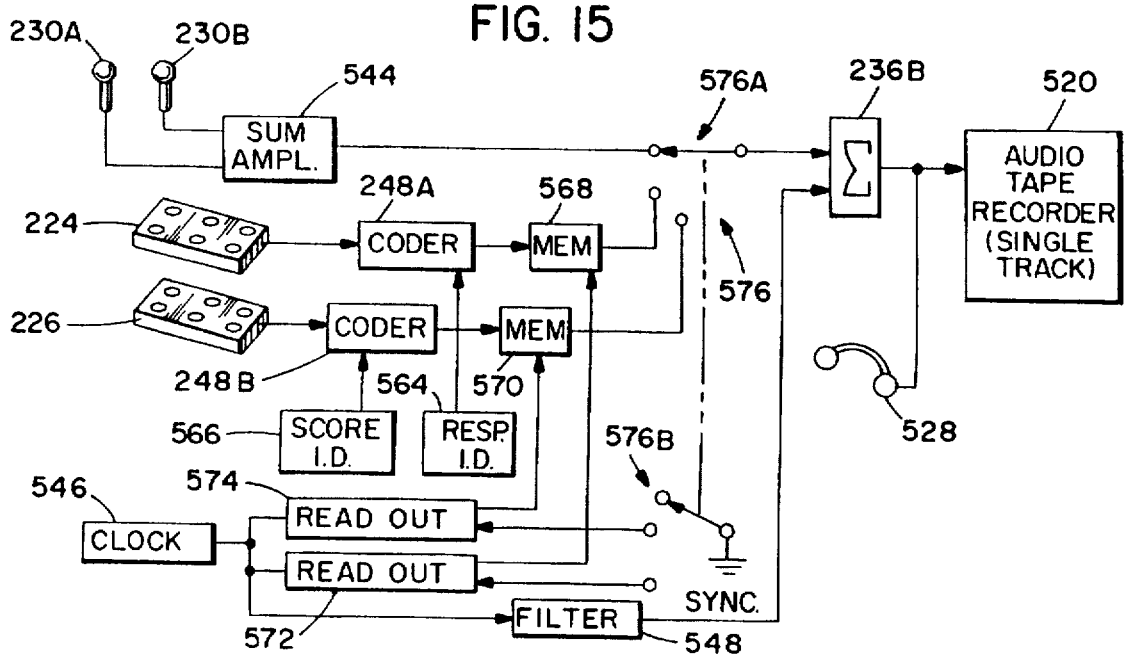
FIGS. 15 and 16 show a modification of the systems of FIGS. 13 and 14, respectively, wherein the central station and the response units of the receiving stations have been modified to be operative with response-criteria and scoring signals transmitted as unintelligible audio signals in the same audio band employed by the recorded audio description of a task-setting program and the audio instructions for response to the task.
Figure 16:
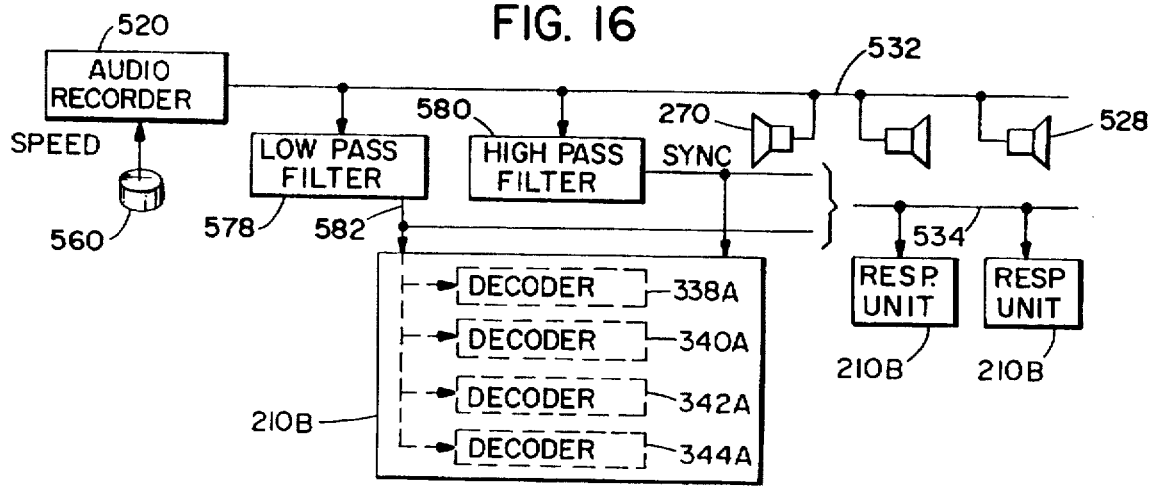
Figure 17:
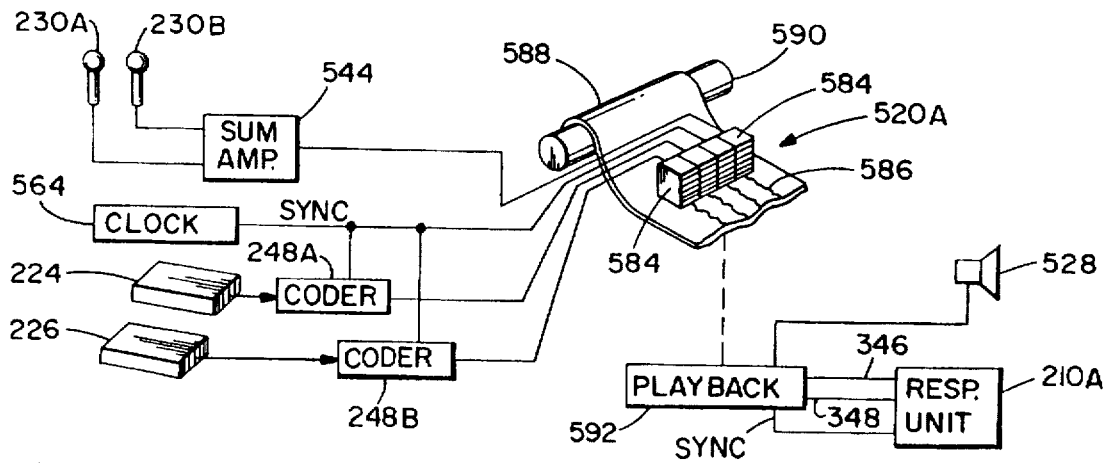
FIG. 17 is a simplified diagrammatic view of the invention showing both the central station and a receiving station in which an audio recorder having four separate channels is employed, the channels communicating audio signals for task and instructions, for synchronization, for response criteria, and for scoring criteria.
Figure 21:
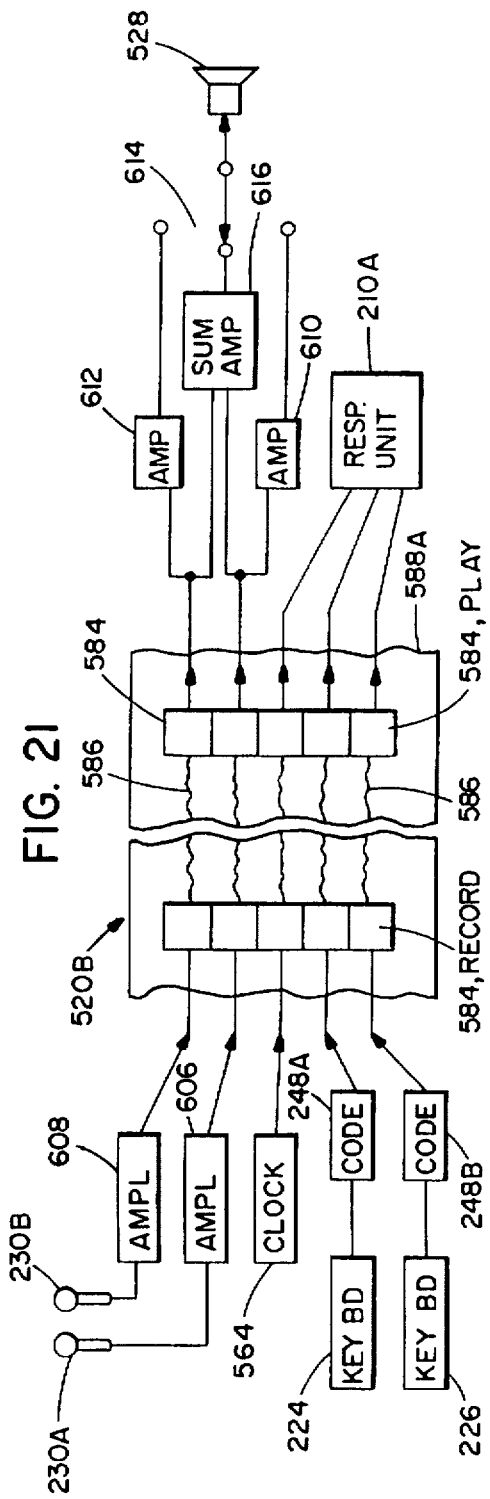
FIG. 21 shows schematically an alternative embodiment of the invention wherein the tape recorder is provided with five channels to allow separate and independent recordation of a verbal description of a scene and verbal instructions for responding to tasks presented in the scene.

In the ensuing description, FIG. 11 shows the use of a prerecorded edition of a program performed in a studio as disclosed above in FIGS. 1, 3, 6 or 7. The receiving stations of FIG. 11 are equipped for a video playback or an audio-only playback. FIG. 12 shows a system employing equipment, previously described in FIGS. 6 and 8, by way of example, to provide a video playback to the receiving stations of FIG. 11. In FIGS. 13 and 14, there is disclosed an alternate system for providing an audio-only playback to the receiving stations of FIG. 11, the system of FIGS. 13 and 14 also employing the equipment previously disclosed in FIGS. 6 and 8, but including further the addition of a fixed-frequency tone, $F_3$, for use as a synchronization signal and which is located in the upper end of the audio spectrum along with the frequencies $F_1$ and $F_2$ previously disclosed in FIG. 10. FIGS. 15, 16 and 19 show a further modification of the audio-only system wherein the scoring and response criteria signals of FIGS. 6 and 8 are transmitted as unintelligible burst code signals between intelligible voice signals, rather than by modulation of the scoring and response criteria signals on a set of carrier frequencies as disclosed in FIG. 10. FIGS. 17, 20 and 21 show a further modification of the audio-only system wherein voice signals, a synchronization signal, and the scoring and response criteria signals may be transmitted simultaneously on separate tracks of a recording medium. With either the video or audio-only recording and playback, it may be desirable to employ a central dispenser of hard copy of respondents' answers as at a central console disclosed in FIG. 11; a system for connecting individual response units to the central dispenser being disclosed in FIG. 18. The systems of FIGS. 11-20 will now be described in further detail.

With reference to FIG. 11, there is shown an aircraft cabin 500 provided with receiving stations 502 and a central console 504. While numerous receiving stations 502 may be present in the cabin 500, three such stations are shown by way of example. FIG. 11 also shows a floor 506 and a vertical partition 508 of the cabin 500. Each receiving station 502 comprises a seat 510 supported by legs 512 upon the floor 506. The partition 508 separates the console 504 from the stations 502.

The console 504 includes the television system 220 and viewing screen 208, described above with reference to FIG. 6, and the dispenser 360 described above with reference to FIG. 8. Included with the dispenser 360 is electrical circuitry 514 which includes a digital communication system 516 (FIGS. 11 and 18) which connects the dispenser 360 to the receiving stations 502. The screen 208 permits an aircraft attendant to monitor the program being played back for passengers sitting in each of the receiving stations 502. The program is recorded initially by a video cassette recorder 518 (including a playback capacity), also shown in FIGS. 3 and 6, connected at an input to the television system 28 or the television system 220 for providing video recordings of the program produced at the central station 12 (FIG. 3) or the central station 202 (FIG. 6). If desired, the recorder 518 may be connected to an output of the central station 12 or 202. Alternatively, the recorder 518 can be formed in a more simple fashion without the need for demodulation and modulation circuitry if the recorder is to be connected to the output terminal of the combiner 70 (FIG. 3) or the combiner 238 (FIG. 6). With the alternative form of recorder, playback is accomplished by connecting output terminals of the recorder directly to the television station 208 and to the speaker 270 in FIG. 6.

In the case of an audio-only recording, an audio recorder 520, which includes a playback capacity, would be connected to the output terminal of a summer 236A as will be described with reference to FIG. 13. Either the recorder 518 or the recorder 520 is to be employed with the console 504 in FIG. 11, depending on whether a video or audio-only recorder is to be employed. By way of example, the video recorder 518 is shown in FIG. 11 connected by an input cable 502 to an input terminal of the television system 220. Knobs 524 are provided on the console 504 for operation of the television system 220 and for selection of operating functions of the dispenser 360.

Each receiving station 502 further comprises a television screen 208A which is mounted upon the back of a seat 510, or on the partition 508, for viewing by a passenger sitting in a seat 510. The screens 208A function in the same fashion as does the screen 208. The mounting of a screen 208A to the back of a seat 510 may be accomplished by means of a swivel mount 526 which enables the screen 208A to be swung to a stowage position conveniently located away from a passenger. The screen 208A is employed only for the video playback, and is not needed for an audio-only playback. Also included within each receiving station 502 is a dispenser 210A which employs components previously disclosed in the description of the response unit 210 of FIG. 6, and may be modified as will be described hereinafter to facilitate its use in a receiving station 502. Also provided in each of the receiving stations 502 is a set of earphones 528 by which a passenger listens to the audio portion of the program produced at the central station 12 (FIG. 3) or 202 (FIG. 6).

The earphones 528 are connected to the TV system 220, in the case of a video playback, in the same manner as is the speaker 270 (FIG. 6) or, connected to the TV system 28 (FIG. 3) as is the speaker 86. This interconnection will be described in further detail in FIG. 12. The TV screens 208A are connected electrically via coaxial cable 530 to the TV system 220. Connection of the console 504 to the earphones 528 is made by an electrical line 532, the line 532 being connected via an armrest of a seat 510 to the corresponding earphone 528. Signals for activating the response unit 210A in each of the stations 502 is provided by an electric line 534 which connects with the console 504, connection of the line 534 being made by way of the armrest of a seat 510 to the respective response unit 210A. Both the earphones 528 and the response unit 210A are connected via flexible lines 536 and 538, respectively, to an armrest of a seat 510. The line 538 is an electric line, while the line 536 may be either an electric line or an acoustically conducting tube, connected by a transducer of electric to sonic signals in the armrest, as is frequently employed in passenger aircraft.

The connections of the screens 208A, the earphones 528 and the response unit 210A to the T.V. system 220 of the console 504 are disclosed further in FIG. 12. Therein, it is seen that each of the earphones 528A is connected in parallel to the speaker 270 so that a passenger can hear in the same fashion as was disclosed for a respondent in the description of FIGS. 3 and 6. Similarly, the screens 208A are connected in parallel with the screen 208 to enable a passenger to view a televised program in the same fashion as was described for a respondent with reference to FIGS. 3 and 6.

Each of the response units 210A is connected via the two lines 346 and 348 to the TV system 220 in the same fashion as was disclosed for connection of the response unit 210 to the television system 220. In this way, in the viewing of the program, the listening to the host of a program, and the entering of responses is accomplished in the cabin 500 in the same fashion as was disclosed for respondents at the remote receiving stations disclosed hereinafter with reference to FIGS. 3 and 6. The connection of the video recorder 518, during playback, is the same as was disclosed with reference to FIGS. 3 and 6 during a recording mode. FIG. 12 also shows that a response unit 210 may be connected, if desired, to the TV system 220 in the console 504 to enable the attendant to practice responses along with passengers who are playing TV games. Alternatively, if desired, the response unit 210 may be deleted from the central console 504. It is noted also that the screens 208 and 208A and the interconnecting cable 530 would not be employed in the case of an audio-only playback of the program of the central station 202 (FIG. 6).

By way of alternative embodiment, it is noted that recording/playback apparatus, such as the recorder 518 could be combined with a response unit 210A in the manner of a small, portable unitary structure to allow a person to play a game or other subject matter privately at a location of convenience. A similar, but larger, unitary structure is provided, as discussed above, in the connection of the response unit 210 to the TV system 220 in the console 504 for enabling the attendant to practice responses along with passengers who are playing TV games.

In a typical embodiment of the invention, a video tape is employed to display a map of the general area over which a plane is flying. An accompanying audio message provides questions to passengers wishing to participate, the questions pertaining to the geography, topography, demography, history, industry, resorts, sports and any other aspect of the region. It is an advantage of this method that the ground does not have to be visible to passengers, who will see the ground by video-tape presentation. Such programs can be sponsored by groups interested in promoting one or another aspect of natural or man-made resources of the area, such as Chambers of Commerce, historical societies, resorts, airlines, commercial sponsors, tourist offices of states and the like. A plurality of audio tapes pertaining to the same map, but containing different questions, may be prepared and used alternatively. Other variations and combinations may be devised.

In the foregoing embodiment, the video or audio tape serves as the recording medium upon which the program, tasks to be performed, appropriate answers against which responses are to be gauged, and scoring criteria are stored. However, in the practice of the invention, it is contemplated that other forms of data storage may become available to serve as the storage medium, such as optical discs and electronic circuitry such as a read-only memory.

According to another embodiment, each passenger is given a printed topographic map, which may or may not be of the region over which a plane flies or through which a mass transportation vehicle is traveling. Audio questions pertaining to the names or any other features not shown on the map have been prepared and stored on alternative tapes. The audio questions are received through headsets. Travelers responses can be marked on the maps, which can be evaluated and scored as described in the context of educational tests. Alternatively, contestants may enter their answers on a keypad, and the individual answers are evaluated and scored as described hereinabove. The methods described can easily be adapted for use in a variety of public locations, such as hotel rooms, restaurants, game arcades, auditoriums, trains, buses, and airplanes.

With reference to FIGS. 13 and 14, there is shown a modification of the central station 202 (FIG. 6) and the interconnection with the response unit 210 (FIGS. 6 and 8) which enable the response unit 210 to operate with an audio-only recording of the program provided in the studio of the central station 202. The single host 212 of FIG. 6 is replaced in FIG. 13 with an announcer 540 and an instructor 542. The announcer 540 provides a verbal description of a scene in the studio, such as a description of the specimen 214 (FIG. 6) by speaking into a microphone 230A. This verbal description takes the place of the televised picture provided by the camera 228 (FIG. 6). The instructor 542 (FIG. 13) explains the task and instructions for responding to the studio situation by speaking into a microphone 230B. It may be advisable, in order to facilitate response by respondents in the aircraft cabin 500 (FIG. 11) to employ both male and female voices at the microphones 230A-B so that a respondent can more readily distinguish between a description of the scene and an instructional message. For example, the instructor 542 may be a male and the announcer 540 may be a female. Electric signals outputted by the microphones 230A-B are combined together in a summing amplifier 544 and applied to an input terminal of a summer 236A which functions in the same manner as the summer 236 of FIG. 6. Also included in the system of FIG. 13 are the keyboards 224 and 226 of FIG. 6, as well as the signal processors 232 and 234 of FIG. 6. In FIG. 13, an output terminal of the summer 236A connects with an input terminal of the audio tape recorder 520 for recording the verbal messages of the announcer 540 and the instructor 542. The tape recorder 520, in this embodiment of the invention, may employ a recording medium having only a single recording track.

In the central station 202 of FIG. 6, oscillators 242 and 244 were employed to provide reference signals at frequencies $F_1$ and $F_2$ for operation of modulators 252 of the signal processors 232 and 234. Additional oscillators 236 and 278 were employed in the TV system 220 (FIG. 6) to provide the corresponding reference signals for demodulation of the response and scoring criteria signal. However, in the audio-only system of FIGS. 13 and 14 wherein the playback speed of the tape recorder 520 may vary during playback from the speed employed during recording, it is desirable to synthesize the reference signals at the frequencies $F_1$ and $F_2$ from a single reference signal recorded on the recording medium. Thereby, demodulation is accomplished accurately independently of playback speed. The single reference signal which serves to synchronize the playback and recording functions is provided by a clock 546 (FIG. 13) and a filter 548. The clock 546 outputs a periodic train of rectangular clock pulses, which clock pulse train is filtered by the filter 548 to transform the pulse train into a sinusoidal waveform at the pulse repetition frequency of the pulse train. This frequency is designated $F_3$ in the drawing.

The system of FIG. 13 further comprises frequency divider 550, a mixer 552, and two filters 554 and 556. The frequency divider 550, which may include a pulse counter (not shown), operates in a well-known fashion to output a pulse train at a lower frequency, designated $F_d$. The signals at the frequencies $F_3$ and $F_d$ are applied to input terminals of the mixer 552 to output signals at the sum and difference frequencies, these signals being captured by the filters 554 and 556 to provide the reference signals at the frequencies $F_1$ and $F_2$. The frequency $F_d$ is equal to the difference of frequency between the frequency $F_3$ and either of the frequencies $F_1$ and $F_2$. The signals at the frequencies $F_1$ and $F_2$ are applied to the processors 232 and 234 which operate in cooperation with the keyboards 224 and 226 to output coded modulated signals to the summer 236A in the same fashion as has been described earlier with reference to FIG. 6. The synchronization signal at frequency $F_3$ is also applied to an input terminal of the summer 236A. These signals are summed together along with the signals of the microphones 230A–B to provide a composite signal which is outputted by the summer 236A and recorded on a recording medium of the recorder 520.

In FIG. 14, a receiving system 558 interconnects a response unit 210 with an output terminal of the audio recorder 520. The receiving system 558 of FIG. 14 takes the place of the TV system of FIG. 6 in providing an interconnection between the response unit 210 and a televised signal received at either the antenna 282 or from the video recorder 518. In FIG. 14, the receiving system 558 employs the synchronization signal at frequency $F_3$ to regenerate the reference signals at frequencies $F_1$ and $F_2$ for use by the demodulators 266 and 268. Both the receiving system 558 and the TV system 220 include the band-pass filters 272 and 274 and the demodulators 266 and 268 which function in the same manner in both the TV system 220 and the receiving system 558. In FIG. 14, the receiving system 558 further comprises the filters 548, 554, and 556, the frequency divider 550 and the mixer 552, all of which have been described previously with reference to FIG. 13. Also included in the receiving system 558 is the speaker 270 which has been described previously with reference to the TV system 220 of FIG. 6.

In operation, an output signal of the recorder 520 is applied simultaneously to the filter 548, to the filters 272 and 274 and to the speaker 270. The filter 548 extracts the synchronization signal at the frequency $F_3$ from the composite signal outputted by the recorder 520. The filters 272 and 274 extract the spectral bands of the response and scoring criteria signals, respectively for applying the signals to the demodulators 266 and 268, respectively. An output signal of the filter 548 is applied as the synchronization signal for operation of the response unit 210, and is also applied to the frequency divider 550 and the mixer 552. The frequency divider 550 operates to provide the lower frequency $F_d$ to the mixer 552 which outputs sum and difference frequencies to the filters 554 and 556 to attain the reference signals at frequencies $F_1$ and $F_2$. By way of example, in the construction of the frequency divider 550, a division ratio of 40 may be employed such that, by way of example, if the frequency $F_3$ has a value of 20,000 Hz, then $F_d$ has a value of 500 Hz and the frequencies $F_1$ and $F_2$ are separated by 1,000 Hz. The division ratio of 40 is given only by way of example, it being understood that other ratios may be selected in accordance with desired spectral bandwidth and separation of the response and scoring criteria signals. The reference signals at the frequencies $F_1$ and $F_2$ are employed by the demodulators 266 and 268 in the same manner as was described with reference to FIG. 6 for outputting the response and storing criteria signals on lines 346 and 348, respectively, to the response unit 210. The response unit 210 and the speaker 270 may be located in the console 504 of the aircraft cabin 500 (FIG. 11) if desired for convenience of an aircraft attendant, but need not be provided in the console 504 insofar as the practice of the invention is required. For simplicity, the response unit 210 and the speaker 270 have been omitted from the console 504 in FIG. 11. In FIG. 14, output signals of the receiving system 558 are provided along lines 532 and 534 respectively to the earphones 528 and response units 210A at the receiving stations 502 of the cabin 500. The audio recorder 520 may be provided with a speed control knob 560 so as to match the playback speed to the recording speed for accurate reception of the voice signals from the speaker 270.

During playback of the game program of the aircraft cabin 500, the announcer 540 provides a detailed description of the scene in the studio. The instructor 542 asks the questions and sets an interval of time for response. During the response interval, neither the instructor 542 or the announcer 540 are speaking. Thus, there would be the absence of any sound during the response interval, which situation might possibly confuse a respondent as to whether or not his earphones were still operative. Accordingly, it may be desirable to play softly background music from a music source 562, such as a tape recorder, the music being received by the microphones 230A and 230B for transmission to the respondents. Either the announcer 540 or the instructor 542 may operate the keyboard 224 and 226.

In FIG. 6, a telephone circuit 280, as has been described previously, serves as a means for interaction between a respondent and personnel at the central station 202. Also, in the case of FIG. 11 with the recorded playback in the aircraft cabin 500, a form of interaction is possible. Such interaction is attained by a respondent commenting to a flight attendant that the questions are too hard, or that the response intervals are too short, or that further description of the specimen 214 (FIG. 6) is required. The flight attendant then responds by replaying a portion of the recorded program to provide the additional description, or alternatively, advances to another portion of the recording medium to provide for simpler questions. As a further alternative, the flight attendant may insert another audio tape cassette into the recorder 520 to provide a further version of a recorded program in which longer response intervals have been provided, or wherein other forms of questions have been provided.

FIGS. 15 and 16 show an embodiment of the system wherein encoded response and scoring-criteria signals are transmitted as rapid bursts of sound, which are unintelligible to a respondent. The burst of sound is transmitted between intervals of speaking by the announcer 540 and the instructor 542. A time sequence demonstrating the transmission of such response and scoring criteria between spoken messages of the announcer 540 and the instructor 542 is presented in the timing diagram of FIG. 19. The system of FIG. 15 includes the two microphones 230A and 230B, the summing amplifier 544 and the keyboards 224 and 226 which have been described with reference to FIG. 13. Output signals of the keyboard 224 and 226 are applied respectively to encoders 248A and 248B which function in the manner described for the encoder 248 of FIG. 6. The encoders 248A and 248B also incorporate identifying signals for digital words to distinguish between response criteria of the keyboard 224 and the scoring criteria of the keyboard 226. The identifying digital words are attained from digital signal sources 564 and 566, respectively. Output signals of the encoders 248A–B are applied to memories 568 and 570, respectively.

The system of FIG. 15 also includes the clock 546 and the filter 548 which function in the manner previously described with reference to FIG. 13. Two read-out circuits 572 and 574 connect between an output terminal of the clock 546 and input terminals respectively of the memories 568 and 570. The memories 568 and 570 may be constructed as shift registers or random-access memories. Each of the read-out circuits 572 and 574 is responsive to clock pulses of the clock 546 for reading out data store in respective ones of the memories 568 and 570 at a rapid rate, for example, 1200 bytes per second wherein each byte is composed of eight bits in a well-known fashion as is commonly employed by modems in the transmission of computer signals over telephone lines. Such digital signals are clearly audible but unintelligible to a person listening to a telephone line carrying the signals. Answers to questions can be given in a relatively few seconds, the transmission of which may be divided up among several bursts each of which is less than one second duration. Similarly, scoring criteria can be transmitted via a relatively few number of short-duration bursts of the coded signals.

The bursts of data transmitted from the memories 568 and 570 are coupled via a section 576A of a switch 576 to a summer 236B which functions in the same manner as the summer 236 in FIG. 6. Switch section 576A is operative to select alternatively output voice signals of the summing amplifier 544, output data of the memory 568 or output data of the memory 570. A second section of the switch 576, namely section 576B, is ganged to the section 576A to be operative therewith for activating one of the readout circuits 572 and 574. Activation of a readout circuit 572 or 574 is accomplished by grounding a control terminal of the readout circuit by the switch section 576B. The switch 576 is operated either by the instructor 542 or the announcer 540 when either one of them pauses in speaking. An earphone 528 connected to an output terminal of the summer 236B enables the instructor 542 or the announcer 540 to hear the burst code sound so as to operate the switch 576 upon completion of a data burst. The synchronization signal outputted by the filter 548 is also applied to an input terminal of the summer 236B. The output signal of the summer 236B is applied to the audio recorder 520 for a recording of the audio addition of the program.

FIG. 16 shows interconnection of an output signal of the audio recorder 520 with a response unit 210B which is a modification of the unit 210 adapted for receiving the response and scoring-criteria signal within a common spectral portion of the audio band. Also included within the system of FIG. 16 are a low-pass filter 578 and a high-pass filter 580. The two filters 578 and 580 separate the relatively high frequency synchronization signal from the data-burst signal outputted by the memories 568 and 570. The data-burst signal is coupled via the low-pass filter 578 to the response unit 210B. The input circuitry of the response unit 210B is similar to that of the response unit 210 of FIG. 8 in that four decoders are employed. However, in FIG. 8, the four decoders connect with data on two input signal lines 346 and 348 while, in the case of the system of FIG. 16, all of the decoders are coupled to a single input data line 582. In the response unit 210B, the four input decoders 338A, 340A, 342A, and 344A operate in the same fashion as the corresponding decoders 338, 340, 342, and 344 of FIG. 8; however, the decoders 338A, 340A, 342A, and 344A of FIG. 16 also are responsive to the identifying words obtained from the digital source 564 and 566, (FIG. 15) to identify signals as being response or scoring-criteria signals. Data signals outputted by the low-pass filter 578 and the synchronization signals outputted by the high-pass filter 580 are applied via line 534 to the response unit 210B in the same fashion as has been described earlier with respect to the response units 210A of FIGS. 12 and 14. Audio signals outputted on line 532 from the recorder 520 are applied to the earphones 528 in the same fashion as has been described above in FIGS. 12 and 14.

Synchronization of the response units 210, 210A and 210B are accomplished, as shown in FIG. 8, by applying synchronization signals to an input terminal of the clock 352. In the absence of the synchronization signal, the clock 352 is a free-running clock. However, in the presence of the synchronization signal, an output pulse train of clock pulses of the clock 352 is generated in synchronism with the synchronization pulse. FIG. 17 shows the use of an audio tape recorder 520A having a recording tape medium with a plurality of recording tracks thereon. The stylized representation of the recorder 520A includes four recording/playback heads 584 connected respectively to upper terminals of the summing amplifier 544, the clock 564, the encoder 248A, and the encoder 248B which have been described above with reference to FIG. 15. Each of the heads 584 is located above a corresponding recording track 586 in a tape recording medium 588. The medium 588 is rolled upon a roll 590 driven by a transport (not shown) for passing the medium 588 beneath the heads 584. Playback circuitry 592 connects with the heads 584 and to the transport for operating the recorder 520A to play back recorded signals.

The signals played back are outputted by the circuitry 592 to the earphones 528 (one of which is shown in FIG. 17), and via lines 346 and 348 and the synchronization signal line to the response units 210A (one of which is shown in FIG. 17). Herein, the response-criteria signal and the scoring-criteria signal have been recorded on separate tracks so as to be coupled via lines 346 and 348 to the response unit 210A. Similarly, separate tracks are employed for the synchronization signal and the voice signals. The use of the four separate tracks 586 permits the voice signals outputted by the amplifier 544, the synchronization signal of the clock 564, the response criteria signal outputted by the encoder 248A, and the scoring criteria signal outputted by the encoder 248B to be transmitted during time intervals which are independent of each other, including a combination of both serial and concurrent transmissions. This is demonstrated in the timing diagram of FIG. 20 in which the synchronization signal at the second trace of the graph is shown to be continuously present while the response and scoring criteria signals, respectively in the third and fourth traces of the graph, overlap the transmission of the verbal description of the scene and the instructions.

Figure 18:
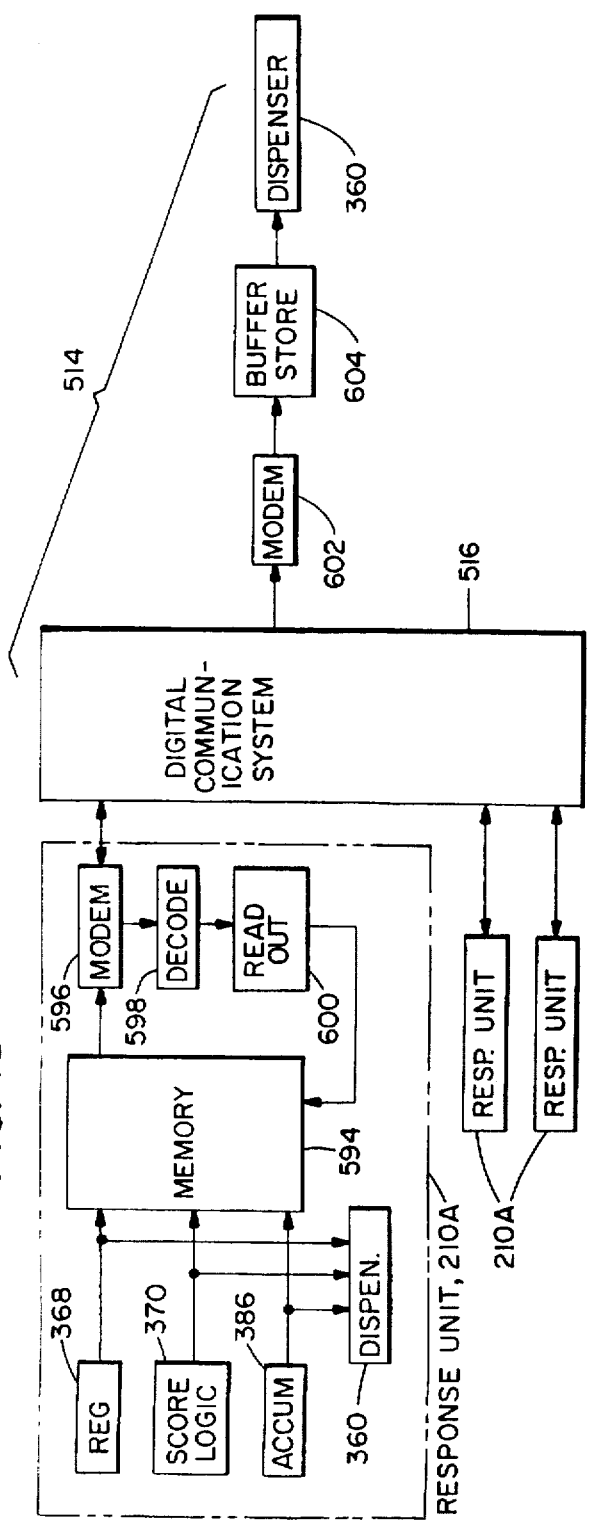
FIG. 18 shows additional equipment which may be incorporated in the response units of FIGS. 11, 12, 14, and 16 for communication of scoring results by a digital communication system to a central dispenser for a hard-copy output of game results.

FIG. 18 shows circuitry of the response unit 210A which permits the response unit to communicate via the digital communication system 516. The response unit 510A has the same components as the response unit 210 and operates in the same fashion as the response unit 210, except for the inclusion of the additional circuitry of FIG. 18. The additional circuitry of FIG. 18 may also be included within the response unit 210B. Comparison of FIGS. 8 and 18 show that the dispenser 360 receives input signals from the register 368, the scoring logic unit 370, and the accumulator 386. The additional circuitry comprises a memory 594, a modem 596, a decoder 598, and read-out circuitry 600.

In operation, the memory 594 stores the signals of the registers 598, the scoring logic unit 370, and the accumulator 386. The stored signals are subsequently read out, upon command of the read-out circuitry 600 to the modem 596 which converts the signals into a form suitable for transmission via the communication system 516. The modem 596 operates in both directions, namely, to transmit signals from the memory 594 into the communication system 516, and to direct command signals from the communication system 516 to the decoder 598. By command of the communication system 516, the decoder 598 identifies the command as applying to the response unit 210A at a particular seat 510 of the cabin 500 (FIG. 11), and then directs the read-out circuitry 600 to initiate a reading out of the stored data from the memory 594 via the modem 596 into the communication system 516.

Also included in the circuitry of FIG. 18 is a modem 602 and a buffer store 604 which comprise a part of the circuitry 514 of the console 504 (FIG. 11). Signals traveling from response units 210A of the receiving stations 502 via the communication system 516 are applied to the modem 602 which reforms the signal into a form suitable for storage in the store 604, after which the signals are applied to the dispenser 360 in the console 504. The buffer store 604 allows the signals received from remote response units 210A to be stored until the dispenser 360 is available for printing hard copy of the results of responses entered into the respective response units 210A at the receiving stations 502. Also, the buffer store 604 allows the signals received from the remote response units 210A to be outputted to the dispenser 360 at a rate commensurate with the operational characteristics of the dispenser 360, which rate may be different from a rate at which signals are communicated via the communication system 516.

Thereby, the circuitry 514 including the digital communication system 516 enables a common central dispenser 360 at the console 504 to be employed for printing out a hard copy of the responses produced at the various receiving stations 502. By use of the central dispenser 360 at the console 504, the apparatus of the response unit 210A at each of the receiving stations 502 may be simplified by deletion of their respective dispensers 360. The deletion of the dispensers 360 from the individual receiving stations 502 simplifies the complexity and physical size of each response unit 210A, and may also reduce the cost of the installation, particularly in aircraft having many receiving stations 502.

A further advantage of the embodiments of the invention employing a prerecorded program is that various versions and formats of the program may be recorded. Thus, a recording with difficult-to-answer questions and a recording with easy-to-answer questions can be prepared. Questions involving a prior knowledge of history, economics, sports or other subject matter can be prepared on the same or separate records. Thereby, the flight attendant has the capacity, in essence, to reformat questions and instructions, as well as the subject matter being described, in response to preferences stated by respondents at the receiving stations. The reformatting of the program, instructional signals, and/or response and storing criteria are accomplished simply by fast-forwarding the recording tape to a further position, or by replacing the recording tape with another tape. The system of the invention may be installed in schools and hotels, as well as in homes.

An aspect of the invention combines the eliciting of an answer with the eliciting of a prediction. An example would be a sports event which has taken place a relatively long time prior to such a broadcast, say the U.S. Open Golf Championship held 10 years prior to the broadcast. A film of the tournament is shown and the prediction/response solicited pertains to the number of strokes taken by the eventual winner of the Championship on the third, par three hole, by way of example. This method permits a person with a good memory to recall the outcome of the event, i.e. responding to a question, the answer to which is known. But at the same time, the method permits a person not having observed the Championship, but having a knowledge of the game and the players, to make an educated guess or prediction.

FIG. 21 shows an audio recorder 520B which is an alternative embodiment to the recorder 520A on FIG. 17. The recorder 520B includes a recording medium 588A having five tracks 586 as distinguished from the four tracks 586 on the medium 588 in FIG. 17. FIG. 21 has many of the components present in FIG. 17, namely, the two microphones 230A and 230B, the clock 564, the keyboards 224 and 226, the encoders 248A and 248B, the earphones 528 and the response unit 210A. In FIG. 21, a set of five heads 584 are employed for recording electric signals on the five tracks 586. A second set of heads 584 are provided for playback of the signals recorded on the track 586. The same or a different set of the heads 584 may be employed for recording and playback as may be convenient in the construction of the audio recorder 520B. The two microphones 230A and 230B are connected by amplifiers 606 and 608 to the respective heads 584 for recording signals of the microphones 230A-B. Another two amplifiers 610 and 612 are connected to the corresponding playback 584 for coupling recorded signals of the microphones 230A and 230B, respectively, via a switch 614 to an earphone 528. Also provided is a summing amplifier 616 which sums together the signals of the microphones 230A-B, as outputted from the recorder 520B, and applies the sum signal via the switch 614 to the earphone 528.

The switch 614 provides a respondent at the receiving station 502 with the option of listening to either the description of the scene as provided by the announcer 540 (FIG. 13) at the microphone 230A, or the instructions for responding to the task as set forth by the instructor 542 at the microphone 230B, or to a composite of the two speeches of the announcer 540 and the instructor 542. The embodiment of FIG. 21 allows statements by the announcer and the instructor to be made independently of each other such that these statements may be made serially or concurrently. In addition, the respondent has the option of listening to either one of these statements independently.

It should be noted also, that while FIG. 11 demonstrates the use of only a single recorder for all of the respondents, in the case of the audio recorder, it is possible to provide a separate audio recorder for each respondent whereby each respondent can play back those portions of the recording requiring further attention. In such case, connection will be provided as shown in FIG. 21 wherein each recorder is outputted to a single earphone and a single response unit rather than to a set of earphones connected in parallel and a set of response units connected in parallel.

Figure 22:
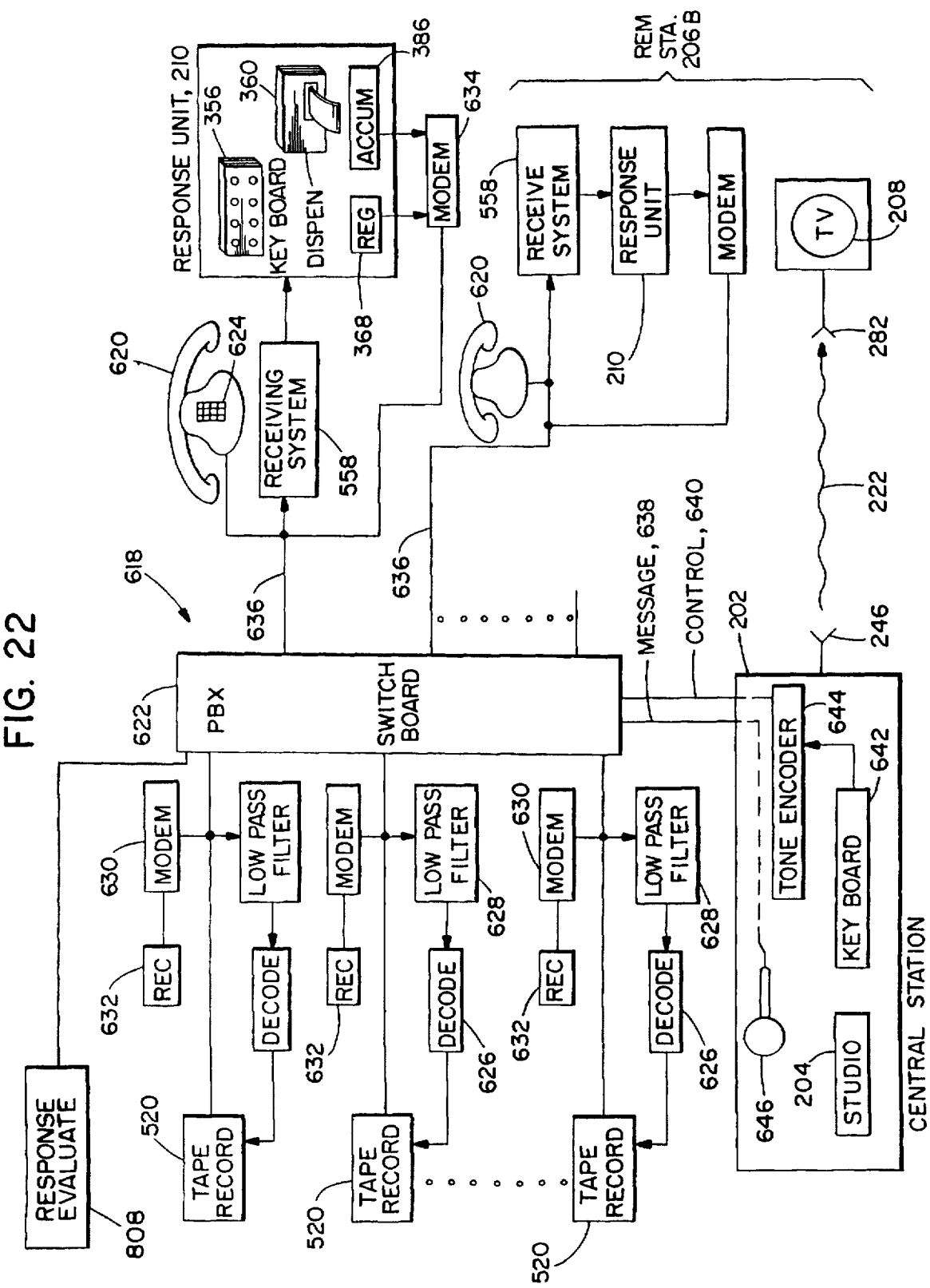
FIG. 22 shows diagrammatically a further embodiment of the invention wherein a respondent can activate a prerecorded program by use of a telephone, the prerecorded program including a task, questions, instructions for responding, response criteria, and signals enabling automatic comparing of answers to predetermined responses and a scoring of responses by a response unit.

FIG. 22 shows a further embodiment of the invention employing recording apparatus, such as the recorder 520 of FIGS. 13-15, for prerecorded tasks and instructional signals. This embodiment employs a call-up system 618 wherein a person, or contestant, wishing to play a game or be involved with an educational experience, by way of example, simply employs a telephone 620, preferably a push-button telephone, to call a number, such as a so-called 900 number employed by telephone companies in the United States (public telephone service wherein the caller is automatically billed for the call plus other charges relating to the nature of the service being provided by the called party for the caller). After connection is made via a private switchboard 622, the contestant activates buttons 624 on the telephone to start the tape recorder 520, stop, rewind and fast forward the tape recorder 520. Also included within the system 618 is the receiving system 558 previously described with reference to FIG. 14, and the response unit 210 of FIG. 8. Outputted signals from the tape recorder 520 are received by the system 558 and applied to the response unit 210.

The recording is based on the system described in FIGS. 13 and 14 wherein all control signals (instructional signals) for the response unit 210 are transmitted in the upper spectral portion of the audio band, this being above the spectrum of the tone signals generated by the telephone. Therefore, both types of signals, the tone and the instructional signals, can coexist at the same time without interfering with each other. Each channel of the switchboard 622 includes, in addition to the recorder 520, a decoder 626, a low pass filter 628, a modem 630 and a receiver 632. In each channel, the low-pass filter 628 protects the decoder 626 from the instructional signals, and allows only the tone signals to reach the decoder 626. The decoder 626 translates the tone signals into digital command signals to activate the recorder 520 for responding to commands from the telephone push buttons 624 in a manner similar to the operation of an automatic telephone message recorder.

A private home or other location of a contestant may serve as a remote station which includes a telephone 620, a response unit 210, and a receiving system 558 as described above. Also included is a modem 634 for connecting the response unit 210 to a telephone line 636 which interconnects the telephone 620, as well as the modem 634 to the switchboard 622.

The system 618 of FIG. 22 operates in a manner analogous to the operation of the airborne system of FIG. 11 except for the primary difference that, instead of relying on the aid of a flight attendant to set up and activate the equipment, the system 618 of FIG. 22 allows a caller who wishes to be a contestant to activate a playback of tape recorder/playback apparatus by simply placing a telephone call. Thereupon, the caller hears the task setting message, and may operate buttons on the telephone to replay any portion of the message which he may have not thoroughly understood. Once a question has been asked along with the transmission of a timing signal to the response unit 210 indicating the start of a response interval, any delay on the part of the caller, such as a replaying of the question, will elicit a logging in of a longer time for the caller's response by the response unit 210 with a consequent diminution in a score to be awarded for the response.

If desired, the system 618 may be operated in conjunction with a central station, such as the central station 202 with studio 204 of FIG. 6. The studio 204 is connected electrically by a message line 638 and a control line 640 to the switchboard 622 to enable the host 212 to communicate by the telephone lines 636 with the response units 210 of the contestants. The host 212 also communicates by the television transmission 222 between antennas 246 and 282 to present a situation, occurring in the studio 204, upon a television screen 208 at each remote receiving station 206B of the respective callers. The central station 202 provides additional flexibility to the operation of the system 618. For example, the host 212 can provide additional information which supplements a description of subject matter provided by the prerecorded message in the tape recorders 520. The additional information may be in the form of a video presentation on the TV screen 208 plus a narrative description.

Further options in the operation are as follows. In the absence of the television transmission 222, the host 212 can speak directly on each of the telephone lines 636 to provide a supplemental verbal description to the telephone 620 of each caller. This is accomplished by sending a control signal from the central station along the line 640 to direct the switchboard 622 to connect the telephone lines 636 to the message line 638. The voice of the host then is carried via the message line 638 to the switchboard 622 which connects the voice to the telephone lines 636.

Also, by use of the control line 640 and the switch board 622, the host can send a synchronization tone signal to synchronize the tape recorders 520 to simultaneously activate the response units 210 of the various callers. For the foregoing purposes, the central station 202 (FIG. 22) comprises an additional keyboard 642 and a tone encoder 644 connected thereto, as well as a microphone 646. The control signals are generated by pressing a specific key or keys of the keyboard 642 to activate the desired function, the keys generating command signals which are converted by the encoder into tone signals which are recognized by the switchboard 622 and the decoders 626 to provide a desired switching function and a desired function of the recorders 520. The microphone 646 is connected to the message line 638 so that the host 212 in the studio 204 of the central station 202 can employ the microphone 646 to speak to the callers. Also, by means of the switchboard 622 a host at the central station 202 can access the recorders 520 to preset them to a specific portion of the recording tape, thereby to regulate the presentation of tasks via the system 618 to a desired level of difficulty. Thus, control of selected portions of the recording tape can be provided alternatively by respondents at receiving stations or by the host at the central station.

The modems 634 are connected to the register 368 and the accumulator 386 (FIGS. 8 and 22) in respective ones of the response units 210 for transmitting data of the responses and the scoring of the respective contestants to the respective receivers 632. Each modem 634 converts the digital signals of the register 368 and the accumulator 386 to tone signals which can be carried by the telephone lines 636 and the switchboard 622, the tone signals being converted back to the digital format by respective ones of the modems 630 to be received by the receivers 632. As noted in block 388 of FIG. 8, identification of the remote station is included within the data outputted by the response units 210, so that the set of receivers 632 can correlate a score with a specific remote station. Thereby, the host 212, or other persons in charge of the quiz show or operation of the prerecorded programs, can be provided with response data which may be used in modifying the questions to be presented at a future time, for announcing winners of a quiz show, for dispensing prizes to winning contestants, and for other such purposes.

If desired, the conducting of the quiz or game show, or other type show, can be accomplished as has been described with reference to FIG. 6, with the switchboard 622 of the system 618 of FIG. 22 being employed only for the recording of test scores or other results communicated by the modems 634 and 630.

One interesting aspect of the foregoing embodiment of the invention becomes apparent in a game show wherein remote contestants, namely, the contestants at the remote receiving stations, participate with the studio contestants in a game to win prizes, the prizes being awarded to both the studio and the remote contestants. As a simple example, consider roulette being played in the studio and observed via television at the remote stations. With reference to FIG. 22, contestants from the remote stations call in to the switchboard before the game starts, and establish a telephonic connection. After the wheel begins spinning, each caller employs the keyboard in his or her response unit to enter numbers, colors or other predictions of the type made by a player at the side of the roulette wheel. A timing signal transmitted to each response unit terminates the interval during which responses may be entered, the interval being terminated before the wheel stops. The criteria for judging the outcome of the prediction, namely the correct response, is then transmitted to each response unit by the instructional signal to enable the response units to compute the scores. The scores are then transmitted via the modems and the telephone circuits to the central station so that winners can be announced to both the studio and the remote contestants.

In this way, other games such as chess wherein the next move is to be predicted, or black jack wherein a card is to be selected, can be played by both the studio and the remote contestants. The remote contestants can be located in rooms of a hotel which houses the studio, within a nearby town, at great distance, or all of the foregoing locations.

In the description of embodiments of the invention disclosed in FIGS. 3, 6 and 7, apparatus has been presented for transmitting the instructional signal, by way of example, within the spectrum of a voice channel, and within the vertical blanking interval between frames in the video portion of a television transmission. Yet another form of transmission of the instructional signal which may be useful in the practice of the invention may be employed, this transmission being partially optical and being included within the video portion of the television transmission.

Figure 23:
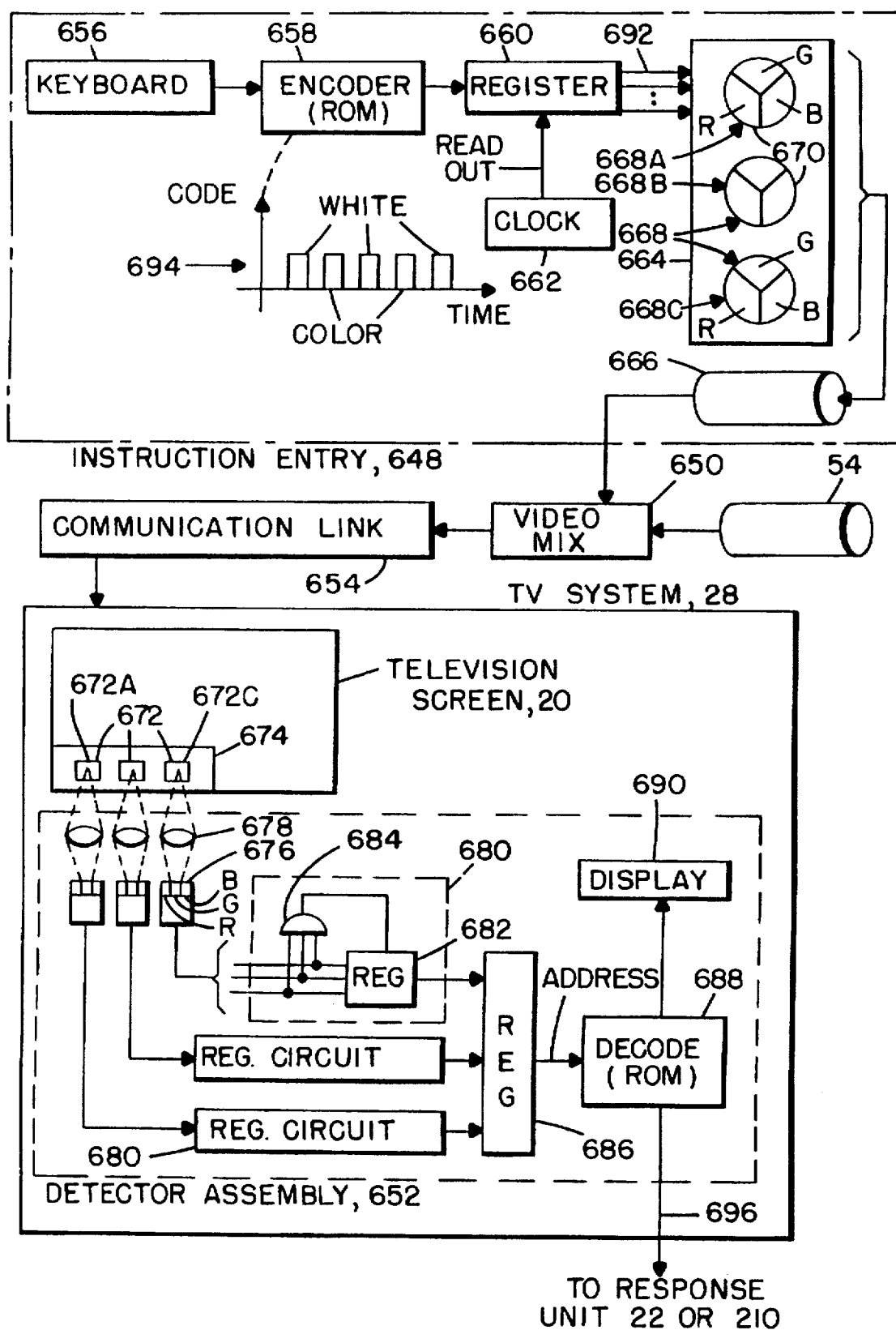
FIG. 23 shows diagrammatically a further embodiment in the transmission of an instructional signal from a central station to a remote receiving station by use of an optical link in combination with the video portion of a television transmission.

FIG. 23 shows the optical transmission of the instructional signal. This alternative mode of transmission of the instructional signal can be used instead of, or to supplement, the modes previously described, if desired. FIG. 3 shows installation of this optional mode of transmission of the instructional signal. In FIG. 3, an entry unit 648, to be described in detail in FIG. 23, provides the host 50 an additional facility for entry of an instructional signal. The entry unit 648 outputs a signal in the form of a television video signal which is to be combined with the video signal outputted by the camera 54. The combining of the two video signals is accomplished by a video mixing unit 650 which operates in the well known manner, frequently employed in sporting events, whereby two video images provided by two separate cameras, such as a view of a tennis player preparing to serve and a receiver preparing to return the ball, are presented side by side on a television screen.

The entry unit 648 provides for the encoding of the instructional signal in the format of a sequence of colored spots which appear on the television screen 20 along with the picture provided by the camera 54. The colored spots are located at the side of the screen 20 so as to avoid interference with a viewing of the picture provided by the camera 54. In the TV system 28, an optical detector assembly 652 is positioned alongside of the screen 20 to read and decode the colored spots, and to output the instructional signal in the format of an electrical signal suitable for use by the response unit 22 or 210.

FIG. 23 shows details in the construction of the entry unit 648 and the detector assembly 652, and shows in simplified fashion the interconnection of these two elements via a communication link 654 which represents the system connection of FIG. 3. The TV system 28 of FIG. 3 has been simplified in FIG. 23 which shows only the television screen 20 and the components of the detector assembly 652. The entry unit 648 comprises a keyboard 656, an encoder 658 which may be fabricated of a read-only memory (ROM), a register 660, a clock 662, a matrix 664 of light-emitting diodes (LED's), and a television camera 666. The LED matrix 664 comprises three clusters 668 of light-emitting diodes 670. There are three diodes 670 in each cluster 668, one of the diodes being red (R), a second of the diodes being green (G), and a third of the diodes being blue (B).

In the TV system 28, the screen 20 shows three of the colored spots, identified by the numeral 672, and located at a side region 674 of the screen 20. The three spots are identified further by the legends 672A–C to facilitate identification of specific ones of the spots 672. Similarly, the clusters are identified further by the legends 668A–C to facilitate identification of specific ones of the clusters 668.

The three spots 672A–C correspond to the three clusters 668A–C, respectively, and are produced by action of the camera 666 in photographing the three clusters 668A–C. The three clusters 668 are provided by way of example, it being understood that another number of clusters, such as two or four clusters by way of example, may be employed with an equal number of spots 672 being produced on the television screen 20.

The optical detector assembly 652 which is positioned alongside of the screen 20 to read the colored spots comprises three detectors 676, each of which is provided with a red section (R), a green section (G) and a blue section (B) for detecting the corresponding colors transmitted by the red, green and blue diodes 670 of a cluster 668 to the camera 666. Each of the detectors 676 is coupled optically by a lens 678 to one of the spots 672 for focussing emitted by the spot upon the detector. The detector assembly 652 includes a set of three register circuits 680 coupled to respective ones of the detectors 676. Each of the register circuits 680 comprises a register 682 and an AND gate 684 connected to a terminal of the register 682 for strobing the register 682 to read signals outputted to the register 682 by the corresponding detector 676. Each of the detectors 676 outputs signals on three separate channels corresponding to the red, the green and the blue colors emitted from a spot 672. The detector assembly 652 further comprises an address register 686, a decoder 688 which may be fabricated of a read-only memory, and an optional display 690.

In operation, and with reference to FIGS. 3 and 23, the host 50 has the capability to send an instructional signal or signals by the alternative route of the video channel, plus the optical link at the interface between the screen 20 and the detector assembly 652. This alternate route is implemented as follows. At the entry unit 648, the host enters an instruction via the keyboard 656. The keyboard 656 outputs an address to the memory of the encoder 658 which responds by outputting a code to the register 660. The code may represent a letter of a word, a number, or any one of a plurality of special terms applicable to a task provided by the studio 14 (FIG. 1), such as the terms "fairway", "bunker", "rough" and "green" of a baseball game, or "check", "castle" or "capture" in a game of chess. The register 660 is connected to the LED matrix 664 by nine lines 692 which activate respective ones of the diodes 670. Each word of the code has nine elements which are stored in the register 660, the nine code elements being applied respective ones of the lines 692 to activate respective ones of the diodes 670.

In the use of the code, there are six choices of colors or combinations of colors in a cluster 668. The choices are red, green, blue, red and green, red and blue, and green and blue. The combination of all three colors which produces white is reserved for use as a strobe signal for activating the registers 682 in respective ones of the register circuits 680. The six choices per cluster 668 provide a total of 216 color coded words for the matrix 664. Any one of the color coded words may be accessed by use of the keyboard 656. The color coded words are photographed by the camera 666 and then are presented by the screen 20 to the detector assembly 652 for detection of the cluster colors by individual ones of the detectors 676. Each of the detectors 676 output detected colors via a set of three lines to its register 682.

As shown in a graph 694 appended to the encoder 658, the colored words are interspersed among white words. The white words are provided automatically by the encoder 658 after each color word. At each of the register circuits 680, the presence of all three colors in a white word activates the AND gate 684 to strobe the register 682. Thereby, the respective registers 682 are strobed to output their respective color signals to the register 686 to provide the register 686 with a complete detected code word. The code word in the register 686 is applied as an address for the memory of the decoder 688 to output the alphanumeric symbol or word which was intended by the host 50 to be transmitted as part, or all, of the instructional signal. The alphanumeric symbol or word is presented on the display 690 to be seen by a contestant at a remote receiving station 18. The alphanumeric symbol or word is presented also to the response unit 22 (FIG. 4) via line 696 or to the response unit 210 (FIG. 8).

The white and colored code words of the graph 694, are depicted as pulse signals having a predetermined duration. The duration may be selected as a matter of convenience. However, it is noted that the camera 666 includes a vidicon which scans the clusters 668 with a sequence of scan lines (horizontal rows with reference to the screen 20) which extend in the direction from the cluster 668A to the cluster 668B. In accordance with normal television practice, there is an interlacing of pairs of scans to produce image frames at a rate of thirty frames per second. The clusters 668 have a width equal to at least a few line scans so that, within an interval of one sixtieth of a second, a few scans have been made of all the clusters 668 to provide adequate opportunity for the detectors 676 to detect the presence of a color. The region 674 extends beyond the spots 672 to provide a dark apron to prevent extraneous light from the screen 20 from entering the lenses 678 to impinge upon the detectors 676. The pulse duration for the light signals outputted by the cluster diodes 670 may be one sixtieth of a second for maximum data rate, and may be longer if desired. It is possible to have a still higher data rate by allowing only one scan line for each pulse, but it may be desirable to use a slower data rate for better signal to noise ratio.

In the response unit 22 of FIG. 4 the instructional signals of the decoder 100 and the detector assembly 652 are applied via an OR gate 698 to the memory 108. The OR gate 698 allows the instructional signals to be applied alternatively or in supplementary fashion to operate the memory 108 in the manner described previously with reference to signals outputted by the decoder 100. In a similar fashion, the signals from the detector assembly 652 an be applied (not shown) also to the memory 106 if desired.

In the response unit 210 of FIG. 8 the instructional signals of the decoder 344 and the detector assembly 652 are applied via an OR gate 700 to the memory 334. The memory 334 has been selected by way of example, it being understood that the signals of the detector assembly 652 can be applied, if desired, to another of the memories of the response unit 210. The OR gate 700 allows the instructional signals to be applied alternatively or in supplementary fashion to operate the memory 108 in the manner described previously with reference to signals outputted by the decoder 344.

The display 690 (FIG. 23) is useful for a contestant in that it allows the contestant to have information, in addition to that presented on the screen 20, which may be significant for determining the contestant's response. For example, there may be an increase in the amount of scoring points to be awarded for a task of higher difficulty level which would encourage the contestant to take a chance and select the higher difficulty level.

With reference again to FIG. 22, it is noted that utilization of the telephone system therein for carrying out the invention can be accomplished in an advantageous manner by employing the telephone system to collect and dispense funds for participants in games, contests, and other projects by the simple expedient of crediting or debiting the accounts of telephone subscribers who participate in the practice of the invention. This permits virtually instantaneous payment of an entry fee to a game, by way of example, and dispensing of an award in the form of a token or card having a monetary value or by crediting a player's telephone account with cash. The use of the telephone system for this purposes will be described now with reference to FIG. 24.

Figure 24:
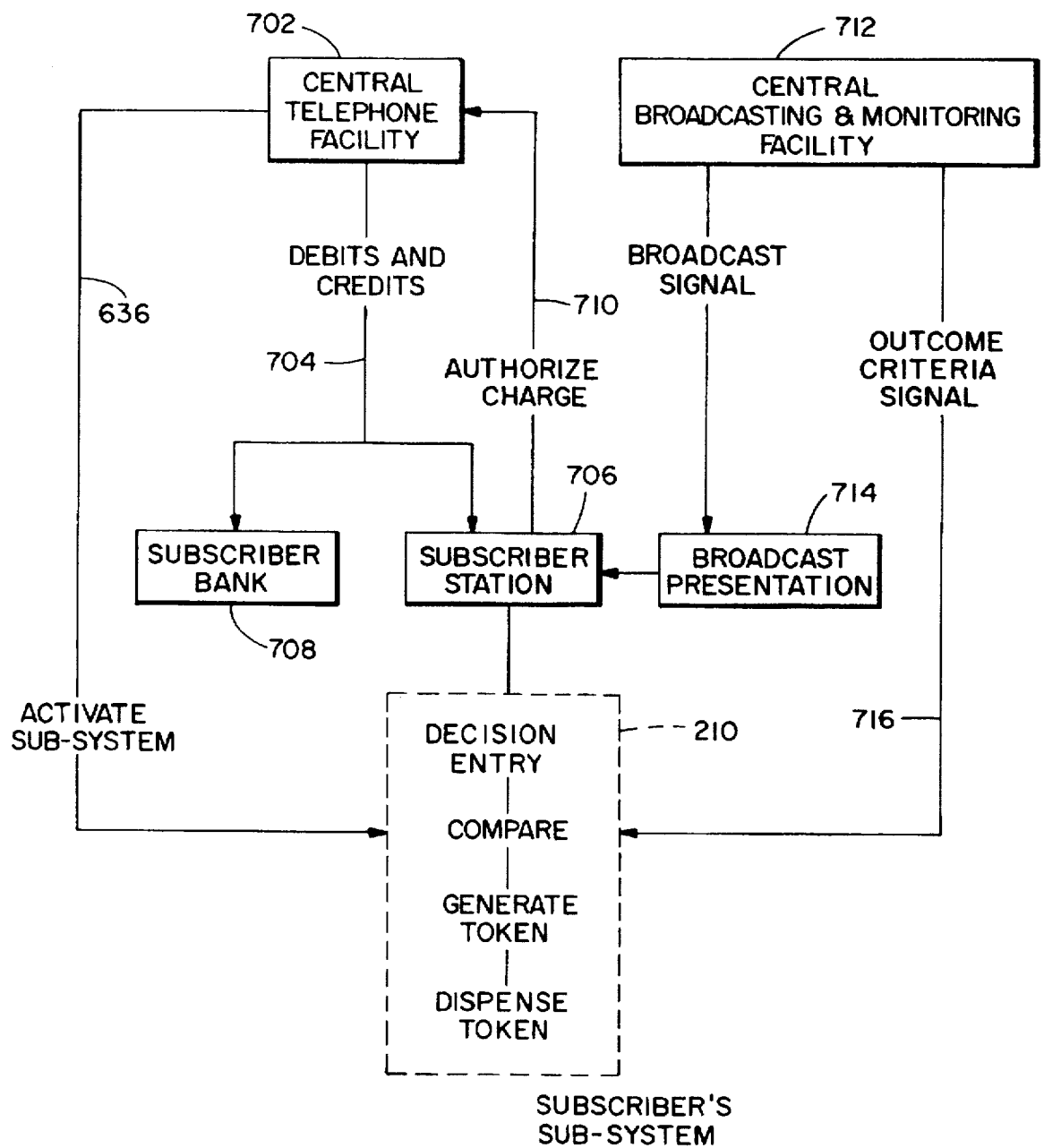
FIG. 24 is a diagram explaining operation of a telephone system of FIG. 22 for use in debiting and crediting a respondent.

FIG. 24 presents a diagram useful in explaining the use of the system of FIG. 22 for transference of funds in the practice of the invention. A central telephone facility 702 connects via a communication link 704 with a telephone subscriber's station 706 (typically the subscriber's home) and to the subscriber bank 708 or other financial institution, by way of example. Via line 710, the subscriber can authorize the central facility 702 to charge the subscriber's account at the bank 708. A response unit 210 (shown in FIGS. 6 and 8) is located at the subscriber station 706. A central broadcast and monitoring facility 712 provides a broadcast presentation 714 with a broadcast signal transmitted to the subscriber station 706 to be observed by the subscriber. The subscriber responds to the broadcast transmission by entering a response in the response unit 210. Outcome criteria signals are transmitted via line 716 directly to the response unit 210. A coded signal transmitted via line 636 (described in FIG. 22) from the central telephone facility 702 can be employed to activate the response unit 210.

The response unit 210, in terms of the presentation of FIG. 24, may be regarded as a subscriber subsystem providing functions described hereinabove. These functions are the decision entry provided by the subscriber-contestant upon use of the keyboard of the response unit, comparing of the entered response with the criteria sent by line 716 from the facility 712, the generation of a hard copy card which serves as a token describing the amount of the award and presenting other information needed for claiming a prize, and the dispensing of the token by the response unit 210.

A number of methods in accordance with aspects of the invention will now be described, the methods utilizing the electronic circuitry described herein. It is noted that the systems of the various aspects of the invention can be used to conduct contests, such as quiz shows wherein the answers to questions are known at the time the questions are asked.

The systems however, also lend themselves to conducting games, contests or tasks involving predictions of the outcome of future events, including games of chance. While the methods for conducting such programs on radio or television programs vary, they all have the important common capability of informing members of the remote audience without delay whether the responses, predictions or gambles have met with success. The success may be defined as an acceptable response to a task or question, an acceptable prediction or the outcome of an event, or the winning of an award in a game of chance. When desired, each successful member of the audience may be issued a token or an award or prize virtually instantly after the success becomes known. The token may include a monetary prize. Its is noted that all of the methods described utilize electronic equipment at the locations of the viewer or listener to evaluate responses, and to award successful participants. The system does not require central computers, thereby obviating the need for simultaneously processing large numbers of viewer responses at a central location.

Many events, including games, can be implemented by the methodology of the invention. Such events take place on large and small defined areas ranging for instance from an 18-hole golf course to a football field and baseball diamond, and to a chess board. All of these areas have the characteristic in common of being able to be subdivided so as to identify portions thereof or locations thereon. Locations can be identified with the aid of grids with coordinates or other identifying plan to implement the methodology of aspects of the invention.

Frequently, in the course of a game, an object is moved by a person, and a prediction may be made as to the location to which the object moves. In some sports events the object moved is the body of the athlete himself. A TV-viewer follows the progress of such a game or contest and enters a prediction of an outcome on an entering device by identifying the area or point at which the object is anticipated to come to rest, or is to be placed by a person addressing the object. Such an observer normally can follow the unfolding of the event on a TV-screen. Following the event, such as in a football game, a track and field event, or a move by a chess player, the producers of the TV-show identify the actual location to which the object has moved. Coordinates of the location or other identification signals are transmitted to remote sites of the TV viewers, so as to permit comparing the actual location with the predicted location entered by television observers. Response criteria for evaluating the outcome of the predictions are similar to the previously described criteria of the instructional signals.

The prediction entering device prevents entries at or after the point in time when the object being addressed, moves, or when a participant, such as an athlete, commences action. The comparison and scoring circuits of the aforementioned entering and evaluating devices at remote locations identify and score acceptable predictions as defined by the instructional signals. A successful participant is informed, when desired by a dispensing of printed coupons or magnetized cards, as previously described, immediately following the relevant event or move of an object.

In televising such an event, the producers may superimpose a grid or coordinates on the television picture for the purpose of enabling observers to identify areas or points broadly or with as much specificity as is desired or practical under the circumstances. Such a grid is helpful in making predictions and in identifying outcome locations. A grid may be subdivided into portions of different dimensions.

It is advantageous that the above-described predictive method can be applied to a large variety of events and games in which an object is moved once or repeatedly, such games including, by way of example, baseball, football, golf, and chess. Depending on the size and configuration of the playing area, the area may be sub-divided into larger and smaller portions. A prediction of a smaller portion of the area to which an object may move, and therefore a more difficult prediction, is rewarded with a prize of greater value than a prediction pertaining to a larger portion. For example, a prediction in a golf match may pertain to the location of a hit ball on large areas, such as a fairway or rough, or on smaller areas, such as on the green, or even in the cup. Predictions may relate to the ultimate outcome of two or more intermittent events, such as the location of a golf ball after three strokes, the position of a chess piece after two moves, or the total number of hits of a baseball player at the end of five innings. To provide for such cumulative outcome predictions, data storage means as previously described, are included in an observer's evaluating device.

Events included in a broadcast contest to which predictions relate may be presented visually or audibly. In an aspect of the practice of the invention, a host or commentator asks for one or more predictions and if a plurality of predictions is available, a TV-viewer selects a prediction. If there exist two or more predictions, outcome criteria are provided for evaluating the response of an observer or contestant to all relevant outcomes, the outcome criteria being conveyed to remote locations after an announced event, or events, has occurred. In another embodiment, outcome criteria are conveyed relative to outcomes of events not specifically made known or announced by a host, such as the final order in which horses cross the finish line at the end of a race. This enables a TV-viewer to elect to predict an outcome not previously mentioned in the transmission from a central station, in the hope that outcome criteria relative to the prediction will nevertheless be conveyed and that a correct prediction of such unannounced event will be rewarded with a prize.

In case a participating TV viewer elects to predict the outcome of an event not specifically identified or announced by the host, the participant runs the risk that there will be no transmission of outcome criteria signals pertaining to that participant's prediction, thus ruling out all chances of winning a prize. It therefore is the twofold task of a TV-viewer in such a situation to anticipate which unannounced event hopefully will be provided with outcome criteria, and that the participant will correctly or acceptably predict the outcome. Awards for such successful predictions will be correspondingly higher.

In view of the fact that in the above described example the outcome criteria are conveyed to remote locations following the event to which the criteria relate, the success or outcome criteria may be transmitted in uncoded and visually or audibly intelligible form. When conveyed, in such open language, the response criteria can serve to inform members of the remote audience of the event which was selected for inclusion in the contest and to advise the members of the outcome of the event.

A further use of the invention in conjunction with telephone facilities, as disclosed in FIG. 22, will now be described. Dedicated telephone lines such as the so-called 900-numbers in the United States, or so-called PIN (person identification number) or ANI (automatic number identification) lines, are used with increasing frequency to request and obtain special services. These services include a wide range of information and data which the telephone systems are capable of providing, the systems being adapted to automatically playback specific recordings or to provide answers to specific inquiries.

According to an aspect of the present invention, a tape playing facility is provided at a central telephone station as a subscriber service. Tapes with prerecorded audio or audio-visual recordings are played back to receivers at remote locations over cable or over dedicated telephone lines, using modems when required.

In a preferred embodiment, a question and answer game is conducted, and a user of or subscriber to the telephone service who answers a question in an acceptable manner receives an award as heretofore described. To conduct such a game, the contents of a tape are formulated and recorded, including one or more sets of message. Each prerecorded message set comprises a question and an instructional signal conveying answer criteria defining at least one correct or acceptable answer.

The question is received in a form intelligible to humans and normally is accompanied by an indication of the period of time a respondent has to enter a response on a data entering device. If the response or answer criteria are transmitted prior to the expiration of the allowed time interval, they are in coded or unintelligible form. if the response criteria are transmitted following the time interval, they can be in open language or other intelligible form. In the latter case, response or answer criteria may consist of the actual correct answer or answers.

The answer criteria may include scoring instructions. If different levels of difficulty are available, the scoring instructions convey the methodology or mode of computing the amount of a prize awarded for acceptable answers at different levels of difficulty.

At remote locations of members of the telephone audience, as described above, members are provided with an electronic response and evaluation unit, which as a minimum, includes a response entering device, means for comparing an entered response to an acceptable response, a timing device and means for informing a user of the telephone service of an earned award. It is understood, of course, that communications equipment is available to a user for contacting the central facility providing the service, in order to request the playback of a tape. Appropriate means for audibly and/or visually presenting the contents of the tape and for informing contestants of an award are provided.

In those instances where response criteria are received at remote locations after the time interval allowed for responding to a task has expired, the response criteria can include signals conveying one or more correct or acceptable responses in both an instructional form and in an informative form. The signals, when in instructional, normally unintelligible digital form, are capable of activating and controlling circuits, such as the scoring elements of the response units and, when converted into informative, intelligible form serve to notify game participants of winning answers. When response criteria or responses are transmitted prior to the end of the allowed time interval, transmission is rendered unintelligible by coding or changing the speed of transmission of the signals. Depending on the time of transmission before or after the elapsing of the time interval, the answer criteria therefore may be unintelligible or may comprise the actual acceptable answers in open language.

According to a preferred embodiment of the method, a question and answer game is prerecorded on a magnetic tape as previously described. A question is posed and a time limit, for example, of ten seconds is announced in open language, visually and/or audibly. At the same time a participant's electronic unit is directed by instructional signals to accept an entry by a participant for the following ten seconds and then to evaluate the entered response in accordance with response criteria. During these ten seconds, there is either no recording or, if desired, a musical recording provided on the tape. Following expiration of the ten second time interval, one or more acceptable and previously recorded answers are announced in open language. The comparison and scoring means evaluate a participant's entry relative to the transmitted response criteria. A successful respondent is informed in a known manner, which can include the dispensing of a monetary prize as described. Questions and answers may be at two or more difficulty levels as described hereinabove.

In the operation of the system, a dedicated telephone line may be coupled to a playback device which plays back one specific tape or one of a specific group of tapes selected by a subscriber to the telephone service. Thus, by calling a number, the caller will automatically receive a playback of a particular tape. The equipment at a subscriber's remote location comprises a sub-system, including the equipment for two-way communication between the remote location and the central facilities and further including the elements of the response unit for entering and evaluating answers. The two way communication equipment may include means not only for directing a multiple digit call to a dedicated number, but also for automatically activating means controlling the tape playback mechanism. The sub-system may include means requiring only the lifting of a receiver or the pushing of one button to activate the playback of a tape at a central location for transmission to the caller's location.

When desired, the equipment at a subscriber's remote location includes previously described means for selecting one of several difficulty levels chosen by a contestant, answers at a higher difficulty level being rewarded with a larger prize. And, as previously described, means are provided for generating a hard copy record of an award earned by a participant, these means being capable of printing on a coupon or magnetizing a plastic card so as to indicate the value of an award, normally a monetary prize. The response unit in cooperation with a modem (FIG. 22) may transmit data indicating the amount of a prize won by a participant over the two-way communicating system to a central location where the amount of the prize is stored. The operators of the telephone service can make payment of a prize amount to a winning subscriber in any fashion, including the crediting of the account of a winning participant with the amount of a prize, such credited amount being carried on the ledger of the operator and reflected in billing the winning subscriber.

The method and system may be modified so that every time a subscriber dials a dedicated number, such a call automatically authorizes the operator of the service to charge an amount to the caller, which amount can be on a per use basis, on a time basis, or can be determined by the caller.

When desired by a participant, a prize amount can be electronically transferred by the subscription service to a bank account of the participant so that the amount of the prize is immediately available to the winner in such a game.

In another version of the present invention, members of a remote audience wager on the outcome of an event. Members can place bets on the accuracy of their respective predictions, but do not necessarily play against other members of the audience.

Using a two-way communication system a participant, who has a line of credit with an operator of a televised event, may choose a specific event and stipulate the amount of a wager on the outcome of the event on which the participant wishes to bet. Events, the outcome of which can be predicted, include sports, elections, polls, and other kinds of happenings, the outcomes of which are capable of being defined in terms of results, scores, points, decisions, and other measurements.

With reference to FIGS. 22 and 24, the system employs traditional telephone facilities at a central location which may be operated by a telephone company, a subscriber service, or by other facilities operators. The facilities are contacted by a person wishing to place a bet on the outcome of an event, such contacting being done by conventional communication means. The person contacting such central facility, in order to initiate a wager, may be referred to as an observer, subscriber, wagerer or bettor. In contacting such a central facility, the observer of an event to take place authorizes the central service organization to charge the observer either a previously stipulated amount, an amount determined by the real time use of the facility, or an amount stipulated by the observer, such as is the case if the amount of the wager is fixed by the wagerer. The amount charged to or authorized by the wagerer is billed to him directly, but may also be debited by the central subscriber service to the wagerer's bank account.

Following authorization by the subscriber, the operator of the central service initiates the playing of a recording or the transmission of a broadcast and activates a sub-system of the subscriber, normally located at the subscriber's home. In addition, the service operator accepts a bet on a specified outcome of an event, such acceptance being done by a human operator or through electronic communication. Thus, for example, within a bettor's line of credit, a bettor who dials a 900- number and additional digits, can place a bet and, by dialing a specific number of digits, the event and amount of a bet can be specified by the subscriber.

At a central location, which may be the same as or different from that at which the central telephone facility is located, events are broadcast to subscribers' remote locations and the outcomes of events are monitored. Broadcast signals of such events are transmitted to and received at remote locations, so that subscribers can follow the progress of events as they unfold. Outcome criteria signals defining the outcome of an event in absolute terms or in relation to the predictions and wagers are transmitted to subscribers at remote locations.

The response unit at an subscriber's location informs the subscriber of a successful prediction by generating and dispensing to a successful bettor a token of a winning bet, such token being a printed coupon or magnetized card. The response unit also scores a winning prediction in accordance with an applicable difficulty level.

Payments computed and payable to or by a bettor can be debited or credited to a bettor's account or monthly statements, or can be reflected directly on the bettor's bank account. Alternatively, when a winning token is generated and dispensed, the token which has the amount won indicated thereon, can be submitted for credit to the operator of the service, to a bank, or to another redemption center.

Following authorization of applicable charges, a subscriber's sub-system can, when appropriate, be made operative by signals sent over telephone wires or by another form of communication, including wireless and cable systems. According to another aspect of the method, the subscriber's sub-system can be activated by the subscriber, and a hard copy record of a successfully predicted outcome is dispensed to the observer of an event. This method is preferred when subscribers do not wish to place bets, as may be the case in a home or in a public place in which members of a family or friends are gathered, or when betting is illegal. Records issued in such an instance have no commercial value unless validated by a verification number or a code which is only provided upon a subscriber's having authorized an appropriate charge by the central telephone or subscriber service. Verification data are transmitted to remote locations via a communication link such as a telephone line or cable.

As an example of operating the system, two central facilities are provided, one being a telephone subscriber service and the other being a station televising a sports event, such as a boxing bout. Viewers are informed that they can wager on the outcome of each round or on the final outcome of the bout, the wager being a win, lose, or draw. Viewers also are informed that boxer A is a favorite over boxer B and that a successful wager on boxer B will be rewarded with 200% of the amount of the wager, whereas a successful wager on boxer will be rewarded with 125% of the amount of the wager. Subscribers to the telephone service then dial a dedicated number, including additional digits specifying a chosen round and/or the final result and the amount wagered on each outcome.

Viewers watch the event on television and at the end of each round and/or of the bout, instructional signals are sent from the central broadcast facility to remote locations defining each outcome and providing scoring instructions to subscriber response units for computing the amount won by a successful subscriber.

The invention may be applied to a game which is conducted from a central location and enables players at remote locations to win prizes delivered instantly at each player's location. Prizes normally take the form of tokens redeemable for cash.

In an adaptation of the system described, players are provided with a response unit and recording medium for the outputting of hard copy with a recording of identifiable data. A first set of data has been provided on the recording medium prior to delivery thereof to the players. The data may be presented as alphanumeric or other symbols. For example, a set data may comprise a combination of six letters and numbers which have been prerecorded on a tamper-resisting recording medium.

The recording medium may consist of a paper tape divisible into sections or it may consist of a plastic card having data magnetically recorded thereon. In any event, such token or recording medium is capable of being placed in the response unit for the purpose of having recorded thereon at least one additional second set of alphanumeric data or symbols. Signals from a central station serve the purpose of conveying data and controlling the printer of the response unit..

In the operation of such a system, a second set of data may comprise, for example, six letters and/or numbers selected or picked at random at a central location. Signals conveying the data are electronically transmitted to remote locations. Transmission can take place over the air or by wire. The central transmitting facility is adapted to activate and direct the printers to print the second set of data. The printer also is directed then to print a third set of data on the recording medium, the third set of data consisting of a verification code or number.

The recording medium, which in this instance is a paper tape, can be separated into sections, each section containing the first and second sets of numbers or letters, as well as the verification code.

A player therefore receives a recording medium with at least three sets of data, which data may be readable by individuals and/or may be machine readable.

If the game is played as a lottery, a winning recording medium is one which has two sets of alphanumeric data or other symbols, which either match completely, match partially, or have some other previously defined correlation. Partially matching sets of data can be rewarded with small prizes which become larger as more of the digits match. Other forms of correlation can be established, whether mathematical or not, including for instance multiples and fractions.

When desired, the central transmission facility can instruct the printer to record additional information on the recording medium. The response unit compares the two sets of alphanumeric or other data mentioned, computes the amount of a prize in accordance with instructional signals transmitted from a central location, and indicates the amount of the prize on the recording medium.

According to a preferred embodiment of the method employed in the system described, a player is able to discern whether two sets of alphanumeric data on the recording medium are a match, a partial match, or have some other correlation; but the player may not know the amount of the monetary prize presented on the outputted recording medium. The medium, which may be a printed coupon or a magnetized card is delivered by a winning player to a redemption center where the player is informed of the size of the prize. Such a redemption center may be a place of business, for example, a store in which such a prize evidenced by a printed coupon or magnetized card may be redeemed for cash and/or merchandise. This method of informing players that they have won a prize, without knowing its amount, is utilized to attract buyers to a place of business. The above method and system permit conducting a game similar to a lottery by retail businesses, which game is purely a game of chance and in which players at home may participate without charge to them.

Yet another feature of the invention is demonstrated with respect to FIG. 14 which allows for a replaying of a previously recorded program without further replay of previously recorded of response criteria including an acceptable response and a scoring mode. This is useful in the case of an advertiser who provides a program of a situation about which questions may be asked, the program being recorded along with response criteria on a tape for distribution to members of the public. However, possibly for reasons of awarding a prize to successful respondents, the advertiser wishes to conduct a question and answer procedure only once so that prizes can be awarded only once. But, the program situation which typically includes descriptions of a advertised products may be played back numerous times.

This feature may be demonstrated, by way of example, by constructing the recorder 520 of FIG. 14 with both a playback head 718 and a record head 720 disposed alongside the path of a tape 722 upon which the foregoing program and response criteria have been recorded. This is accomplished by providing the recording medium of the tape 722 with a first portion which stores the program situation including advertising information (or other data), and a second portion which includes the response criteria. The distinction between the two portions of the recording medium is shown diagrammatically in FIG. 14 by use of a set of dots at 724 on the tape 722 to identify the second portion of the recording medium. Included in the second portion is a digital code which commands a disabling of the recorded response criteria data after the response criteria has been played back. The tape 722 moves, in a direction shown by an arrow, from the playback head 718 to the record head 720. As the second region at 724 moves past the playback head 720, the digital code is retrieved along line 346 and decoded by a decoder 726 also located in the recorder 520. Upon receipt of the digital code, the decoder 726 records a disabling signal upon, or erases, the second portion of the recording medium so that the response criteria originally recorded thereon can no longer be used. Alternatively, the recording of a disabling signal may be replaced by a step of physically impairing the integrity of the second recording position.

Figure 25:
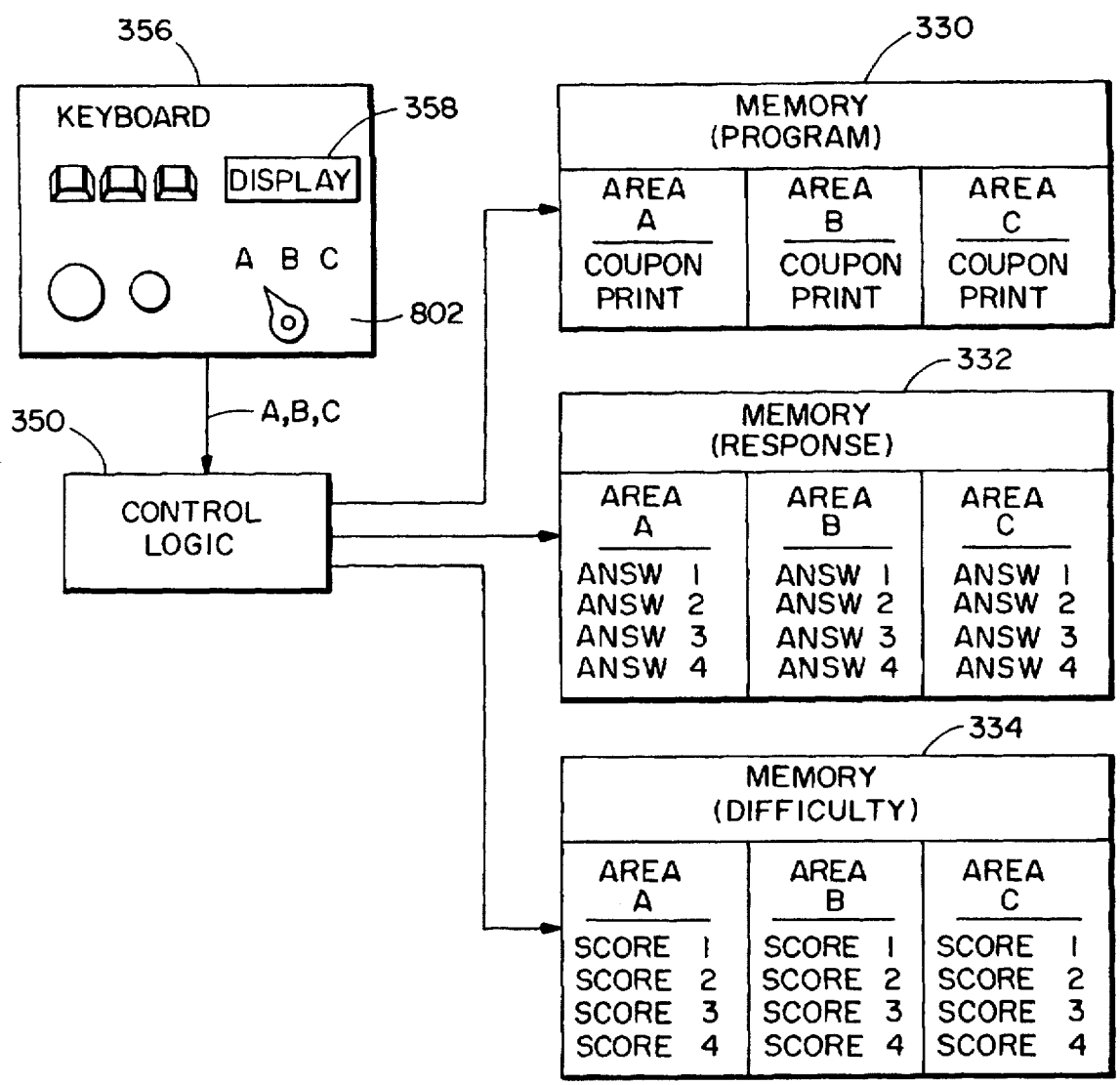
FIG. 25 shows diagrammatically the storage of information in two of the memories of the response unit of FIGS. 8 and 26.

With reference to FIG. 25, and in accordance with a further aspect of the invention, it is desirable to provide a respondent with the capacity to select an area of interest in the program transmitted from a central station to a remote receiving station. This area of interest may pertain to answering questions relating to specific parts of the subject matter presented in the transmitted program, or to the nature of awards which may be provided to successful contestants.

By way of example in the nature of the questions requiring a response, the questions may be directed to historical aspects of the material being presented on the program, or may be directed to the manner of construction of items presented in the program, or to the cost of the items. For example, in a program devoted to the merchant marine in which both new an old forms of ships are presented, questions may be of an historical nature directed to when and where certain forms of ships were employed. Or the questions may be directed to the manner of construction of ships in both ancient times and the present time. Questions might also be directed to the cost of buying a ship and the cost of maintaining a ship. During the presentation of the ship program advertisers may display, by way of example, merchandise such as clothing to be worn on cruises and on other vacations. Coupons awarded to successful contestants may specify a discount towards specific styles of the clothing or, alternatively may provide a discount to certain marine products shown in the program or, by way of further example, toward theater tickets.

A specific type of award is associated with specific types or categories of questions which a contestant may select in order to avail himself or herself the benefit of a preferred category of award. Thus, a contestants choice of area of interest may be based on the subject matter of the questions or on the nature of the award. This capacity for selecting an area of interest greatly increases the chance that a contestant will participate, and that the contestant will redeem the coupon. Fortunately, as will be shown in the ensuing description, this aspect of the invention can be practiced with a response unit, such as the response unit 22 of FIG. 4, the response unit 210 of FIG. 8, or a response unit 800 to be described in FIG. 26, with no more than a minimal change relating to the addressing of memories therein.

The addressing of the memories is demonstrated in FIG. 25 with respect to the response unit 210 of FIG. 8. As has been explained hereinabove with reference to FIG. 8, command signals entered at the keyboard 356 are operative via the control logic unit 350 to activate the memories 330, 332, and 334. In the foregoing description of the system 200 of FIG. 6, or the system 200A of FIG. 7, the central station transmits a televised program plus answering instructions, scoring criteria and a message to appear upon a coupon to a remote station wherein the response unit 210 operates with the answering instructions, the scoring criteria and the coupon message upon activation by a contestant. In particular, it is noted that the transmission of answering instructions, the scoring criteria and the coupon message relate to a single set of questions in only one area of interest, such as the area A indicated in the memories 332, 334 and 330, respectively. However, in the practice of this aspect of the invention wherein the contestant can select areas of interest, the central station sends also additional sets of answer instructions, scoring criteria and coupon messages for other areas of interest such as the area B and the area C shown in FIG. 25. While only three areas of interest are shown, it is understood that more areas may be employed if desired. Also, by way of example, four questions are shown in FIG. 25, it being understood that more questions may be provided if desired.

To practice the invention, the response unit 210 is provided with the capacity to store the requisite information for a plurality of interest areas to enable the respondent to choose an area of interest. In the operation of a response unit 210, the respondent first selects the area of interest, after which the response unit 210 functions in the same manner as has been described with reference to FIG. 8. The selection is accomplished by entering at the keyboard 356 a letter, or other symbol, designating the desired area of interest. The entered letter, as shown in FIG. 25, serves to address the appropriate regions in each of the memories 330, 332, and 334, so that the response unit 210 can then function in accordance with the coupon message, the response criteria and the scoring criteria of the selected area of interest. The response unit 210 compares responses of the respondent with the acceptable answers stored in the memory 332 to identify an acceptable response, scores and times responses in accordance with data stored in the memory 334, and outputs a coupon with redemption and advertising data thereon in accordance with information stored in the memory 330. If desired, the response unit 210 may be provided with a dedicated selector device, such as a selector switch 802, shown in the simplified view of the keyboard in FIG. 25, for addressing the memories.

The capacity to select an area of interest is particularly useful for the merchandising of products with the aid of a game show broadcast from the central station 202 of FIG. 6, or transmitted in prerecorded fashion by use of the recording apparatus presented in the cabin 500 of FIG. 11 or the system 618 of FIG. 22. The respondent plays the role of a contestant in the game or quiz program, and also acts as a shopper for merchandise presented in the program. By use of the selector switch 802, the shopper selects the area of interest having the product of interest. The shopper then plays the game or quiz in earnest to receive a coupon which facilitates purchase of the product by redemption of the coupon. If desired verification codes may be imprinted on the coupon in a manner described hereinabove. A product may also be selected prior to responding to a task, subject of course, to entering an acceptable answer or prediction.

Figure 26:
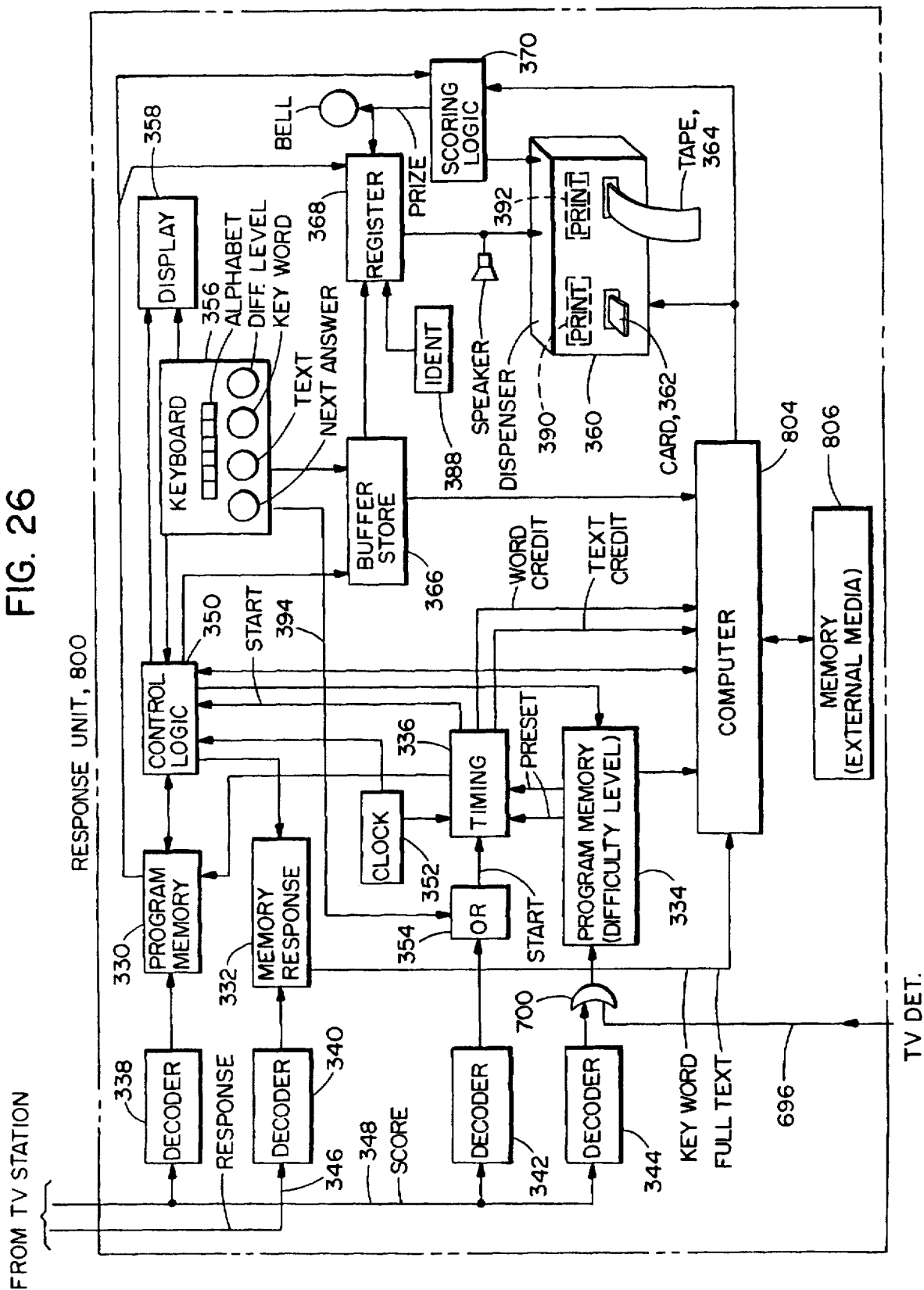
FIG. 26 is a block diagram of a response unit which is a modification of the response unit of FIG. 8.

FIG. 26 shows the response unit 800. The response unit 800 provides the functions of the response unit 210 of FIG. 8 by use of a computer 804 which replaces certain components of the response unit 210, namely, the comparators 372 and 374, the registers 376 and 378, the multipliers 380 and 382, the summer 384, and the accumulator 386. The computer 804 is operative with a memory 806 which provides the program for performing the functions of the replaced components, and also connects with the control logic unit 350 for interaction with the memories 330, 332 and 334, the timing unit 336, and the buffer store 336. The computer 804, which may be constructed as a microprocessor, outputs signals to the dispenser 390 and to the scoring logic unit 370 as does the accumulator 386 in FIG. 8. Also, the computer 804 can provide data on the display 358 via the control logic unit 350.

An advantage in the use of the computer 804 is that the memory 806 may store algorithms for providing more complex routines for a more versatile scoring of the responses than is possible with the response unit 210 of FIG. 8. For this purpose, it is desirable to provide the memory 806 with an external replaceable storage medium such as a tape which may be mounted on a card, a dedicated replaceable read-only memory (ROM) chip, or a floppy disk so that scoring can be customized to match the product selected by the respondent shopper. The memory may be provided with advertising data and redemption instructions as well as verification material to be placed on the coupon awarded to the successful respondent shopper. This enhances the merchandising capabilities of this method of the invention wherein the respondent selects areas of interest. Also, by virtue of the connection of the computer 804 to the dispenser 390, the computer can direct the imprinting of specific material on the coupon in accordance with specific instructions of an advertiser or merchant.

In some cases, it may be desirable to provide the functions of comparing responses with acceptable answers, identifying acceptable responses, and scoring the acceptable responses at a central station such as the central station 202 of FIG. 22. This is accomplished by providing the system 618 with a response evaluation unit 808 connected to the switchboard 622. The response evaluation unit 808 includes the computer 804 and the memory 806 of FIG. 26 so as to be able to perform the functions of comparing, identifying, and scoring. By virtue of the connection of the evaluation unit 808 to the switchboard 622, the functions of the evaluation unit 808 are provided to the central station 202 in response to signals from the remote stations. For example, these functions could be disabled in the response units 210 of the remote stations and provided by the central station with the response evaluation unit 808 employing algorithms not available to the remote stations.

Figure 27:
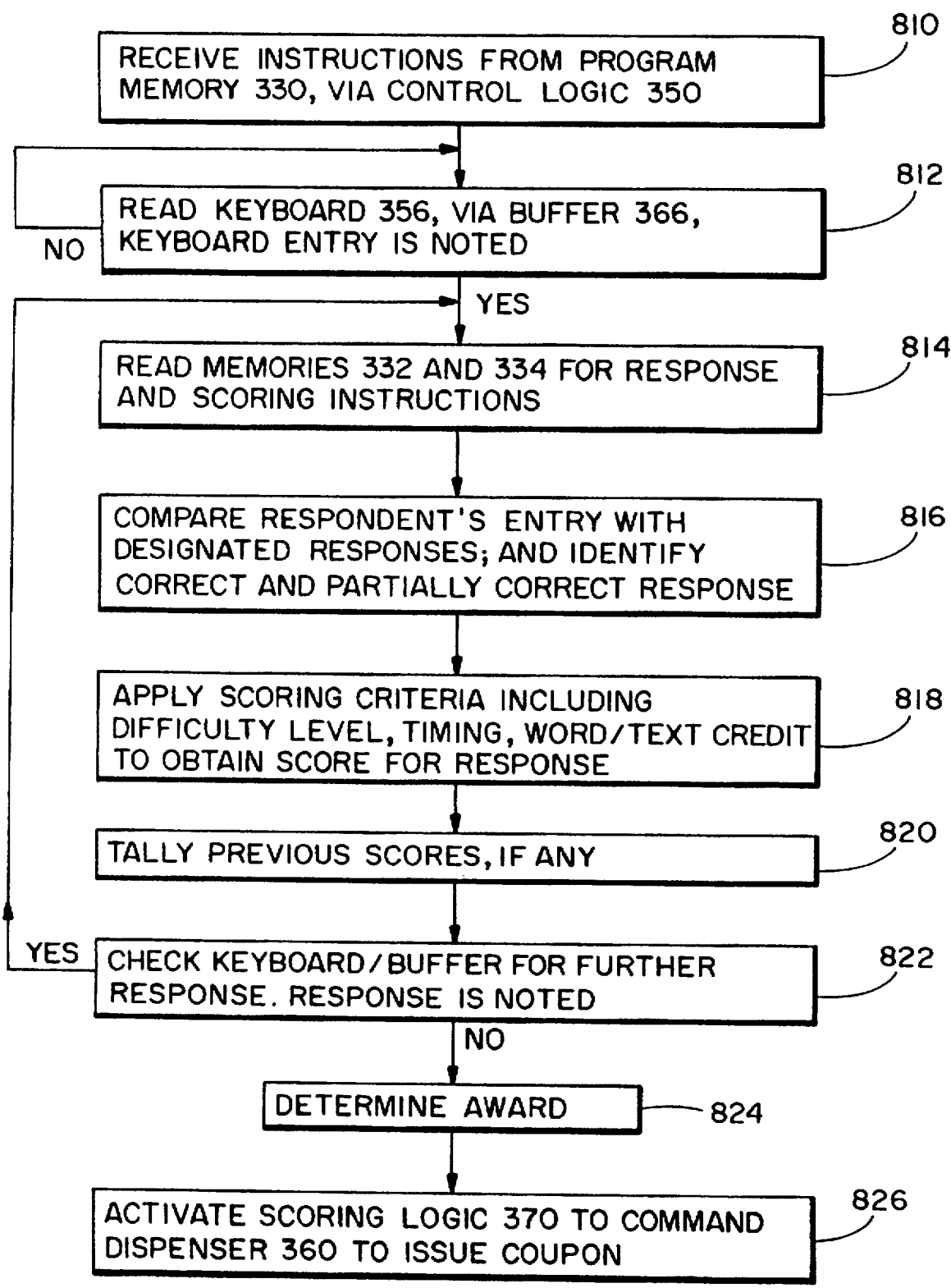
FIG. 27 is a flow chart for operation of a computer in the response unit of FIG. 26.

FIG. 27 shows a flow chart of the program for operation of the computer 804 of FIG. 26. Operation begins at block 810 wherein the computer receives instructions from the program memory 330 via the control logic unit 350. Then at block 812, the computer reads the keyboard 356 via the buffer store 366 to determine what entry may have been made by the respondent. If no entry has been made, operation loops back to the block 812 for a subsequent reading of the keyboard. If an entry has been made by the respondent, such as the entry of a response to a question, the computer reads the memories 332 and 334 at block 814 for response and scoring criteria or instructions.

The procedure advances to block 816 wherein a comparison is made between the respondents answer with acceptable responses stored in the response memory 332. This is followed by an identification of correct and partially correct answers of the respondent. At block 818, the computer performs the scoring function giving full credit and partial credit in accordance with the scoring instructions stored in the memory 334. This is accomplished by using the scoring criteria including difficulty level, timing of response, and key word or full text credit where applicable in accordance with the nature of the response to the question. Then at block 820, the computer tallies previous scores from previous answers in a set of answers, if applicable to the questions at hand, this function having been done by the accumulator 336 in the response unit 210 of FIG. 8.

The computer again checks the keyboard at block 822 to see if there is a further entry. If there is a further entry, operation loops back to block 814.. If there is no further entry after a predetermined interval of time, operation proceeds to block 824 for determination of the award. Then, at block 826, the computer signals the scoring logic unit 370 to command the dispenser 360 to issue the coupon. The coupon is imprinted with material based on instructions and data stored in the program memory 330, and may also contain data stored in the supplemental memory 806.

The teachings presented in the preceding embodiments for the systems and methods of the invention are applicable generally to the selection aspect of the invention providing the product choice and choice of area of interest. The following discussion amplifies the description of the practice of the selection aspect of the invention to provide a full appreciation thereof.

In many instances, local or regional suppliers of goods and services develop their own and highly focused marketing priorities. As an example, a local retailer may wish to dispose rapidly of certain excess inventory or of perishable goods. Nationally broadcast programs may not be the most suitable forum for such promotions.

Frequently, suppliers prefer to sponsor a coupon program directed at local or regional audiences. Until now, however, local newspapers have been the only forum of any consequences available to such local sponsors for detailed product offers.

The discounts or prizes are in many instances applicable to merchandise sold in stores and supermarkets. Specifically included are children's stores. When desired, the products to which a discount applies may also include such items as admission tickets, travel tickets, total accommodations, subscriptions, vouchers, personal and any other marketable services, including service agreements.

The components of the several systems and methods for practicing the invention will now be described.

A central broadcasting facility includes the normal elements for transmitting a program. For purposes of illustration, the invention will be described in terms of television, but is equally applicable to radio.

The television program is received and presented on standard TV-receivers at viewers' remote locations. The program includes one or more tasks, such as questions. Members of the broadcast audience who wish to become contestants on the spur of the moment are informed of the time allowed for a response to each announced task.

Each task is accompanied by one or more predetermined acceptable responses. Instructional signals conveying response criteria defining acceptable responses are electronically transmitted from a central facility to remote locations, said signals being referred to as response criteria signals. They include data conveying the allowed period of time and mode for scoring an acceptable response, i.e. for assigning a calculated value to the prize coupon dispensed to a successful contestant. The response criteria are received at remote locations and may be modified or reformatted by a conductor of the program from task to task.

The electronic transmission can be done in any known manner: it can be on a radio frequency, via optical or light impulse codes, via cable, vertical blanking intervals or other means.

If desired, a task, such as a question, may be answered at one or more levels of difficulty. If there is more than one level of difficulty, the lowest or base difficulty level normally is selected by the broadcaster and a higher difficulty level may be selected by a respondent. Means for such selection are provided to the broadcaster and to each member of said audience.

Another group of predetermined signals is transmitted from a central broadcasting facility to remote locations conveying a listing of or information pertaining to the products of sponsors of such a broadcast. The term "product" includes goods and services whether specifically promoted in the course of such a broadcast, such as a commercial, or only appearing in the product listing of a sponsor. The information conveyed by these broadcast signals is referred to as product signals and comprises prices, specifications, availability and discounts applicable to specified products. Product signals may also include "sales", "specials", free samples and any other information pertaining to such products and deemed useful by a sponsor. The product information is modified or reformatted as determined by a sponsor.

Members of the broadcast audience are equipped with means for receiving and presenting the broadcast program, which includes tasks or may essentially consist only of tasks. Members of said audience have means to receive the response criteria signals and the product signals, the data for both being stored in appropriate storage means at members' locations. The product signals can include all the promotional data mentioned. Product information may be presented to viewers on a standard TV-set or on a separate screen or display. In addition, members are provided with means to enter a response to a task, such response data also being stored at members' locations.

The response criteria data product data, when modified, replace or supersede any previously stored data of the same nature. Response criteria include, when desired, a formula for placing a value on an acceptable response, referred to as scoring mode.

The means provided at members' locations for displaying the latest product list and other information desired by sponsors permit sponsors or broadcasters to delete, substitute, add or modify information. Audience members are equipped with means for individually selecting from said product list a product they prefer and intend to purchase. Said selecting means may be separate, or may be associated with the means for entering a viewer's response to a task.

The equipment provided at each remote location normally includes signal receiving means and presentation means for the program, task and product information; signal receiving means for response criteria; entering means for response and product selection; data storage means; comparing and scoring means; and means for generating and dispensing a prize token.

The above mentioned means at contestants' locations may conveniently be combined into a response unit.

The methods described lend themselves well to narrowcasting. The term narrowcasting is defined as the ability to transmit product or service information to a select group of members of a broadcast audience. The present method described, which dispenses prizes to individuals intending to purchase a specified product or products, narrowcasts product information because only viewers with a discount incentive will use the product information. Conversely, product information can be utilized only by viewers who have earned a prize through skill and have qualified for a discount applicable to a selected product.

A response entered by a member and stored, if necessary, is compared by comparison means with the applicable response criteria. A winning contestant's prize is calculated by scoring means on the basis of the applicable scoring mode. The product selection and a winning respondents score are outputted to a device at each contestant's location for generating a permanent record, such as a coupon, which, when dispensed, has provided thereon an indication of the prize and of the chosen product, including any sales or redemption information the advertiser wants the shoppers to have. In some instances, only one mode of scoring may be desired. This is the case if only one fixed award is to be made to winners obviating the computation of a score. An example would be a "true or false" type of answer. Such a single fixed award is made to all successful participants in case a sponsor intends to introduce a new product, in which event winning contestants are given the opportunity to select a free sample from a number of different available products. The chosen product is then specified on a prize coupon.

The device for generating a permanent record normally comprises a printer capable of printing or otherwise marking on a substrate, i.e. the recording medium, the award information, product information, redemption terms and a verification number; the record, such as coupon, includes commercial messages, including advertisements and announcements of special events and prizes. When desired, prizes may be awarded to a successful contestant over and above the award for an acceptable response; examples being "blind" or sweepstake prizes.

The term "prize" is intended to include all forms of rewards, such as cash, prizes, discounts, free merchandise, other financial and non-financial benefits, certificates, recondition or benefits. The terms "prize" and "discount" as used herein may occasionally be interchangeable.

The term "redeem" is intended to include the collection of a prize by delivering or presenting a coupon personally, through the mail, or other forms of obtaining a prize upon surrendering or in exchange for a coupon.

The term "sales outlet" is intended to include retail and public stores, redemption centers, catalog centers and all sales location whether accessed in person or by mail.

The word "conductor" or "host" as used for instance in the term "conductor of a broadcast transmission" is intended to include the individuals engaged in the operation of formulating a message or program for broadcasting on behalf of an advertiser, manufacturer, store or sponsor.

The term "dissimilar" is intended to include the meaning of different and non-identical.

The term "shopper" is intended to include individuals who are potential buyers of products and services.

The term "scoring basis" is intended to include complex scoring based on a formula, credits earned, difficulty level, time consumed and other criteria, as well as an automatic or fixed scoring basis, such as a single and universally applicable score as would be applied to a "yes or no" answer. An example of a fixed scoring basis would be a 10% discount prize for every correct answer entered within the allowed time limit.

A "correlation" of alphanumeric or other symbols may take the form of a complete or partial match or any other mathematical or predetermined correlation thereof.

The term "listing" as in "product listing" is intended to include the names of products, their specifications, prizes, discounts and other product information.

The term "matching" is intended to include any predetermined correlation of alphanumerics or symbols.

The term "superior" as in "superior response" is intended to include answers, response and predictions that are more accurate, more comprehensive, more responsive or entered within a shorter period of time.

The term "acceptable response" is intended to include answers to questions and prediction of events which are wholly correct, or sufficiently or in part correct, or which otherwise qualify for a prize, discount, recognition or award.

The term "conjointly" as used herein refers to the transmission and reception of electronic signals and the presentation of a task-setting message and of product information conveyed by said signals in combination, taking place partially or entirely concurrently or following each other so as to form a joined presentation.

The signals electronically transmitted and conveying task messages are referred to as the task-setting signals. The signals, electronically transmitted and conveying the response criteria are referred to as the response criteria signals. The signals electronically transmitted and conveying a product list or product: information are referred to as product information signals. The signals electronically transmitted and conveying the outcome criteria of a prediction are referred to as outcome or success criteria.

The product signals may include information regarding additional or special discounts or other prizes over and above, and unrelated to, the coupon prize. For example, a product listing may include under one or more products the statement "The purchase of this product doubles your coupon prize". This form of direct marketing gives managers a great deal of maneuverability including sales on short notice. These types of messages presented to shoppers for instance on a TV-terminal, or LCD-screen, or appearing on prize coupons, can be modified upon a seller's instructions on very short notice, such as through telephonic instructions by a store manager to a broadcast station which transmits the response criteria and other instructional signals.

Typically, the printer includes means for storing a recording medium, for instance a continuous paper tape which, following the printing of a coupon, is severed or divided into coupon sections. According to the present invention, the device includes known means capable of dispensing tokens, such as coupons of larger or smaller size, depending on the amount of text printed on such coupon and having desired configurations. When desired, for example in the case of an educational quiz as described below, the printer can be designed for the presentation of graphics or it can take the form of a telefax device capable of depicting pictures, drawings and the like.

Using the present methods and the systems described, a broadcaster or a sponsor formulates task sets, the sets each comprising task-setting and response criteria signals, being broadcast successively. Tasks may be interspersed in programs or program segments and may be broadcast individually or intermittently. Each task is accompanied by one or more acceptable responses. One acceptable response may apply to more than one task, such as the answer "yes" applying to a number of questions. A task-setting message can comprise a question requiring an answer, or a solicitation or request for a prediction of the outcome of a future event. Operationally, these two types of task-setting messages and shoppers' responses thereto are treated similarly, except that in the case of a question, the period of time allowed for entering an answer normally is fixed, whereas in the case of a prediction, the entering or further entering of predictive information of the modification of predictions is not necessarily inhibited after a fixed period of time, but is inhibited prior to or at approximately the time of the occurrence of the event.

The response criteria signals are broadcast from a central location, which may or may not be the location of the task broadcast. The product information signals normally are broadcast but may be broadcast from another central location. The product signals may be modified at any time as directed by a sponsor.

In the operation of the system described, a retailer prepares a listing of products selected for sales promotion in the target market. The products selected may be designated by name, but often are numbered and may be divided into categories. The products listings displayed at members' locations are grouped accordingly. If the product listing of a sponsor is lengthy, it can be displayed to members in successive segments or groupings. This is achieved by the use of known display and scrolling devices. Members' display devices may also be adapted to display and re-display successive listings of products or lists of numbered products in different categories as and when desired and such additional lists may be called up in sequence by a member of the broadcast audience until a desired product category and/or a specific product is displayed which a member intends to buy.

When preferred, the entire presentation of product information can be performed on television. In that event, the product listing can be shown on the television screen and the instructional signals are transmitted on the audio sideband frequency of the TV-program. Alternatively, the product listing can be shown on a liquid crystal display or on a small, separate, passive TV-screen. Both the passive terminal and the response unit include comparison, scoring and printing circuits receiving their radio command signals via a TV-audio or radio sub-carrier.

Using the split-screen television technique, the product information can conveniently be displayed along with other portions of the TV-program. This method is particularly easy and economical to implement on an automated cable channel, which for example can display concurrently a question and a product list.

The selected product is identified by touching numbered buttons on a respondent's entry device, or by other means. This selection is outputted to and is stored in a memory coupled to the printer or to means for computing the coupon value. The coupons may carry the same percentage value, but a different value in absolute terms, depending on the price of the merchandise. For example, for the same correct answer a $5.00 item selected by a contestant may be subject to a $0.50 discount, whereas a $2.50 item is subject to a $0.25 discount, the computation being performed by scoring means. In order to accommodate a variety of differently priced products, the coupon value can be expressed in terms of a percentage discount applicable to any product selected by a member.

If a higher difficulty level is chosen, the absolute monetary award or the percentage of the discount is raised. As an example, at the basic or first level of difficulty, the discount is 10%, at level two it is 15% and at level three it is 20%.

The response unit may include a self-contained memory which lists products for long term use. Memories of this kind, such as boards or cards for use in the response units, may be in interchangeable form for substitution in the response unit as required. For example, when a member receives a new coupon tape, whether in the mail or through personal pickup at a store, a sponsor may utilize the opportunity to provide such a member with a revised memory board which is supplied to such member along with the new tape and inserted in or connected to the response unit. Such revised memory is valid until replaced. Normally, the product listings assign numbers to individual products for use by shoppers. The response units at members' remote locations may be equipped with a memory capable of retaining all of the product items of a retailer for a predetermined period of time. Products may be numbered permanently or on an ad hoc basis. Periodically, say every day, the retailer conveys a listing of the names or numbers of products selected for promotion on that day. A sponsor's product listing may be stored in a memory for extended periods of time. The memory may be part of the display means permanently storing product information. The shopper is provided with control means to activate the screen displaying such listing at any time and further is provided with means to enter and indicate one or more items of interest to such shopper in the near future.

The selection of said item is stored in a memory coupled to the means informing shoppers of items chosen by the sponsor for promotion. The display and selection means are further provided with comparing means and alarm means, visual or audible, to inform or alert a shopper when the item of interest to the shopper is one chosen by the sponsor to which a prize is applicable. This method enables shoppers to wait until an item on a shopper's marketing list is announced as one eligible for a special prize and then attempt to qualify for such a prize by responding to a question. In such an event a shopper's product selection is entered prior to the entering of an answer or prediction.

Prize coupons can be redeemed at a sales outlet specified on said coupon; other provisions may appear on coupons, such as dates and terms of redemption. A discount or other prize specified on a coupon may be made applicable to a group or mixture of products which includes the product specifically selected by the contestant, as well as other products to be promoted. Coupons may be redeemed in person, by mail, or by telephone using the validation code on the coupons to verify its authenticity.

In an alternative embodiment, contestants' display means are directed by the product signals to display only the names or numbers of product items selected by a sponsor from the comprehensive listing of products permanently stored in the memory of the response units. The product numbers thus displayed and applying for example to a "special" on sale the same day may be changed easily and quickly. A sponsor may provide printed lists of all products to viewers, each product being permanently numbered so that a viewer can relate a broadcast product number to a specific product.

When preferred, the entire presentation of product information can be performed on television. In that event, the product listing can be shown on the television screen, using for example the split screen or window technique, and the instructional signals can be transmitted on the audio sideband frequency of the TV-program.. Alternatively, the product listing can be shown on a small, separate, passive terminal screen, which can be part of the response unit.

The methods provide, when desired, for an announcement of product information by the host of a TV-broadcast. This embodiment is preferred when the information is to be particularly emphasized or relayed to the public as quickly as possible. In that event, the host indicates to members of the broadcast audience the products or the reference numbers applying to specific products, so that a contestant, by touching appropriate buttons on a keypad of the response unit, can designate the product which is to be identified on the coupon dispensed to a successful contestant. An on-stage or off-stage announcer can orally describe the product and related information, while the corresponding visual information can be retained on the screen for as long as is desired.

The present invention has applications in areas other than the promotion of commercial merchandise. An example is an inventory of perishable produce which will have to be discarded, unless sold within 48 hours. A "special" on such produce can be announced on very short notice, the produce carrying a 40% discount if purchased within 48 hours. The following day, the discount provided on prize coupons can be raised to 75%, if the produce is purchased that same day. It is evident that a store manager will prefer to salvage 25% of the retail value of a product to a total loss. As an additional promotion device, the basic level of difficulty in answering a question can be dropped, so as to generate an even larger number of prize winning shoppers. As an illustration, in the example, a product selection may be left unchanged for all tasks presented, or may be changed when the desired number or quantity of products has been reached to which the prizes won by such a member are applicable. The system can be adapted to permit contestants to select more than one product to be specified on a prize coupon, provided all of such products are included in the listing of products eligible for discounted purchase.

A prize can be made available to a shopper in the form of a coupon carrying a discount on a product or in another form, such as a cash prize, a credit or other benefit collected personally, by telephone, or through the mail.

In an alternative embodiment of the present method, the broadcaster or organizer of a program composes and provides to viewers product listings supplied by a plurality of sponsors. In such an event a program initiator periodically collects information from several local suppliers with respect to the products each of them wishes to promote. Based on such information, the program initiator or broadcaster than prepares a composite listing of appropriately numbered products available from a plurality of suppliers, which listing is announced and/or displayed to the remote audience on their display screens. The response criteria signals instruct the printer to output a hard copy record stipulating the sales outlet at which the products of the respective sponsors can be purchased using a discount token.

Thus, the latest product information can be conveyed to members of the remote audience and can be updated at any time. A sponsor can alter the instructional signals by making a telephone call to the local FM-station. This adds a great deal of flexibility to the promotional efforts of regional producers and local retailers. Obviously, the principle of the systems and methods described can be applied also to national broadcasts. In that event, the sponsors of an advertising campaign or program lists only products to be promoted on a nationwide basis.

It will be clear from the description of the coupons that, apart from carrying a prize, the coupons can serve a an effective direct marketing tool having advantages which no other form of promotion can match. The methods of the present invention make it practical and economical to combine the delivery in a shopper's home of a promotional hard copy record representing a financial award with sales information of specific interest to the winner of the prize at the time of receipt. The fact that the contestant has specified a product selected for intended purchase signifies that such a shopper is likely to visit the sponsor's store and examine the coupon and its other promotional messages closely. Being in the sore and exposed to another product promoted on the coupon, the contestant will at least seriously think about the other products promoted.

As an example, a dispensed coupon can carry a discount on a first product selected by a TV-viewer and, in addition, can carry a "buy one, get one free" message regarding a second product, the latter product being much more likely to be purchased once a shopper has entered a sales outlet than if the product had been the subject of a free-standing magazine insert.

Thus, a prize coupon carrying a discount on a first specified product and redeemable in a specified sales outlet, can be utilized to attract a shopper to said sales outlet in order to induce said shopper to purchase a second product available in the same sales outlet, said coupon carrying an additional discount or prize on a second product.

Coupons dispensed to winners bear a verification number or code. When desired, sweepstake or other prizes may be awarded in addition to the prizes applicable to scored responses, such additional prizes being awarded to a small number of winners determined in any suitable fashion.

Such additional prize information is conveyed to members' locations through the transmission of additional response criteria signals. For example, if the verification code consists of six digits, the last three digits in their specific order may constitute the "lucky number" of the day, if matched by a 3-digit number chosen by a sponsor on that day, entitling the holder of the winning coupon to an additional prize upon redemption of the coupon in a sales establishment or other specified location. The three digits chosen by the sponsor or broadcaster can be revealed at the place of redemption, or can be transmitted with the response criteria signals. The number of such additional prizes, which can range up to the value of sweepstake prizes, is controllable. In the above instance, the number of winning coupons is one per thousand coupons dispensed.

The fact that a prize coupon is issued only to contestants who have won it through skill, make it legally permissible in many locations to attach larger or even sweepstake prizes to such coupons. The delivery of a prize-winning record at a sales location preferably it tied to the personal delivery thereof, but may also be performed by using the mail or telephone.

The present invention combines practical, psychological and financial inducements to bring about an increased rate of coupon redemption by television viewers and radio listeners. A member of the broadcast audience who has selected a product because its purchase is timely, who wins a discount prize through personal skill, and who will save on the purchase of the product, is very likely to redeem such a prize coupon by buying the product at the specified sales outlet.

A number of additional methods intended to induce TV-viewers to redeem coupons will not be described. The instructional signals directing the response units at viewers' locations to generate a token, such a coupon, direct the coupon generator or printer to generate and dispense to one successful contestant more than one coupon at a time. Multiple coupons may be awarded for superior responses. For example, a total prize may be awarded in the form of three coupons redeemable upon purchase of two or more items or kinds of merchandise, or a total prize may be awarded consisting of two identical coupons for the same merchandise. Additional coupons may be dispensed for one acceptable response at a high difficulty level or for an exceptionally comprehensive answer. If more than one coupon is awarded for one response, the two or more coupons may have different values, redemption dates or places of redemption, in order to increase the number of shoppers attracted to sales establishments on any given day or to induce a shopper to visit a place of redemption more than once.

In another embodiment of the methods described, coupons dispensed to winners of an award are provided with first code symbols, said symbols varying from coupon to coupon, an example being consecutive six-digit numbers. The first code symbols may have previously been provided on said coupons, for instance on the coupon tape prior to the insertion of said tape into the coupon generating means. The first code symbols can also be provided on the coupons at approximately at the time of or subsequent to the printing of the prize indication. The first and second codes together constitute a winning combination if they match or bear a predetermined correlation, said correlation having been determined by an organizer of the broadcast, such as a sponsor, or advertiser. As an example, in the case of a six-digit number code, a correlation may be determined to exist if the last three digits on such a coupon match. Other code forms may be devised. Winning codes or code combinations normally are not intelligible, i.e. not identifiable as a winning code, by a contestant at his location and are revealed to a shopper only at the place of redemption of the prize coupon.

A code may be alphanumerical and/or comprise other symbols, which code is only machine-readable at the place of redemption, so that the bearer of such a coupon will not know whether a prize coupon caries an additional prize until and until and unless said coupon is redeemed. The opportunity of winning an additional "blind" prize, the value of which is not discernible by a contestant who already has won a prize through skill, i.e. by correctly answering a question, will in many instances be the decisive factor that will make the holder of such a coupon decide to visit a store or other place of redemption. A coupon may carry a discount applicable to the price of a first selected product as described, and in addition, the generating means, such as a printer, may be directed by the instructional signals to provide on the coupon indications of an additional prize or other benefit tied to the purchase of a second product. The second product may be specified by the contestant, or it may be specified by a sponsor, or it may be an unspecified product. In the latter case the holder of such a coupon will be able to purchase the selected product at a discount and apply the additional prize to a second product selected once the shopper is in the place of redemption.

In another use of the invention, a combined method is employed to raise the redemption rate of coupons preprinted in magazines, newspapers, free-standing inserts and the like, hereinafter referred to as preprinted coupons. The following examples illustrate a number of uses of the response unit of the invention in combination with the above mentioned preprinted coupons.

A hard copy record generated at a shopper's location bears a stipulation to the effect that, upon presentation of a specified or otherwise identified preprinted coupon together with the generated record, the shopper is entitled to an additional prize. The prize may be specified on the generated record, or it may be a "blind prize" which is revealed to the shopper only at the place of redemption of the preprinted coupon. It may also be printed on the coupon contained in the free-standing insert. In another version of the method, the preprinted coupons are provided with an identification, such as an alphanumeric or other code.

Coupons dispensed to a prize-winning shopper by his or her response unit also are provided with an alphanumeric or other code. A shopper presenting a preprinted coupon and a prize-winning coupon having matching or correlated codes is entitled to an additional prize, which may be a sweepstake prize. The value of the additional prize if disclosed to such a shopper only at the sales outlet. All of the methods described will raise the redemption rates of coupons.

If desired the steps of comparing entered responses to the applicable response criteria and of identifying and scoring prize-winning responses can be performed at a central location, in which event shoppers' entered responses are electronically transmitted to a central location, such as by telephone and modem. In such a situation, means for comparing, identifying and scoring are provided at a central location, these means operating in the manner described previously with respect to the response unit at a remote station. Instructional signals governing the generating of a hard copy record are then electronically transmitted to shoppers' locations, at which location said records are generated and dispensed. The instructional signals can be transmitted to shoppers' remote locations in any known manner, such as on an FM-radio frequency, or, in television transmissions through the vertical blanking intervals, through TV-audio or video sub-carrier signals generated by subliminal light impulses.

In all instances, however, hard copy records are generated and dispensed at shoppers' remote locations.

According to the present invention, scrambling devices may be provided as part of the response units at shoppers' locations; such scrambling devices of known design are activated and controlled by instructional signals transmitted from a central location. It is the function of said scrambling devices to scramble in random fashion alphanumeric data transmitted, so that when desired, the codes printed or otherwise provided on the hard copy records of a multitude of shoppers randomly differ from each other. In that manner, shoppers in a geographically limited area will receive tokens such as coupons bearing dissimilar or non-identical alphanumeric or other codes. The method of randomly rearranging or disturbing the order of numbers and other symbols transmitted, permits the organizer or sponsor of a broadcast to limit the distribution of prizes to a restricted and somewhat controlled number of television viewers, thus limiting the financial exposure of such sponsor. When broadcasting to a larger audience, the financial exposure of a sponsor can be statistically determined within a narrow range by following the scrambling procedure described.

The product list may be presented to shoppers at their remote locations by transmitting instructional signals from a central location directing the printers of the response units to print the names or numbers of a plurality of products on the prize coupon generated and dispensed as described. The shopper having received such a coupon displaying a listing of several products then indicates his or her choice of product on the coupon in any convenient manner, such as by checking off, circling, filling in a box, drawing a line, etc. The prize carried by such a coupon is applicable to the earmarked product. Thus the coupon itself serves as a product list limited to products from which a shopper can make a final selection after having entered a sales outlet. Thus a winning TV-viewer can take to a store a discount coupon applicable to a product selected by the shopper at the checkout counter from a list of products. In this fashion, the sponsor has the ability to limit the list of discount products and the shopper can make the final selection.

According to a preferred method and configuration of the passive terminal, a participant can program a memory in the terminal by entering the names or numbers of one or more products targeted by the participant for early purchase. The potential shopper can then leave the terminal unattended. When the sponsor of a program includes a product so specified by a shopper among those earmarked by the sponsor for discounts or other awards, an alarm in the terminal is activated so as to alert the shopper to this fact. The shopper then has the opportunity to participate in the game and to win a prize token, such as a coupon, carrying a discount on the selected product targeted by the shopper for immediate purchase. It is virtually certain that such a shopper will redeem the coupon thus obtained.

Figure 28:
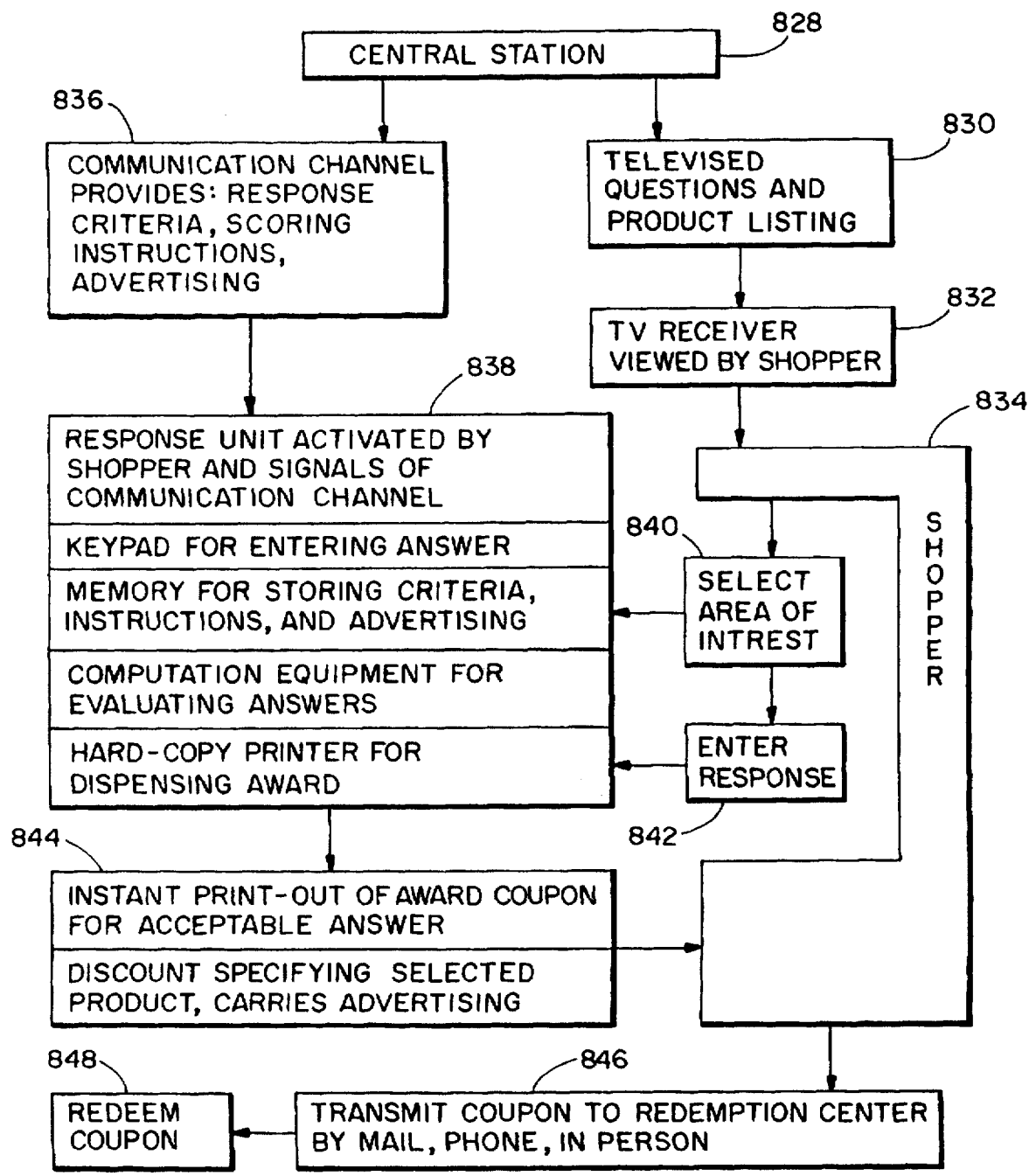
FIG. 28 is a diagram showing a sequence of steps in the practice of the method of the invention.

FIG. 28 shows steps of the method for the selection aspect of the invention. Preparation of materials, including formatting of response and scoring criteria, may be performed by the host at the central station, or prerecorded by the host for transmission to remote stations from the central station, indicated at block 828. Program material including questions and product listings are televised at block 830 to be received for viewing, at block 832, by a shopper, indicated at block 834. A separate communication channel at block 836, such as a sideband of an audio or video portion of the television transmission, provides instructions such as response and scoring criteria, as well as product advertising information in the form of electronic signals to be employed in the operation of a response unit, indicated at block 838. The response unit includes a keypad for entering an answer, memory for storing the various criteria and instructions plus advertising or merchandising matters, computation equipment for evaluating answers, and a printer for producing a hard copy record of the respondents performance.

The shopper selects an area of interest at block 840 at the response unit, and then enters a response at block 842. Upon a successful responding, the respondent shopper receives at block 844 a coupon from the response unit. The coupon provides a discount for selected products, and may carry advertising. At block 846, the shopper transmits the coupon to a redemption center by any one of a variety of ways, such as, by mail or by telephone or even in person.. Then, at block 848, the shopper redeems the coupon and receives an award such as a discount on the purchase of a selected product.

The foregoing description shows the full versatility of the system and methodology of the invention for allowing contestants at remote stations to participate in a game, quiz or other form of show, contest, game of chance, or making predictions of the outcomes of unknown or future events, whether the show be live, prerecorded, or partially prerecorded and partially live.

Figure 29:
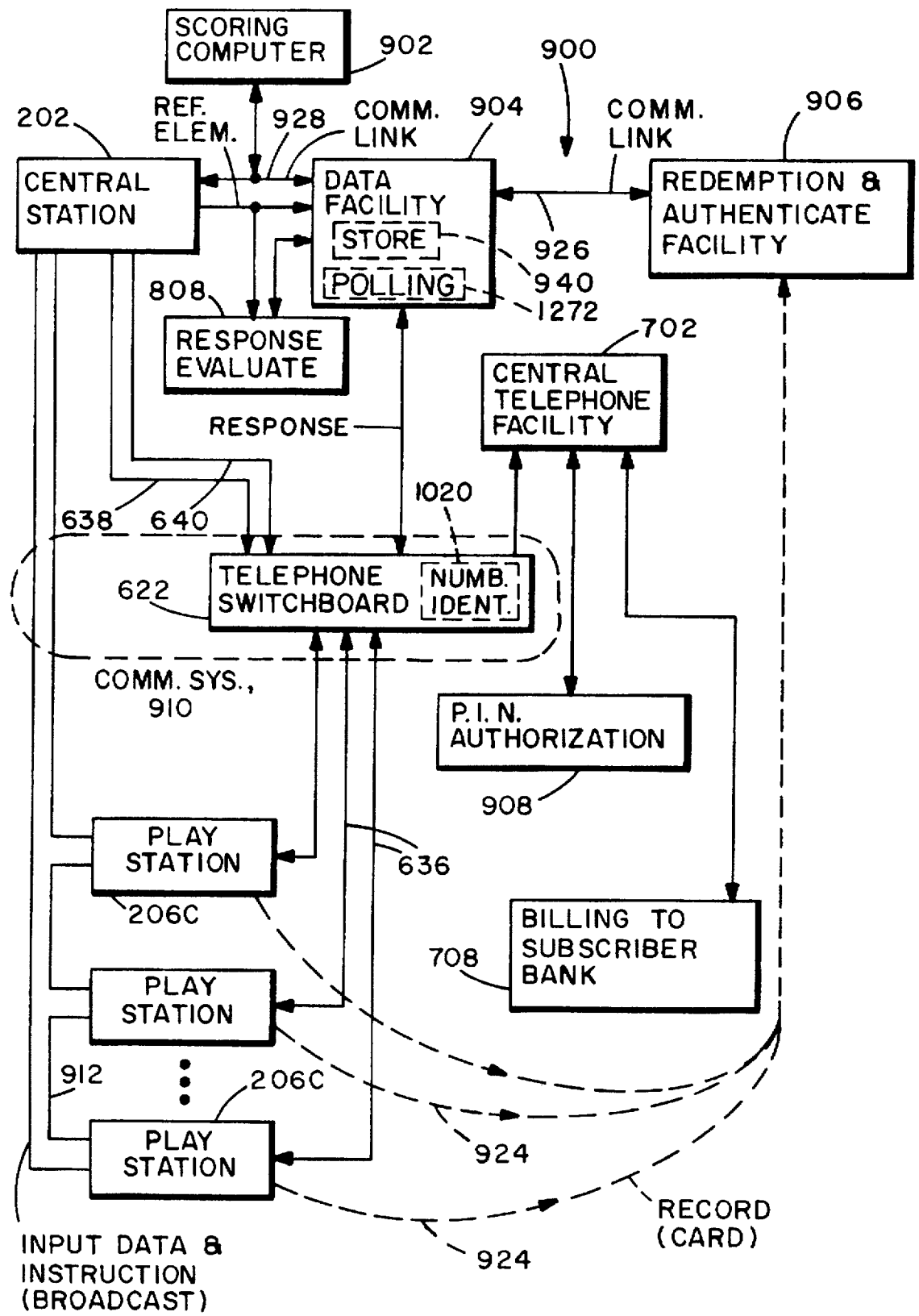
FIG. 29 is block diagram of a further embodiment of the invention wherein a central station and a set of remote playing stations are employed to conduct a wagering game including the issuance of coupons, or other form of wagering record, in a forgery proof system.
Figure 30:
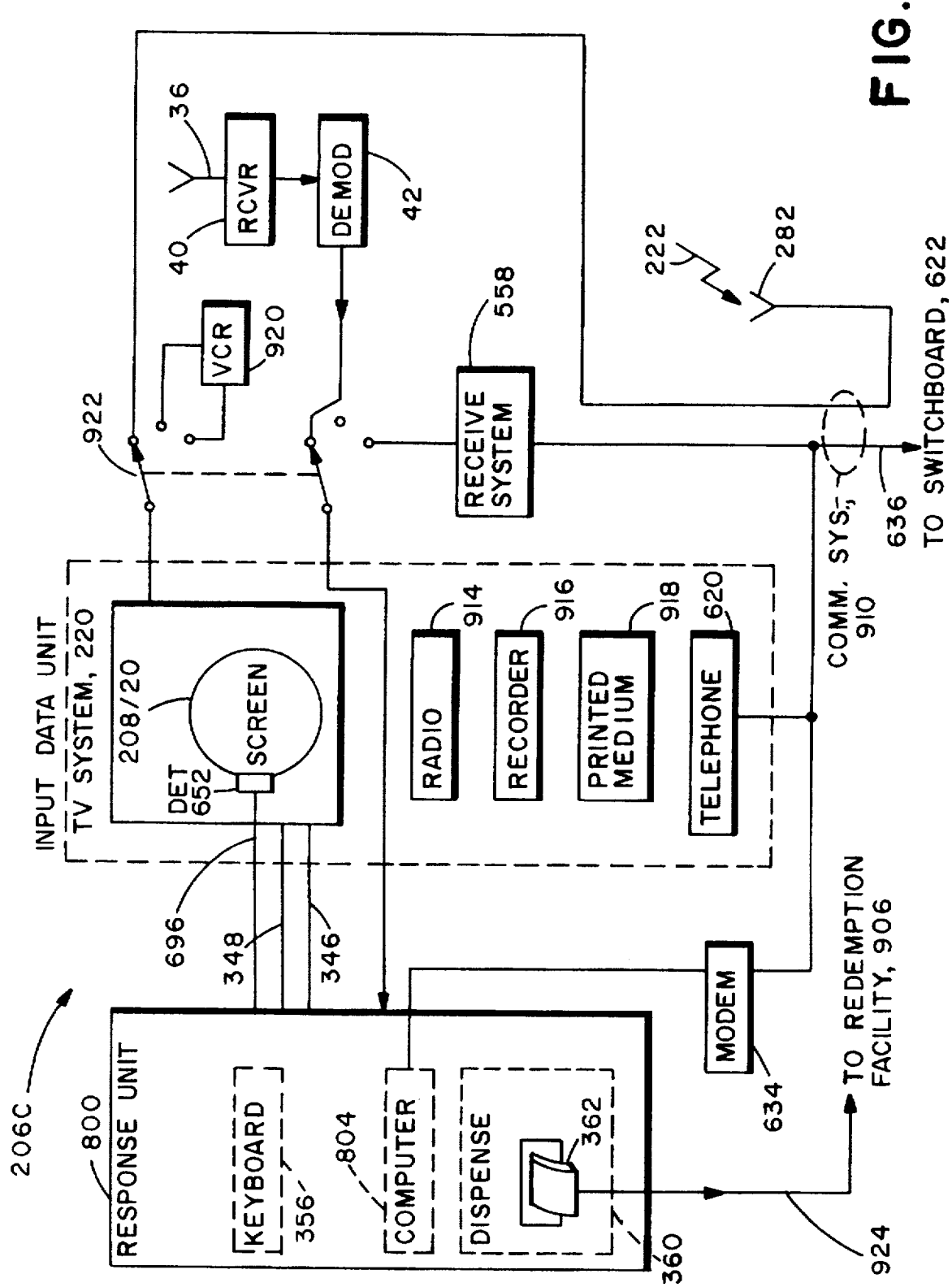
FIG. 30 is a block diagram of a playing station of the system of FIG. 29.

FIGS. 29 and 30 are block diagrams showing a further embodiment of the invention employing a central station and a set of remote stations, similar to those described above, in a system 900 for the conduction of a wagering game in a forgery-proof fashion. The system 900 includes components which are essentially the same as components described above, and includes modifications for adapting the components to the practice of wagering, as in a wagering game. The system 900 includes the central station 202, described above in reference to FIG. 6, and playing stations 206C similar to the remote stations 206B of FIG. 22. Each of the playing stations 206C includes a response unit 800 and a receive system 558 described above with reference to FIG. 26, and a TV system 220 described above with reference to FIG. 6 and employing a screen 208 (FIG. 6) or screen 20 (FIG. 1) for presenting data or a scenario to a person at the remote station. If desired, a scenario or wagering situation may be presented to players via the telephone. Also included in the system 900 are a telephone switchboard 622 and a response evaluation unit 808 described above with reference to FIG. 22, and a central telephone facility 702 and a subscriber's bank 708 described above with reference to FIG. 24. The system 900 further comprises a scoring computer 902, a data facility 904, a redemption facility 906 and an authorization unit 908. In a playing station 206C (FIG. 30) the response unit 800 is connected via lines 346 and 348 to the TV system 220, as shown also in FIG. 6, and optionally via line 696 to a detector 652 at the screen 20, as shown also in FIG. 3. Message and control signals (FIG. 29) are coupled between the central station 202 and the switchboard 622 via lines 638 and 640 as shown also in FIG. 22. Connection of a playing stations 206C (FIGS. 29 and 30) via modems 634 and via lines 636 to the switchboard 622 is shown also in FIG. 22. In FIG. 29 a communication system 910 provides for a broadcast transmission, via a communication channel 912, between central and remote stations, such as the broadcast transmission 222 of FIGS. 6 and 22, or the separate broadcast transmissions by radio and television links of FIGS. 1 and 3. The communication system 910 also provides for communication via the telephone switchboard 622 and telephone lines 636, such as the telephonic communication of FIG. 22.

In the practice of wagering by the invention, a player at a playing station 206C is informed about the nature of the wagering situation as a first step in the usual practice of the invention. The information provided to the player may be only rudimentary, such as a time when wagering may be performed, and a situation wherein a game such as lotto is to be played by choosing one or more numbers. Alternatively, the information provided to a player may be complex such as a situation involving a game show, as has been described above with reference to FIG. 6, wherein at some point in the show, the players at the remote playing stations 206C may be asked to bet on an outcome of the show or some other event. The communication channel 912 is intended to represent various ways in which data can be disseminated to the players at the stations 206C such as by television and/or radio, a radio being indicated at 914 in FIG. 30. It is understood that the communication system 910 includes transmission of the requisite data by various means, in addition to the foregoing broadcast transmission of television and radio, such as by means of a previously recorded audio message employing a recorder 916, in accordance with the practice described above with reference to FIG. 11. Data may be provided even by means of a printed medium 918 such as a newsletter. And, as will be explained below, the communication system 910 includes transmission of the requisite data also by means of a telephone 620.

Additionally, a video cassette recorder (VCR) 920 may be selectively coupled via a first branch of a switch 922 to the TV system 220, in lieu of connection of the TV system 220 to the antenna 282 for receipt of the broadcast transmission 222. Connection of the TV system 220 to the VCR 920 provides data in the manner described above with reference to FIGS. 11 and 12. A second branch of the switch 922 selectively provides for connection of the response unit 800 to the antenna 36 (shown also in FIG. 1) via the receiver 40 and the demodulator 42, or to a receiving system 558 for reception of data via the telephone line 636 as described above in reference to FIG. 22. Data may also be inputted to a player via a telephone 620 connected to the telephone line 636 as described in FIG. 22. The various ways in which data can be inputted to a player at a playing station 206C are represented collectively in FIG. 30 as a data input unit. In the practice of the invention, a record outputted by the dispenser 360 of the response unit 800 may be in the form of a card 362 which is conveniently carried by a player to the redemption facility 906 for receipt of a prize for a winning wager. The carrying of the card 362 to the redemption facility 906 is represented by a dashed line 924. A communication link 926 connects the redemption facility 906 with the data facility 904. A communication link 928 connects the central station 202 with the data facility 904.

Figure 31:
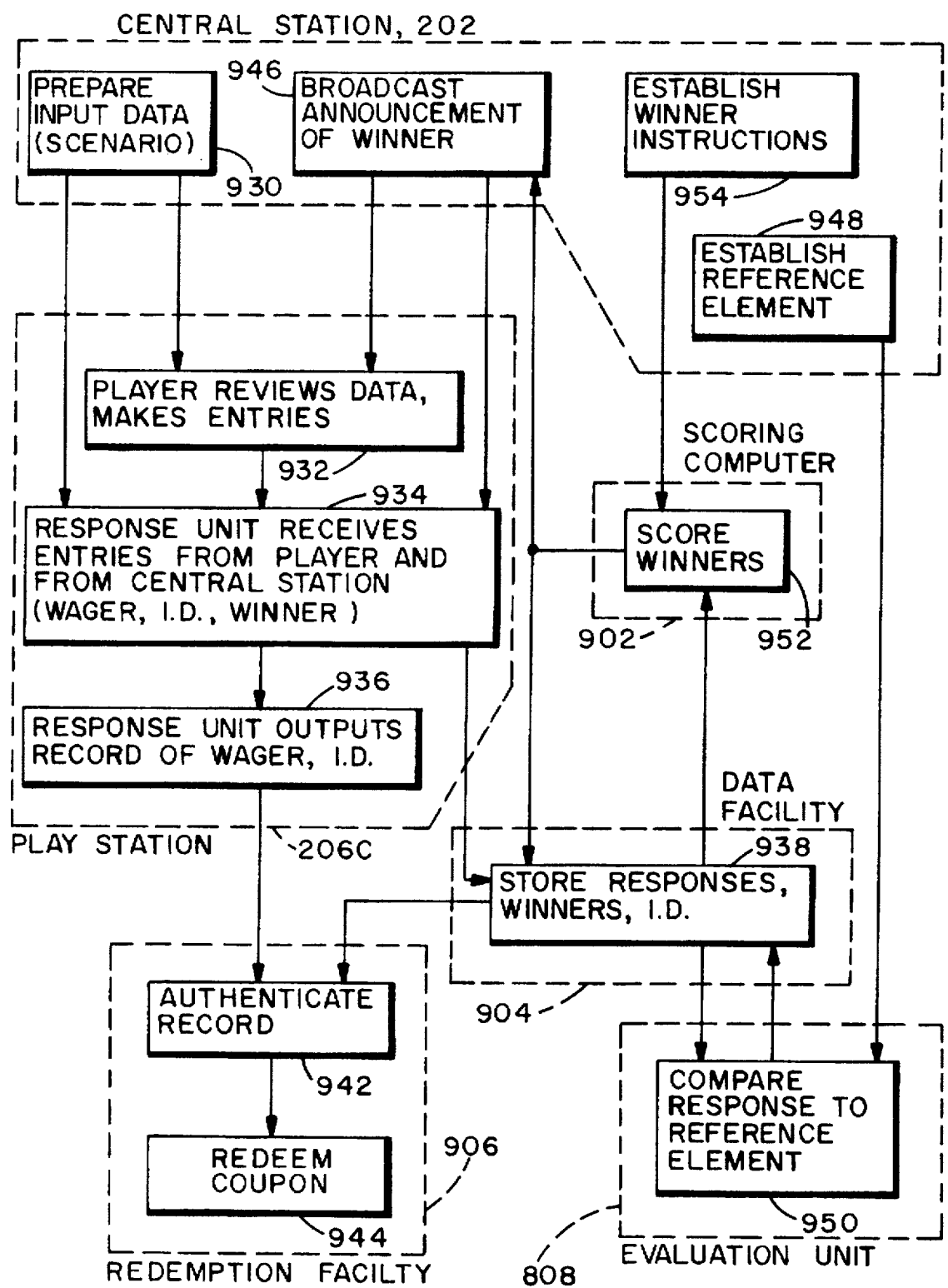
FIG. 31 is a flow chart showing method steps employed at various components of the system of FIG. 29 for practicing the forgery proof wagering game.

With reference to FIGS. 29–31, the operation of the system 900 begins with the preparation of data, at block 930 (FIG. 31), to be presented to a player at a playing station 206C, via block 932, and to be inputted to the response unit 800 at the playing station 206C via block 934. In FIG. 31, the method steps are presented in solid blocks while the locations in the system 900 (FIG. 29) for the performance of the steps are shown by dashed lines enclosing the solid blocks. Typically, the input data is prepared at the central station 202, but may also be prepared at some other location. By way of example, a wagering situation may be based on the outcome of a horse race, as in off-track betting, wherein the identity of the horses varies from race to race. In this case, a host at the central station 202 presents the players with the various combinations of winning situations (to win, to place, to show) and possibly handicaps prior to each race. A televised presentation of a sequence of races may be broadcast directly from the central station to the remote playing stations in the form of a live broadcast or in the form of a prerecorded broadcast, or may be broadcast from some other site distant from the central station but concurrently with the presentation of the host at the central station. Announcers may also present a situation via radio or telephone.

Thus, for example, the program signal transmitted via the communication channel 912 may include a listing of the horses' names and identification numbers while an instructional signal transmitted via the channel 912 would include the odds for each horse and the horse identification numbers plus scoring criteria for categories of win, show and place. If, instead of a horse race, the wagering is based on a televised game show, such as has been described hereinabove, the program and the instructional signals would include the data and instructions as described above, and would include also data and instructions relating to the wagering. For example, studio contestants may be playing a game of geography, and players at the remote stations may be attempting to guess the answers before the studio contestants. Wagers can be placed on the answers. For example, a question may be posed as to which countries border on the Black Sea, and players would enter the names of countries via the keyboard 356 along with wagers that the countries entered are the correct answers to the questions. Prizes can be gradated commensurate with knowledge presented. In a similar fashion, the studio program might involve mathematical calculations which would be performed by the players at the remote stations, multiple choice answers would be provided on the television screen 208 at each playing station, and the players would bet on the right answer. In this case, the outcome of the wagering would depend on the players' skills as well as on luck. In the simplest situation, it is possible to practice the invention without a transmission of data and instructions from the central station 202, as in the case of a game of lotto wherein each player chooses six numbers out of a set of one hundred numbers. In this case, data of the event including the time and rules could be published in a newsletter, and instructions for operation of the computer 804 could be provided in a magnetic medium of the memory 806 (FIG. 26).

As has been described above with reference to FIGS. 4, 8 and 26, the response unit, in its various embodiments, outputs a record such as the card 362 providing data as to a player's response. The outputting of the record is indicated at block 936. The record may include a player's score and identification (I.D.), as well as the serial number of a response unit and other data. In similar fashion, the response unit 800 employed in the conduct of wagering in FIGS. 29–31 also outputs a record such as the card 362 by means of the dispenser 360 to provide information as to a player's wagering. In particular, the number or set of numbers selected by a player, as in a lotto game, the identity of a winning racer, as in the case of a horse race or ski race or boat race, by way of example, or selected elements of a game show which may include an article of clothing or a geographical place or the author of a book, by way of example, is imprinted on the card 362. For ease of describing the invention, the outputted record may be described as the card 362, it being understood that the outputted record may have the form of a tape, coupon, entry ticket or other of various forms as have been described above. The card 362 is conveniently carried by a player to the redemption facility 906 to obtain a prize.

In accordance with a feature of the invention, protection against a forgery of the card 362 is provided. This is accomplished as follows. In addition to the recording of a player's response and identification on the card 362, the response data is recorded automatically also in a storage unit 940 of the data facility 904 via block 938. The storage unit 940 is inaccessible to players and all other persons except for authorized personnel conducting the lottery or other form of wagering. Communication of the wagering data from the playing stations 206C is accomplished via the communication system 910, particularly via the telephone lines 636 and the switchboard 622 to the data facility 904. Later upon redemption of the card 362 at the redemption facility 906, the invention provides for the process steps of authenticating the record, at block 942, and only after a successful authentication, redeeming the card or coupon at block 944. In the process of authentication, the redemption facility 906 communicates via the communication link 926 to the data facility 904 to interrogate the storage unit 940 to attain the copy of the record, this being followed by a comparing or the data on the record copy of the data facility 904 with the record on the card 362. Any alteration of data on the card 362 will cause a disparity between the two records of data resulting in a rejection of the card 362. Thereby, the system and methodology of the invention are rendered forgery proof.

In a typical wagering situation, the entering of data by a player (block 932) into the response unit 800 is accomplished within a preset amount of time allocated for the response, after which the response unit 800 refuses further entries in accordance with commands of the instructional signal as described hereinabove with reference to FIGS. 4, 8 and 26. Alternatively, or additionally, following an announced point in time, command signals may be transmitted from the central station 202 directing the switchboard 622 to terminate transmission of further entries to the storage unit 940. Thereafter, in accordance with the process of the invention, a host at the central station 202 announces the winning entity such as the winning number or set of numbers of a lotto game or the answers to a game of geography or other form of game, at block 946, and broadcasts the winning entity to players at the remote playing stations 206C via the communication system 910. Additionally, the winning entity is communicated to the response units 800 at the playing stations 206C via the communication system 910, and to the data facility 904 via the communication link 928 for storage in the storage unit 940. Communication of the winning entity to the response unit 800 is indicated at block 934 (FIG. 31), and communication of the winning entity to the data facility 904 is indicated at block 938.

The winning entity includes a reference element against which a player's response can be compared to determine the correctness of the response. The reference element is established, typically, by the host at the central station 202 at block 948 for transmission to the evaluation unit 808. For example, in the case of a lotto game wherein a player is to select six numbers from a set of one hundred numbers, the reference element would comprise the six numbers to enable the evaluation unit 808 to compare a player's response to the six numbers. In the case of a race, the reference elements of participating racers can be one, two, three and so forth. Alternatively, if the wagering game required a player's response to fall within a range of values, such as in a case wherein a player is to guess the average summer temperature in Alaska, then the reference element would provide the average temperature and the requisite range of values to enable the evaluation unit 808 to compare a player's response with the designated average value, and also to determine if the player's response falls within the range. Utilization of the evaluation unit 808 is accomplished by continuing the inventive process at block 950 wherein each player's response is compared to the reference element. Each player's response and the reference element are coupled, respectively, from the data facility 904 and from the central station 202 to the evaluation unit 808, and the result of the comparison is fed from the evaluation unit 808 back to the data facility 904 for storage in the storage unit 940.

The invention provides for still further evaluation of a player's response in the form of a scoring of the response at block 952 by use of the scoring computer 902 in accordance with instructions from the central station 202 provided at block 954. Data for the scoring computer 902 is provided by the data facility 904. This additional evaluation is useful in the foregoing example in which a player wagers on the value of the average summer temperature in Alaska. The instructions at block 954 may provide for a highest score to a player who selects the correct value of the temperature, and lower nonzero scores to all players who have selected temperatures falling within the designated range. Additional score points may be awarded, by way of example, for player responses closer to the correct value than an average deviation of selected values from the correct value. Thus, the scoring computer 902, in this example, would compute the average deviation of selected values from the correct value, in the process of scoring the responses. In the case of a race, such as a horse race or a sailing race, the scoring computer 902 would evaluate the odds based on the responses of all the players, and then employ the odds in computing each player's score.

With respect to the magnitude of a wager entered by a player, the magnitude may be expressed as a dollar amount or an amount of points, or an amount of gifts to be presented by an advertiser, by way of example. The scoring computer 902 also multiplies the amounts wagered by the players' scores to obtain the total prize or award due each player. In the event that the amount of prizes to be awarded is based also on the total amount wagered, as in the case of a purse at a horse race, then the scoring computer 902 also calculates the total amount wagered for computing the amount of each prize. Suitable programs for operating the computer 902 to accomplish these calculations are well known, and need not be described herein. The resulting scores and magnitudes of prizes are stored in the data facility 904, and are also transmitted to the central station 202 for subsequent transmission to the response units 800 at the playing stations 206C. At each of the playing stations 206C, the dispenser 360 of the response unit 800 imprints upon the card 362 data as to the amount of the prize. The card 362 is now ready for presentation at the redemption facility 906, and the data facility 904 has a copy of the data on the card 362 to permit the authentication step to proceed prior to redemption of the card 362. Thereby, the invention has accomplished a twofold goal of being adaptive to a large variety of wagering situations, and of providing a forgery-proof process for redemption of the cards 362.

The features of the invention, as provided by the system 900, are readily implemented in a fashion convenient for people at home, as well as other locations, as may be appreciated from the ensuing discussion of the operation and the advantages of the invention. The invention is applicable to the conducting of a large variety of games of chance including lotteries wherein players can participate in their homes and obtain entry tickets, such as in the form of the card 362, by way of example, directly in their homes. Furthermore, the players can pay for their wagers without leaving their homes, so that players who do not win do not have to leave their homes, and players who do win need make only one trip to a local lottery agent at the redemption facility 906 to collect their winnings.

FIG. 29 shows the use of the central telephone facility 702 in conjunction with the switchboard 622 to provide a convenient method of paying for one's wagers without leaving the home. By means of prior arrangement with the telephone facility 702, a player at any one of the playing stations 260 is provided with a personal identification number (PIN) which is readily entered via pushbuttons on a telephone to identify the player to the telephone company. The PIN number securely identifies the player to permit a monetary charge to be placed against his account in the same fashion as a charge is placed for a long-distance telephone call. The PIN number and the amount of money being wagered can be applied via the keyboard 356 and the modem 634 to be received by the telephone facility 702 in the same fashion as can be accomplished the use of pushbuttons on a telephone, but at a much greater convenience than by use of the telephone. The keyboard 356 in conjunction with the computer 804 and the modem 634 enable a player to attain connection with the data facility 904 in much the same fashion as a computer terminal may be employed in the home to interrogate a computer service, such as a service providing legal, medical, travel, financial, or other materials as are currently available. By means of the authorization unit 908 which checks the PIN number, the telephone facility 702 ascertains that the player is a bona fide approved user of the telephone system.

The amount of money wagered is billed automatically by the telephone facility 702 to the bank 708 of the player, or telephone subscriber. To facilitate this billing function, the computer 804 may tally the amount of all wagers being entered by a player in response to a game show or other wagering situation presented by the central station 202 and then, upon completion of a succession of wagers, present via the modem 634 the total value of the wagers to be deducted from the players account in the bank 708. If desired, an indication of payment by the player may be transmitted by the telephone facility 702 to the data facility 904 to ensure that there is no consideration of a player's wager until after payment has been made. The process of billing the player, or telephone subscriber, is similar to that described above with reference to FIG. 24. Alternatively, the billing may be performed by a separate entity (not shown), such as by a service provider connected via telephone lines to the switchboard 622.

It is an advantage of the present invention that the identity of winning players and the amount won can be announced on television or radio immediately following the drawing of a winning number. The convenience of use of the inventive wagering system contrasts greatly with wagering processes presently available to the general public. At the present time, individuals who wish to participate in a lottery must visit the location of a local lottery agent or retailer to purchase a lottery ticket. Thereafter, a second trip is necessary to collect the winnings at the agent's location. The identities of winners often are not publicly announced immediately following the drawing, and sometimes are delayed for one or more days. Normally, no televised entertainment value is attached to a lottery. These and other drawbacks are overcome by the present invention.

The response unit 800 is registered in the name of an owner, such as a TV viewer who may elect to become a player in a wagering game. The hard-copy records dispensed by the response unit 800 can bear identification data tracing the hard-copy record back to the specific response unit. The user's name may even be printed on each ticket. The hard-copy record, described above as the card 362, may serve as a coupon, ticket, or proof-of-entry ticket for participation in a lottery or other wagering situation. Furthermore, as noted above, the card may also serve as a winning ticket by which a player redeems; his prize at the redemption facility 906.

The card 362 may be provided with validation data and coded markings, as has been described above, for additional security to be used in conjunction with the forgery-proof benefit provided by the placing of a copy of the card data in the data facility 904 in a secure fashion which is inaccessible to all persons other than personnel operating the data facility 904.

If desired, a player may select his or her own lottery number, and to compare a selected number with a winning number printed on the hard-copy record without delay, to enable the player to determine whether a prize has been won. A ticket or card 362 may be printed with alphanumeric characters which are readable by the player, and/or by means of bar coding which is to be read by machine for increased accuracy and security in the ticket redemption process. Furthermore, by printing both the winning number or entry along with the player's entry on the ticket prior to the drawing, a player is able readily to compare his entry with a winning entry. In terms of construction of the system 900, the data facility 904 may be located distant from the central station, or may be located on site with the central station 202. Also, the scoring computer 902 and the evaluation unit 808 may be located at sites distant from both the central station 202 and the data facility 904 or, alternatively, either one or both of the computer 902 and the evaluation unit 808 may be located at the central station 202 or the data facility 904. Furthermore, while the playing stations 206C are located normally at considerable distance from the central station 202, such as in a different city, it is within the inventive concept to locate one or more of the playing stations 206C relatively close to the central station 202 as is done in the situation of a studio audience participating in a contest, or in the aircraft shown in FIG. 11. Also, by virtue of communication between the data facility 904 and the central telephone facility 702, different credit limits can be set for different lotteries such that the storage unit 940 is provided with credit limit data prior to the conducting of a lottery or other wagering situation. A wager which exceeds the credit limit is rejected by the data facility 904, and the telephone facility 702 is directed to credit the subscriber's account in the bank 708.

If desired, the data facility 904 may store additional data of players who have registered to play a wagering game. For example, photographs of individual ones of the players may be stored digitally in the storage unit 940 for subsequent transmission to the central station 202 followed by a television transmission, to the playing stations 206C to allow all members of the viewing audience to see a picture of a winning person. If desired, the televising of a person's previously stored picture may be employed for participation from a remote station in a game show even without the placing of a bet on an outcome of a game show. The game show and the lottery may be, but do not have to be, televised from the same central location.

Developments in compression techniques by communications companies make it possible to send vast amounts of data not only over optic fiber cable, but over stranded telephone wires and other non-optic cable. Transmission rates of 64 kilobits-per-second have been announced by AT&T Bell Laboratories for a so-called Integrated Services Digital Network designed for video phones. This technique allows transmission of two high-speed digital channels of data or voice traffic over a single twisted-pair copper phone line.

Compression techniques permit sending pictures of video resolution and quality over such telephone wires. This technology makes it possible to conduct complete game shows by telephone provided the home phones are equipped with a screen and a speaker or some other audio means. Thus, a telephone facility which can be a central facility, whether national regional, or local in scale, takes the place of the broadcast stations, i.e. of the network, cable, and radio stations. Telephone subscribers touch or tap a dedicated number to establish contact with the telephone center, requesting a quiz program and authorizing an appropriate debit on their phone bills.

Using compression techniques and video-equipped phones at such subscribers' homes, a telephone network operator conducts the same kind of quiz described hereinabove. The amount of prizes earned by successful participants is credited to their accounts with the telephone company, a bank, or other institutions. When printers are connected to subscribers' phones, coupons having value or magnetized cards can be generated.

In another embodiment of the aforesaid TV and radio station network, combined with the telephonic transmission compression techniques, a scenario will be described.

TV and/or radio stations receive task sets from a central telephone facility. However the stations do not transmit the task selected to their audiences, but transmit both the task and response criteria back to a telephone facility in their market area, where the information is stored in memories at the appropriate hubs. The participating telephone company transmits the task and allows time to its subscribers on its picture phone and upon expiration of the time limit processes only responses received in time from identified subscribers on its hub evaluation equipment.

This method permits radio stations to participate in the network and the sweepstakes program on the same terms as a TV station, because the video portion as well as the audio portion is sent to subscribers' video phones.

The names of identified respondent subscribers can be transmitted from each hub to a central storage facility until the sweepstakes drawing takes place at the end of the program. Alternatively, the subscribers' names are temporarily retained in the hub memories and then entered directly in the sweepstakes drawing. Using known technology, names of viewers can be announced and their pictures can be shown at the end of the program that asked the question.

To ensure additional protection against forgery various identification numbers or other indicia may be imprinted in coded format, or in an invisible format such as by use of magnetic media, or holographic optical recording media, with a copy of the identifying data being stored at the data facility 904. A ticket presented for redemption must have the requisite identifying data.

In the playing of a lottery game, the player has the option of selecting a winning number or, alternatively, allowing the computer 804 of the response unit 800 to pick a number for the player. This may be accomplished by providing a random number generation program for the computer 804, such programs being well known. Thereupon, the computer 804 is able to select in random fashion one or more numbers from a set of numbers used in the lottery.

The capacity of the system of the invention to create and to dispense wagering tickets with security against cheating is an important object of the invention because this allows players to operate their response units, including the printers, in their homes without danger of someone tampering with a printer to forge a winning ticket. The validating data imprinted on a ticket and the comparison of data with previously stored data in the central data facility enable a foolproof verification of the ticket. By virtue of the invention, the printer cannot be used as a forgery tool. Also, the system meets the objective of providing convenience to players by allowing persons to participate on the spur of the moment in a lottery game or other predictive contest while being debited automatically without leaving their home. The conduction of wagering in conjunction with a task, contest or game of skill rewarded with a prize adds significant entertainment value and possibly instructional value to the wagering experience. Game of lotto and bingo can be accomplished with particular facility by the invention, and the capacity for immediate announcement of winners on television enhances excitement among the participants.

The systems and the methods of the invention apply to events or games, by chance, such as lotteries, and to events or games covered by knowledge, skill or ability, such as quizzes, tournaments, bouts, contests, and races by humans, machines and animals. It should be understood that a prediction may pertain, for example, to an event of the past, but not known or no longer remembered by a player, so as to constitute a de facto prediction from that player's perspective. An operator or judge of a game of chance or skill determines the rules or conditions that are to be met to qualify for a prize. For example, in a form of betting known as "off track" betting on a horse race, there are odds governing payoffs to winners. The odds are determined at a central location and are reflected in the winning wager information transmitted from the central location to the remote playing stations for imprinting on the players' tickets.

In the practice of the invention for wagering, the terms "operator" or "organizer" of a game of chance or skill are intended to include all individuals in charge of such gaming activities or in any kind of decision-making capacity, including judges, referees, handicappers, umpires, racing committees and other officials. The terms "forgery-resisting" and "tamper-proof" are intended to include prevention and alteration, as well as the preventing of tampering with an object of the forgery, typically a lottery ticket, and also includes making inaccessible and preventing electronic access to the object of forgery. The terms "fee" or "charge" are intended to include the meaning of debit, cost, or price charged to participants in a wagering situation. The terms "wagering", "betting" or "gaming" are intended to include the meaning of players' predictions of, or bets and wagers on, the total, final, midstream, or partial outcome of a game of skill, such as a golf tournament, and includes also the wager amount. The term "ticket" is intended to include the meaning of vouchers, coupons, certificates and other hard copy records.

The term "presentation" of a wagering situation or scenario is intended to include a presentation over TV, radio, and/or the telephone. The term "authentication" is intended to include processes of validation, verification, confirmation and acceptance of a winning ticket. The term "matching" as in "matching numbers" is intended to include any predetermined relationship between a player's entered data and the determined reference element, and between selected and winning numbers, such as a mathematical, partial, or zero relationship. The term "forgery-resistant data storage facility" is intended to include any facility in which stored data are protected against tampering, are inaccessible, or beyond the reach or influence of would-be forgers. If a wager is offered by an operator and such wager carries only a single type of fixed award, for example, or if only one wager amount is offered, then the term "wager amount determined by a player" is intended to include the acceptance of such fixed wager.

The term "game show" is intended to include the meaning of one or more questions, quizzes, predictions and solicitations to perform a task. The term "response" is intended to include the meaning of an answer and of a prediction. The term "scenario" is intended to include the meaning of a presentation, definition, view or description of an event or a situation. The term "entered wager" pertains to data entered by a player prior to the determination of the data constituting a winning wager. The term "winning wager" pertains to an entered wager having a determined correlation to a reference element. The term "reference element" pertains to data, such as a number, by which an entered wager is judged in order to determine whether the entered wager is a winning wager. The term "reference element" is intended to include measurements and expressions of evaluation, such as points scored, time consumed, judged performance, achieved ratings and standings of participants and players/contestants.

In a preferred embodiment of the invention, the operators of a game of chance decide on a formula by which prizes may be won by players whose selected indicia do not completely match a winning indicia. Rewards may be granted to players whose selected number or indicia come closest to the winning indicia. Players may enter selected indicia up to a cutoff point in time determined by a game operator; also, means may be provided for modifying a selected wager prior to the cutoff point. By way of example, if a winning indicia is the number 100 and the prize is $50,000 for a completely matching number, the following formula may be determined and applied in the event that none of the players has selected the number 100. Players having selected number 101 or 99 divide $30,000 among them, and players having selected numbers 102 or 98 divide $20,000 among them. Other schemes may be employed.

As has been described above, a number or indicium may be selected by a player or may be established by random selection. The number assigned to a player is communicated to the central data storage facility prior to a drawing of the winning number.

By way of further example in the use of the invention, a question may be posed in a TV show, the question asking the years in which World War I began and ended. A time limit for answering and a prize also are announced. A winning player would enter the years 1914–1918 in the response unit. The response unit prints out a ticket stating the players' entered information and identification. The response unit also transmits the same information via a modem and a telephone line to the central data storage facility.

When or after the host of the TV-show has announced the correct answer on the air, the signals conveying the correct answer and prize information are transmitted from the location of the TV-show to players' remote response units. The response units print the winning information on all players' tickets for comparison purposes. Winning tickets on which a player's entered information matches the winning information may be presented by the ticket holders at an appropriate location for redemption or playoff. As described above, the agent at the location can verify the authenticity of the ticket by communicating with the data storage facility and obtaining confirmation. In the case of a ticket formed as a magnetic card, the magnetic card can be validated by passing it through a well-known scanner connected to the data storage facility, the scanner reading the data recorded on the card for transmission to the data facility whereupon the data facility transmits back a signal acknowledging verification or denying verification.

In some instances, the conditions under which a lottery is conducted are similar in many respects to those of sweepstakes and other games. The present invention therefore is intended to be applicable to any game, contest or wagering based on knowledge, skill, or chance, in which it is important to prevent tampering with or forging of hard copy records by interested parties. While it may not be necessary to employ all the safeguards described herein in connection with every wager, the operator of the wager game has the option of employing the security measures disclosed herein. For example, in the case of wagering situations for which prizes of high value may be awarded, there may be further storage of a player's data indicia, number or symbols in an accessible location to facilitate secure redemption of a ticket. In the event that a player's betting exceeds acceptable monetary limits, the automatic billing via the telephone system, as disclosed hereinabove, may limit the amount of betting and disclose to the central data facility and to the response unit a rejection or limitation of bets exceeding a previously established limit. When required, players are notified and are asked to communicate their wager information to a designated location for storage and comparison purposes. Such a notice to players makes it clear that tampering with a player's home response unit is useless. Thus, players are dissuaded from attempting forgery or other form of falsification.

Security is enhanced further by providing the response unit with a registration or serial number by which each response unit is registered in the name of its owner. Hard-copy records dispensed by the response unit may bear the same serial number, if desired, to enable tracing of a hard-copy record to the specific response unit which generated the record. This security is in addition to that provided by the PIN number described above by which a player gains access to the telephone system. Normally, in a wagering situation, a time limit is established electronically for the entering of wagers at the keyboard of each response unit such that a late entry, made after the time limit becomes effective, are not stored at the central data facility, and are not printed on the player's ticket, this precluding the player from winning a prize for a late entry of wager.

In the printing and dispensing of hard-copy records by a response unit, it is noted that the records may have a variety of forms which facilitate different manners of utilizing the hard-copy record. For example, in the event that a ticket is employed wherein the winning number and a player's entry are printed, the player has the opportunity to check as to whether he has won, or to the extent in which he has won in the event that various levels of winning are present. In the event that a magnetic card is employed as the hard-copy record, the card can be utilized in connection with automatic electronic debiting of a player by the amount of the wager, and with an automatic electronic crediting of winnings to a player's account. Equipment, such as automatic banking machines employing card readers, are already available for cooperation with the inventive system for providing these functions of crediting and debiting. Bar codes and bar code readers may also be employed in which case the bar code is imprinted on a ticket along with data imprinted with alphanumeric characters to be readable by a player.

As has been described above in the operation of a response unit, the invention enables participants in the remote audience to designate areas of interest. This is particularly important with respect to an award received by individual ones of the participants, such that the award is related directly to a participant's area of interest. Thus, in the case of a game show wherein advertisers' products are displayed in various areas of interest, a participant of the remote audience can select a product area of interest and, subsequently, receive an award in the form of a coupon allowing him to purchase a product in the area of interest. This greatly increases a participant's interest in the game show. This feature also increases greatly the chance that a participant will employ his coupon, as by visiting the store of an advertiser to redeem the coupon. Also, in a quiz program, a contestant is given the opportunity to select an area of interest from alternative areas of interest in which the contestant is believed to have a special knowledge area. Prize coupons may be available to winning contestants entitling the player to a discount on merchandise promoted by a sponsor. However, in the event of a discount coupon issued for a product that is not in demand, the unwanted product, most likely, would not be redeemed. However, unlike merchandising systems of the past where coupons have been issued in areas of little interest with consequential low rates of redemption, in the case of the present invention a high rate of redemption is anticipated because of the capability afforded to participants to select areas of interest, both with respect to manufacturers' or retailers' products as well of areas of interest in terms of a participants' knowledge.

In view of the use of the telephone system for communication of data between a response unit and the central data facility, it is possible also to employ the telephone system to substitute for communication via the television and/or radio in areas wherein television and/or radio reception are not available to a participant. Thus, by way of example, the progress of a contest can be reported via telephone to a participant. Also, if desired, such progress can be reported by a telephone to supplement data received via television and/or radio broadcast.

If desired, the central data facility or the telephone system may store financial information regarding individuals who are subscribers to a wagering service provided by the invention. The financial information may be updated periodically or when desirable, for instance each time a subscriber pays a bill or commits a sum to a wager. This enables the telephone or other service facility to check the financial standing or credit status of each player in the context of the wager a player wishes to make.

In accordance with a further aspect of the invention, it is noted that the concept of playing a game by responding to stimuli, such as a scenario presented by television, by radio or by telephonic communication, can be extended over a period of days, weeks, or even months. Scenarios may be authorized such as in the case of dramatic or prearranged scenarios. Over such an extended interval of time, a respondent might make entries via the keyboard of the response unit 22 (FIG. 4), 210 (FIG. 8) or 800 (FIG. 26), or update entries during participation in a game, a contest, an educational process, a process for shopping for merchandise, or other extended field of endeavor. An extended playing or responding interval can be illustrated readily with respect to a shopping for items that may be offered on sale or at a discount at some future time. The basic procedural steps follow those which have been described above for the conduction of an educational game. There follows an example by use of the system 200 of FIG. 6 with the response unit 800 of FIG. 26.

The extended shopping interval proceeds as follows. A list of items obtainable by purchase at a local market is set forth in a listing contained, by way of example, in a newspaper, in a mailing to householders, or on the television screen 208 along with identifying numbers which are provided also to the memory of the response unit via the instructional signal. The listing may comprise all of the products obtainable from a manufacturer or from a retailer, even if only some or none of the products are on sale or discounted at the time of the listing.

The respondent employs the keyboard to enter into a memory of the response unit the identifying numbers of those items for which there is an interest in a future purchase at a sale or discounted price. From time to time over the ensuing days, weeks, or even months, the instructional signal transmits to the response unit an updated listing of the items of merchandise including data of items put on sale or on discount by the manufacturer or retailer. This effectively flags those items which are on sale or available at discount. The computer 804 (or a comparator 372 or 374 in the case of use of the response unit 210 of FIG. 8) compares the respondent's entries with the flagged items, and then indicates a match by a suitable indication such as by sounding the bell, and by leaving a message on the display 358 of the response unit. The respondent, by command entered at the keyboard, directs the printer to list the sale or discounted items. Alternatively, respondent enters on the keyboard items desired for purchase and, upon such items being put on sale, the printer of the respondent's response unit prints out coupons conveying a discount on the items without additional commands by respondent. Such discount coupons may be printed even during an absence of the respondent, and will be waiting for the respondent upon his or her return.

Furthermore, with respect to the wagering aspect of the invention, the respondent, or player, can wager on which item or items may go on sale or be discounted. The selected items serve as the subject of a bet in the same fashion as presented in the foregoing description of the wagering.

The foregoing description has demonstrated that the various configurations of central station and remote station can be employed additionally in the conduction of a wagering situation, either by itself as in a game of lotto, or in conjunction with an educational program, a sporting event, or a program directed specifically to products of interest to an advertiser, by way of example.

FIGS. 32-40 show a further inventive feature which is obtained by linking numerous central stations together in a common network with a single base station which provides program material for retransmission via the central stations of the network. Each of the central stations may be of the form disclosed hereinabove with reference to FIGS. 3 and 6. Alternatively, one or more of the central stations may be simplified from those disclosed in FIGS. 3 and 6 to include only such equipment as found in broadcast stations. The linkage, in the form of a communication network, provides for an enlarged area of broadcast for the network programs, the broadcast area being substantially larger than that obtainable by use of a single central station. The network program may be in any one of a number of forms, particularly in the form of a contest having a duration in a range of time extending from less than one minute up to possibly several minutes. Such network programs may be interspersed among regularly scheduled programs provided by respective ones of the central stations for presentation on television or radio. They may also be repeated. The regularly scheduled programs provided by respective ones of the central stations may be similar or disparate. The network broadcast may take the form of a well-known network communication commonly employed today for news programs communicated across the country simultaneously to local broadcasting stations for retransmission to home radios and television. Alternatively, a separate network employing satellite communication or a telephone network, by way of example, may be employed to transmit the network program from the base station to each of the central stations.

The individual network programs are transmitted one after the other from the base station in a sequence continuing, if desired, throughout the day. Each of the network programs occupy a predetermined time slot within a program sequence wherein the times of occurrence of the various network programs as well as, possibly, the contents of the network programs, have been made known previously to the managers or hosts of the various central stations of the network.

The invention provides that each central station is free to select specific ones of the network programs for rebroadcast in accordance with the program scheduling of the central station. This provides freedom for the host of the central station to employ network program material which may be live or previously prepared. In the case of live network program material, the network program material may be prepared with the aid of a program host in a studio at the base station, which studio may be constructed as disclosed above with reference to FIGS. 3 and 6. Previously prepared material, such as prerecorded material, may be provided by the base station in a manner similar to that disclosed in FIGS. 11-21 for the utilization of prerecorded program material.

A great advantage of the invention is that the use of the network program material interspersed among local programming material allows people across the country to participate in a common contest, or a common learning experience, or in a common national survey, by way of example. The use of predesignated time slots allows the central stations to insert the network programs within the regular broadcasting schedules of the respective central stations in a manner similar to that of the usual interruption of a broadcast program for a message from an advertiser or sponsor. Thereby, the invention allows for the participation of people from across the country to be accomplished without need for any significant rescheduling of local programming.

Many people in the broadcast audience can participate by responding to tasks or questions set forth in the network program. For example, it is anticipated that there will be many responses occurring during a relatively short interval of time following a broadcast of the network material nationally, such as a nationally broadcast contest wherein individual responses by participants, whether simultaneous or staggered, might be based on chance, skill, or prior knowledge. The nature of the response would depend on the nature of the task presented. To facilitate entry of the large number of responses, as well as to evaluate and authenticate the responses, the invention employs an electronic hub which is operated in conjunction with each central station. As will be described, the hub may include equipment such as the telephone switchboard of FIG. 22 interconnected with a facility for remote evaluation of responses (also disclosed hereinabove with reference to FIG. 22) in conjunction with authorization (FIGS. 24 and 29). Such authorization as well as automatic number identification (ANI) at a telephone hub allows for authentication (disclosed also in FIG. 29) of a participant in a network event such as a contest, and also permits a respondent to communicate a special message to a host of the event, such as permission to reveal the respondent's identity, or a request to remain anonymous. This enables participants from each local region of the national audience to present their responses by telephone. Furthermore, valid responses meeting the response criteria may also be communicated by telephone link from each electronic hub to the base station or another central facility for conduction of a sweepstakes or other prize event. The remote evaluation unit 808 (FIG. 22) allows for evaluation of responses from participants in each local area at a central site remote from the individual participants' receiving stations, such as the receiving stations 16 and 18 of FIG. 1 and 206 in FIG. 6. Optionally, evaluation can be accomplished at the individual receiving stations by a response unit such as the response unit 210 of FIG. 8 and 800 of FIG. 26. The use of a central evaluation hub is particularly advantageous because remote evaluation allows conduction of the contest or other form of network program to be conducted without need for specialized equipment at a participant's receiving station, there being a need for only a television (radio) and a telephone for enabling a person to participate.

Before continuing with a description of the benefits of the inventive feature of the networking of plural central stations, it is advantageous to describe the details in the construction and the practice of this feature of the invention.

Figure 32:
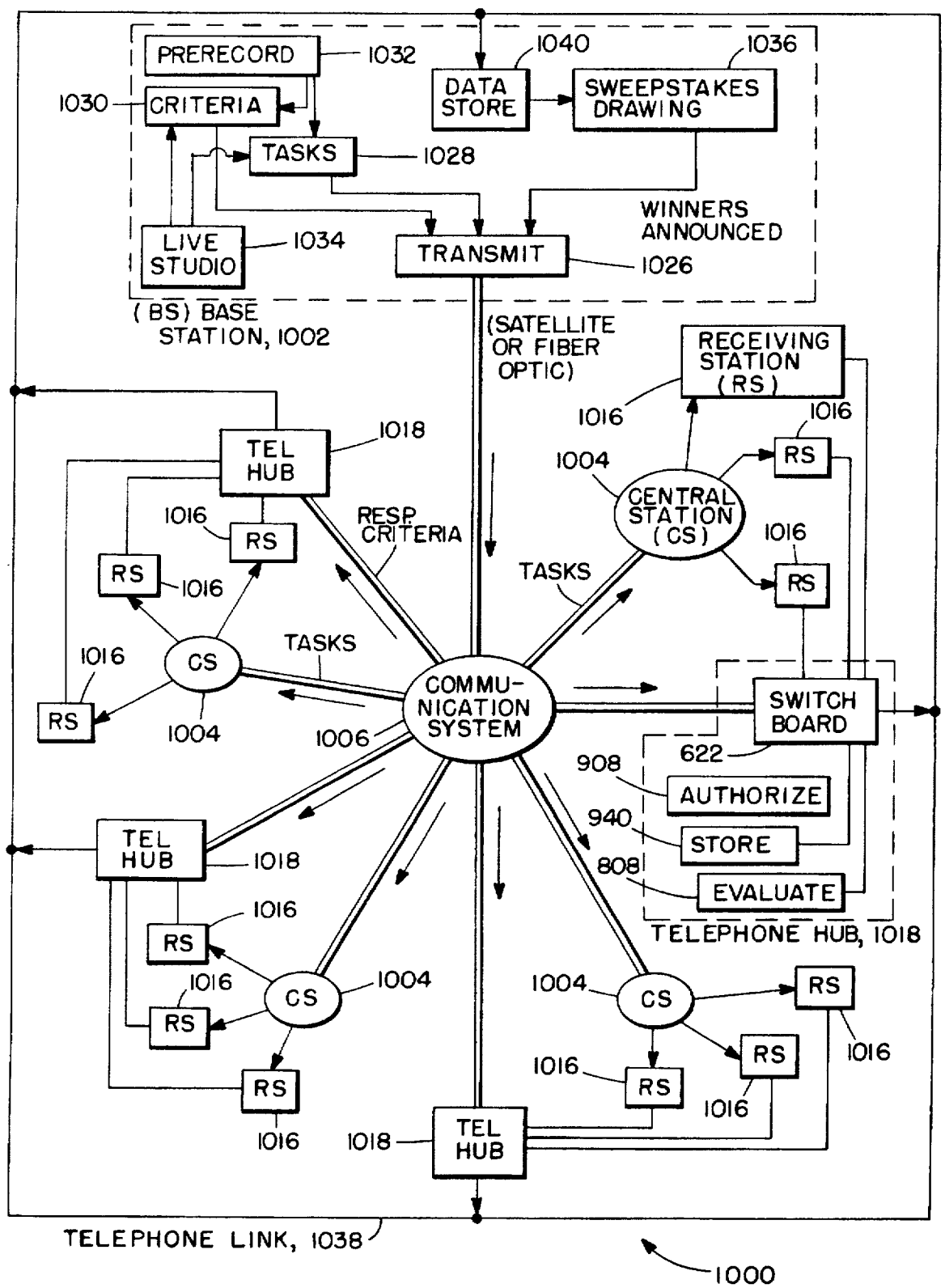
FIG. 32 shows diagrammatically a network of central stations and telephone hubs connected via a communications system to a base station with facilities for conduction of a sweepstakes.

FIG. 32 shows a telecommunications network 1000 comprising a base station (BS) 1002 and a plurality of central stations (CS) 1004 which are interconnected by a communication system 1006 for transmission of television and/or radio type signals including the signals of program tasks with their associated instructional and command signals including response criteria, response evaluation and response scoring as has been disclosed hereinabove with reference to FIGS. 1, 3, 4, 6, 8, and 26. The communication system 1006 may comprise, by way of example, the equipment of standard broadcast technology, telephone, or fiber optic communication links, or communication via satellite, the latter being employed in a preferred embodiment of the invention. Each of the central stations 1004 may be constructed as the central station 12 of FIG. 3 or the central station 202 of FIG. 6. In order to receive signals of the communication system 1006 via satellite, the central station 12 (FIG. 3) and the central station 202 (FIG. 6) may be provided with an antenna 1008 and a receiver 1010 coupled to the antenna 1008 for receiving a down-link signal from the satellite. In FIG. 6, the receiver 1010 is connected directly to the combiner 238, and the combiner 238 is understood to operate in a fashion which allows for a coupling of signals from the television camera 228 to the transmitter 40 or the coupling of signals from the receiver 1010 to the transmitter 240 or, alternatively, if desired, a coupling of both signals of the camera 228 and the receiver 1010 in the manner of a split-screen television presentation. By way of example, in the case of the split-screen presentation, the scene from the camera 228 occupies a major portion of the television screen 208 while a smaller portion, such as a corner of the screen 208, may be employed to present a scene, or a portion of the scene of a video presentation from the base station 1002 (FIG. 32). In FIG. 3, the receiver 1010 is connected via a storage unit 1012 and a selector switch 1014 to the combiner 70. The storage unit 1012, which may also be employed with the combiner 238 of FIG. 6 if desired, provides for momentary (or longer) storage of program material received via telecommunication system 1006 so as to facilitate interspersing of the network program from the base station 1002 with material from the television camera 54.

The switch 1014 allows the host 50 (FIG. 3) to select program material from the camera 54 or from the base station 1002 (FIG. 32) to be transmitted to the remote receiving stations 126 and 18 (FIG. 3). The function of the switch 1014 is understood to be included within the combiner 238 of FIG. 6. By way of example in the use of the storage unit 1012, the studio 14 (FIG. 3) may be producing a talk show wherein persons in the studio audience are still speaking at the moment when the network program material arrives from the base station 1002 (FIG. 32). The storage unit 1012 would then be operated to store the material until the speakers finish, possibly after a delay of ten seconds to one-half minute. Thereafter, the material stored in the storage unit 1012 is read out to the combiner 70. Thus, the storage unit 1012 is normally operated as a delay unit to delay presentation of the network material of the base station 1002 for proper interspersing of the network material with the local program material of the camera 54. The storage unit 1012 may be employed also for long term storage of network material should it be desirable to include such network material with local programming material at a later date.

In FIG. 32, each of the central stations 1004 broadcasts its program material to plural remote receiving stations (RS) 1016 of which three stations 1016 are shown by way of example. Each of the receiving stations 1016 may include equipment disclosed in FIG. 3 for the receiving stations 16 and 18 and in FIG. 6 for the receiving station 206, or equipment of the remote station 206B of FIG. 22, as well as the response unit 800 of FIG. 26. Associated with each central station 1004 is a communications or telephone hub 1018 which includes a switchboard 622, previously described with reference to FIG. 22, for communicating with individual ones of the remote stations 1016 of the local audience of the central station 1004 via a telephone circuit such as the telephone lines 636 disclosed in FIG. 22. Each telephone hub 1018 further comprises the response evaluation unit 808 coupled to the switchboard 622 as disclosed in FIG. 22, a storage unit 940 coupled to the switchboard 622 as disclosed in FIG. 29, and an authorization unit 908 coupled to the switchboard 622 as disclosed in FIG. 29. The switchboard 622 includes a number identification facility 1020 (shown in FIG. 22), and is coupled via a satellite transceiver 1022 to an antenna 1024 (shown in FIG. 22) for communicating with the base station 1002 via the communication system 1006.

The base station 1002 includes transmission equipment 1026 for transmitting tasks 1028 and criteria 1030 via the communication system 1006 to the central stations 1004. The tasks 1028 are provided preferably as short televised programs posing questions or presenting situations for eliciting responses by respondents at the remote stations 1016. The criteria 1030 include instructions for evaluating responses and, possibly, securing the responses if desired. The tasks and the criteria may be provided as prerecorded material by recording apparatus 1032 such as the video and audio recorders 518 and 520 of FIGS. 11–16, and the audio recorders 520A–B of FIGS. 17 and 21. Alternatively, the tasks at 1032 and the criteria at 1030 may be provided by a host at a live studio 1034 which may be constructed, by way of example, as the studio 14 of FIG. 3 or the studio 204 of FIG. 6. By way of further example, the tasks may involve a prediction, as described hereinabove, and the prediction may be employed in the conduction of a poll. Therein, an acceptable prediction could be one deviating not more than 5% from the actual outcome. As a further example, in a basketball game, an acceptable prediction could be one in which the winner is predicted directly and the predicted point spread with deviation not more than 10 points from the actual outcome.

In the conduction of a program, via the base station 1002, such as a sweepstakes, the sweepstakes drawing takes place at 1036. At each telephone hub 1018, responses communicated from the station 1016 to the switchboard 622 are evaluated at a response evaluation unit 808 with results of the evaluation being stored in the storage unit 940. The storage unit 940 also stores information about prospective respondents to allow for authorization of each respondent at the authorization unit 908 before or after a sweepstakes drawing. Authenticated and acceptable responses are then communicated from the hub 1018 via a telephone link 1038 to a data storage unit 1040 in the base station 1002. The acceptable answers stored in the storage unit 1040 are employed in the sweepstakes drawing 1036 for selection of sweepstake winners. The winners are then announced by transmission of their names from the sweepstakes drawing 1036 via the transmission equipment 1026 and the communication system 1006 to the central stations 1004 for rebroadcast to the receiving stations 1016. It is noted that each of the hubs 1018 is connected to both the communication system 1006 and to the telephone link 1038 so that respondents in the receiving areas of each of the central stations 1004 can communicate their responses to the base station 1002.

Figure 33:
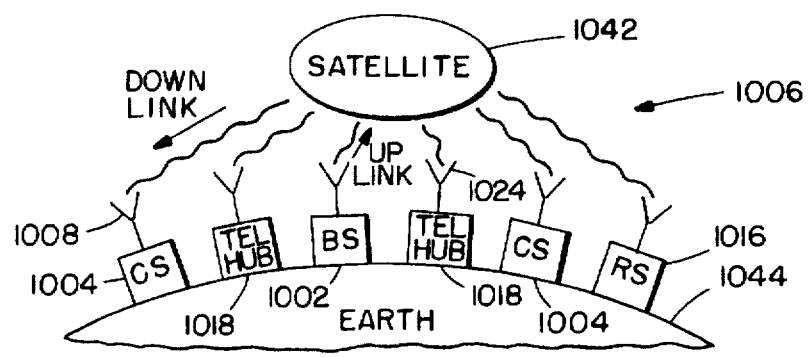
FIG. 33 shows diagrammatically a transmission via satellite of a network program from the base station to the central stations of FIG. 32.

FIG. 33 shows diagrammatically operation of the communication system 1006 via a satellite 1042 encircling the earth 1044. The base station 1002 transmits an up-link signal to the satellite 1042 which retransmits the base-station signal via down-link paths to the central stations 1004 and the telephone hubs 1018. It is also possible to equip the receiving station 1016 with a satellite-reception antenna and suitable receiver to receive the base-station signal directly from the satellite 1042 without the need for retransmission via a central station 1004.

Figure 34:
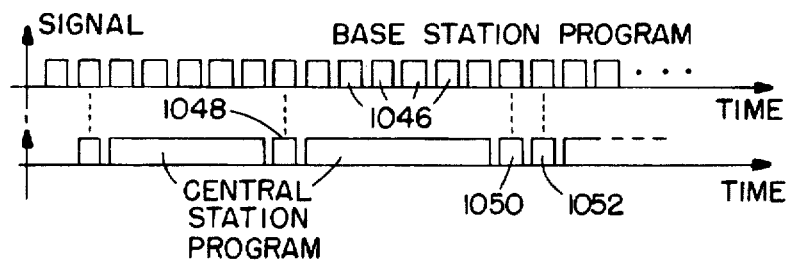
FIG. 34 is a timing diagram showing the generation of tasks of a base station network program in a sequence of time slots for interposition between regularly scheduled programs broadcast by central stations of FIG. 32.

FIG. 34 presents an upper graph representing a sequence of network programs transmitted by the base station 1002, and a lower graph which presents a sequence of local programs broadcast by a central station 1004. In the upper graph, a network program is transmitted in each of a sequence of successive time slots 1046 wherein the programs may differ from slot to slot and, if desired, may repeat from time to time. In the lower graph, the programs produced by the central station 1004 extend over time intervals having a length equal to many of the time slots 1046. The local programs of the central-station are scheduled to begin and to end in correspondence with an integral number of the time slots 1046, and to leave a space between successive ones of the local programs to allow for insertion of at least one of the network programs from the base-station as is indicated at 1048, 1050, and 1052. If desired, a network program can be transmitted concurrently with a local program from a central station by means of split-screen television technique.

Figure 35:
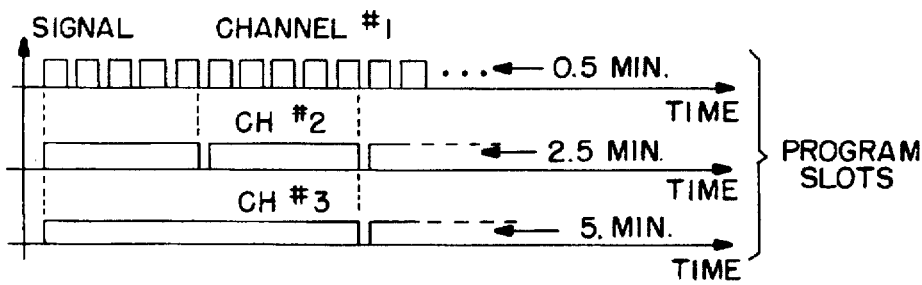
FIG. 35 is a timing diagram showing the generation of network programs at the base station of FIG. 32 in synchronized time slots of differing lengths.

FIG. 35 shows a situation wherein the programs transmitted by the base station 1002 may be of different lengths. Thus, the base station 1002 can broadcast over three different channels, by way of example, in which a first channel transmits short programs lasting only one-half minute. In a second transmission channel, the base station transmits a sequence of programs of moderate duration such as 2.5 minutes. The third channel has more lengthy programs, namely programs with a duration of five minutes, by way of example. The programs of the three channels are synchronized to a common time base, and allow a central station to select a short, medium, or longer network program commensurate with available time at the central station.

Figure 36:
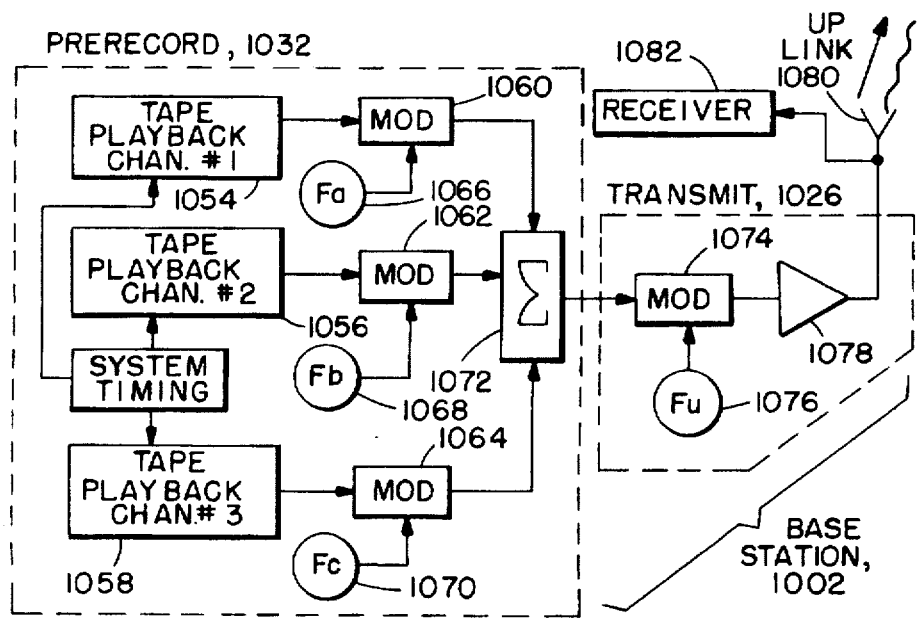
FIG. 36 is a block diagram of record playback and transmission equipment for use in the base station of FIG. 32.

FIG. 36 shows an implementation of the recording apparatus 1032 of FIG. 32 for playback of the plural channels of program slots (FIG. 35) at the base station 1002. As shown in FIG. 36, the recording apparatus 1032 comprises three tape playback units 1054, 1056, and 1058, respectively, for each of the three channels. The recording apparatus 1032 further comprises three modulators 1060, 1062, and 1064, three sources of subcarrier frequency such as three oscillators 1066, 1068, and 1070, and a summer 1062. The transmitter 1026 includes a modulator 1074, a source of carrier frequency, such as an oscillator 1076, and a power amplifier 1078. The base station 1002 also includes an antenna 1080 by which signals outputted by the amplifier 1078 are directed as an up-link transmission to the satellite (FIG. 33). If desired, the base station 1002 may include a receiver 1082 connected to the antenna 1080 for receiving messages via satellite link, possibly from the telephone hubs 1018 upon a down-link frequency different from the up-link frequency. If desired, a separate antenna (not shown) may be used for the receiver 1082. Also, the receiver 1082 may be employed during short intervals of silence between successive ones of the program transmissions, (by way of example) for reporting the quality of transmission.

In operation, each playback unit 1054, 1056, and 1058 provides for the playback of previously recorded program material recorded on a recording medium such as a magnetic tape. A signal outputted by the oscillator 1066 at a frequency Fa is modulated at the modulator 1060 with the signal outputted by the playback unit 1054 to output a signal to the summer 1072. By way of example, the signal outputted by the playback unit 1054 may be a television program. In similar fashion, the modulators 1062 and 1064 output signals to the summer 1072 in which the outputted signals of the playback units 1056 and 1058 are modulated on the subcarrier Fb and Fc, respectively. The signals of the modulators 1060, 1062, and 1064 are summed by the summer 1052 and are modulated by the modulator 1074 upon the up-link carrier signal Fu of the oscillator 1076. The signal outputted by the modulator 1074 is then amplified in power by the amplifier 1078 for transmission via the antenna 1080 to the satellite 1042.

Figure 37:
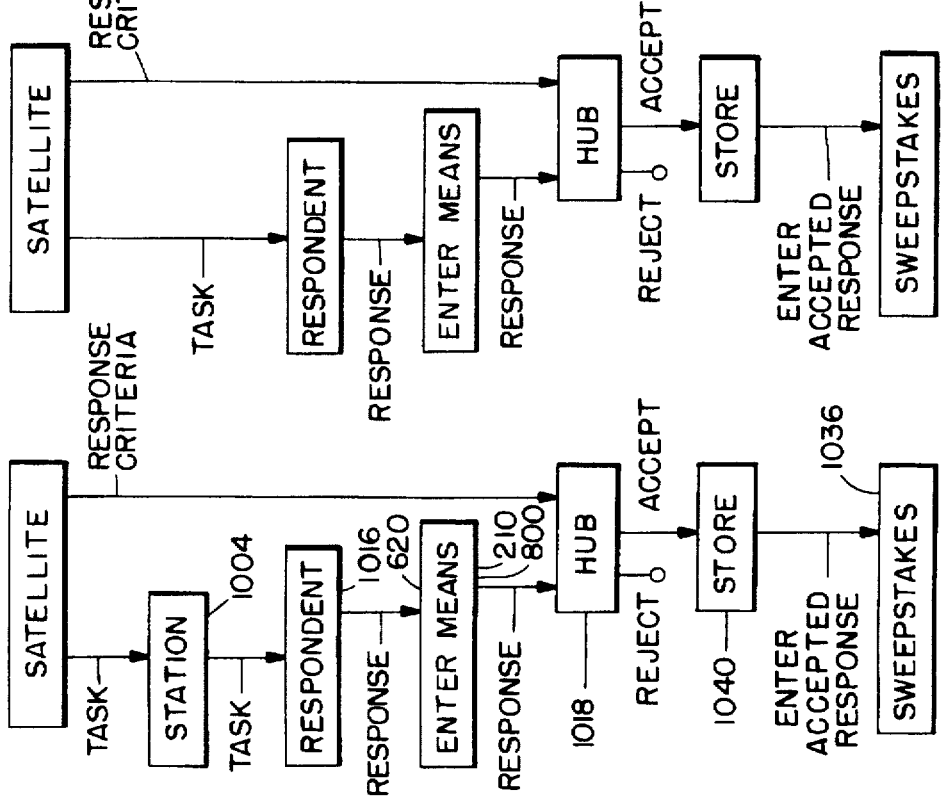

FIGS. 37–40 are flow charts representative of differing methods for employing the telecommunications network 1000 of FIG. 32. In FIG. 37, the down-link communication from the satellite provides both the task and the response criteria. The various aspects of the response criteria, including scoring instructions, if required, may be provided as a part of the audio spectrum as disclosed above with reference to FIG. 10, and are identified by codes to be decoded by decoders of the response units 22, 210 and 800 of FIGS. 4, 8, and 26, respectively. Thus, the telephone hub 1018 (FIG. 32) readily receives and processes the response by means of the evaluation unit 808. The task transmitted from the satellite is rebroadcast by the central station to the respondent at a receiving station 1016. The respondent then enters his response via a suitable entering means such as the response unit 210 or 800 for communication via a modem 634 (FIG. 22) to the switchboard 622 or, alternatively, the respondent may enter his response simply by use of a telephone, such as the telephone 620 with buttons 624. After reaching a central number at the hub, which may be an 800 number which is free of charge or a 900 number having a charge, the respondent simply enters a selected entry by use of the buttons 624 of the keypad of the telephone 620. It is also possible, by way of entry, to report the selected choice of answer to a telephone operator at the hub 1018. At the hub, the response is processed by verifying the authenticity of the respondent, and by evaluation of the response by use of the response criteria. In the case of a rejected respondent or rejected answer, the process ends at the hub. However, an acceptable answer is transmitted via the telephone link 1038 (FIG. 2) for storage of the response at the data storage unit 1040 of the base station 1002. Subsequently, upon conclusion of the time allocated for reception of responses of the respondents, there is a drawing of one or more sweepstake winners with the winners being announced via satellite transmission to the central stations 1004. Another prize event may take the place of the sweepstakes.

By way of alternative embodiments, it is noted that a hub 1018 may serve as a further central facility wherein the storage unit 940 may include magnetic recording tape as a medium for storing response criteria along with a playback device for playing back the response criteria in synchronism with the transmissions of network programs, thereby to provide the response evaluation unit 808 with the criteria for evaluating responses communicated electronically via telephone circuitry to the unit 808 from receiving stations 1016. It is noted also that response criteria may be bilingual or multilingual to permit respondents conversant in foreign languages to participate in a quiz or contest, portions of the quiz being made understandable independently of language by use of cartoons, by way of example.

Figure 38:
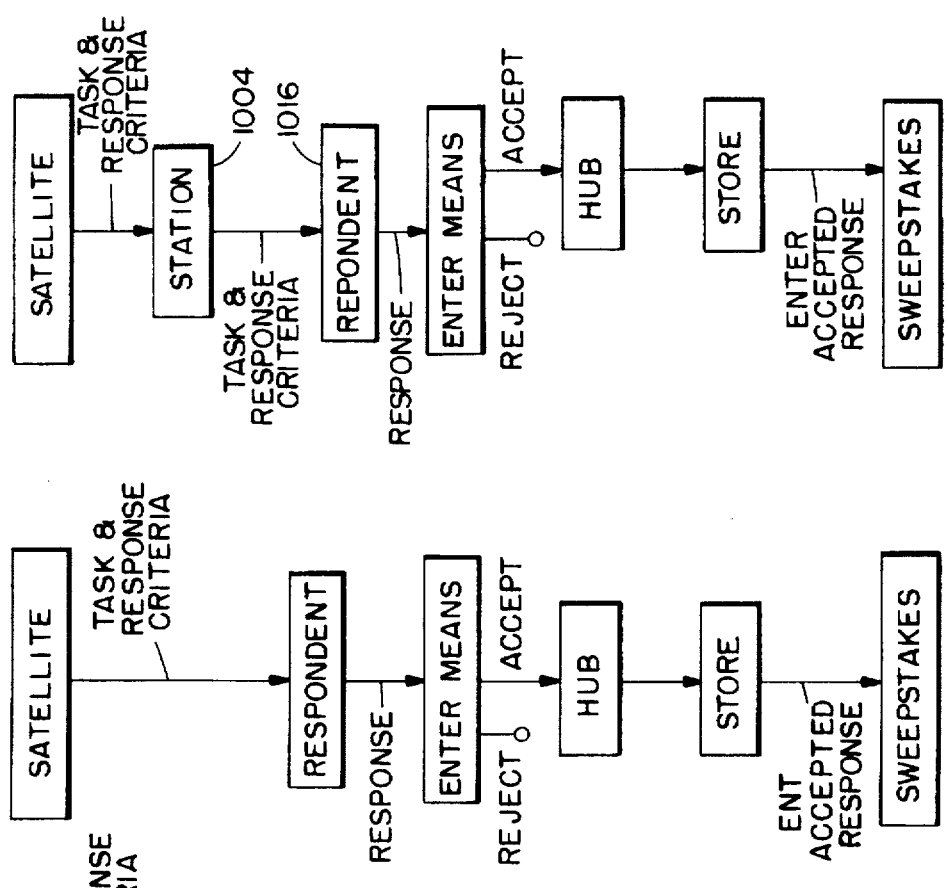

FIG. 38 shows an alternative arrangement which differs from that of FIG. 37 in that the central station 1004 is deleted. In FIG. 38, the task transmitted from the satellite is received directly by the respondent at a receiving station without the interposition of the central station and its rebroadcast function. The direct reception at the receiving station of the satellite signal may be accomplished, as shown in FIG. 1, by use of a satellite receiver 1084 and an antenna 1086. Down-link signals of the satellite impinge upon the antenna 1086 for reception by the receiver 1084. The receiver 1084 applies the received signals to the TV system 28 for processing in the same manner as signals received by the antenna 26. The antenna 1086 and its receiver 1084 can be employed with other remote receiving stations such as the station 206 of FIG. 6. In FIG. 38, the respondent enters his response in the same fashion as in FIG. 37, and the response is processed in the same fashion as disclosed for FIG. 37.

Figure 39:
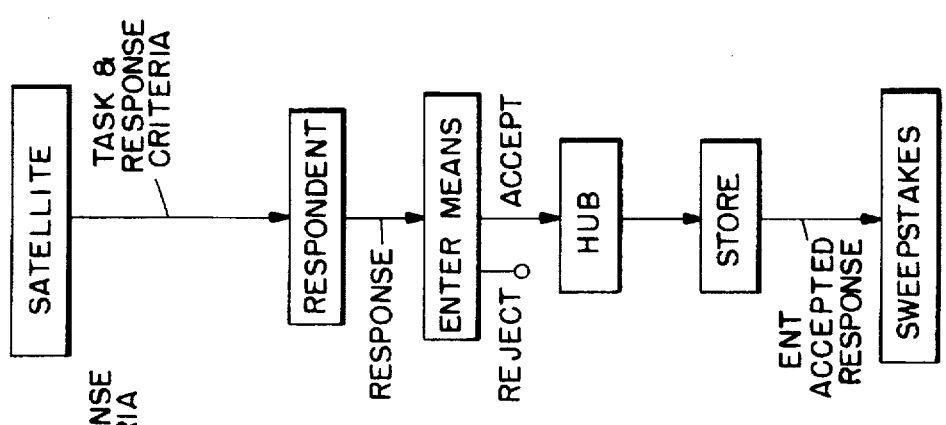

FIG. 39 represents a further modification to the steps of FIG. 38. In FIG. 39, both the task and the response criteria are transmitted from the satellite directly to a respondent at a receiving station 1016. The respondent enters this response by a response unit such as response unit 210 (FIGS. 6 and 8) for the response unit 800 (FIG. 26). The response unit evaluates the response, and transmits the response to the hub via the modem 634 as taught in FIG. 22. Acceptable answers are transmitted by the hub to the base station for the sweepstakes drawing, as disclosed with reference to FIGS. 37 and 38.

Figure 40:
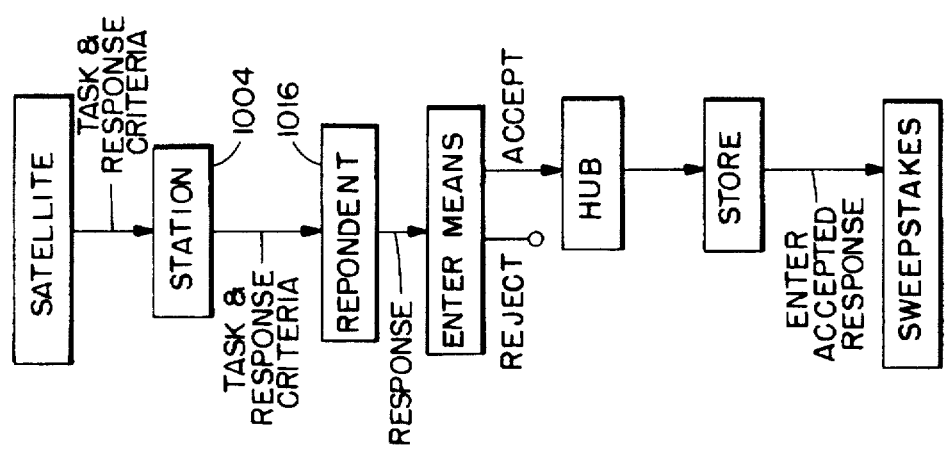
FIGS. 37–40 are flow charts showing different configurations in a process of utilizing the equipment of the network of FIG. 32.

FIG. 40 shows an arrangement substantially the same as that of FIG. 39, except for the interposition of a central station 1004 for retransmission of the task and response criteria to the respondent at a remote receiving station 1016. Thereupon, the process continues in the same fashion as disclosed for FIG. 39.

The use of the telecommunications network 1000 (FIG. 32) constitutes an extension of the concept of the central station. As noted in a definition of the term "central" provided hereinabove with reference to the description of FIGS. 1–5, the concept of a central station is intended to refer not only to a single broadcast station, but also a network capable of serving a large area such as a county or a time zone. In such a case, the broadcast of a program from the central station is implemented by use of a plurality of broadcast stations connected to the studio of the central station. FIG. 32 shows an implementation of a network wherein plural central stations 1004 may be operated independently of each other or in conjunction with each other, the joint operation being provided by means of the telecommunications network 1000. In accordance with the invention, individual ones of the central stations 1004 can join the network or leave the network in accordance with directives of the program host at each of the central stations 1004 by simply operating the combiner 238 (FIG. 6) or the selector switch 1014 (FIG. 3) for broadcasting material from the studio of the central station 1004 or material from the base station 1002. Also, as has been noted hereinabove, with reference to FIGS. 1 and 33, transmission of a network program from the base station 1002 via the satellite 1042 may bypass the central stations 1004 to go directly to a remote receiving station 1016 equipped with a satellite receiver 1084. It is emphasized also that, as noted hereinabove, a participant can participate at a remote station without use of specialized equipment such as the response unit 800 (FIG. 26) by virtue of the remote evaluation provided at a telephone hub 1018 by the response evaluation unit 808.

The telecommunications network 1000 is versatile in that it permits members of the enlarged broadcast audience having specialized equipment, such as the response unit 800, to participate by use of such response unit. In the case of a sweepstakes, by way of example, while winners are announced via the communications system 1006, those having a response unit such as the response unit 22 (FIG. 4), 210 (FIG. 8) or 800 (FIG. 26) can have a ticket printed for them directly at the receiving station. Such specialized equipment at a remote station 1016 may include with the response unit 800, as shown in FIG. 30, a touch panel 1088 in which keys of the keyboard 356 are provided directly on the screen of a display, such as the display 358 (FIG. 26), to allow a participant to select an answer by simply placing a finger upon the touch panel 1088. The equipment may include also enhanced telephone sets having a display and various buttons for entering responses. For example, a button may be provided to communicate a respondent's desire to be entered into a sweepstakes.

The telecommunications network 1000 may be viewed as having three signal delivery systems of which a first system provides for broadcasting of television and radio programs from a central station 1004 so as to provide the programming to remote stations 1016. A second of the signal delivery systems comprises the communication system 1006 whereby a common quiz program, sweepstakes, or other program of general interest can be provided by the base station 1002 for all of the central stations 1004. A third of the signal delivery systems comprises the telephone hubs 1018 and the telephone link 1038 which enable communication of accepted answers back to the base station 1002 to facilitate a sweepstakes drawing at 1036.

The equipment of the base station 1002 may be located in a building distant from all of the central stations 1004 and from the telephone hubs 1018. However, the concept of the invention applies also to the situation in which the equipment of the base station 1002 is located within a building which houses one of the central stations 1004, or within a building which houses one of the telephone hubs 1018. In a rudimentary form of the network 1000, there would be only one central station 1004 and one telephone hub 1018, and the equipment of the base station 1002 would be housed in the single telephone hub, by way of example. The various stations of the network 1000 may be fixed in position, in the geographical sense, or one or more of the stations may be located at a temporary site, or may even be in a state of movement. As an example of a moving station, a member of the enlarged audience may be located at a ship in a harbor, or on a moving aircraft since both of these vehicles may be equipped with television and with telephones. In this sense, a receiving station 1016 may be either fixed in position or a moving station. Alternatively, one may view a receiving station 1016 as being located at a temporary site, and understood to include very light portable telephones and portable radio/television receivers. For example, such a portable telephone and radio receiver may be combined at a single unit to be taken anywhere and, thus, to any temporary site wherein a subscriber may be found. Even a central station 1004 can be constructed as a moving station by placing the equipment of the central station upon a moving vehicle such as a ship.

In the use of the communication system 1006 (FIG. 32) it is noted that the transmission of the tasks, as represented by a television program from the base station 1002, and the transmission of the response criteria of the base station 1002 may be accomplished via the same or different forms of transmission. Transmission via the same transmission medium of both the tasks and the response criteria have already been described with reference to a communication via satellite, by way of example. However, if desired, the tasks in the form of a television program may be transmitted via an optical transmission system, an electromagnetic microwave transmission system wherein microwave signals are beamed between antennas at repeating stations, or via a cable system in which electromagnetic signals are carried via a cable.

During the transmission of the tasks via the satellite or the optical link or the microwave link, or the cable, the response criteria may be transmitted via a telephone line in view of the much lower bandwidth of the signal carrying the response criteria. In the case of a radio transmission from the station 1002, the communication system 1006 may employ telephone links for transmission of both the tasks and the response criteria between the base station 1002 and all of the central stations 1004. Thus, the communication system 1006 is adaptive for use of varying forms of communication technology to facilitate the practice of the invention. An advantage in the use of telephone links in the communication system 1006 is that a central station 1004 can initiate telephonic contact only when it is desired to receive a network transmission, and the telephone company may monitor the times of transmission of the network programs from the base station 1002 to each of the central stations 1004. For example, the telephone company may provide a written record of usage of the network programs for auditing purposes.

If it is desired to send the task television program as a sequence of frames at a relatively slow rate, possibly as cartoons in which there is little change in the amount of data from frame to frame, data compression techniques may be employed to send digitized versions of the subject matter from the base station via telephone lines of the communication system 1006 so as to provide the convenience of implementation of video presentations utilizing existing telephone lines. In this fashion, it is possible to conduct complete game shows by telephone provided that the home phones are equipped with a screen and a speaker or other audio means. By placing the equipment of the base station 1002 within a telephone hub 1018, a telephone subscriber can enter a dedicated number, as via a telephone keypad to establish contact with the telephone center, requesting a quiz program and authorizing an appropriate debit on a phone bill.

By use of data compression techniques a television screen of the receiving stations of FIGS. 1, 3, and 6 may be replaced with a low-resolution display, such as may be employed with a computer, so as to enable the quiz show to be transmitted from a central location to numerous remote receiving stations via telephone lines. The amount of prizes earned by successful participants is credited to their accounts with the telephone company, or other account facilities such as a bank, in the manner described with reference to FIGS. 22 and 24. Printers, such as the printers employed with the response units 210 and 800 may be employed in conjunction with the subscribers' telephones to provide coupons having a value, or alternatively, magnetized cards may be provided. The quiz program can be conducted by presentation of tasks and the entry of answers which are evaluated in accordance with response criteria, in the manner described hereinabove with reference to televised quiz programs. In the case of the transmission of program data via telephone lines to each participant, the central stations 1004 of FIG. 32 can be deleted, and the invention may be practiced by use of telephone circuits which constitute the communication system 1006. Thus, the program material is received at a remote station by telephone lines from telephone hubs 1018, and the participant responds via telephone lines of a telephone of 1018.

All necessary data for connection of the quiz program or sweepstakes is stored within the storage unit 940 of the telephone hub 1018. In this way, the invention can be practiced with either an audio or a visual presentation of a task at a person's home, the task being provided by a telephone lines, and a participant's response being transmitted via the telephone lines to a telephone hub 1018. Accordingly, it is possible to configure a simplified embodiment of the network 1000 (FIG. 32) in which equipment of the base station 1002 is located within a telephone hub 1018, and wherein all necessary data is transmitted to members of the audience via telephone lines so as to obviate the need for central stations 1004. The scoring of responses, the announcement of winners, and the provision of awards can be conducted in the same manner as described hereinabove, with the announcement of winners being provided either by radio, television, or via the telephone lines.

The system and method of the invention lend themselves well to conducting polls, surveys, and other studies in which large population samples are preferred in order to obtain more reliable results than those obtained from small samples. This produces polling results that reduce the statistical margin of error to a negligible quantity because the audiences polled approximate in size a large fraction of the population being sampled.

The telephone link 1038 (FIG. 32) may comprise the standard telephone circuitry including wiring customarily found in homes and offices with the wiring extending via telephone circuits to the switchboard of a telephone central exchange. Alternatively, particularly in the case of vehicular and portable telephones, the telephonic connection is made via cellular telephone system to any one of the telephone hubs 1018 (FIG. 32). Thus, the telephone link 1038, in accordance with the practice of the invention, is understood to encompass both wireless communication and communication via standard telephone circuitry. Wireless communication includes radio transmission by equipment such as that employed in CB (citizen band) radios.

The term "polling" is intended to include the meanings of all forms of soliciting opinions, responses, estimates, and other types of information that have useful applications in such areas as surveys, market analyses, studies of demographics and psychographics, comparisons, contests, sampling and public opinion polls.

The term "selecting", such as in selecting a task, is intended to include the meaning of selecting or clearing a task for broadcasting, even if there is only one task available at the time.

The term "score" is intended to include the meaning of computing or assigning a value to or an award for an acceptable response, including a single fixed value or award for all acceptable responses.

The term "printer" or "printed" is intended to include all types of hard record generating devices, such as teletype and other printers, facsimile machines, and all methods for generating such records such as the faxing of documents.

The term "task" is intended to include the meanings of question(s), a request for a statement or response, elicitation of an opinion or judgment, an educational fact, an invitation to make a prediction, or an extending of an opportunity to go on record with a expression in response to an inquiry.

The term "hub" is intended to include the meanings of any location having means for providing a common storage, an evaluation, an accepting, a rejecting, or having a scoring or processing facility for handling a plurality of data sets.

The term "identification" is intended to include any data and information through which the identity of a respondent can be traced or established, including a respondent's entering means or response unit.

The term "audience" is intended to include any individuals receiving a task, such as TV viewers, radio listeners, telephone subscribers, and single or pluralities of individuals at remote locations or gathered in hotels, casinos, bars, auditoriums, and other public and private places.

The term "central" as in a central station or location is intended to refer to a signal transmission or processing facility serving or being shared by a plurality of other stations. Similarly, the term "central location" or "central facility" refers to any location or facility performing functions for or serving a plurality of recipients or receiving stations.

The term "program structure" is intended to refer to the chronological sequence, scheduling and timing of program portions, such as entertainment segments, commercials, newsbreaks, and station identifications, by way of example.

The term "broadcasting" is intended to include the transmission and the propagation of signals in any form over the air by wire or cable, including telephone wires and optic fiber cable, and by television, radio, and telephone.

The term "answer " in response to a task is intended to include the meaning of answers, responses, selections (e.g. true or false) and confirmations (e.g. do you agree that . . . ).

The term "800-number" refers to a dedicated telephone number called by a subscriber without cost to the subscriber. The term "900-number" refers to a dedicated telephone number called at the subscriber's expense.

The term "transmitter" or "transmitting" are intended to include means for, or the act of, transmitting through broadcasting or narrowcasting electronic, magnetic, audible, and visual signals by cable, telephone wire or over the air.

The term "sweepstakes" is intended to include the awarding of prizes of any value in which the determination of one or more winners is by a random or other predetermined process . . . . The term "prize event" is intended to include any kind of event in which a participant, through skill or by chance, including random determination, can win a prize having value.

Tasks or task sets can be communicated, transmitted, delivered, provided or conveyed to stations in different ways including transmissions over the air or by cable, and mechanical or physical delivery in the form of recordings such as tapes or writings.

The term "station" is intended to include facilities for sending or receiving television, radio and telephone signals.

The term "prize event" is defined as an event in which one or more winners are determined either randomly or through skill. As an example, participation in a survey or poll can be encouraged by allowing respondents to enter or be entered in a sweepstakes or in a contest in which winners are determined by skill or knowledge.

The term "response" is intended to include answers to questions and predictions of the outcome of events.

The term "portion", as in program portion, is intended to include the meanings of taped footage, segment, episode, scene, or other parts of a program.

The term "network", as in network of stations, is intended to refer to a loose grouping of stations, in which the stations do not necessarily cooperate with each other or coordinate their broadcast and program content, but in which stations participate in order to benefit from the combined audience drawing power of an event such as a sweepstakes.

The provision of a network for linking together the numerous central stations, in accordance with the invention, makes possible the generation of an enlarged broadcast audience and, furthermore, enables the leveraging of advertising potential of possibly hundreds of broadcast stations so as to fund large sweepstakes events in which attractive prizes are offered to members of the audience. While, in the past, networking has enabled television and radio stations to share a common program content as by broadcasting the same entertainment or other common program, the invention provides for a further common denominator of the station network in the nature of an event such as a sweepstakes.

The major thrust of the concept underlying the systems and methods of the invention is to weld the audiences of hundreds of television and radio stations broadcasting their regularly scheduled programs into a single advertising market. The combining of the audiences occurs during the span of a broadcast program such as a thirty minute or a sixty minute program, as the numerous television and radio station broadcast their regularly scheduled programs. This advertising market is formed by the broadcast stations participating in a network created for this purpose. The ad hoc network concept is based on the rationale that very large television and radio audiences, possibly in the tens of millions of persons, can be attracted by combining broadcast entertainment with quiz opportunities to win sweepstake prizes. The sweepstake prizes would be unusually large, and the sweepstakes would offer the participants odds that are significantly more favorable than those of, for example, state lotteries. Furthermore, if desired, the sweepstakes can offer all viewers and listeners opportunities to win discount coupons, cash vouchers, and other prizes as has been disclosed hereinabove with reference to FIGS. 1, 6, and 22. In similar fashion, as has been described with the systems and methods of FIGS. 1, 6, and 22, a quiz conducted for home viewers by the network 1000 (FIG. 32) can have trivia questions or more complex tasks and responses by individual audience members. The equipment allows for instant evaluation of responses. The network utilizes existing television, radio, and telephone facilities. The television and radio stations which broadcast the tasks, such as questions inserted into the respective programs, may be broadcasting different programs. The telephone facilities used for communication of responses, in conjunction with the telephone hubs 1018 (FIG. 32) can serve as a collection center for collecting responses and/or also serve as a center for evaluating and storing responses from members of the audience. If desired, acceptable responses can also be rewarded with prizes, such as coupons dispersed in the homes of respondents.

While there are similarities in the construction and the operation of the systems of FIGS. 1, 6, 22, and 32, the networking disclosed in FIG. 32 in conjunction with the common source of programs provided by the base station 1002 provides features to the operation of the network of FIG. 32 in addition to the operating features disclosed hereinabove with reference to the systems of FIGS. 1, 6, and 22. The additional features provide advantages; both for persons organizing the network as well as for persons who participate as members of the audience receiving broadcasts of the network.

The network organizers, by way of example, may sign an ad hoc network agreement with 500–1000 mixed television and radio stations. Such an arrangement may be loose in nature, permitting program by program participation by individual stations at their own discretion. Stations can decide at any time to join the network as part of the first signal delivery system. Normally, the organizers of the network would sign telephone companies to the agreement. In addition to providing a communications link, the telephone companies would also employ the aforementioned response evaluation equipment.

The television stations (both network and cable stations) and radio stations each transmit their regularly scheduled programs. Most of the programs are expected to be disparate. Program contents need not be changed. Presently, most programs are routinely interrupted to allow for the broadcast of material such as commercials and station identification, such interruptions being timed, preferably, to fit each stations schedule. This prevents all of the stations from airing a quiz at the same time.

The programs broadcast by TV and radio stations may differ from each other in a number of ways. The program content, the number of program segments, the duration of program segments, the timing of commercial and other messages and other chronological features may vary from station to station. It is an important characteristic of the invention that every station participating in the ad hoc network can design and structure its program independently of that of the other stations. A participating station can broadcast or retransmit a task, such as a question, at the particular point in time when a task insertion is harmonious with the broadcast program, without conflicting with the station's normally scheduled program structure. When practical and desired, two or more tasks can be fitted into a station's program.

Taking advantage of the ad hoc nature of the network of the invention, a station can join a network prize program without giving advance notice. The station can subsequently account to operators of the network for advertising revenue in accordance with the terms of the network agreement. As an example, the station can pay a share of its increased advertising revenue to a prize fund administered by the operators of the network. Other arrangements, such as a flat fee or a per task charge can be agreed upon.

The quiz portion of the broadcast is carried by the second delivery system which may be operationally independent of the first program delivery system. The second delivery system can combine over-the-air and cable transmissions. The second delivery system can transmit sequentially a plurality of tasks, such as questions, as has been disclosed above with reference to FIG. 34. The questions may take the form of taped task sets. Each task can comprise a question and the time allowed for answering, as well as response criteria defining acceptable answers and scoring instructions, as has been disclosed hereinabove with reference to FIGS. 11–17. If desired, response criteria may be coded or sent in bursts unintelligible to humans. The central stations 1004 (FIG. 32) may retransmit the tasks in whole or in part while the response criteria may be employed either in homes or in the telephone hubs 1018 for use in evaluations of the responses.

Audiences of participating television and radio stations are able to respond to a quiz in their homes, hotels, bars, and other places by use of standard preexistent telephone equipment. As noted above, the practice of the invention is facilitated by enabling a participant to respond by simply dialing a dedicated telephone number followed by the use of specific keys of the telephone keypad to enter a chosen response. As may be determined by sponsors of the quiz program, the dedicated number to be called by a participant may be an 800 number or a 900 number. Also, as has been disclosed hereinabove with reference to FIGS. 1, 6, and 22, a question may require simply a yes/no answer or a true/false answer or may require a more complex response. An answer to a multiple choice question may require only one ore two additional key strokes or the touching of one of two additional buttons on a keyboard.

Accordingly, in accordance with a preferred embodiment of the invention, at one or more telephone hubs, programmable evaluation devices are provided, such as the aforementioned response evaluation unit 808 of FIG. 22. Such evaluation devices may provide for filtering out or blocking unacceptable responses, and may also be employed to evaluate and score responses based on accuracy, comprehensiveness, and time taken to respond, as well as other qualities suitable for a scoring basis. The evaluation means may be programmable by signals received from outside a telephone facility, as from the base station 1002 or other suitable platform, or from within the telephone facility. Prizes received for acceptable answers which qualify contestants for a sweepstakes event may be based on skill so as to prevent the sweepstakes from being classified as a lottery.

Tasks transmitted by the second delivery system to participating stations such as the central stations 1004, may be arranged, for purposes of illustration, as a taped task set having a duration of one minute. For a sixty minute program, up to sixty different task sets are taped. A different task set would be transmitted every minute by the second delivery system. Alternatively, a task duration of a shorter interval of time or of a longer interval of time, as has been disclosed with reference to FIG. 34, may be employed.

This enables a broadcast station to pick up and retransmit as part of its program a task set at the precise time it fits into the schedule of the particular station, and without interfering with the chronological structure of its scheduled program. Each participating television or radio station determines when to insert a task set for its own program. If, for example, a sweepstake program of the network is aired between 8:00 PM and 9:00 PM, an individual station may decide to pick up tasks following, or in the place of, two of its commercials, which are scheduled at 8:15 and 8:45, by way of example. Following each of the sixty second commercials, the participating station retransmits the tasks received at 8:16 and 8:46 PM. The content and the structure of its regularly scheduled program remains unchanged. The task sets broadcast via the satellite 1042 (FIG. 33) from the base station 1002 can be taped very economically.

Acceptable responses qualify contestants for automatic and cost-free entry into the sweepstakes. Using ANI (automatic number identification), as may be provided by the facility 1020 (FIG. 22), or other caller identification techniques, recipients of large prizes can be identified and can be informed on the air whether they have won a prize. Since known electronic devices can determine acceptable answers virtually instantaneously, winners can also be notified by taped telephone messages informing contestants of results in the course of the same telephone call by a respondent responding to a telephone facility via the dedicated telephone number. Messages can include an announcement to successful contestants that their name has been entered in a sweepstakes for that particular program. When desired, an entered respondent can be requested by way of touching an additional button, to indicate permission to announce the respondent's name on the air, in case the respondent wins the sweepstakes. The drawing of the winning sweepstake numbers can be held and the results can be announced at the end of the program. From all of the acceptable responses stored in the data storage unit 1040 (FIG. 32), one or more of the responses may be drawn at random by the sweepstakes drawing 1036. Prizes can be mailed to sweepstake winners or can be collected at authorized agents. Prizes can take different forms and can be delivered in various ways. For example, some prizes can take the form of coupons, checks, vouchers, or prize certificates delivered by mail, and others can take the form of a credit on a bank account or telephone bill. Sweepstakes prizes normally call for identification of the claimant and their verification procedures.

The telephone facilities are used effectively, and without overloading, in spite of the large audience which may respond o questions. First, it is noted that television and radio stations normally broadcast questions spread over the duration of their respective programs, possibly over a sixty minute interval. Respondents throughout the network 1000 call their local telephone exchange or hub; however, since there are many hubs 1018 within the network 1000, these telephone calls are distributed throughout the numerous hubs, rather than being directed to a single telephone exchange. This militates against the overloading of any one telephone exchange and insures efficient use of the telephone facility.

A participant in a game can be informed of the acceptance of a response by the transmission of a message to the participant automatically from a hub 1018 to the participant's location. By way of example, the message may be transmitted to the participant via telephone or, in the event that the participant has a response unit, such as a response unit 800, the message may be directed to the response unit which then prints out a copy of the message or otherwise displaces the message. Thus, the message may be in the form of a voice message, a display message, or a hard copy record.

In the operation of the central stations 1004, the managers select one or more of the successive tasks (FIG. 34) for insertion in their scheduled programs at a point in time that is convenient, and does not conflict with the chronological program structure of the respective stations. Due to the disparate nature and chronological structure of the programs of hundreds of the broadcast stations, the tasks of the base station 1002 are likely to be interspersed in a widely distributed manner during the time interval selected for the airing of the sweepstakes program. Thus, members of the audience of any one central station 1004 are aware of only one of the numerous tasks, specifically the question aired by the central station 1004 to which this portion of the audience is tuned.

It is advantageous to employ the automatic number identification facility 1020 in a telephone hub 1018 for the purpose of tracing back the response of a subscriber. Thus, each entry in the sweepstakes can be associated with the respondent having entered an acceptable answer. Notification of the respondent that a response has been entered as well as notification of all of the respondents of the winner(s) to the sweepstakes is readily accomplished prior to the end of the regularly scheduled program being broadcast by a central station 1004.

If desired, relatively complex questions may be employed, and the response evaluation equipment scores the answers with a score commensurate with the degree or skill of knowledge displayed in the response as has been described hereinabove with reference to the systems of FIGS. 1 and 6. Responses with higher scores can be rewarded with two or more entries into the sweepstakes or other prizes. In the case of a respondent employing a response unit, such as the response unit 800, in the home, the response unit can be directed to reward a high-scoring response by printing out a discount coupon, by way of example, with discounts on commercial products purchased by shoppers in the respondents locale. it is anticipated that sponsors and advertisers on a program of a station will preferably select a time slot which is convenient in the context of a station's regularly scheduled programming, and which is suitable for insertion of a task prior to or following a commercial of the advertiser.

The network 1000 also lends itself to tasks which take the form of predictions. In that event, a task transmitted via the communication system 1006 invites the station audience to predict the outcome of an event. Normally, that event takes place during the quiz program. Audience members enter their predictions as described heretofore. Following the event, outcome criteria are determined by the operators of the network and transmitted as in the case of response criteria. Participants' predictive responses are processed for exception or rejection of the response, and are evaluated and scored as described hereinabove in connection with a question and an answer.

In the case of national advertisers, a trivia question may relate to the advertiser, to a product, or may constitute institutional advertising. Such a question is in effect a commercial to which audiences respond as described hereinabove.

By way of example in the practice of the invention, on occasions, it may be desirable for all participating central stations 1004 to interrupt their programs at the same time and to synchronize the time gaps in their programs so as to insert one or more tasks from the base station 1002. In such event, television and radio stations broadcast their scheduled programs, but create synchronized interruptions of their programs so as to occur at the same time. Program sources can be television network affiliates, independent television ground stations, satellites, and radio stations.

For example, the program of a participating broadcast station is divided into two or more segments. The segments are chronologically separated and a time gap, for example, of thirty to sixty seconds, depending on the question, is created between segments. Task sets are transmitted and answers by contestants are entered and evaluated as heretofore described.

Alternatively, each viewer or listener is provided with a response unit, for instance, at home. The response units may be programmed via satellite signals which convey response criteria including acceptable answers and scoring instructions. Acceptable answers are instantly rewarded, commensurate with knowledge displayed by respondents, by monetary coupons printed by the response unit in each home.

Awards can be in the form of numbered and/or coded coupons carrying a discount on products promoted by an advertiser. The numbering, coding, or bar-coding of coupons makes it possible to trace coupons to the response unit that has printed the coupon, and through the registered response unit to the individual owner or respondent using it. In a coast-to-coast broadcast sponsored by several national advertisers, a number of sweepstakes prizes are interspersed among the discount or smaller cash prizes awarded to successful audience members. Depending on the number of participating stations and advertisers, sweepstakes prizes can be very large and can far exceed prizes normally offered participants in game shows. The prospect of extraordinarily large prizes will attract viewers and listeners to any program at any time. Any of numerous program materials may be selected, and all of the programs can differ in content, if desired.

Furthermore, broadcast stations may interrupt their programs at the same time to provide time for the insertion of a network quiz. Broadcast station programs may vary, but within the constraint of synchronization of the time gaps between segments of the programs of the respective broadcast stations. Also, as noted hereinabove with respect to the storage unit 1012 (FIG. 3), it is to be understood that in the process of receiving and retransmitting a task set, or portion thereof, a central station 1004 may briefly store such data between the time of receiving and the time of retransmission.

As a further illustration in the practice of the invention, hundreds of broadcast stations broadcast different television and radio programs, and the communication system 1006 via the satellite 1042 (FIG. 33) transmits the task signals including questions and instructions for the rewarding of acceptable answers. The task signals are transmitted coast-to-coast at exactly the same time and fit between the segments of all of the various, and presumably different, programs which are interrupted at the same time. The prize winning aspect of operating the network 1000 is operative without restraint on the nature of the program content of the participating broadcast stations. Thus, the insertion of a quiz can be programmed at any time in the manner of a commercial. The method of the invention can therefore be used to bolster the rating of any show at any time of the day.

If desired, various ones of the central stations 1004 can synchronize their operations into a plurality of groups of central stations wherein, in each group, all of the central stations are synchronized to use a specific set of time slots of tasks from the base station 1002, and wherein the selection of time slots varies among the various groups of the central stations. Such a grouping of the central stations may be viewed as, in essence, separate ad hoc networks of the central stations. By staggering the aforementioned time gaps occurring between the segments of the programs aired by the station groups (or ad hoc networks), a single satellite channel of the communication system 1006 services a plurality of the ad hoc networks, as the central station of the ad hoc networks air their various disparate programs. This can be used to raise the ratings of a multiplicity of broadcast programs as follows.

For example, a network operator organizes a conglomeration of 500 television and 500 radio stations coast-to-coast for a specific time slot, for example, 11:00 to 11:00 AM Eastern time. Individual stations and TV networks can sign on until the time of the broadcast, or can simply provide an accounting regarding its revenues or the usage of the network. Each broadcast station airs the show as scheduled, without coordination or consultation with other ones of the broadcast stations. Theoretically, 1000 totally different programs can be aired. There is a requirement that all of the shows be interrupted, for instance, from 11:10 to 11:11 AM and from 11:20 to 11:21 AM, this being two interruptions each of which lasts for one minute. Each time gap in this example includes time for a 30 second commercial, as well as for a 30 second task set, wherein a task set includes a question and time allowed for an answer plus one or more acceptable answers and instructions for scoring the answers. The commercial by a national advertiser can serve as a vehicle for a question. The questions may require a multiple choice answer, with each answer being numbered so that a participant need only touch a numbered button on a telephone or other response device.

Before and during the show, the audience is informed that all acceptable responses will be rewarded with a coupon carrying a certain discount on the advertised other products and that, in addition, there will be awarded a prize to each of five sweepstakes winners. Questions can be deliberately easy to answer, or if so determined by its sponsor, can offer respondents the opportunity to enter more comprehensive or superior answers, for instance, in response to open-ended questions. When respondents are appropriately equipped with response units 22, 210, or 800, answers can be individually evaluated and scored within a respondents home by the response units. Discount and other prize coupons may be instantly printed and dispensed, if desired. All prizes can be traced back, if desired, to the owner of the response unit through numbered or coded coupons.

To attract numbers of shoppers to stores, a percentage of the coupons dispensed can be "blind coupons" that carry an extra prize, ascertainable only upon redemption of stores, if the numbered coupons match the "lucky number" of the day in the store. Coupons can have advertising and promotional messages printed on them in accordance with programming signals received by the response units from a central location. Advertisers can change the text of such coast-to-coast messages on very short notice.

The versatility and the flexibility of the system enables participating advertisers and broadcast stations to bolster the ratings of any show at any time of the day or night. A participant who has entered an acceptable answer can be rewarded with a prize having symbolic or monetary value. An example of an award having symbolic value would be a ranking or standing of the participant in a national contest in which responses are scored, and the scores compared and ranked at a hub. Responses with superior scores can be further evaluated, screened and reduced in number so as to reduce the number of remaining participants who have entered acceptable responses to the number determined by the game operators. The aforementioned telephone links permit a downloading of evaluated response data to a further central storage and evaluation facility where accepted and scored responses are further compared and rank-ordered. Final standings can include 5, 10, 50 or other number of remaining players. One or more of those players can be rewarded with prizes, ranging from sweepstake prizes to cash, discounts and other prizes. If desired, the communication system 1006 can be employed for communication via satellite on even an international scale to enable the implementation of world wide contests.

According to a preferred method, acceptable responses are scored and the scored responses, which are identified with respondents, are entered in sweepstakes. The entered responses have their scored results associated with them, the scores being used for weighing the responses. The weights are then attached in order to skew the statistical probabilities of randomly determining one or more winners of the sweepstakes.

Thus, while all entered responses have a chance of winning a sweepstakes prize, entered responses with superior scores are weighted so as to increase the probability of winning. As an example, acceptable responses are awarded point scores, ranging from ten points for a response meeting minimum response criteria to fifty points for perfect responses. The responses are entered in a sweepstakes in which winners are randomly determined within determined parameters.

Such parameters can be one or a range of percentages or of a respondent emerging as a probabilities winner from among entered respondents. The electronic mechanisms for selecting winners are similar to those of electronically programmable slot machines used in casinos. In such machines the chances of winning can be adjusted, ranging, for instance, for a minimum prize from 5–10%. Applying similar principles to the system of the present invention, the probability of a response with a 10 point score winning a prize can be adjusted to be one fifth the probability of a response with a perfect 50 point score.

In addition to the frequency of winners within a point score range, the size of prizes within the point score range can also be adjusted.

In some instances, the network organizer may want to enter successful respondents in a preliminary qualifying or elimination event. Participants in a preliminary event, who have acceptably answered a question posed by the station to which they are listening or which they are viewing, are automatically, or are entitled to be, entered in a secondary or a final event. The preliminary event can be a contest of skill or a randomly decoded event. A successful respondent's reward can be the automatic entry in one or more secondary contests offering prizes to winners. In this manner, the number of entries can be significantly reduced and can be controlled at will by regulating the level of difficulty of the tasks of the preliminary or qualifying contest, i.e. the tasks disseminated by stations. Successful respondents can be entered in the "semifinals" or "finals" of a secondary event.

When desired, tasks, including questions, can allow for responses including answers at two or more levels of difficulty, and responses are scored in accordance with the degree of difficulty of the response. Acceptable responses at the lowest level of difficulty can be rewarded with one entry into a sweepstakes, whereas responses scored higher due to a response at a higher level of difficulty, are rewarded with two or more entries in the sweepstakes in the name of the successful respondent.

A plurality of regional sweepstakes of the kinds described can be conducted and winners of each of the sweepstakes are determined. Every winner of a regional sweepstakes can be rewarded with a prize, as well as with one or more entries in a "final" "ultimate" or "grand" sweepstakes.

The determination at evaluation hubs whether or not a response is an acceptable response is normally made in a short period of time, which permits notifying a respondent of the evaluation result via a recorded message in the course of the initial call made by the respondent to transmit a response to the central evaluation facility. For instance, a "yes" or "no" response, or the answer to a multiple-choice question, can be evaluated in milliseconds by devices in employing well-known electronic components. A caller of a dedicated number can therefore be informed very quickly whether he or she has been entered into a prize event. This capability is important in order to limit calls to less than one minute.

According to the preferred embodiment of the methods described, evaluation hubs are formed into regional or local hub group, e.g. hubs connected to a local telephone company or to one of the Regional Bell Operating Companies. A separate game show, or a similar event, or another form of contest, is held for individuals in the area, and winning respondents are entered in a regionally limited sweepstakes. The intention is that regional winners, who win prizes, are entered in a similar event comprising a larger territory, or even a national sweepstakes in which the winner of the grand prize is determined. By organizing "preliminaries" or elimination events, increasing interest and suspense are generated. As an example, daily regional contests are conducted in different parts of the country during weekdays. Winners of the regional contests or sweepstakes, who receive prizes, are entered in the ultimate Saturday finale or "Sweepstakes Hour". Regional contests may extend to and include foreign regions, provinces, or countries, permitting regional game shows to be conducted in different languages.

The method described has the advantage of making it possible to announce a larger number of winners on the air than would be practical in the case of a single contest. The term "regional" is intended to include the meanings of local, country-wide, state-wide or other territorially limited area served by one or more hubs of telephone companies or of other evaluation facilities capable of the functions described.

An example of an economical procedure for preparing a large number of tasks for use in an internationally conducted game will now be described. A well known person, such as a movie star, acting as the host, asks several questions which are self-explanatory, so as to be intelligible to radio listeners without benefit of a video presentation. The video presentation can be added for members of the audience having television equipment. The question can be asked in one language in its original taping, and can be translated into any desired number of languages for dubbing in the foreign radio or TV version of the question. Such taping of questions for presentation to radio listeners and TV viewers will be very inexpensive. It is noted that the audience is tuned into the radio or TV station broadcasting the program preferred by the listener or viewer, irrespective of the sweepstakes event. Conversely, this means that the quality of the quiz is not necessarily the decisive feature attracting the audience, but simply is a vehicle for giving audience members the sweepstakes opportunity to win large prizes.

Unauthorized use of the methods of the invention is prevented by coding or scrambling at least a part of the tasks transmitted to and retransmitted by a broadcast station or transmitted to respondents' locations. Such scrambling is well known and is often incorporated presently in programs transmitted via satellite. Intelligible task sets will only be received by stations and respondents having decoding or unscrambling equipment.

Normally, a question is accompanied by a time limit for responding. Provisions can be made to prevent entering more than one answer to a question within the time limit allowed for responding as has been described hereinabove with reference to the operation of the response unit 210 (FIG. 8) or the response unit 800 (FIG. 26). Provision can be made to prevent entering more than one answer to a question within the time limit allowed for responding. For instance, a telephone hub can be programmed to accept only one response from a respondent. In order to phone in more than one answer to a question, the corresponding number of lines would have to be available. In the event of an abnormal frequency of calls, traffic can be monitored at the telephone hubs for each line.

Forging of a sweepstakes prize is prevented in the use of the network 1000 in a manner similar to that to the previously discussed embodiments, including the system of FIG. 29. A respondent's answer entered in a response unit, upon activation by the respondent, is transmitted by the response unit via modem to a central data storage facility, as is disclosed in FIG. 22, the central data storage facility being physically inaccessible to respondents and being tamperproof. When a response unit prints and dispenses a monetary hard copy record to a contestant, the record can be verified by comparing the data on the record with the stored data. The storage facility can be contacted by a paying agent and can be used as a means for authenticating claimed sweepstakes and other awards prior to payment.

The invention may be practiced with known techniques for number or caller identification which make it possible to identify every respondent in a poll, thereby to generate market data not obtainable heretofore. Using the technique in the context of market analysis and to elicit consumer reaction to products, the resulting single source marketing data base that can be created provides important information and leads for the purpose of advertising, promotions, and direct mailings.

Further, in the practice of the invention by use of prerecorded tasks at the base station 1002, if desired, the response criteria can be recorded on a separate tape or disc which, instead of being played back at the base station 1002, may be played back at each of the telephone hubs 1018. In such case, in the operation of the system, a broadcast station selects, from the sequence of prerecorded tasks, the task that fits that stations schedule and broadcasts the selected task(s). At a hub wherein the recording containing the response criteria is to be played back, only a specific response criteria matching the selected task is employed. This may be accomplished by playing back the tape at a telephone hub 1018 in synchronism with the playing back of the tape at the base station 1002. In this way, the evaluation unit 808 in a hub 1018 responds only to the criteria for the selected task, and disregards the criteria of other tasks. This is useful in preventing unauthorized use of the methodology of the invention because normally only those response criteria to be used by participating stations in conjunction with their authorized task transmissions is allowed to reach the evaluation unit 808. Furthermore, the foregoing anti-forgery process can be employed concurrently with known scrambling and descrambling devices used in the transmission of the tasks by the communication system 1006 such as are currently employed with satellite communication systems.

For use of the invention with multi-lingual audiences, questions broadcast over television can be in the form of pictures, cartoons, animations, or graphics which are understandable by people speaking different languages simply by visual interpretation. An accompanying audio portion is selected for its universal comprehension by people speaking different languages as in the use of the word "no".

It is noted also that the function of the communication system 1006 in disseminating data from the base station 1002 to each of the central stations 1004 and to each of the telephone hubs 1018 can be accomplished in an alternative procedure whereby prerecorded tapes, or other recording media, are mailed or delivered to the central stations and to the hubs for use at specific days and times of a day. This allows the benefits of the invention to be accomplished without use of the satellite transmission, if so desired. Alternatively, if desired, question sets can be electronically communicated to the central stations in advance of the day for dissemination to the public, the question sets to be stored at the central stations 1004 for subsequent playback at a designated day and time of day, or at a time selected by and convenient to each individual central station. By way of example, storage can be accomplished in the manner shown in FIGS. 11–17. In the event that participation in a network program, such as a sweepstakes, is to be limited to respondents having a response unit, such as the aforementioned response units 22, 210, and 800, the response criteria are also stored at the central stations 1004. Then, during the practice of the invention, the various response units of the respondents serve for determining correctness of answers, and for transmitting the identifications of successful respondents by telephone wires to data storage facilities, as disclosed with reference to FIG. 22. This is followed by an entering of successful respondents into a sweepstakes, as disclosed with reference to FIG. 32. In such a case, the telephone exchanges or hubs only serve as temporary storage facilities for the conveyance or transfer of acceptable responses to the sweepstakes center, at the base station 1002, and for the purpose of storing the identity of respondents.

If desired, in the communication of a respondent's response from a remote station 1016 to the hub 1018 (FIG. 32) such communication may include an indication as to whether a respondent authorizes the sweepstakes operator to announce his or her name on the air. Such indication can be provided by the use of a simple keystroke on the telephone keypad or on the keyboard of a response unit. In the case of large winners, the sweepstakes operator can reconfirm through live operators whether authorization is granted or withheld, by calling the known telephone number of the sweepstakes. Sweepstake winners can be informed of their winning either by an announcement made on the air and/or by use of a recorded message accessible to a person calling the telephone hub 1018 by use of a dedicated telephone number which may include use of additional keys to indicate whether a person wishes to respond to a more recent question, or to learn of a previous winning. As noted hereinabove, the dedicated number may be cost free such as an 800 number, or may entail a fee such as a 900 number.

Thereby, every audience member, from viewers of an urban television station to listeners of a small-town radio station enjoy virtually effortless participation in a sweepstakes and an equal chance of winning the sweepstakes prize.

A number of polling systems of the invention will now be described. The objectives of the polls can include a tabulation of responses or "votes" on a national or other scale, the responses including a confirmation (e.g. "do you agree that . . . ?"), choice between two options (e.g. "which of the following two choices do you favor?") or a multiple choice selection (e.g. "indicate your preferred "alternative"").

It also is an objective to screen out or reject responses that are not responsive in the sense of not addressing the issue, being mutilated or unacceptable for other reasons. To eliminate non-responsive votes, the organizers of the poll formulate response criteria defining the parameters or basic rules to which a response has to conform to be validated, i.e. to be counted. The validation of a response or vote therefore is a first step in its processing or evaluation. Once validated, the accepted votes are stored and then are tabulated, analyzed or otherwise processed in accordance with known procedures.

Responses can be tabulated on any desired scale, including local, regional, national or other scale. When desirable, votes are recorded, stored, or even processed on a limited geographic scale and are then communicated to a larger, more central, or a national facility for further processing and tabulation. Votes can be partially processed or evaluated on a local or regional scale and can be further analyzed upon collection at a national processing or tabulating facility.

It is obvious that responses have to meet certain basic and varying requirements to be tabulated or otherwise processed. For instance, if an answer does not address the question, if an answer is incomplete or entered too late, etc., such an answer is not validated i.e. it is not accepted for processing. The said validation of responses is governed by response criteria defining the requirements to be met by a response.

To induce the public to respond to a poll, the incentive of informing respondents of the outcome of the poll can be provided. Such informing can be done through the mail or one of the mass communications media.

It is understood that every response undergoes two processing steps, the first being a validation step and the second being a processing step. Unvalidated, i.e. rejected responses are excluded from tabulation. Validated responses are processed in accordance with instructions formulated by the poll operator. Results of tabulation are made available to respondents, but are normally limited to providers of a validated response.

The versatility of the system and methods of the invention are illustrated by the following example. A regional charitable organization, having used the survey technique described, has tabulated identified respondents in its area of activities who in the survey have "strongly endorsed" the goals of the charitable organization. This tabulation enables the organization to follow up and contact these individual families identified in the tabulation by telephone, mail, or through personal visits.

To minimize polling costs related to telephone charges, whether incurred by calling 800 or 900 numbers, a subject or issues to be voted on are discussed, for example, in the course of a 30 minute TV program. During the first 25 minutes, no votes are taken, but the audience is alerted to the questions that will be asked at the end of e debate. During the last five minutes of the program, during which a voter is connected to a local hub by telephone or other cable, or to a radio hub, a number of predetermined questions are asked. For instance, 10 votes are elicited and 30 seconds are allocated to each question. Of those 30 seconds, 20 seconds are devoted to a summary of an issue and 10 seconds are allowed for the entry of a multiple-choice answer, such as touching buttons to enter two digits on a telephone keypad.

It is another objective to identify and record the identities of the respondents or "voters". According to a preferred embodiment, votes are cast by telephone, although other two-way communication can be used. A voter dials a dedicated number and enters additional digits indicating the voter's response. The votes of telephone subscribers are recorded and tabulated as described. At the same time, using caller identification CI automated number identification (ANI), or similar techniques, the identities of all voters are captured and stored. The stored data can include not only the respondent's identity, but the vote itself and other comments.

Votes can be tabulated on the basis of the nature of votes cast, so that for instance all telephone subscribers living in one congressional district who have cast identical votes, can be identified and grouped. Desired identified voters can then be contacted at an appropriate time. Other records can be tabulated on the basis of predetermined characteristics or correlations of cast votes. A correlation could be, for example, that of votes tending to favor one political trend over another, as would be the case of voters "agreeing strongly" or "agreeing somewhat" with a proposition when confronted with four or five choices of a multiple choice question. These types of tabulation can be generated for any chosen delimited area defined by topographical or political boundaries, demographics, or other characteristics.

Figure 41:
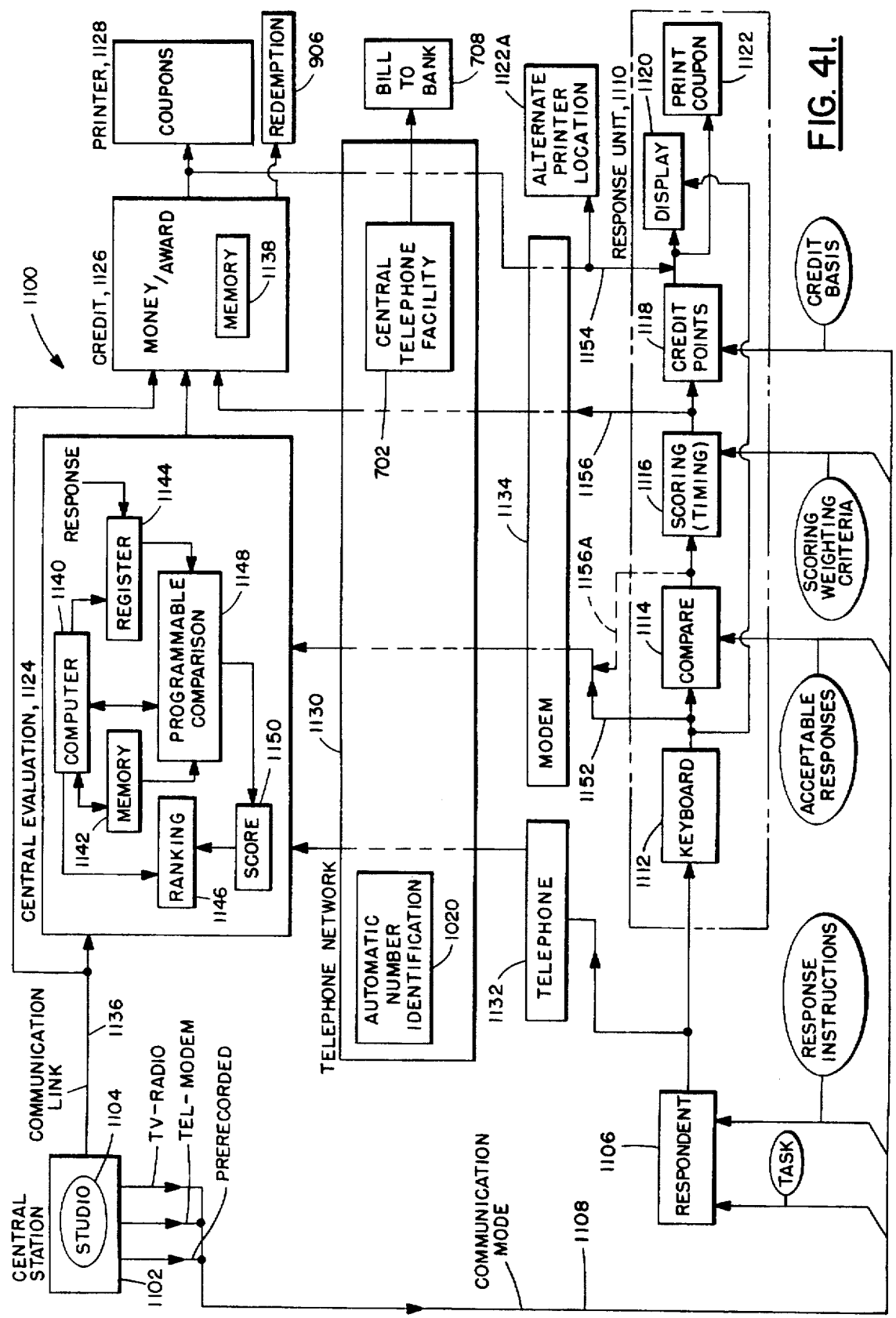
FIG. 41 shows diagrammatically a generalized system concept of the invention incorporating various embodiments of the preceding figures.

FIG. 41 shows a generalized system 1100 which summarizes various embodiments of the invention disclosed hereinabove. In the system 1100, a central station 1102 is provided with a studio 1104 for presenting tasks to a respondent 1106 who is a member of a remote audience, such as the audience members 94 and 216 of FIGS. 3 and 6. The studio 1104 may be located within the central station 1102, or spaced apart from the central station 1102 and connected thereto electronically. The presentation of the task to the respondent 1106 is accomplished by some mode 1108 of communication such as a broadcast of radio and/or television as shown in FIGS. 1, 3, 6 and 7, or by telephone and/or modem as shown in FIGS. 6, 22, 24, 29, 30, 32, 33 and 37–40, or by use of prerecorded material as shown in FIGS. 11–17, 21, 30, 32 and 36. Included with the presentation of the task are basic instructions such as the selection of one of a number of possible responses, an entry of a specific word or number, or other type of response as has been described hereinabove. The respondent 1106 enters a response by use of one or more components which may be found in a response unit 1110, such components including a keyboard 1112 for entering an answer, a comparison unit 1114 for comparing the answer to an acceptable response, a scoring unit 1116 for scoring the answer with scoring being based in part on a time of response, a unit 1118 for crediting points to the answer, a display 1120 by which the respondent, 1106 can view the answer and/or the response results, and a printer 1122 for printing a coupon or other hard copy record presenting results of the response. The use and operation of such components of a response unit, as well as a complete response unit, have been described above with reference to FIGS. 1, 3–8, 11–12, 14, 16–18, 21–22, 24–28, 30 and 37–40.

Alternatively, evaluation of a response of the respondent 1106 can be accomplished by a central evaluation facility 1124, the crediting of the response by points as well as with a monetary or other form of award can be accomplished by a central crediting facility 1126, and the provision of the coupon or other form of hard copy record of results of the response can be accomplished by a central printer 1128, all of which are included in the generalized system 1100. Also included in the system 1100 is a telephone network 1130 comprising the automatic number identification (ANI) facility 1020 (described above with reference to FIG. 22), a telephone 1132 allowing direct communication between the respondent 1106 and the central evaluation facility 1124, and one or more modems 1134 allowing for communication between components of the response unit 1110 and the central evaluation facility 1124, the central crediting facility 1126 and the central printer 1128. A communication link 1136 provides for transmission of instructions and data from the central station 1102 to the central evaluation facility 1124 and to the central crediting facility 1126. Included within the central crediting facility is a memory 1138 for storing data of awards earned by respondents such as the respondent 1106. The ANI facility 1020 enables the central evaluation facility 1124 to identify each of the respondents submitting a response by identification of the respective telephone circuits used in communicating the respective responses. Winning respondents' bank, telephone or other accounts can be credited by the central crediting facility 1126, in which event neither the printer 1122 or the printer 1128 are used.

The central evaluation facility 1124 comprises a computer 1140, a memory 1142, a register 1144, circuitry 1146 operatively coupled to the computer 1140 for ranking responses of respondents according to a predetermined criteria such as response score, and programmable comparison circuitry 1148 operatively coupled to the computer 1140 for comparing answers of respondents to acceptable responses pursuant to instructional commands from the central station 1102. Signals outputted from an output terminal of the comparison circuitry 1148 indicate the correctness of the responses. The acceptable responses are stored in the memory 1142 and serve as reference inputs to the comparison circuitry 1148. Responses received from respondents are stored in the register 1144 for subsequent application to a further input of the comparison circuitry 1148. Scoring circuitry 1150 connects between the output terminal of the comparison circuitry 1148 and the ranking circuitry 1146 for scoring the responses and for providing scores to the ranking circuitry 1146. The scoring circuitry 1150 may employ response time data, if available, as a factor in computing scores, and may include the scoring computer 902 of FIG. 29. Respondents may accordingly be ranked on the basis of the quality, such as the correctness, responsiveness, and details of the response, as well as on the speed of response. Central evaluation functions have been described hereinabove with reference to the response evaluation unit 808 of FIGS. 22, 29, 31 and 32, and the scoring computer 902 of FIGS. 29 and 31.

The communication mode 1108 also provides signals for operation of the components of the response unit 1110. More specifically, the communication mode 1108 presents acceptable responses to the comparison unit 1114, scoring and/or weighing criteria to the scoring unit 1116, and a basis for the crediting of responses to the crediting unit 1118. Communication via radio and/or television is disclosed in FIGS. 1, 3, 6–7, via telephone and/or modem is disclosed in FIGS. 22, 30 and 32, via signals emitted on a television screen in FIG. 23, and by use of prerecorded media in FIGS. 11–18 and 21–22. One or more of these functions of the communication mode 1108 are described hereinabove with respect to the response unit 22 of FIGS. 3 and 4, the response unit 210 of FIGS. 6–8, and the response unit 800 of FIG. 26. The functions of comparing, timing and scoring are shown in the response units of FIGS. 4, 8 and 26, with the circuitry of a timing unit being shown in FIG. 9. Providing credit to a response based on aspects of a response such as a word or text, in combination with timing and difficulty level, is disclosed in the response units of FIGS. 8 and 26.

With respect to the various embodiments presented by the system 1100, one embodiment provides for entry of a response by use of the keyboard 1112, with the signals outputted by the keyboard being transmitted to the central evaluation facility 1124 along line 1152 via modem 1134 and telephone network 1130. This provides the option of evaluating a response at the central facility rather than by a response unit at the local station. This can be accomplished by use of the response unit 800 of FIG. 26 to simply output the keyboard entry without evaluation of the entry, such operation being disclosed hereinabove with respect to central evaluation by the response evaluation unit 808 in FIGS. 22 and 29. The results of the evaluation can then be passed on to the central crediting facility 1126 to credit the respondent with whatever award is to be received, and may then be transmitted along line 1154 via the telephone network 1130 and modem 1134 back to the display 1120 of the response unit 1110 at the remote location of the respondent. A coupon can then be outputted by either the central printer 1128 or by the printer 1122 at the remote location.

By way of further option, the processing of a response can be shared between the remote response unit 1110 and the central evaluation facility 1124, by way of example, by performing the comparison and scoring functions at the response unit 1110. Then, the results of the scoring are transmitted along line 1156 via modem 1134 and telephone network 1130 to the central crediting facility 1126 for the crediting of an award. Thereafter, coupons may be provided by the central printer 1128 and, via transmission of the output of the central crediting facility 1126 along line 1154, the award may be displayed on the display 1120 of response unit 1110. Alternatively, by transmission of the crediting output along line 1154, a coupon may be provided by the printer 1122 of the response unit 1110.

It is noted that the mode 1108 of communication includes also communication via cable as is frequently employed for the transmission of television programs. In such transmission, referred to as Cable TV, Pay TV, and closed-circuit TV, addressable converters may be employed to limit the program presentation to a viewer to show only certain TV channels, or to limit the amount of time available for presentation of program material to the viewer. The addressable converters decode encoded or encrypted television signals to allow reception of the signals by home television receivers, and the addressable feature allows for the selection of specific channels to be enabled in response to control signals transmitted along the cable from a central station. Generally, the availability of such programs is established by prior arrangement between the viewer, or subscriber, and a broadcast company. Such arrangement can enhance an advertiser's chance of communication with a prospective customer, the TV viewer, since the program material is known ahead of time to be of interest to the viewer.

Also included in the mode 1108 of communication is portable or cellular telephony wherein the receiver of the program and instructional signals, as well as the transmitter of a response to a task, may be located on a mobile platform such as a boat or automobile, or even an aircraft. The foregoing operation of the system 1100 can proceed in the same fashion as described above, if desired. However, the mobile platform introduces the further possibility of communication between the central equipment, including any one of the central station 1102, the central evaluation facility 1124 and the central crediting facility 1126, and a plurality of remote locations. For example, a respondent to a task may respond while driving in an automobile, and the results of the response may be transmitted for printing at a printer 1122A at an alternative location such as the respondent's home or office. This is particularly useful in a situation wherein the results of a response require further study. For example, the respondent may be answering questions in a college exam, and the result, a critique by the professor, is transmitted to the respondent's home to provide further understanding of the subject matter. As a further example, the response may be the selection of certain automotive features desirable in a car intended to be purchased, and the results of the response, namely a listing of cars having the requisite features, would be transmitted to the respondent's office to be printed out in hard copy for his viewing, or to be stored in his or her office computer, assuming the computer is active and equipped with a modem. Furthermore, data to be transmitted to the alternate location may be stored in the memory 1138 to permit later transmission at a time of convenience. Conversely, a student may respond to a test at home and the graded paper may be awaiting and be delivered to the student in a classroom. As the tests results are distributed to the students in the classroom, each test paper may be individually critiqued by a professor.

The foregoing functions of the system 1100 can be accomplished also in conjunction with a coupon redemption facility such as the redemption and authentication facility 906, shown in both FIGS. 29 and 41, wherein the facility 906 is provided with data stored in the memory 1138. Also, the foregoing functions of the system 1100 can be accomplished in conjunction with a billing for services made automatically to a subscriber's bank 708 via a central telephone facility 702 of the network 1130, such automatic billing having been described previously with respect to FIG. 29.

Thereby, the generalized system 1100 of the invention demonstrates the adaptive feature of the invention to provide for evaluation and/or analysis of a respondent's response by use of electronic equipment (the response unit 1110) located at the remote location of the respondent, or by use of electronic equipment (the central evaluation, crediting and, in some instances, printing facilities 1124, 1126 and 1128) located at a central location distant from the respondent. It is noted that the computer 1140 in conjunction with the other components of the central evaluation facility 1124 are capable of performing the various evaluation functions of the remote response unit 1110. For example, acceptable responses and various weighing criteria can be transmitted via the communication link 1136 to enable the comparison and the scoring functions to be performed. Even the length of time employed by the respondent 1106 in generating a response can be made known to the central evaluation facility 1124 by transmitting along the link 1136 the time of day when the respondent is presented with the task. This is then subtracted from the time of receipt of the response at the central evaluation facility 1124 to give the length of time employed by the respondent in generating the response.

Figure 42:
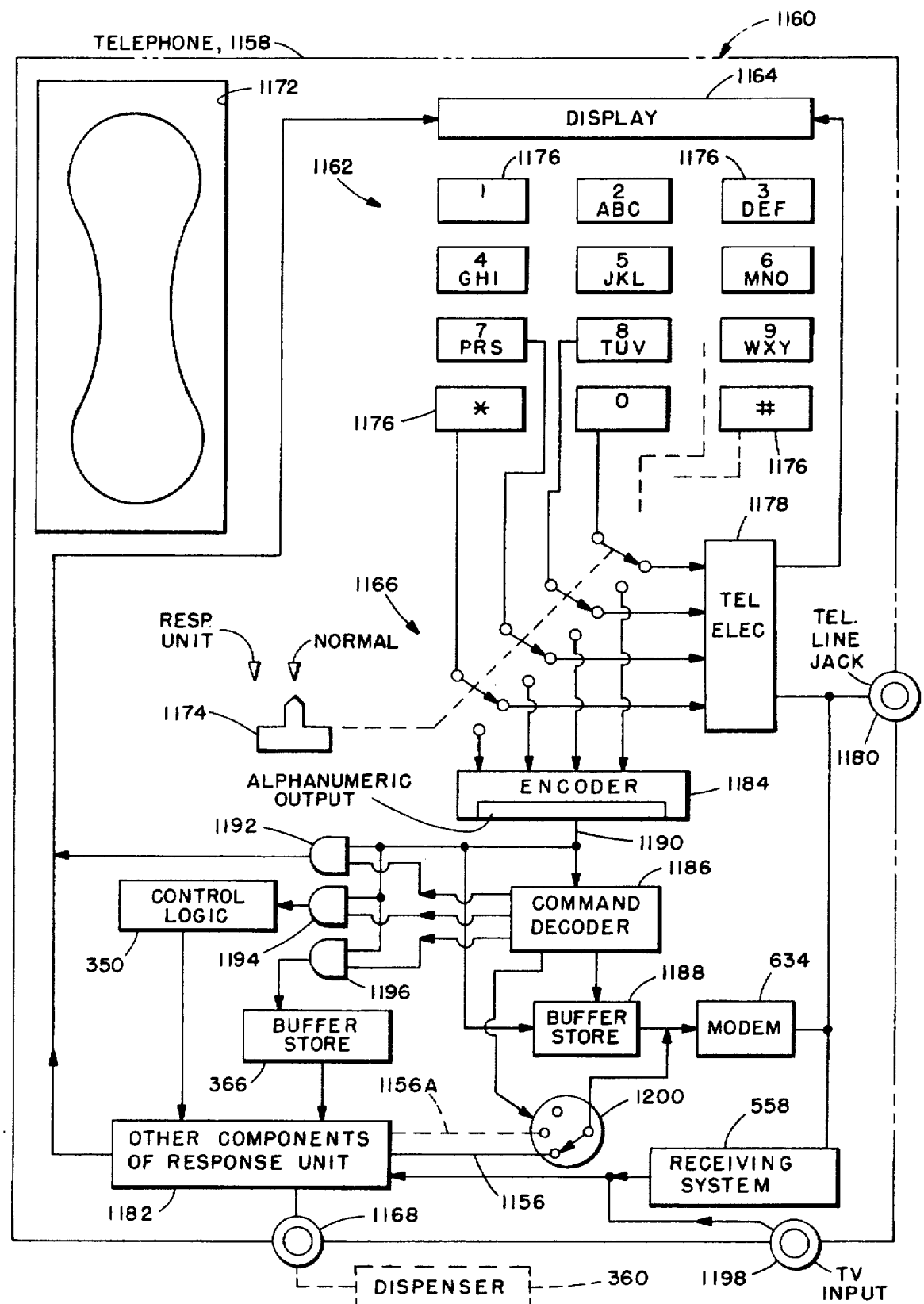
FIG. 42 shows diagrammatically a telephone incorporating circuitry of a response unit to accomplish various functions set forth in FIG. 41.

With reference to FIGS. 8, 14, 22 and 42, there is provided a simplification of equipment employed by a respondent in the generation of a response and in the transmission of the response to a central facility. As has been described with reference to FIG. 22, generation of a response at a remote station 206B is accomplished with the aid of a telephone 620 and a response unit 210 (shown in FIG. 8), or equivalently the response unit 300 of FIG. 26. Communication is obtained via a switchboard 622 and a telephone line 636. Connection of the response unit 210 to the telephone line 636 is accomplished by means of the receiving system 558 (shown in FIG. 14) and a modem 634. Thus, there is a significant amount of electronic equipment at the remote station 206B. FIG. 42 demonstrates a construction of equipment for the remote station 206B which reduces the quantity of separate pieces of electronic equipment by placing the electric circuitry of the receiving system 558 and the modem 634 and the response unit 210 within the housing 1158 of a telephone 1160. This is accomplished by miniaturizing the size of the circuitry by constructing the circuitry in the form of electronic chip circuits. The dispenser 360 of the response unit 210 would be left outside of the telephone housing 1158 because of the relatively large size of the printers 390 and 392 therein. The telephone 1160 includes a keyboard 1162 and a display 1164 which are time shared among the normal telephone functions and the functions of the response unit in a manner, to be described below, wherein no additional electronic components, except for a mode selector switch 1166 and a connection jack 1168 for the dispenser 360, appear on the outside of the telephone housing 1158.

The telephone 1160 further comprises a handset 1170 held within a cradle 1172 of the housing 1158. The switch 1166 has a button 1174 which may be slid by a person operating the telephone 1160 to select either the normal mode of telephone operation, or to activate operation of the telephone as a response unit. In the normal position of the switch 1166, keys 1176 of the keyboard 1162 are connected by the switch 1166 to the electronics 1178 of the telephone whereby tones representing digits of a number dialed are outputted via a jack 1180 to a telephone line such as the line 636 of FIG. 22. Also included in the telephone 1160 are the circuits of the aforementioned modem 634 and the receiving system 558, as well as components of the response unit 210 (or 800) such as the logic control unit 350 and the buffer store 366, plus the other components of the response unit indicated collectively at block 1182. In order to adapt the telephone 1160 to use as the response unit, there are also provided an encoder 1184, a decoder 1186 of command signals, and a buffer store 1188.

In operation, the switch button 1174 is placed in the normal position, and the telephone 1160 is operated in normal fashion for dialing the central evaluation facility 1124. After communication is initiated, as may be indicated by transmission of a prerecorded message from the central evaluation facility 1124 to the respondent, the respondent moves the switch button 1174 to the "response unit" position to enable the telephone 1160 to operate as a response unit. The electrical connection of the keys 1176 is switched by the switch 1166 from the telephone electronics 1178 to the encoder 1184. The encoder enables the keyboard 1172 to generate alphanumeric characters, rather than only the ten digits plus star and pound which are available during normal telephone operation.

The logic of the encoder 1184 may be demonstrated as follows, by considering operation of one of the keys 1176, for example, the key for generating the numeral 2. This key also shows the letters A, B or C. Upon pressing the key by itself, without a concurrent pressing of any other key, the encoder 1184 outputs the numeral 2 in the form of an electric signal on line 1190. However, by a concurrent pressing of the key with the star and/or the pound key(s), the encoder outputs the letter A or B or C, as follows. In the customary layout of a touch tone telephone, in the arrangement of the alphanumeric characters on the foregoing key, the letter A is located to the left of the letter B, and the letter C is located to the right of the letter B. The star key is located in the lower left corner of the keyboard, and the pound key is located in the lower right corner of the keyboard. Hence, upon pressing the star key concurrently with a pressing of the ABC key, the encoder 1184 outputs the letter A. Upon pressing the pound key concurrently with a pressing of the ABC key, the encoder 1184 outputs the letter C. And upon pressing both the star and the pound keys concurrently with the ABC key, the encoder 1184 outputs the letter B. Upon a pressing of the star and/or pound key(s) without a concurrent pressing of one of the digit keys, a number but no alphanumeric character is outputted by the encoder 1184.

Other ones of the keys 1176 operate in similar fashion. For example, the JKL key activates the encoder 1184 to output a numeral 5 in the absence of a concurrent pressing of star and/or pound keys. However, a concurrent pressing of the star and the JKL keys provides the letter J, a concurrent pressing of the pound and the JKL keys provides the letter L, and a concurrent pressing of the three keys provides the letter K. In the case of the operation of the key for generating the numeral 1, use of the star key provides the letter Q, use of both the star and the pound keys provides the letter Z, and use of the pound key provides a comma for punctuation. In the case of the operation of the key for generating the numeral 0, use of the star key provides the delete function for deleting the last character to correct a mistake, use of both the star and the pound keys provides the enter function for transmitting a message to the central evaluation facility 1124, and use of the pound key provides a period for punctuation. The line 1190 connects the output port of the encoder 1184 to the display 1164 to activate the display 1164 to show the respondent the alphanumeric characters which have been typed.

Thereby, the keyboard 1162 and the display 1164 provide the function of entering alphanumeric characters in a manner equivalent to the operation of the keyboard 356 and the display 358 in the response units 210 and 800 of FIGS. 8 and 26, respectively. The keyboard 356 also has special function keys such as "next answer", "different level", etc. Such special function commands may be implemented on the keyboard 1164 of FIG. 42 as follows. Typing of the letter Q twice "QQ" designates a command function which is repeated by a numeral to identify the command. For example, QQ1 indicates that the telephone 1160 is to provide the operation of the response unit 800 without communication with a central evaluation facility such as the facility 1124. QQ2 indicates that responses are to be processed in the manner shown in FIG. 41 wherein communication is accomplished via lines 1152 and 1154 wherein evaluation is accomplished at the central facility 1124 and wherein the printing of a coupon is accomplished under direction of the central crediting facility 1126 by the central printer 1128 and/or by the dispenser 360. QQ3 Indicates that responses are to be processed in the manner shown in FIG. 41 wherein communication is accomplished via lines 1156 and 1154 wherein evaluation is accomplished locally at the telephone 1160 and a crediting of an award is accomplished by the central crediting facility 1126. In similar fashion, other commands may be provided to provide for "next answer" or "different level", useful in the conduct of a quiz program by way of example. Still further commands may select upper or lower case letters to be presented in the display 1164, while yet additional commands may be employed to provide for a foreign language alphabet, such as Greek symbols.

In the operation of the telephone 1160, the signals outputted on line 1190 from the encoder 1184 include signals having the same form as those outputted by the keyboard 356 of FIGS. 8 and 26 to the buffer store 366, plus the command signals to the logic control unit 350, plus command signals for the display 1164 and further command signals not present in the response units 210 and 800 for FIGS. 8 and 26. The decoder 1186 recognizes the various signals and sorts out the various signals via a set of AND gates 1192, 1194 and 1196 for applying the respective signals to the display 1164, the logic control unit 350 and the buffer store 366. Signals constituting a message to be transmitted from the telephone 1160 to the central evaluation facility 1124 and or the central crediting facility 1126 are stored initially in the buffer store 1188 until such time as the respondent provides the enter command. In response to the enter command, the decoder 1186 strobes the store 1188 to output the message to the modem 634 to be transmitted via the telephone jack 1180 to the central evaluation facility 1124 and/or the central crediting facility 1126. Communication may be had also with the central station 1102 via telephone circuit and modem, as has been described above with reference to FIG. 41.

Instructional signals for operation of the response circuitry of the telephone 1160, arriving via the telephone jack 1180 are received by the receiving system 558 and converted to a signal format, as described above with reference to FIG. 14, suitable for operation of the decoders 338, 340, 342 and 344 of the response units shown in both FIGS. 8 and 26. Alternatively, if instructional signals are to be received by radio or television, as shown in FIGS. 1, 3, 6 and 7, the telephone 1160 may be provided with a further jack 1198 which bypasses the receiving system 558. The capacity of the telephone 1160 to implement the communications represented by the lines 1152, 1156 and 1154 of FIG. 41 is accomplished with the aid of a switch 1200 which is activated by the decoder 1186 to connect line 1156 from the output of the scoring circuitry to the modem 634 for transmission to the central crediting facility 1126, or to connect optionally line 1156A from the input terminal of the scoring circuitry for transmission to the central evaluation facility 1124, or to leave both lines disconnected for operation as a stand alone response unit.

When desired, a memory (not shown) connected to credit point storage 1118 functions as cumulative storage of credit points earned by respondents who have successfully answered more than one question. By utilizing the circuitry shown in FIGS. 22 and 41, a respondent can elect to receive an award for a single acceptable response, or "to let the winnings ride" on the successful answer or answers to one or more additional questions or tasks. At the option of the system operator, the game may permit accumulating credit points for all acceptable responses, irrespective of wrong answers, or losing all credit points earned for preceding wins by entering one unacceptable answer, or to earn cumulative credit points after deducting credit points for unacceptable or wrong answers. The modes or rules governing a game are determined by the host and announced to respondents.

By way of further embodiments, it is noted that it may be desired to operate the telephone only in an all digital system wherein instructional signals are to be encoded digitally, as are facsimile signals, employing the full frequency spectrum of the telephone line, rather than the limited spectrum disclosed in FIG. 2. In such case, the receiving system 558 can be replaced with a modem (not shown) or share the modem 634 with the outgoing signal transmission, and the decoders 338, 340, 342 and 344 can be replaced with circuits recognizing the identifying flags of the various digitally formatted signals.

In view of the capacity of the telephone 1160 to provide the foregoing various modes of processing responses to quizzes, tasks, contests, wagering and other situations described hereinabove, to include both local evaluation and central evaluation, the telephone 1160 may be regarded as a form of universal response unit.

The system of FIG. 41 and the telephone of FIG. 42 are operative with various forms of prerecorded and live transmission of program material including direct broadcast, cable transmission, the use of playback mechanisms which can be activated by individual TV viewers, as well as other video-on-demand techniques, as well as various forms of communication protocol including various forms of signal compression and data compression. Also, the mode of displaying of the data can be a cathode ray tube as in a television set or a charged-coupled device (CCD) display, or similar flat-panel displays which may be electrically activated to portray the program material. Also, the data entry devices may include a keyboard with a screen, as has been disclosed with respect to the response unit 800, or an entry device constructed as a computer terminal having both keyboard and a large screen. The keyboard and display of the foregoing telephone 1160, or a touch-panel wherein electrostatic interaction between a person's finger and the panel provides for entry of an alphanumeric symbol or other symbol located in the area of the panel touched by the person's finger, as well as by the use of voice activated devices, infrared guns, joysticks, a mouse or track ball or other device used for entry of data on computer terminals. Signal transmission means can utilize optical, audio, radio frequency, electric, mechanical, infrared or other signals which can be modulated or varied in intensity, frequency or phase of pulses, and other forms of modulation as may be desired to convey the requisite information. It is noted also, that the printer employed, either at the central station or at the remote station for outputting a coupon or other hard copy may be constructed in the form of a facsimile machine with data being transmitted by facsimile protocol.

In the case of program material producing a scenario such as a world series baseball game wherein a task requires the prediction of the next play, it is understood that the game may be either a live game, or may be a game of historical interest which, may have been played more than 10 years earlier. In either case, the consideration of an event to be predicted applies equally well to both the live and the prerecorded presentations.

With respect to the use of the central evaluation facility 1124 accessed by use of the telephone 1132 (FIG. 41) or the telephone 1160 (FIG. 42), notification of the results of a response submitted by the respondent 1306 may be provided rapidly, on the order of a matter of seconds, or at a later time such as the following day or week In the case of a result which is to be transmitted almost immediately to the respondent, use of the telephone permits a report to the respondent to be made by way of a prerecorded message designating a score or an award or providing a further instruction, by way of example. In the event that the telephone is provided with a display screen which can be activated by signals from a remote station, the results of the respondent's submitted response can be portrayed on the telephone display. Such immediate report back of results is useful in events for wagering.

In another form of implementing the method for rewarding successful contestants, a marketing facility such as a catalog center, a showroom, a discount center, or a redemption center carries or opens monetary accounts in the names of individual contestants. A contestant can spend part or all of his or her credit limit, or of the amounts accumulated in or credited to such accounts through purchases of selected merchandise made in person, through the mail, or electronically as by telephone or 2-way cable.

The printer described in the context of prize coupons and other forms of awards can also be directed by instructional signals to print messages and text unrelated to prizes. A coupon printer normally is limited to printing relatively short hard copy text, such as discount coupons or recipes sponsored by manufacturers of cooking or baking ingredients. However, modified printers are able to print larger hard copy suitable for news flashes, stock quotations, weather reports, sports results and the like. In such an event, individual printers are activated and controlled by instructional signals filtered to a user's printer through an addressable converter. Such a system can be used by a subscription service providing selected printed out information addressed to individual subscribers.

Figure 43:
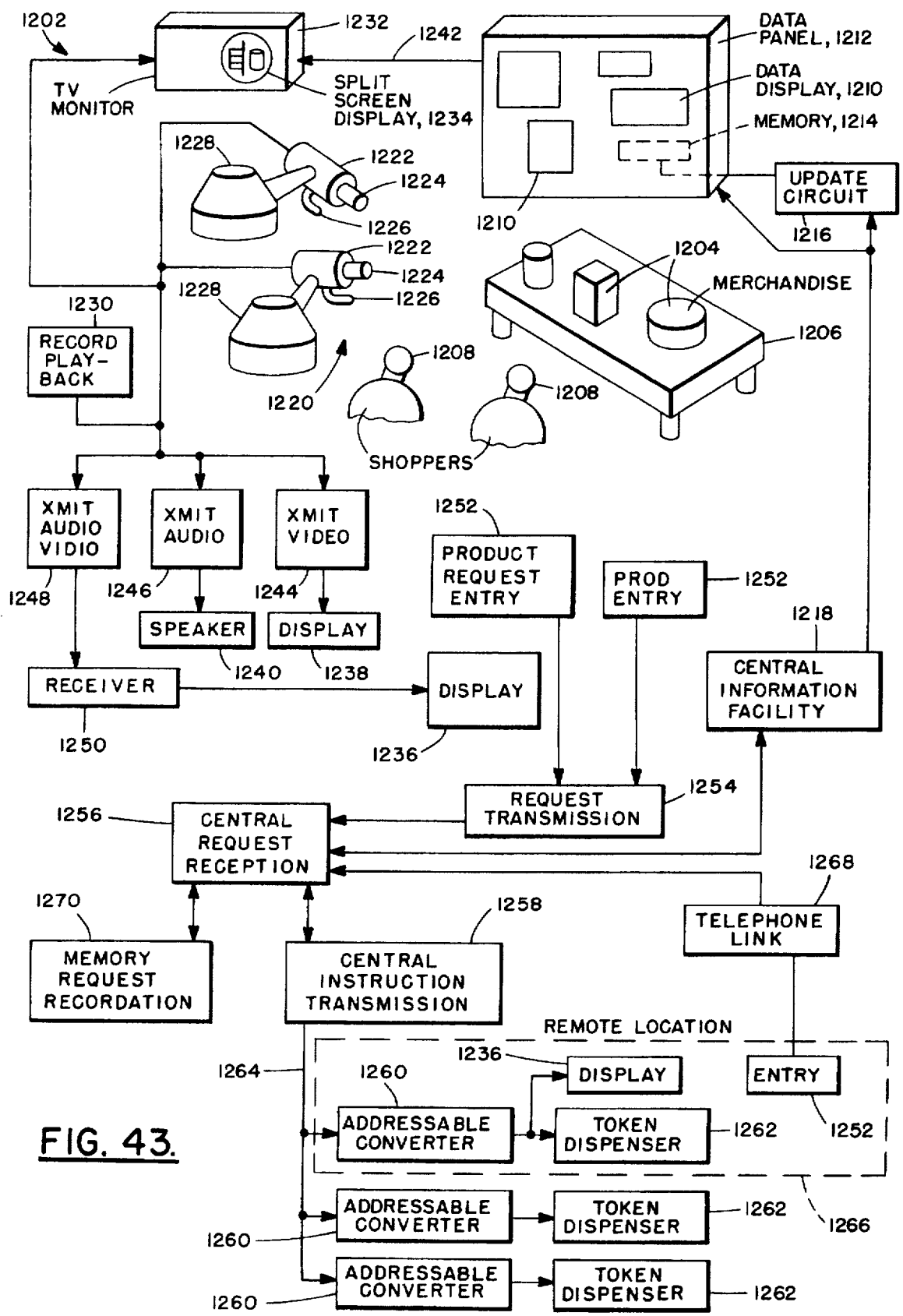
FIG. 43 shows diagrammatically a system for studying and selecting merchandise combined with receipt of awards, the system employing equipment and techniques of the preceding embodiments.

FIG. 43 shows a merchandising system 1202 employing equipment and techniques found in the preceding embodiments of invention. The system enables a buyer or shopper at his remote location to selectively enter a request for a dispensing of a coupon or other hard copy bearing a discount on an identified product need at the time. To facilitate the description, the term "token" is understood to include various forms of hard copy such as a rebate check, voucher or discount coupon. The system 1202 provides an area for viewing products 1204, or even "large ticket items", such as automobiles and includes a stand or table 1206 for displaying the products 1204 before prospective shoppers 1208. Product data is presented on a set of displays 1210 of a data panel 1212 which includes a memory 1214 for storing data to be displayed. The stored data is updated by update circuitry 1216 which erases old data from the memory 1214 and inserts new data into the memory when such new data is made available by a central information facility. While only one display panel 1212 is shown in the figure for one product viewing area, it is to be understood that the invention is operative with multiple panels 1212 located in respective ones of multiple product viewing areas, and wherein the multiple panels 1212 are activated by a common central information facility, namely the facility 1218.

A product selection is made by a shopper following the display at the shopper's location of alternative products available for purchase and upon the receipt of product information. The product information is provided in both visible and audible form by use of television equipment 1220 including vidicons 1222 with zoom lenses 1224, and equipped with microphones 1226. The vidicons 1222 are positioned by guidance systems 1228 which aid observers, including TV viewers, to view specific products including labels thereof containing useful product information. Voice commentary about a product 1204, as well as video material may be recorded for subsequent playback by means of recording-playback apparatus coupled to the television equipment 1220, or may be presented to shoppers directly by means of a TV monitor 1232 having a split screen display 1234, as well as by means of further displays 1236 and 1238 of video material, and by means of a speaker 1240 presenting audio material.

The split screen display 1234 provides both written material from the labels of the products 1204 and a view of the products, the written material and the product view being on opposite sides of the screen. Additional data obtained from the data panel 1212 via line 1242 may also be presented on the screen of the monitor 1232. Signals for operating the display 1238 are transmitted from the television equipment 1220 by means of a video transmitter 1244, and signals for operating the speaker 1240 are transmitted from the television equipment 1220 by means of an audio transmitter 1246. A transmitter 1248 of video and audio signals applies signals from the television equipment 1220 via a television signal receiver 1250 to the display 1236, thereby to present both video and audio descriptive material of the products 1204 to the shoppers 1208. The product information may be in alphanumeric form including symbols and icons, if desired, as well as in pictorial form. The display of merchandise can precede or follow or accompany the display of information.

A shopper can enter a request for a token on an identified product directly without awaiting the receipt of product information, or the shopper can first request product information for the purpose of acquainting himself or herself with the latest information available at said data storage facility. The information is made available by the interconnection of the data panel 1212 with the central information facility 1218. The actual product request by a shopper 1208, whether the request be for information or for a token directed to the product, is entered on any one of a plurality of entry devices 1252 which may take the form of a computer terminal having a keyboard and display, or a more simple form of man-machine interface such as a touch panel wherein a shopper merely touches the area of the panel identifying the product.

The various entry devices 1252 connect with transmission circuitry 1254 which transmits the shopper's request to a central request reception facility 1256. The facility 1256 communicates with the central information facility 1218 to order the display of requested product data on the panel 1212. A central instruction transmitter 1258 connects with the request reception facility 1256 to transmit a token request via one of a plurality of addressable converters 1260 to one of a plurality of token dispensers 1262. The dispensers 1262 are located at points of convenience to shoppers, so as to be accessed readily by respective ones of the shoppers to receive their respective tokens. Typically, the transmission of the transmitter 1258 is via a microwave communication channel 1264 and includes the address of each dispenser 1262. Also, for security purposes, the dispenser command signals may be coded, and the converters 1260 decode the signals in the same fashion as is accomplished with home cable TV. The converters 1260 read the address of the selected dispenser 1262 to direct a token request to a selected one of the dispensers 1262.

This arrangement permits the dispensers 1262 to be located at remote locations 1266 if desired, for example, at business locations of individual shoppers in the case wherein the merchandising system 1202 is employed for wholesale. Furthermore, a remote location 1266 may be provided also with an entry device 1252 connected via a telephone link 1268 to the central request reception facility 1256 to request information to be displayed on a display 1236 also located at the remote location 1266 and connected to the addressable converter 1260. Interconnection of the central information facility 1218 with the central request reception facility 1256 enables the facility 1256 to verify that the request is a valid request for a product carried by the merchandising system 1202. Recordation of shoppers' requests is accomplished by storing the requests in a memory 1270 connected to the central request reception facility 1256.

A product display facility, constructed as shown above, can be dedicated, if desired, solely to the promotion of specific products by the displaying of the products available for sale, both wholesale and retail, without being a sales outlet. Such a facility can be designed and used for display purposes only, obviating large amounts of space normally required in a retail store. Being essentially an exhibiting facility, such a showroom can be planned and laid out for that specific purpose. Such a display facility permits, for example, stocking only two articles of each kind such as two bottles of an over-the-counter medicine or drug. One bottle displays the front and the other the back of the bottle. The resulting showroom and display facility can, therefore, be constructed with a relatively compact architecture.

If used for wholesale purposes, such a display facility can serve as a tool for the marketing by manufacturers, distributors, or wholesalers to retailers. In that event, as noted above, the product information is transmitted through coded signals via the addressable converters 1260 to buyers for stores or those of target retailers. Product information, such as prices, will vary depending on whether promotions are directed towards the public or commercial enterprises. For remote locations 1266 located at commercial enterprises, the tokens can take the form of rebate checks and credit vouchers which can be used in conjunction with a wholesale order, if desired, by deducting the amount of a rebate check dispensed by dispenser 1262 from the amount of a written purchase order accompanied by the rebate check. Also, the token may be of other form of hard copy carrying value consideration and intended to induce stores or chains to buy products wholesale.

For example, a purchasing manager may access the central information facility 1218 via the telephone link 1268 which, by way of example, may be a two-way cable communication link to request a rebate check based on the purchase of a product in a specified quantity or monetary amount to be dispensed by a printer within the dispenser 1262. Additional security measures may be taken, including coding and stipulations on the rebate check that such rebate or discount is available only upon purchase of a specified product or products from a specified group. Furthermore, products can be identified by name, number, or bar code, as well as by store or shelf location. Bar codes, as well as other codes which may be employed, can be read automatically by readers mounted within reading range of the product identification code without obstructing images picked out by the vidicons 1222.

Product information may include also value consideration, such as rebate, prizes, or discounts available upon purchase of the identified products, as well as related information, such as cut-off dates, and store or factory locations. The recordation of a buyer's request at the memory 1270 permits the collection of data relative to the product identified by a wholesale or retail buyer, such cumulative data creating a buyer's individual purchase profile for subsequent analysis and evaluation.

Upon request of a shopper, whether the shopper be physically located within the display area, or whether the shopper call in from the remote location 1266 via the telephone link 1268, the vidicons 1222 are activated to zoom in on an individual product to provide the shopper with the desired product information. The merchandising system 1202 may also display products of different manufacturers in the manner of a trade show wherein only one or two items of each model are on display for viewing from different angles by one or more TV cameras or for providing a wrap-around view by a roving camera. An inventory of such products may be warehoused at a remote location. Also, by means of the merchandising system 1202, a group of suppliers can form a cooperative venture in the form of a central showroom in conjunction with a tape or disk library which can be accessed by retail and wholesale buyers. The products and services of the suppliers would be numbered or otherwise identified to facilitate accessing of desired product data.

By way of alternative embodiments, it is noted that the plurality of remote receiving stations 16 and 18 of FIGS. 1 and 3, the stations 206C of FIG. 29, and the plurality or receiving stations 1016 need not have the same physical form. For example, as described above with reference to FIG. 41, one receiving station may be a permanent station such as a person's home or office, while another of the stations may be a temporary station resided in by a person on a temporary basis such as a vehicle, for example, a ship, an aircraft, or an automobile. Various forms of communication, including cellular telephony and satellite communication may be employed between any one of the remote receiving stations (whether the receiving station be a permanent or a temporary station) and its central station 12 (FIGS. 1 and 3) or 1004 (FIG. 32). Thus, this feature provides versatility by enabling a person to enter a contest while residing at a temporary location, and requesting a central control station to direct a printout of hard copy at the person's permanent location.

Figure 44:
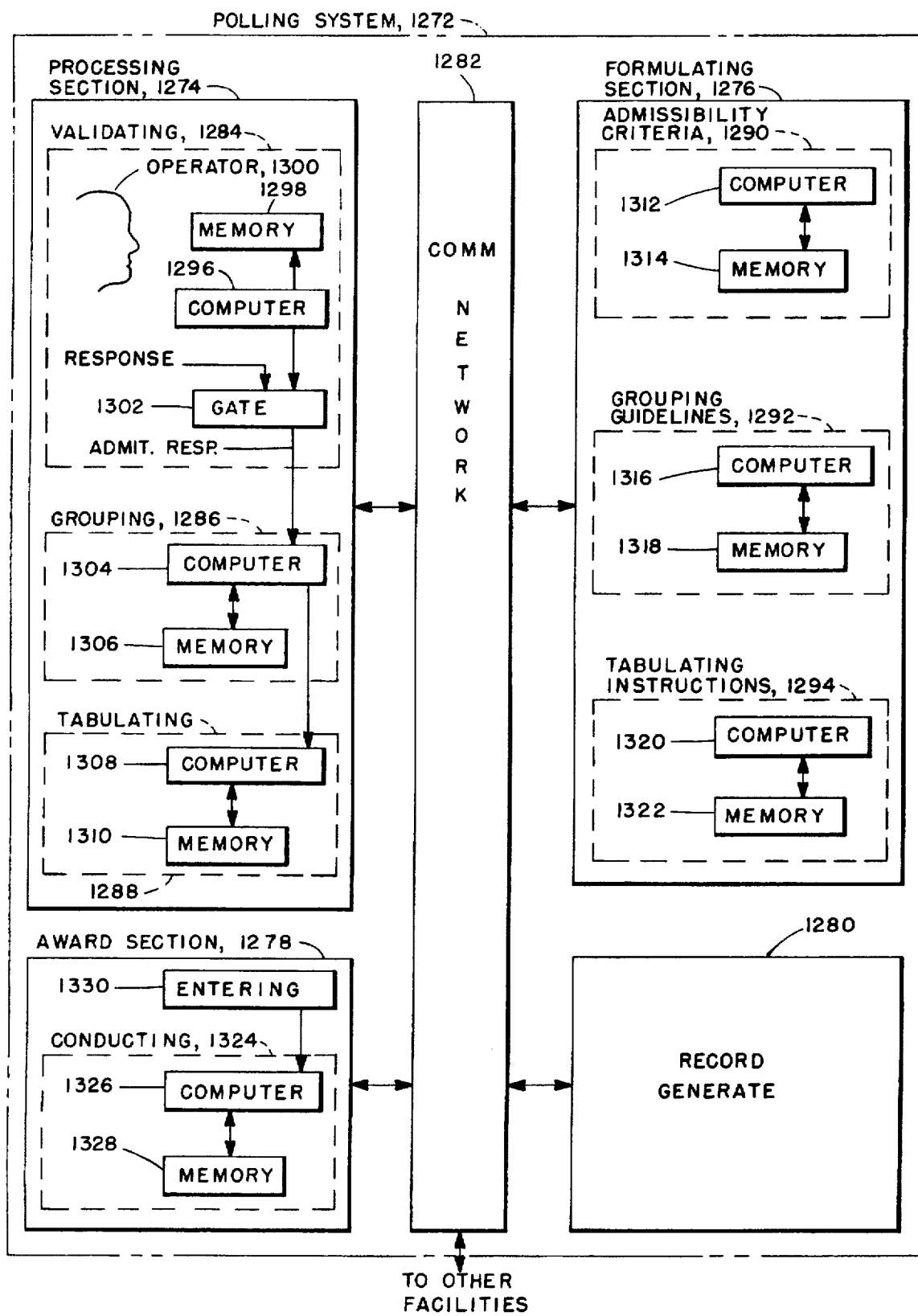
FIG. 44 is a block diagram showing components and functions of a polling system.

FIG. 44 shows details in the operation of the system of the invention to provide for a polling of members of a remote audience. The polling function has been described hereinabove for use with various equipments disclosed above and with various ones of the embodiments of the invention. Some aspects of the polling may be summarized as follows. Respondents' data are processed in accordance with several distinct sets of criteria of which the following are noted. Normally, the first criteria set a standard for admissibility of responses to the analytical procedures. Such standards range from barring mutilated or objectionable responses to minimum or limit-setting guidelines, such as screening out respondents who have not completed high school. These criteria are primarily negative or disqualifying criteria. A second set of criteria serves to further select and group respondents based on a variety of yardsticks, characteristics and specifications which, by way of examples, includes age, gender, residence, children, income, education, political affiliation, hobbies, voting record, health features and others. This set of grouping indicator is used, both to limit respondents to the desired groups, or to identify and isolate discrete segments of the polled population for separate or subsequent polling.

Having polled the targeted group of respondents and having processed responses as described above, the resulting input by desired groupings of respondents can then be analyzed in any desired fashion. Different groupings can be cross-referenced or otherwise processed. The results are tabulated and stored or made available to sponsors for further analyses based on a sponsor's own interpretive guidelines. The software designed in connection with the above described polling or survey activities allow for the flexibility of individually programming circuitry to achieve selected ones or all of the state objectives.

With reference to both FIGS. 29 and 44, further explanation of the polling function is provided. Specific apparatus for performance of the polling function is presented in a polling system 1272. To facilitate a description of the polling system 1272 and its interconnection with various ones of the facilities and equipments of FIG. 29, the polling system 1272 is incorporated within the data facility 904, however, it is to be understood that the polling system 1272 may be provided as a separate facility distant form the data facility 904, if desired. As shown in FIG. 29, the locating of the polling system 1272 within the data facility 904 provides for communication between the polling system 1272 and the switchboard 622 to provided for the advantages of automatic number identification at the number identification facility 1020, as well as communication with the response evaluation unit 808 and the scoring computer 902 to utilize the features of response evaluation and scoring, and communication with the central station 202 to obtain direct input from personnel operating the central station, if desired. The polling system 1272 may be constructed as a programmable general purpose computer with adequate memory to store data to be used in conducting the polling. However, to facilitate a description of the invention, and to show the various functions to be implemented by the polling system 1272, the diagrammatic view of the polling system 1272 in FIG. 44 shows separate blocks for respective ones of the functions, with individual ones of the blocks having their own programmable computer and memory for storing data necessary for carrying out the various polling functions.

The polling system 1272, as shown in FIG. 44, comprises a processing section 1274, a formulating section 1276, an award section 1278, and a record generating section 1280 which are interconnected via a communication network 1282, the latter providing communication also with other components of the data facility 904 and other facilities of the system 900 of FIG. 29. The processing section 1274 comprises a validating unit 1284, a grouping unit 1286, and a tabulating unit 1288. The formulating section 1276 comprises a unit 1290 providing criteria for admissibility respondents' responses, a unit 1292 providing guidelines for grouping respondents' responses, and a unit 1294 providing instructions for tabulating respondents' responses. The validating unit 1294 comprises a computer 1296 operative with a memory 1298, and under control of an operator 1300, to activate a gate 1302 to pass admissible responses to a computer 1304 of the grouping unit 1286. The grouping unit 1286 further comprises a memory 1306 operatively connected to the computer 1304. The tabulating unit 1288 comprises a computer 1308 and a memory 1310 operative upon signals received from the grouping computer 1304. The criteria unit 1290 comprises a computer 1312 with a memory 1314. The guidelines unit 1292 comprises a computer 1316 with memory 1318. The instructions unit 1294 comprises a computer 1320 with memory 1322. The award section 1278 comprises a unit 1324 for conducting a prize or sweepstakes event for persons responding to a poll, the conducting unit 1324 including a computer 1326 with a memory 1328. The award unit 1278 further comprises an entering device 1330, such as a keyboard, for entering data and instructions into the computer 1326. The record generation section 1280 may comprise a token dispenser, such as the dispenser 360 of FIG. 8, or other suitable device for providing a record of proceedings of the polling situation.

In operation, the formulating section is employed to set up the ground rules of the polling. The unit 1290 establishes criteria to be employed by the validating unit 1284 for determining whether a response is an admissible response. Such criteria might include the amount of time allocated to persons from specific geographic locations or in a specific age bracket. Or, by way of further example, the criteria for an admissible answer in a survey about political candidates may be the number of misspellings in a candidates name. The unit 1292 establishes guidelines for grouping responses according to political, geographic, demographic and/or psychographic factors in respondents' personal profiles. These guidelines are employed by the grouping unit 1286 for grouping responses in predetermined groups. The unit 1294 establishes instructions for operation of the tabulating unit 1288. In the case of a polling situation, such as the conduct of a survey involving a set of multiple questions, the tabulation instructions insure that the tabulating unit is able to distinguish the answers for the various questions for accurate tabulation of the survey results. In the conduct of a poll, it may be desirable to award participants with some form of a prize. This is accomplished by feeding from the validating unit 1284 identification of either all respondents, or only those submitting an admissible response, via the communication network 1282 to the award section 1278, whereupon the award section 1278 instructs the record generation section 1280 to output tokens having monetary value for the participants. The record generation section 1280 may also provide a listing of participants in hard copy as well as in some form of magnetic or optical media.

It is to be understood that the above described embodiments of the invention are illustrative only, and that modifications thereof may occur to those skilled in the art.

Accordingly, this invention is not to be regarded as limited to the embodiments disclosed herein, but is to be limited only as defined by the appended claims.

What is claimed is:

1. A system for communicating task-setting program signals to respondents at a plurality of receiving stations and for responding to said program signals at said receiving stations, the program signals being suitable for the playing of a game, said system comprising:

a plurality of receiving stations;

first signal means for generating one of said program signals;

second signal means for generating an instructional signal incorporating predetermined response criteria defining an acceptable response, said response criteria serving also for scoring an acceptable response, said second signal means being operative to generate said instructional signal independently of a generating of said program signal by said first signal means;

means coupled to said first and second signal means for recording upon a recording medium said program signal of said first signal means and said instructional signal of said second signal means;

playback means operative with said recording medium for playing back said program signal and said instructional signal recorded by said recording means;

means for communicating said program signal from said playback means to each of said receiving stations;

means for presenting a program situation to said receiving stations;

means for communicating said instructional signal from said playback means to a central tamper-resisting evaluation station inaccessible to said respondents;

means at each of said receiving stations for responding to said program situation;

means for communicating an individual response of said respondents to said central evaluation station;

comparing means at a central location having means responsive to said instructional signal of said playback means for comparing the responses of individual respondents ones of said to said predetermined response criteria to determine acceptable responses;

means coupled to said comparing means for scoring a respondent's acceptable response in accordance with said instructional signal to assign a fixed or a computed value to an acceptable response; and informing means coupled to said scoring means for informing said respondent of a scored response;

wherein two or more responses are acceptable, of which one is a preferred response;

wherein said preferred response receives a higher score award;

wherein said evaluation station includes means for scoring said individual response essentially immediately following its input by said respondent; and wherein said scoring means permit input of said single response by a respondent on the spur of the moment.

2. A system for conducting a game for individual participating players at remote locations and for awarding individual one of said players who have responded acceptably to a question, said system comprising:

a plurality of remote locations for said players;

a facility for playing back a recording medium at a central location, the recording medium intended to be played back by said playing facility, the recording medium containing messages, each of said messages comprising signals conveying at least one question which is either a single-part question or a multiple-part question and signals defining at least one acceptable answer to the question;

an evaluation facility serving said remote locations, and comprising a tamper-resisting storage for entered answers of said players and means for comparing a stored individual one of said entered answers to an acceptable answer to determine an acceptable entered answer, said evaluation facility further having means for generating instructional signals to communicate information evidencing an acceptable one of said entered answers to a token generating means;

communication means operatively connected to said recording medium playing facility for transmitting said messages from said playing facility to individual ones of said remote locations and to said tamper-resisting storage;

means for communicating one of said messages defining an acceptable answer from said recording medium playing facility to said evaluation facility;

a sub-system at each of said players' remote locations comprising:

means operative by an individual participating one of said players for activating said record medium playing facility;

means for receiving said message from said playing facility;

means connected to said receiving means for presenting said messages to individual participating ones of said players;

means in communication with said evaluation facility for responding to a question; and means for generating a token evidencing an acceptable answer by a successful one of said players;

said system further including means for communicating said instructional signals from the evaluation facility to said token generating means to generate a token evidencing an acceptable entered answer by said successful player.

3. A method for transmitting task-setting program signals, suitable for the playing of a game, from a central site to a plurality of receiving stations at remote sites and for responding to said program signals at said receiving stations, said method comprising:

transmitting a task-setting program signal from a central site, said task comprising at least one question which is either a single-part question or a multiple-part question;

presenting a program, including said task transmitted by said program signal to members of an audience at each of said receiving stations;

providing means at a central site for transmitting an instructional signal incorporating response criteria determining an acceptable response to said task and determining the scoring of an acceptable response to said task;

transmitting said instructional signal;

providing means at each of said receiving stations for responding to said task presented in said program;

responding to said task by an individual member;

providing means for communicating a member's response to a central evaluation facility said evaluation facility serving a plurality of said receiving stations;

receiving said instructional signal and a member's response at said evaluation facility;

providing means at said evaluation facility, responsive to said instructional signal, for comparing the response of an individual one of said members to said response criteria and for scoring the member's response, said scoring ranging from assigning a fixed value determined by said response criteria to assigning a computed value determined by said response criteria;

comparing and scoring responses of the respective members at said evaluation facility;

wherein said means for transmitting said instructional signal includes means for generating an instructional signal which provides for scoring independently of a transmission of an instructional signal which provides for comparing;

said response criteria have been determined prior to the transmission of said program signals;

an individual one of said responses is evaluated essentially immediately following its input by a member; and said evaluation facility permits input of a single response by said member on the spur of the moment.

4. A method for conducting a prize event for audience members of broadcast stations, comprising the steps of:

formulating at least one task, and at least one accompanying acceptable response, each acceptable response having a value;

a station broadcasting a program including said at least one task;

an audience member responding to said task by entering response data in an entering device operatively connected to two-way communications means for communicating response data to a response evaluation facility and for identifying a responding audience member;

providing said evaluation facility, said evaluating facility having means for comparing a member's entered response with an acceptable response to determine an acceptable entered response and its value;

providing means for identifying responding ones of said audience members;

communicating said entered response to said evaluation facility;

providing data of said acceptable response to said evaluation facility;

storing said acceptable response data in said evaluation facility until completion of the evaluation step;

evaluating said entered response at said evaluation facility by entered within an allowed time, and comparing said entered response to said acceptable response to determine an acceptable entered response and its value;

identifying a member of said audience having entered an acceptable response;

comparing values of acceptable entered responses of identified ones of said members to create a listing of comparative values of members' response values;

awarding prizes to said members in accordance with the comparative values of their responses; and informing identified members of awarded prizes;

wherein, if two or more responses by said audience members are acceptable, one can be a preferred response;

wherein a preferred response receives a higher award;

wherein said evaluation facility rewards an individual response essentially immediately following its input by a member; and wherein said evaluation facility permits input of a single single one of said responses by a member on the spur of the moment.

5. A method for transmitting task-setting program signals, suitable for the playing of a game, from a central site to a plurality of respondents at receiving stations at remote sites and for responding to said program signals at said receiving stations, said method comprising:

formulating a task-set comprising a task, response criteria defining an acceptable response, an acceptable response essentially being the entering of information prescribed in an announcement of the task, and a value associated with an acceptable response;

providing central means for transmitting a program signal;

transmitting a first program signal including a task requiring a response by a respondent within an announced time frame;

providing means for transmitting an instructional signal, the instructional signal incorporating response criteria comprising the acceptable response;

transmitting the instructional signal, said announced time frame for responding, and a value associated with an acceptable response;

providing means at said receiving stations for presenting a program transmitted by said program signal;

presenting said program signal at said receiving stations;

providing means at each of said receiving stations for entering a response to a task presented in said program;

each of said respondents entering a response at a respective one of said receiving stations;

providing a response evaluation facility for receiving an entered response and means responsive to said instructional signal for determining an acceptable entered response and associated value;

determining said acceptable entered response and associated value;

providing means for preventing the entering or evaluating of responses outside said time frame;

preventing the entering or comparing of responses outside said time frame;

providing two-way communication means between said receiving stations and said evaluation facility;

informing a respondent who has entered an acceptable response of said value; and making said value available to said respondent.

6. A system for transmitting task-setting program signals from central site to a plurality of receiving stations at remote sites of respondents and for responding to said program signals at said receiving stations, the program signals being suitable for the playing of a game, said system comprising:

said plurality of receiving stations;

means at a central site for transmitting one of said program signals to said receiving stations, said program signal conveying a task-setting program;

means at each of said receiving stations for presenting said task setting program conveyed by said program signal to an audience, a task of said task-setting program comprising at least one question which is either a single-part question or a multiple-part question;

means at a central site for transmitting a set of instructional signals incorporating response criteria determining an acceptable response to said task and the scoring of an acceptable response to said task;

means at each of said receiving stations for entering a response by individual respondents to said task presented in said program;

a central evaluation facility serving a plurality of said receiving stations, and means operable by said respondents for communicating a respondent's response to said central evaluation facility;

means at said evaluation facility for receiving said instructional signals;

means at said evaluation facility, responsive to said instructional signals for comparing a respondent's response to said response criteria, to determine an acceptable entered response;

means coupled to said comparing means for scoring an acceptable response of said respondent, said scoring ranging from assigning a fixed value determined prior to the transmission of said program signal to assigning a computerized value determined by said evaluation facility in accordance with said response criteria; wherein said means for transmitting said instructional signals includes means for generating a first and a second instructional signal, said first instructional signal providing for scoring independently of a transmission of said second instructional signal which provides for comparing, and wherein said response criteria have been determined prior to the transmission of said program signal;

wherein two or more responses are acceptable, of which one is a preferred response;

wherein said preferred response receives a higher score;

wherein said evaluation facility scores an individual one of said responses essentially immediately following its input by one of said respondents; and wherein said evaluation facility permits input of a single response by said respondent on the spur of the moment.

7. A method for conducting a first prize event for audience members of broadcast stations and for entering winning ones of said members in a second prize event, the method comprising the steps of:

formulating in a first prize event at least one task, and an accompanying acceptable response;

a station broadcasting its program including at least one task;

an individual one of said audience members responding to said task by entering a response in the entering device of a telephone;

identifying said member through caller identification means or through entered personal identification;

providing a central evaluation facility having means for comparing a member's entered response with an acceptable response to identify a winning member;

transmitting an acceptable response to said task from a central station to said evaluation facility;

storing an acceptable response to a task in said evaluation facility;

communicating entered responses to said evaluation facility;

comparing an entered response to said acceptable response to determine an acceptable response entered by an identified winning member;

entering winning members in said second prize event;

conducting said second prize event; and determining a winner of said second prize event.

8. A system for communicating task-setting program signals to respondents at a plurality of receiving stations for responding to said program signals at said receiving stations and for ranking responses, the program signals being suitable for the playing of a game, said system comprising:

said plurality of receiving stations;

first signal means for generating one of said program signals;

second signal means for generating an instructional signal incorporating predetermined response criteria defining acceptable responses, said response criteria serving to score acceptable responses, said second signal means being operative to generate said instructional signal independently of a generating of said program signal by said first signal means;

means coupled to said first and second signal means for recording upon a recording medium said program signal of said first signal means and an instructional signal of said second signal means;

playback means operative with said recording medium for playing back said program signal and said instructional signal recorded by said recording means;

means for communicating said program signal from said playback means to each of said receiving stations;

means for presenting a program situation to said receiving stations;

a central tamper-resisting evaluation station inaccessible to said respondents, and means for communicating said instructional signals from said playback means to said evaluation station;

means at each of said receiving stations for entering a response by one of said respondents to said program situation;

means for communicating a respondent's entered response to said central evaluation means;

wherein said central evaluation station has means responsive to an instructional signal of said playback means for comparing responses of said respondents to said predetermined response criteria to determine acceptable responses of said respondents;

means coupled to said comparing means for scoring said respondents' acceptable responses in accordance with said instructional signals to assign a value to said respondents' acceptable responses;

means coupled to said scoring means for ranking said acceptable responses of said respondents in accordance with their assigned values; and means communicatively connected to said ranking means for indicating the ranking of responses to said respondents.

9. A method for evaluating responses to recorded task-setting messages provided at a central station and intended for respondents located at receiving stations, the messages being suitable for the playing of a game, the method of evaluation being tamper-resistant, which method comprises:

generating at a central station during a first time interval a first set of signals conveying a task-setting message, a task comprising at least one question which is either a single-part question or a multi-part question;

generating at said central station during a second time interval a second set of signals conveying response criteria for comparing entered responses to response criteria, said second time interval occurring independently of said first time interval, said response criteria
including a scoring basis;

recording said first and second sets of signals for playback;

playing back said first set of signals at said central station;

receiving said first set of signals at said receiving stations;

playing back said second set of signals at said central station, said second set of signals having been determined prior to the playing back of said first set of signals;

providing at said central station means resistant to tampering and inaccessible to said respondents for comparing at least one element in one response of said entered responses with said response criteria;

receiving said second set of signals at said central station;

entering by a respondent, at an individual one of said receiving stations, a response to said task-setting message;

communicating a respondent's response to said central station;

comparing at least one element in one response of a respondent's response with said response criteria and with other entered responses in accordance with said scoring basis to determine the relative standing of entered responses.

10. A method for transmitting task-setting program signals from a central site to a plurality of receiving stations at remote sites and for responding to said program signals at said receiving stations, the program signals being suitable for the playing of a game, said method comprising:

transmitting a task-setting program signal from said central site;

presenting a program transmitted by said program signals to members of an audience at each of said receiving stations;

providing means at said central site for transmitting a first instructional signal incorporating response criteria determining an acceptable response to a task and determining the scoring of an acceptable response to said task, said task comprising at least one question which is either a single-part question or a multiple-part question;

transmitting said instructional signal;

providing means at each of said receiving stations for entering a response by individual members of said audience to a task presented in said program;

entering a response to said task by an individual member;

providing means operable by an individual one of said members for communicating a member's response to a central evaluation facility;

receiving said instructional signal and said member's response at said evaluation facility;

providing means at said evaluation facility, responsive to said instructional signal, for comparing said member's response to said response criteria and for scoring said member's response, said scoring assigning to a response a value determined by said scoring;

comparing and scoring responses of said members, and rank-ordering scored responses; wherein said means for transmitting said instructional signal includes means for generating a second instructional signal which provides for said scoring independently of said first instructional signal, said first instructional signal providing for said comparing; and wherein said response criteria have been determined prior to the transmission of said program signal.

11. A method for evaluating responses to recorded task-setting messages, the messages being suitable for the playing of a game, being provided at a central station and intended for respondents located at receiving stations, which method is tamper resistant and comprises:

generating at said central station during a first time interval a first set of signals conveying one of said task-setting messages;

generating at said central station during a second time interval a second set of signals conveying response criteria defining an acceptable response relative to said task-setting message, said second time interval occurring independently of said first time interval, said response criteria including a scoring basis;

recording said first and second sets of signals for playback;

playing back said first set of signals at said central station;

receiving said first set of signals at said receiving stations;

playing back said second set of signals at said central station;

providing at a central comparing station means resistant to tampering and inaccessible to respondents for comparing at least one element in one response of said responses with said response criteria;

receiving said second set of signals at said comparing station;

entering by respondents at respective ones of said receiving stations, responses to said task-setting message;

communicating a respondent's response to said comparing station;

comparing at least one element in one response of a respondent's response with said response criteria to determine an acceptable response;

scoring accepted responses meeting said response criteria;

comparing the scores of scored responses; and determining at least one winning scored response.

12. A method for evaluating responses to recorded task-setting messages, the messages being suitable for the playing of a game, the messages being provided at a central station and intended for respondents located at receiving stations, which method is tamper resistant and comprises:

generating at said central station during a first time interval a first set of signals conveying a task-setting message;

generating at said central station during a second time interval a second set of signals conveying response criteria defining an acceptable response relative to said task-setting message, said second time interval occurring independently of said first time interval, said response criteria including a scoring basis;

recording said first and second sets of signals for playback;

playing back said first set of signals at said central station;

receiving said first set of signals at said receiving stations;

playing back said second set of signals at said central station;

providing at a central comparing station means resistant to tampering and inaccessible to respondents for comparing at least one element in one response of said responses with said response criteria;

receiving said second set of signals at said comparing station;

entering by a respondent at one of said receiving stations a response to said task-setting message;

communicating a respondent's response to said comparing station;

comparing at least one element in said respondent's response with said response criteria to determine an acceptable response;

scoring accepted responses meeting said response criteria;

comparing the scores of scored responses; and rank-ordering scored responses.

13. A system for conducting a game for a plurality of participants in any one of a plurality of public places or conveyances, including any one of a hotel, a casino, a riverboat and an airplane, comprising:

a recording of a program comprising at least one question or other task requiring a response and an acceptable response to said task, there being participants' identified stations in said public places or conveyances having seats or other accommodations;

a play-back facility for playing back said recording of said program to said participants;

means in communication with said play-back facility for conveying the task of said program to said stations of said participants in said any one of said plurality of public places or conveyances, said conveying means including data presentation means wherein the data is audio-visual data;

means at said participants' stations for responding to said task;

evaluation means, and means for conveying the acceptable response to said task to said evaluation means;

communication means between said participants' stations and said evaluation means for conveying a participant's response to said evaluation means and for identifying individual ones of said participants through said participants' stations;

wherein said evaluation means provides for comparing each of said participant's responses at said any one of said plurality of public places or conveyances to an accompanying acceptable response to determine a winning response, said evaluation means including means for identifying individual ones of said stations having winning ones of said participants through said communication means; and said system further comprises means located at said central location and in communication with said evaluation means for generating a record of winning responses.

14. A system for conducting a game for a plurality of participants in any one of a plurality of public places or conveyances, including any one of a hotel, a casino, a riverboat and an airplane, comprising:

transmitting means at a first location central to said any one of said plurality of public places or conveyances for transmitting a program comprising at least one question or other task requiring a response, and at least one acceptable response to said task, there being participants' identified stations in said public places or conveyances;

means for receiving the task of said program at said participants' stations, said means including audio-visual presentation means;

means at said participants' stations for responding to said task;

an evaluation facility central to the participants at said stations at said any one of said plurality of public places or conveyances, and means for communicating between said participants' stations and said evaluation facility for conveying a participant's response to said evaluation facility, said communication means including means for identifying individual ones of said participants through said participants' stations;

wherein said evaluation facility has means for receiving an acceptable response from said central location and means for comparing the response of each of said participants to an acceptable response to determine participant's winning response;

means for informing winning ones of said participants of a winning response through said communicating means; and means at a second location central to the participants at said stations at said any one of said plurality of public places or conveyances for generating a record of winning responses.

15. A method for conducting a game for a plurality of occupants at playing stations in any one of a plurality of public places or conveyances, including any one of a hotel, a casino, a riverboat and an airplane, comprising the steps of:

formulating at least one task and accompanying response criteria defining at least one successful response to each task and assigning values to successful responses;

transmitting said task and accompanying response criteria from a first location central to the occupants at said stations in said any one of said plurality of public places or conveyances;

receiving and presenting said task to an occupant at one of said playing stations, said presenting being accomplished by an audio-visual presentation;

said occupant responding to said task at said occupant's playing station;

providing a common evaluation facility having means for receiving responses from occupants at said playing stations and response criteria from a second location central to the occupants at said stations in said any one of said plurality of public places or conveyances, said evaluation facility having means for determining a successful response of one of said occupants by comparing a response of said occupant to said response criteria and having means for assigning a value to said successful response in accordance with the response criteria, said facility further having means for generating instructional signals conveying a value assigned to said successful response;

communicating said occupant's response to said common evaluation facility via a communications link, said communications link having identifying means through which a station of one of said occupants can be identified;

determining and assigning a value to an identified successful occupant's response;

providing at a third location central to the occupants at said stations in said any one of said plurality of public places or conveyances recording means communicatively connected to said evaluation facility and said identifying means, said recording means being responsive to said instructional signals for generating a record of the value assigned to an identified occupant's successful-response;

communicating said instructional signals to said recording means;

generating said record; and making the value of said record available to a successful one of said occupants.

16. A method for conducting a game for a plurality of occupants at any one of a plurality of playing stations in public places or conveyances, including any one of a hotel, a casino, a riverboat and an airplane, comprising the steps of:

formulating a set of tasks having at least one task, and response criteria;

defining at least one successful response to each task of said set of tasks;

assigning a value to a successful response;

recording a task of said task set for playback on a playback facility at a first location central to the occupants at said stations in said any one of said plurality of public places or conveyances;

recording the response criteria including value information for playback on said playback facility;

providing storage means at a second location central to the occupants at said stations in said any one of said plurality of public places or conveyances for the response criteria;

playing back and communicating said task from the playback facility to the occupant's stations;

playing back and communicating the response criteria from the playback facility to said central storage means;

providing means for receiving and for presenting said task to an occupant at one of said playing stations, the presenting being accomplished by an audio-visual presentation;

said occupant responding to said task on responding means at said occupant's playing station;

providing an evaluation facility at a third location central to the occupants at said stations in said any one of said plurality of public places or conveyances communicatively connected to said central storage means, said evaluation facility having means for receiving responses and the response criteria, said evaluation facility having means for determining said occupant's successful response by comparing said occupant's response to the response criteria, said evaluation facility having means for assigning a value to said successful response in accordance with the response criteria, said evaluation facility further having means for generating instructional signals conveying a value assigned to the successful response;

communicating said occupant's response to said central evaluation facility via a two-way communications link through which said occupant's station can be identified, said communications link including identifying means;

communicating stored response criteria to said central evaluation facility;

identifying a playing station of a successful one of said occupants through said communications means;

providing at a fourth location central to the occupants at said stations in said any one of said plurality of public places or conveyances recording means communicatively connected to said evaluation facility and said identifying means, said recording means being responsive to said instructional signals for generating a successful occupant's record of a value assigned to said identified occupant's successful response;

generating said record; and making said assigned value available to said successful occupant.

17. The method according to claim 7 wherein said acceptable response is a selection-type answer and is selected from the group comprising a "yes or no" answer, a "true or false" answer, a multiple-choice response, a preference-indicating response and a rank-ordered selection from an array of alternative answers presented to the members of said audience.

18. The system according to claim 6 wherein said signal transmission means at said central site is proximate said evaluation facility.

19. A method for rewarding responses to task-setting messages transmitted from a station central to members of a remote audience who have responded to said messages in a manner meeting response criteria, which method comprises the steps of:

transmitting signals to the members of the remote audience, the signals conveying a presentation of messages defining tasks to be performed by members of the audience;

responding to said tasks by individual ones of the members of said audience;

establishing a facility central to and distant from a plurality of the members of said audience for evaluating a response of a member of the audience in accordance with said response criteria to identify an acceptable answer;

providing to said central facility said response criteria, said response criteria governing responses by said individual ones of the audience members to individual ones of said tasks of said task-setting messages;

evaluating a response of a member of said remote audience based on said response criteria by said central facility;

communicating a response from a member of said audience to said central facility prior to performing said evaluating step; and communicating a result of said evaluating step to said member of said audience upon completion of said evaluating step;

wherein said task-setting messages and said criteria provide for either a single-part question or a multiple-part question, and said task-setting messages and said response-criteria have been determined prior to performance of said responding step.

20. A method according to claim 19 further comprising steps of providing to said central facility scoring criteria governing a scoring of the responses;

providing said central facility with scoring means for scoring the acceptable response in accordance with said scoring criteria; and at said central facility, crediting a member of said remote audience who has responded in a manner meeting said response criteria.

21. A method for rewarding responses to task-setting messages transmitted from a central station to members of a remote audience who have responded to said messages in a manner meeting response criteria, which method comprises the steps of:

transmitting program signals to the members of the remote audience, the program signals conveying a presentation of messages defining tasks to be performed by members of the audience;

providing response means to the members of the remote audience;

providing response criteria for evaluating responses of the members of the remote audience at remote locations to said task-setting messages;

entering responses to said task-setting messages at the response means by individual ones of the members of said audience;

providing scoring criteria for said responses entered by the members of the remote audience;

establishing a facility distant from and common to the members of said audience for evaluating one of said responses of a member of the audience in accordance with said response criteria to identify an acceptable answer;

communicating said response from a member of said audience to said evaluating facility;

at said evaluating facility, comparing individual ones of said responses entered by a member of said remote audience with said response criteria;

at said evaluating facility, scoring responses in accordance with said scoring criteria;

communicating a result of said scoring step to said member of said audience; and crediting a member of said remote audience who has entered said one of said responses meeting said response criteria, said crediting including creating a record of scored response results from said scoring step.

22. A method according to claim 21 wherein said response criteria can be provided independently of a transmission of said program signals.

23. A method according to claim 21 wherein said response criteria can be provided to said evaluating facility independently of a transmission of said program signals.

24. A method according to claim 21 wherein said response criteria can be provided to an individual one of said audience members independently of a transmission of said program signals.

25. A system for evaluating responses by members of an audience to task-setting messages suitable for the playing of a game and being transmitted from a central station to locations remote from the central station, the audience members being located at the remote locations, the system comprising:

transmitter means for transmitting program signals to the remote locations, the program signals conveying a presentation of data including task-setting messages defining tasks to be performed by members of the audience relative to said presentation;

response means at the remote locations operable by individual ones of the audience members for responding to the task-setting messages;

a facility common to and distant from the locations of a plurality of the members of said audience and including means for evaluating a response of a member of the audience in accordance with response criteria to identify an acceptable answer;

communication means linking said response means at said remote locations of said audience members with said common facility, wherein said communication means provides for communication of said response from said member of said audience to said common facility for operation of said evaluating means upon said response; and wherein said task-setting messages and said response criteria provide for either a single-part question or a multiple-part question, and said task-setting messages and said response criteria have been determined prior to entry of a response at said response means by a member of the audience.

26. A system according to claim 25 wherein said communication means provides for communicating a result of an evaluation of the response of said member of said audience.

27. A system according to claim 25 wherein said evaluating means at said common facility comprises means for comparing the response entered by the audience member with said response criteria, and means activatable by individual ones of the members and coupled to said comparing means for scoring a response to output a score based on a scoring basis;

said response means includes means coupled via said communication means to said evaluating means for generating a record on a recording medium, a result of said scoring means appearing on said recording medium upon activation of said scoring means; and said evaluating means provides credits based on said scoring basis to a member of said remote audience who has responded in a manner meeting said response criteria.

28. A system for evaluating responses by members of an audience to task-setting messages suitable for the playing of a game, and being transmitted from a central station to locations remote from the central station, the audience members being located at the remote locations, the system comprising:

transmitter means for transmitting program signals to the remote locations, the program signals conveying a presentation of data accompanied by task-setting messages defining tasks to be performed by members of the audience relative to said presentation;

response means at the remote locations operable by individual ones of the audience members for responding to the task-setting messages;

a facility common to and distant from the locations of a plurality of the members of said audience and having means for comparing with response criteria a response entered by an audience member, and means at said facility for scoring said response to output a score based on scoring criteria;

means for providing said response and said scoring criteria to said facility for evaluating said response of the member of the audience in accordance with said response criteria to identify an acceptable answer, and for scoring an acceptable answer in accordance with said scoring criteria;

communication means linking said remote locations of said audience members with said facility, wherein said communication means provides for communication of said response from the member of said audience to said facility for operation of said comparing means and said scoring means upon said response;

means connecting with said facility for generating a record having said score on a recording medium;

wherein said communication means provides for communicating a result of a scoring of the response to said member of said audience;

said scoring means provides credits to a member of said remote audience who has responded in a manner meeting said response criteria; and said task-setting messages and said response criteria provide for either a single-part question or a multiple-part question, and said task-setting messages and said response criteria have been determined prior to entry of said response at said response means by a member of the audience.

29. A system for evaluating responses by members of an audience to task-setting messages suitable for the playing of a game, and transmitted from a central station to locations remote from the central station, the audience members being located at the remote locations, the system comprising:

a plurality of remote locations for said players;

transmitter means for transmitting program signals to the remote locations, the program signals conveying a presentation of data accompanied by task-setting messages defining tasks to be performed by members of the audience relative to said presentation;

response means at the remote locations operable by individual ones of the audience members for responding to the task-setting messages;

a central facility in communication with said response means, said central facility being distant from the locations of a plurality of the members of said audience and having means for comparing with said response criteria said response entered by an audience member, and means at said central facility for scoring said response to output a score based on scoring criteria;

means for providing signals carrying said response and said scoring criteria to said central facility for evaluating said response of the member of the audience in accordance with said response and said scoring criteria, thereby to identify an acceptable response entered by the audience members;

communication means between the audience member and the central station;

means in communication with said central facility for generating a record having said scoring result on a recording medium;

wherein said scoring means provides credits to a member of said remote audience who has responded in a manner meeting said response and said scoring criteria;

said communication means provides for communication of said response from the member of said audience to said central facility for operation of said comparing means and said scoring means upon said response, and said communication means provides for communicating a result of a scoring of the response to said member of said audience;

at least one of said transmitter means and said providing means provides for modification of their respective signals to alter the acceptability of said response by alteration of a response criteria; and further responses by members of the remote audience are scored in accordance with altered criteria selected from a class of criteria consisting of response criteria and scoring criteria.

30. A system for evaluating responses by members of an audience to task-setting messages suitable for the playing of a game, and transmitted from a central station to locations remote from the central station, the audience members being located at the remote locations, the system comprising:

transmitter means for transmitting program signals to the remote locations, the program signals conveying a presentation of data accompanied by task-setting messages defining tasks to be performed by members of the audience relative to said presentation;

response means at the remote locations operable by individual ones of the audience members for responding to the task-setting messages;

an evaluation facility distant from the locations of and serving a plurality of the members of said audience having means for comparing with response criteria a response entered by an audience member, and means at said facility for scoring said response to output a score based on scoring criteria;

means for providing said response and said scoring criteria to said evaluation facility for evaluating said response of the member of the audience in accordance with said response criteria to identify an acceptable answer;

communication means linking said remote locations of said audience members with said evaluation facility, wherein said communication means provides for communication of said response from the member of said audience to said evaluation facility for operation of said comparing means and said scoring means upon said response;

wherein said communication means provides for communicating a result of said scoring of the response to said member of said audience;

said scoring means provides credits to a member of said remote audience who has responded in a manner meeting said response criteria, and said record includes a scored response result from said scoring means;

at least one of said transmitter means and said providing means provides for modification of their respective signals to provide a second response criteria independently of said transmitting of said program signals; and further responses by members of the remote audience are evaluated in accordance with said second response criteria.

31. A system according to claim 30 further comprising means in communication with said evaluation facility for generating a record having said scoring result on a recording medium.

32. A system for evaluating responses by members of an audience to task-setting messages suitable for the playing of a game, and transmitted from a central station to locations remote from the central station, the audience members being located at the remote locations, the system comprising:

transmitter means for transmitting program signals to the remote locations, the program signals conveying a presentation of data accompanied by task-setting messages defining tasks to be performed by members of the audience relative to said presentation;

response means at the remote locations operable by individual ones of the audience members for responding to the task-setting messages;

a central facility distant from the locations of a plurality of the members of said audience having means for comparing with response criteria a response entered by an audience member, and means at said central facility for scoring said response to output a score based on scoring criteria;

means for providing signals carrying said response criteria and said scoring criteria to said central facility for evaluating said response of the member of the audience in accordance with said response criteria, thereby to identify an acceptable response entered by the audience members;

communication means linking said remote locations of said audience members with said central facility, wherein said communication means provides for communication of said response from the member of said audience to said central facility for operation of said comparing means and said scoring means upon said response;

means in communication with said central facility for generating a record having said scoring result on a recording medium;

wherein said communication means provides for communicating a result of said scoring of the response to said member of said audience;

said scoring means provides credits to a member of said remote audience who has responded in a manner meeting said response criteria, and said record includes a scored response results from said scoring means; and said program signals can be generated to direct an individual one of said audience members independently of a providing of a response criteria signal by said signals providing means.

33. A system for evaluating responses by members of an audience to task-setting messages suitable for the playing of a game and being transmitted from a central station to locations remote from the central station, the audience members being located at the remote locations, the system comprising:

transmitter means for transmitting program signals to the remote locations, the program signals conveying a presentation of data accompanied by task-setting messages defining tasks to be performed by the members of the audience relative to said presentation;

response means at the remote locations operable by individual ones of the audience members for responding to the task-setting messages;

a central facility distant from the locations of a plurality of the members of said audience having means for comparing with response criteria a response entered by an audience member, and means at said central facility for scoring said response to output a score based on scoring criteria;

means for providing said response criteria and said scoring criteria to said central facility for evaluating said response of the member of the audience in accordance with said response criteria to identify an acceptable answer;

communication means linking said remote locations of said audience members with said central facility, wherein said communication means provides for communication of said response from the member of said audience to said central facility for operation of said comparing means and said scoring means upon said response;

means connecting with said central facility for generating a record having said score on a recording medium;

wherein said communication means provides for communicating a result of said scoring of the response to said member of said audience;

said scoring means provides credits to a member of said remote audience who has responded in a manner meeting said response criteria, and said record includes a score from said scoring means;

said providing means includes means for designating a mode of scoring responses of members of said remote audience, said mode of scoring being included in said scoring criteria for establishing said scoring criteria, said designating means being operative independently of a transmitting of the program signals; and said task-setting messages and said response criteria provide for either a single-part question or a multiple-part question, and said task-setting messages and said response criteria have been determined prior to the providing of said response.

34. A method according to claim 15 wherein said first location and said second location and said third location are separate from each other.

35. A method according to claim 15 wherein said first location and said second location and said third location coincide with each other.

* * * * *